(12) United States Patent
Ueno et al.

(10) Patent No.: US 7,831,984 B2
(45) Date of Patent: Nov. 9, 2010

(54) DISK DRIVE WITH ESTABLISHED RESONANCE FREQUENCIES FOR DAMPER MEMBER

(75) Inventors: Shigeto Ueno, Toyonaka (JP); Teruyuki Naka, Izumi (JP); Shinichi Maeda, Daito (JP); Masakazu Ishizuka, Ikoma (JP); Yasuo Kabuta, Tondabayashi (JP); Isao Obata, Nara (JP); Tomoshi Tokunaga, Zama (JP); Akira Yoshida, Zama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/504,549

(22) Filed: Jul. 16, 2009

(65) Prior Publication Data

US 2010/0031278 A1 Feb. 4, 2010

Related U.S. Application Data

(62) Division of application No. 10/501,022, filed as application No. PCT/JP03/00048 on Jan. 7, 2003, now Pat. No. 7,581,233.

(30) Foreign Application Priority Data

| Jan. 10, 2002 | (JP) | ............................. 2002-003630 |
| Jan. 15, 2002 | (JP) | ............................. 2002-005677 |
| Jan. 21, 2002 | (JP) | ............................. 2002-011554 |
| Jan. 23, 2002 | (JP) | ............................. 2002-014081 |
| Feb. 13, 2002 | (JP) | ............................. 2002-035141 |
| Feb. 20, 2002 | (JP) | ............................. 2002-043497 |
| Feb. 28, 2002 | (JP) | ............................. 2002-054099 |
| Mar. 7, 2002 | (JP) | ............................. 2002-061802 |

(51) Int. Cl.
*G11B 33/08* (2006.01)
*G11B 17/044* (2006.01)
*G11B 23/03* (2006.01)

(52) U.S. Cl. ...................................... 720/651; 720/698
(58) Field of Classification Search ................. 720/601, 720/616, 627, 630, 651, 690, 691, 692, 693, 720/694, 698
See application file for complete search history.

(56) References Cited

U.S. PATENT DOCUMENTS 5,164,934 A 11/1992 Kase et al.

(Continued)

FOREIGN PATENT DOCUMENTS

EP 0764947 3/1997

(Continued)

OTHER PUBLICATIONS

European Search Report dated Feb. 26, 2007.
European Office Action dated Nov. 27, 2008.

*Primary Examiner*—Craig A. Renner
(74) *Attorney, Agent, or Firm*—Dickinson Wright PLLC

(57) ABSTRACT

A disk drive includes a disk rotating unit, a traverse base holding the disk rotating unit, a damper member holding the traverse base, a main unit holding the traverse base through the damper member, a tray mounting a cartridge housing the disk, a driving unit that loads or ejects the tray and moves the disk in the cartridge relative to the disk rotating unit, and a traverse base holding member that is moved vertically by the driving unit relative to the main unit at the time of tray loading or tray ejection. The traverse base is held by the traverse base holding member through the damper member, and the resonance frequencies of the damper member in the radius direction of the disk as it is being loaded and in the direction of a rotation shaft are set higher than the maximum rotational frequency of the disk.

2 Claims, 70 Drawing Sheets

U.S. PATENT DOCUMENTS

| | | |
|---|---|---|
| 5,586,104 A | 12/1996 | Choi |
| 5,737,304 A * | 4/1998 | Soga et al. .................. 720/692 |
| 5,777,978 A | 7/1998 | Ota et al. |
| 5,812,511 A | 9/1998 | Kawamura et al. |
| 5,914,929 A | 6/1999 | Kato et al. |
| 5,933,400 A | 8/1999 | Kabasawa |
| 5,956,314 A | 9/1999 | Ishimatsu et al. |
| 6,181,664 B1 | 1/2001 | Kano et al. |
| 6,285,643 B1 | 9/2001 | Arai |
| 6,349,084 B1 * | 2/2002 | Ariyoshi .................... 720/692 |
| 2001/0010674 A1 | 8/2001 | Ahn |
| 2001/0012254 A1 | 8/2001 | Lee |
| 2002/0097657 A1 | 7/2002 | Seo et al. |
| 2003/0193874 A1 * | 10/2003 | Ariyoshi et al. ............ 369/75.2 |

FOREIGN PATENT DOCUMENTS

| | | |
|---|---|---|
| EP | 0 984 446 | 3/2000 |
| JP | 09251696 | 9/1997 |
| JP | 11066716 | 3/1999 |
| JP | 2000-003545 | 1/2000 |
| JP | 2000285561 | 10/2000 |
| WO | 0157865 | 8/2001 |
| WO | 02/23546 | 3/2002 |

* cited by examiner

FIG. 2
(a)
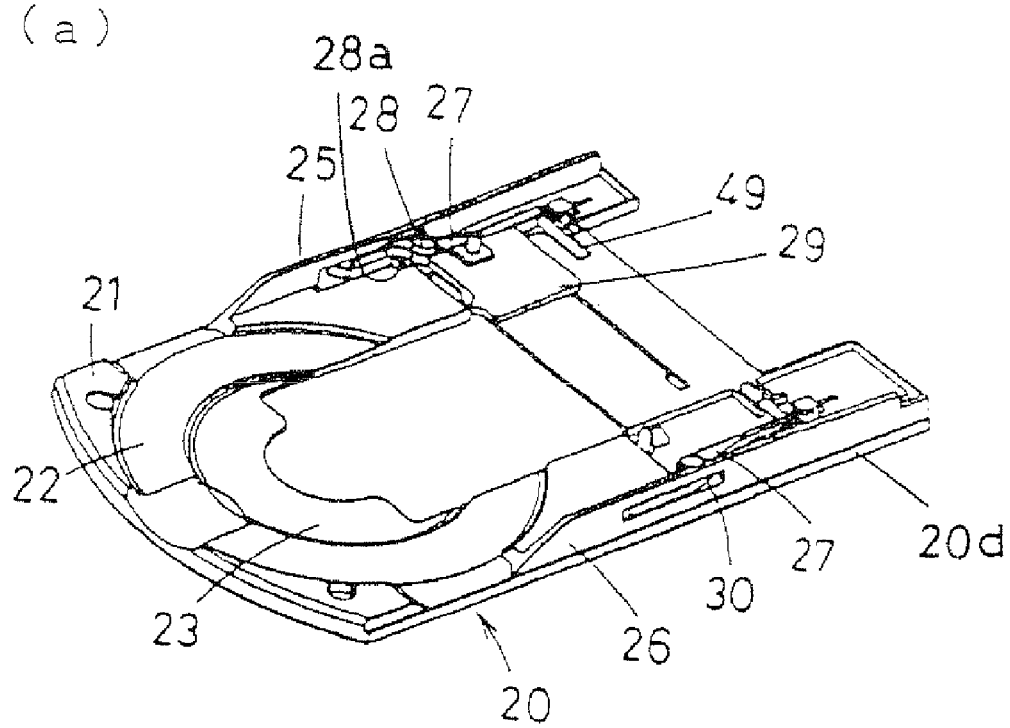
(b)
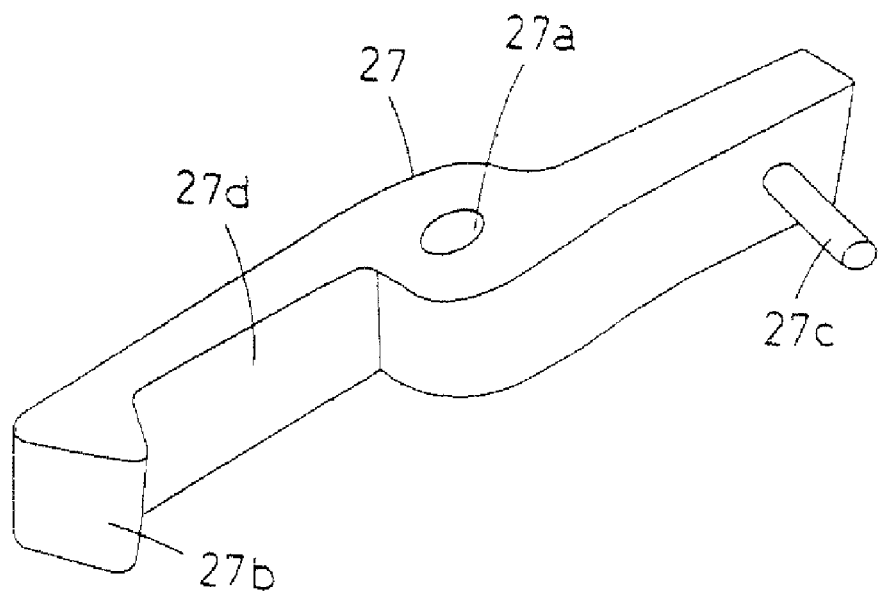

FIG. 5
(a)
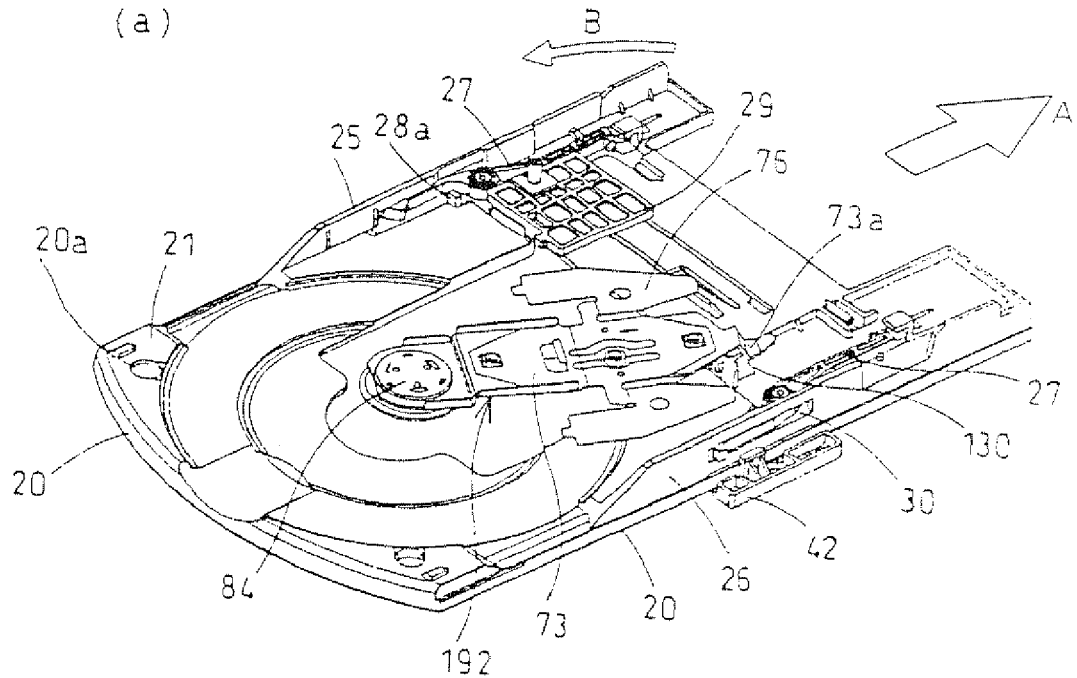
(b)
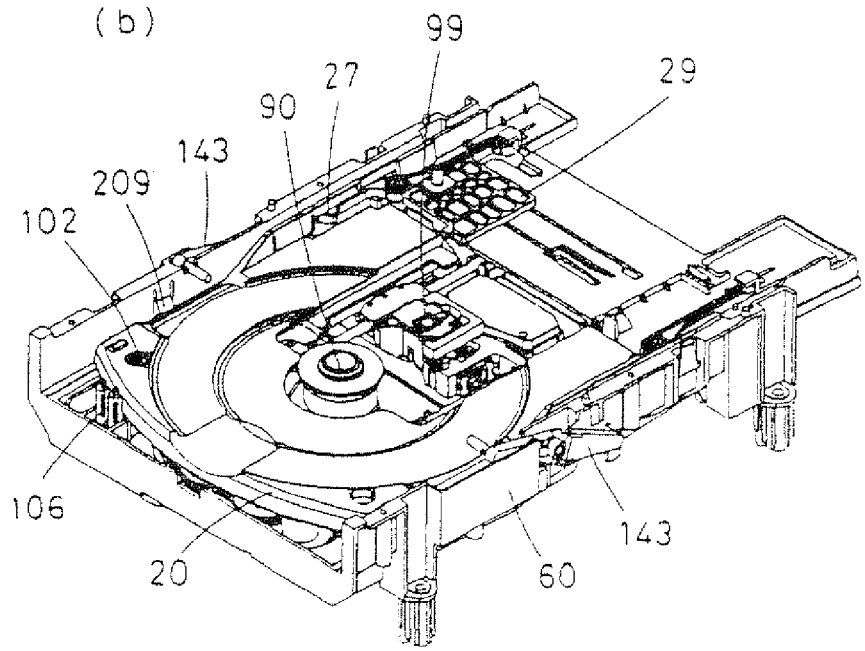

FIG. 8
(a)
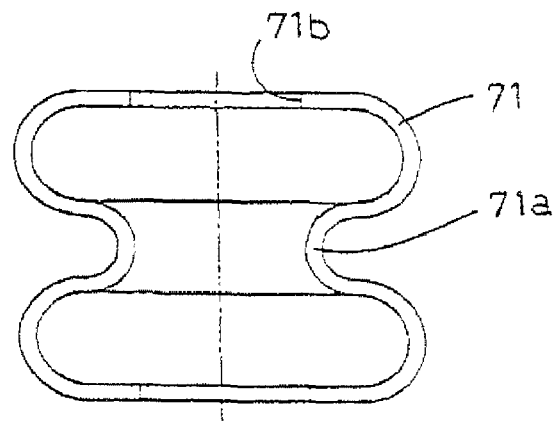
(b)
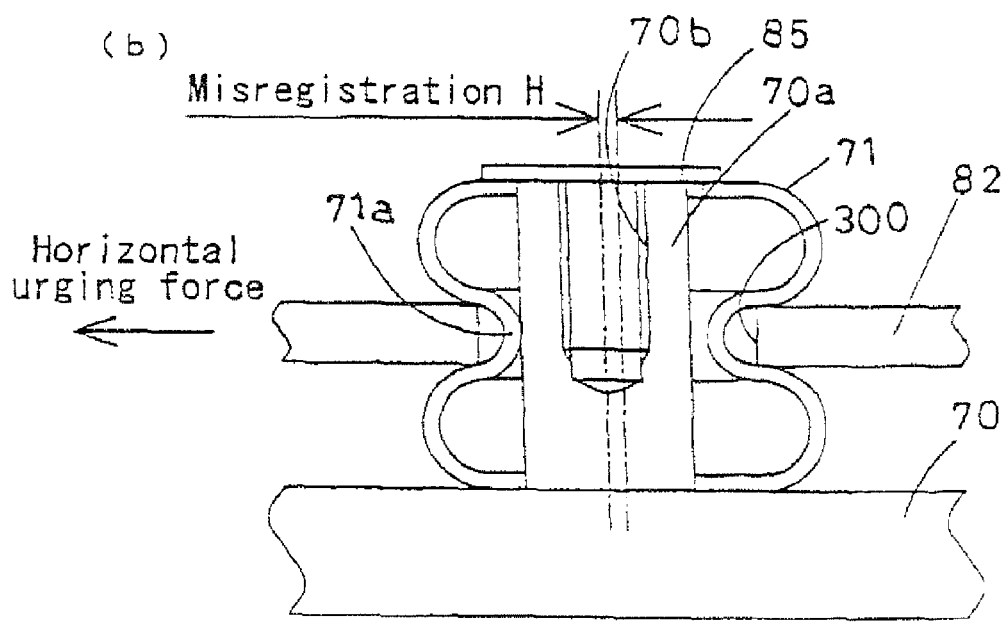

A : Maximum rotational frequency
B : Primary resonance frequency

FIG. 27
(a)
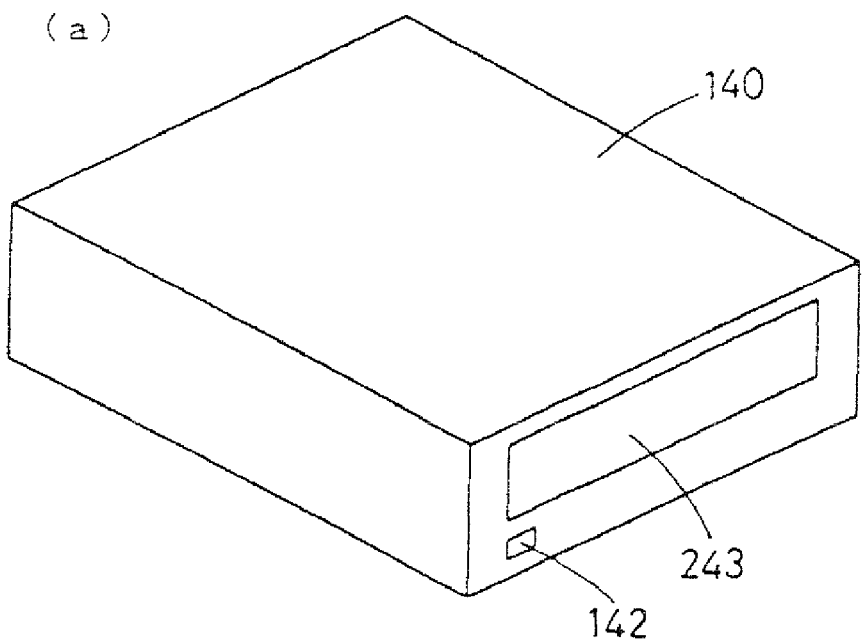
(b)
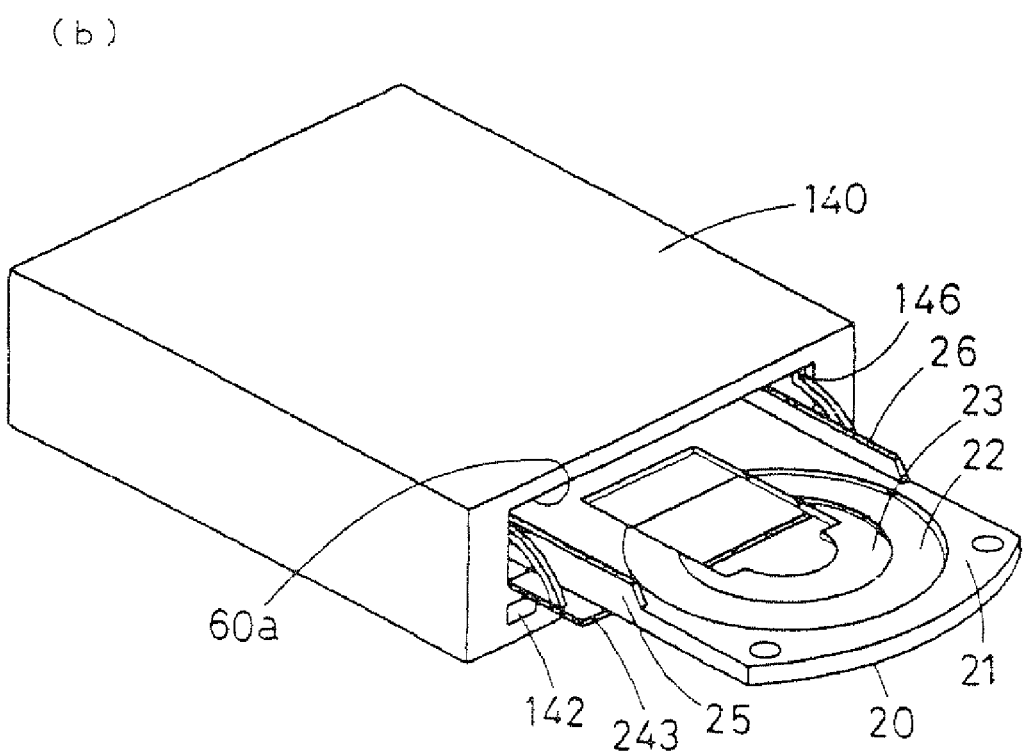

FIG. 30
(a)
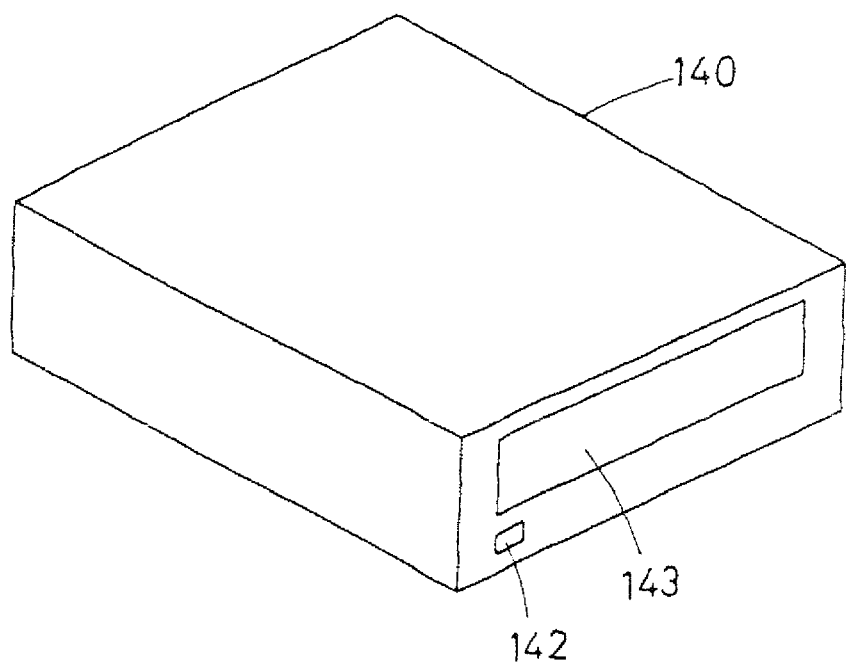
(b)
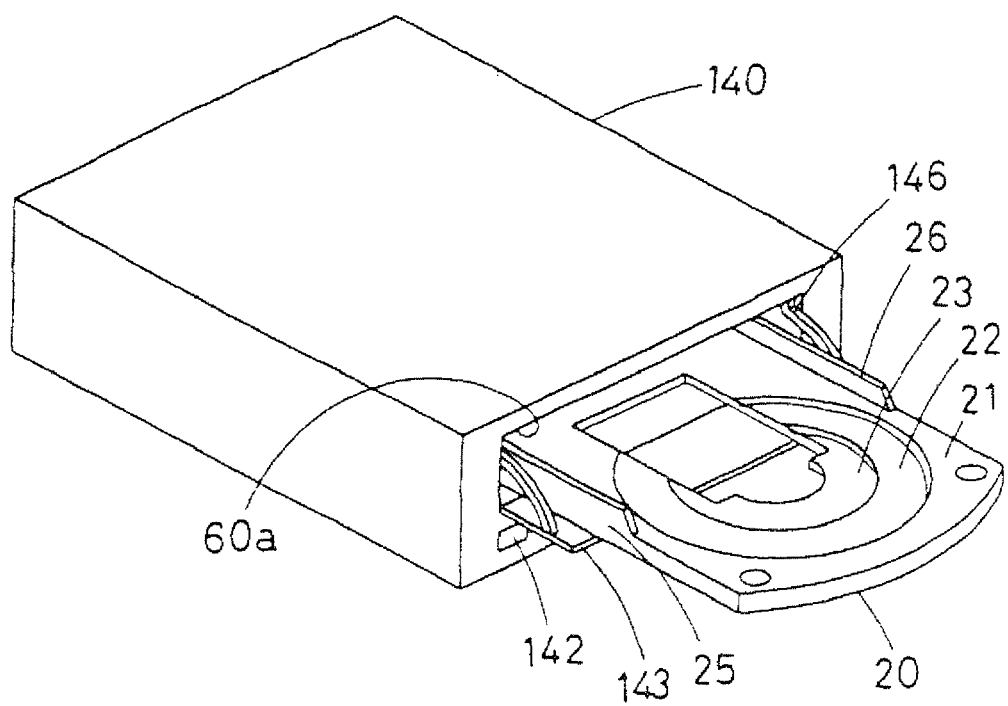

FIG. 31
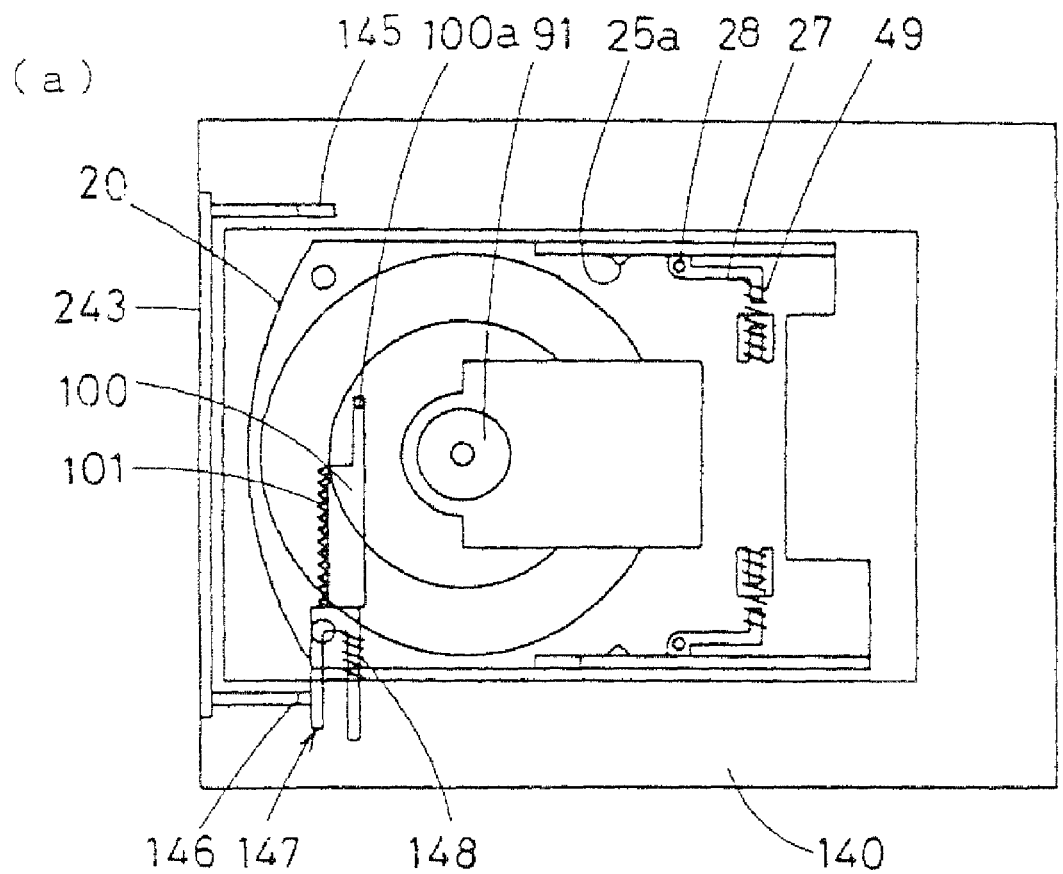
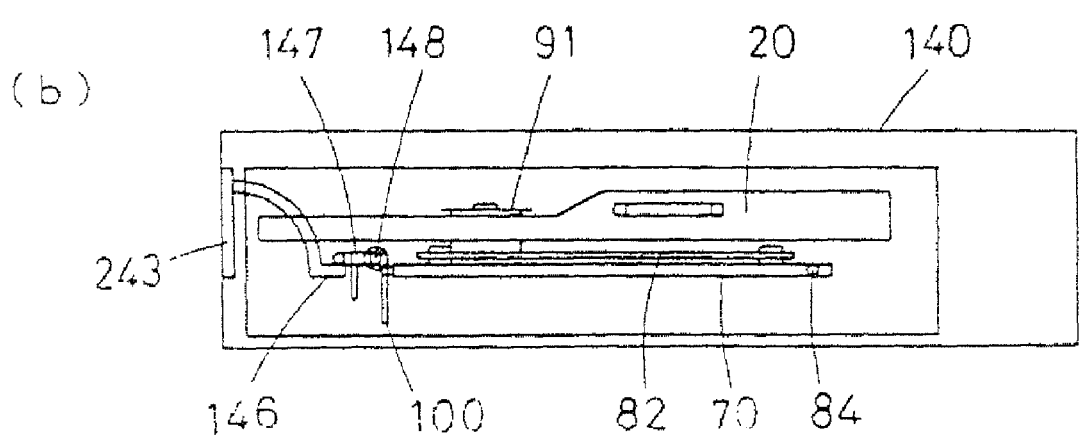

FIG. 33
(a)
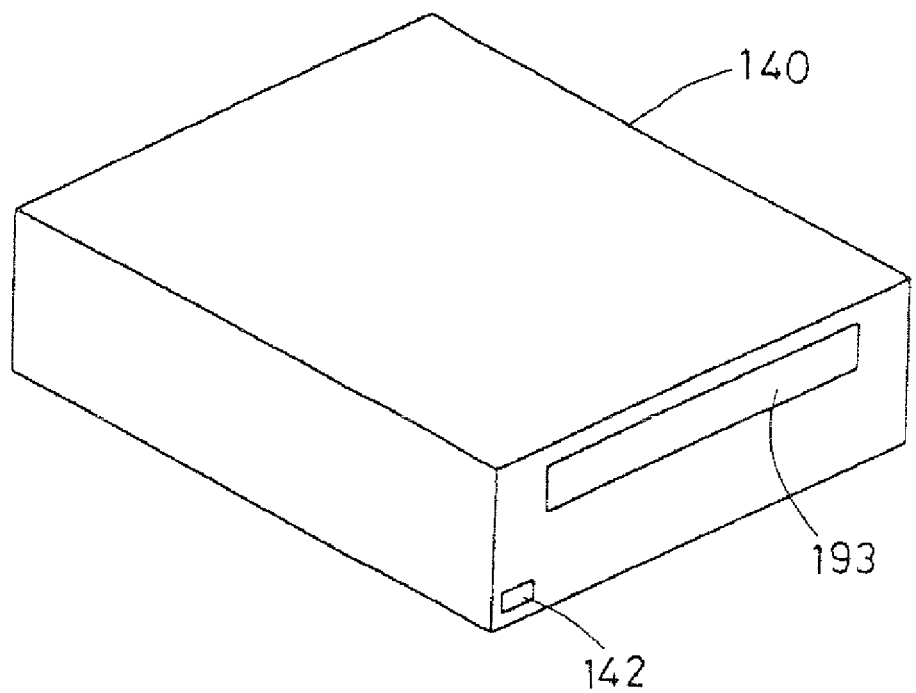
(b)
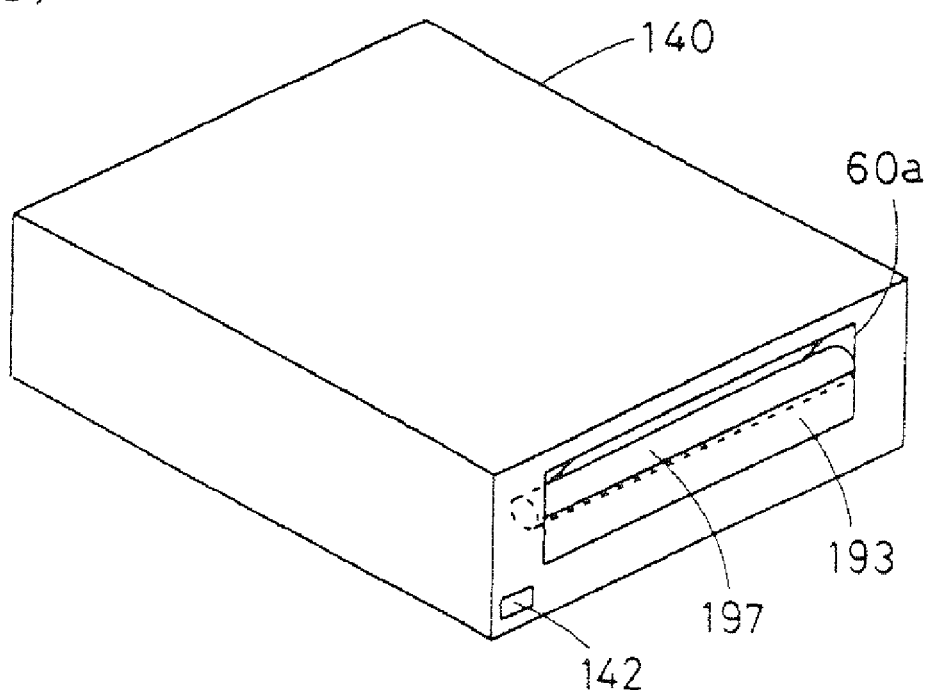

FIG. 34
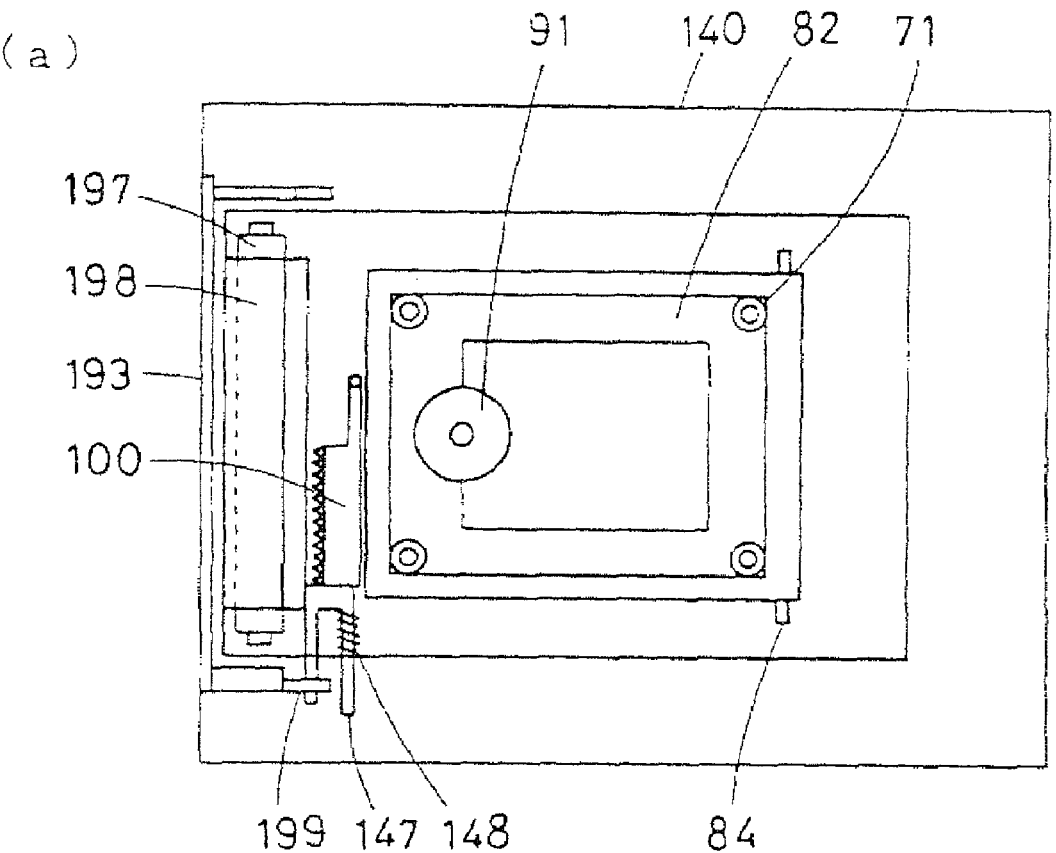
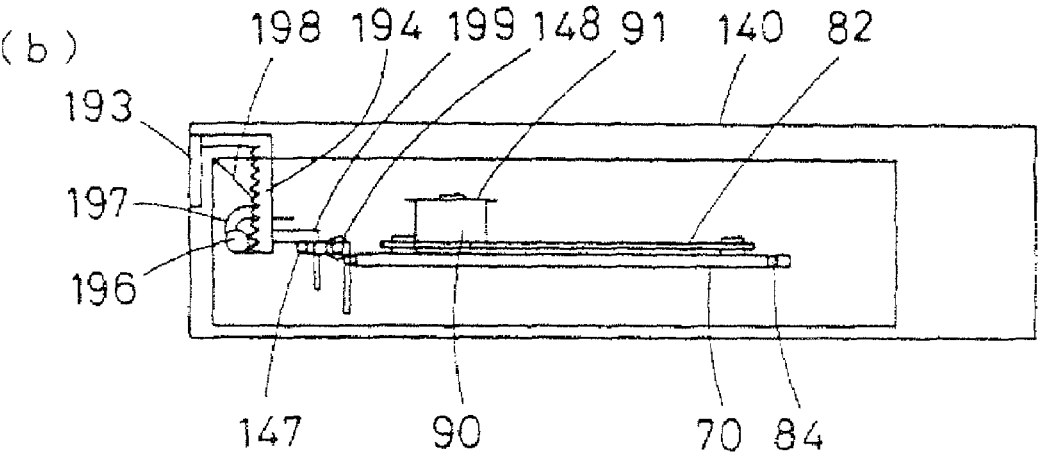

FIG. 35
(a)
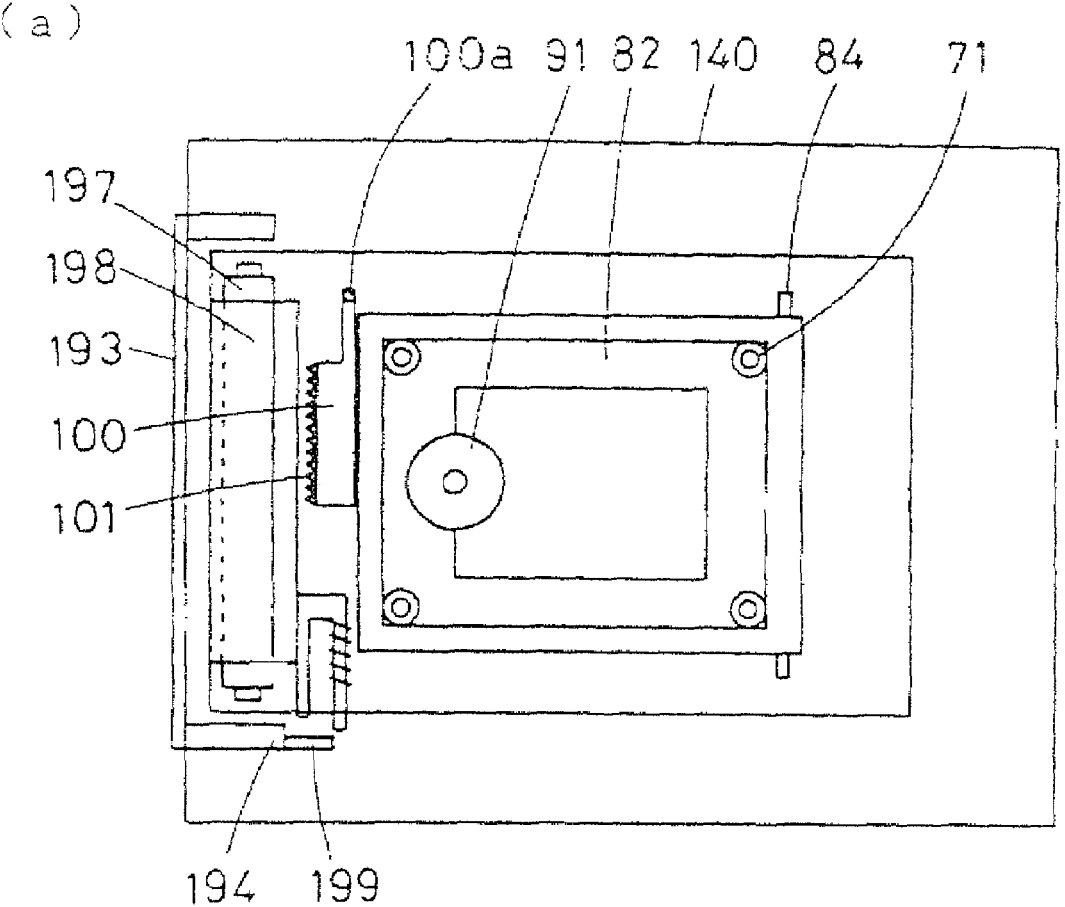
(b)
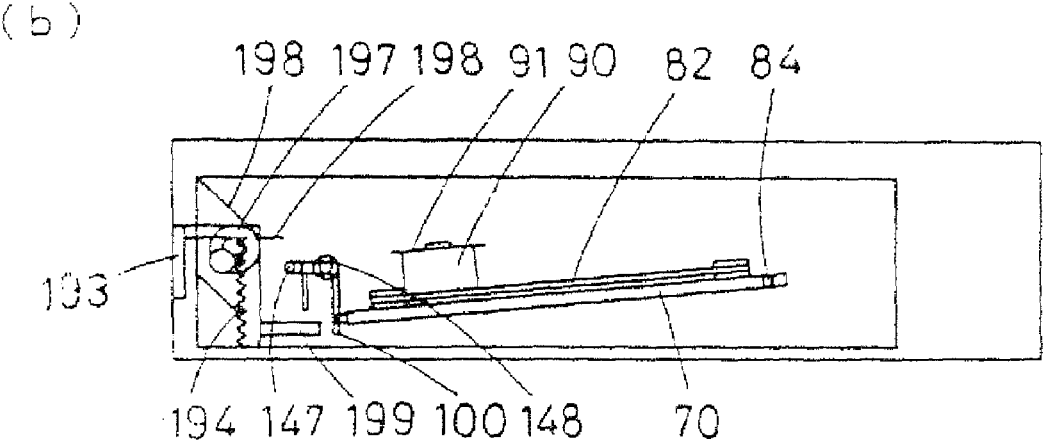

FIG. 48
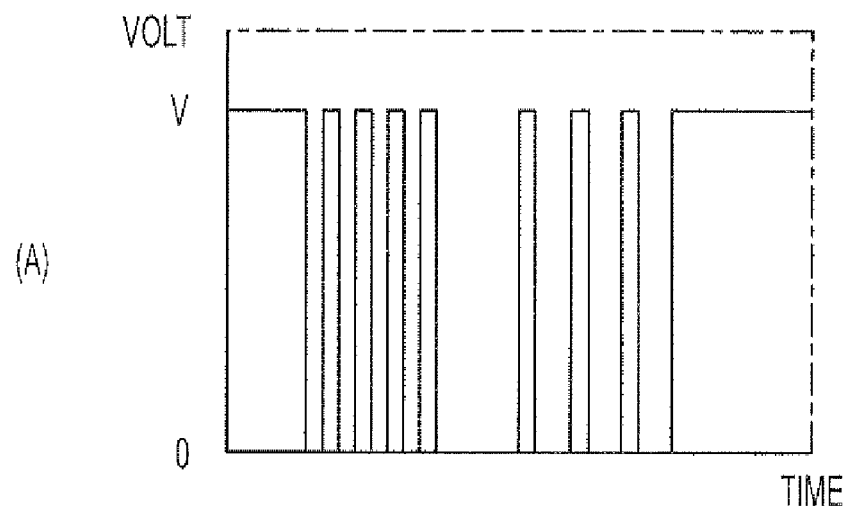
(A) PWM DRIVE VOLTAGE
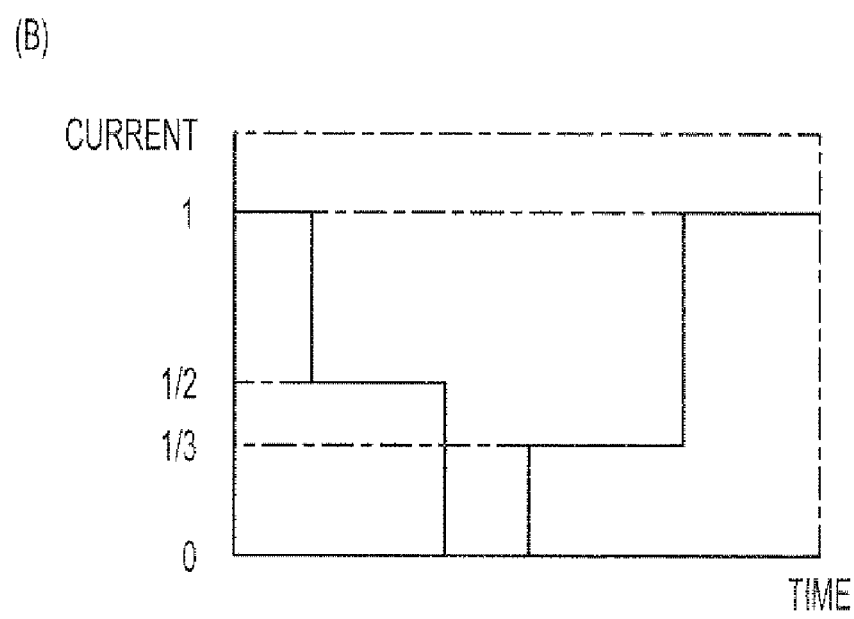
(B) PWM DRIVE CURRENT

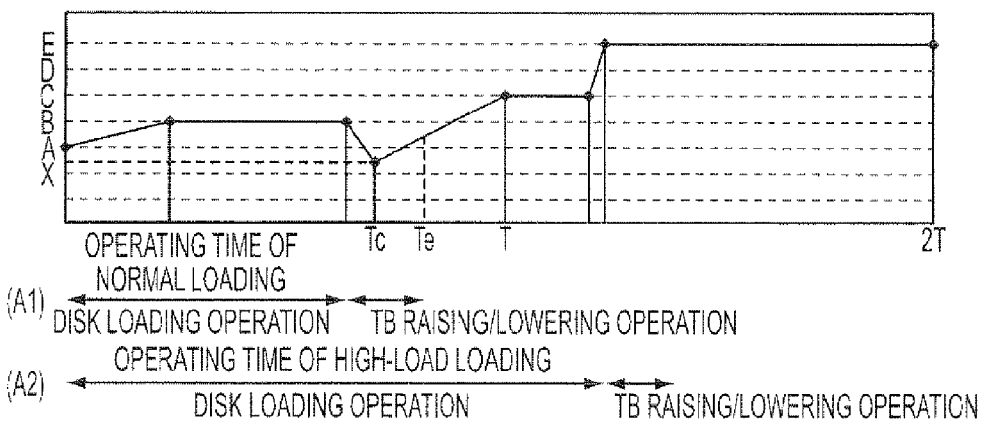
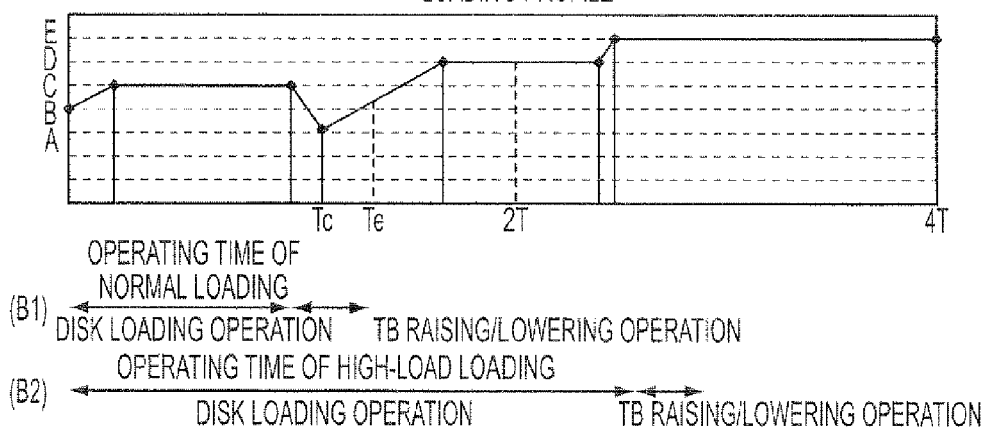
FIG. 49

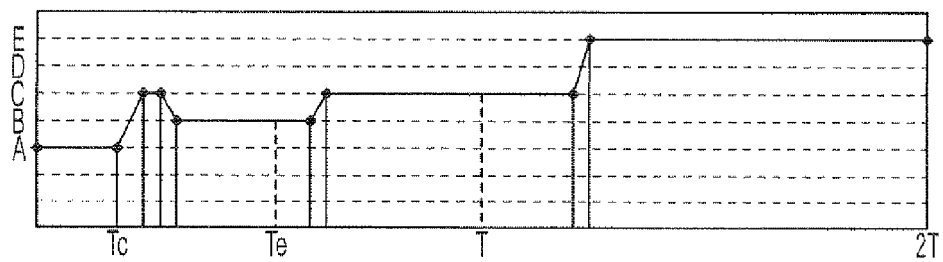
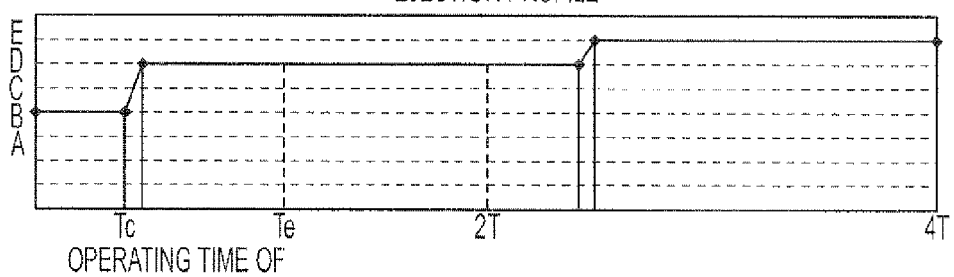
FIG. 50

FIG. 51
(a) 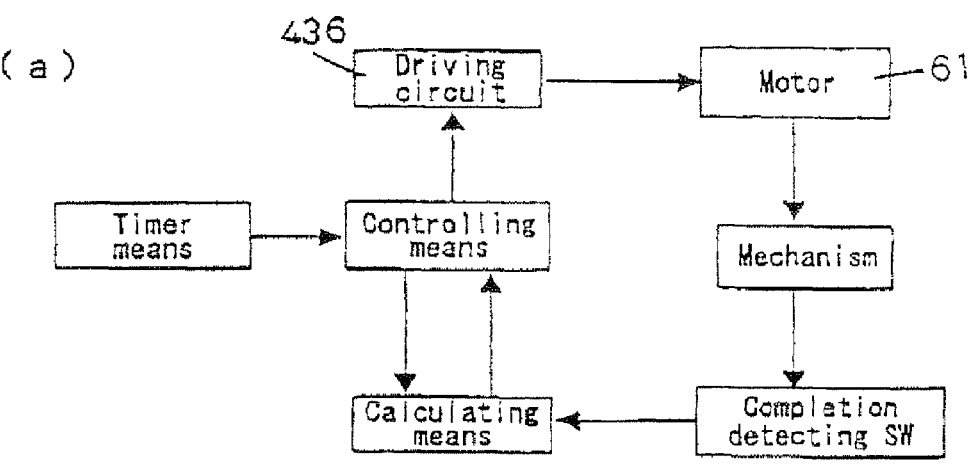
(b) 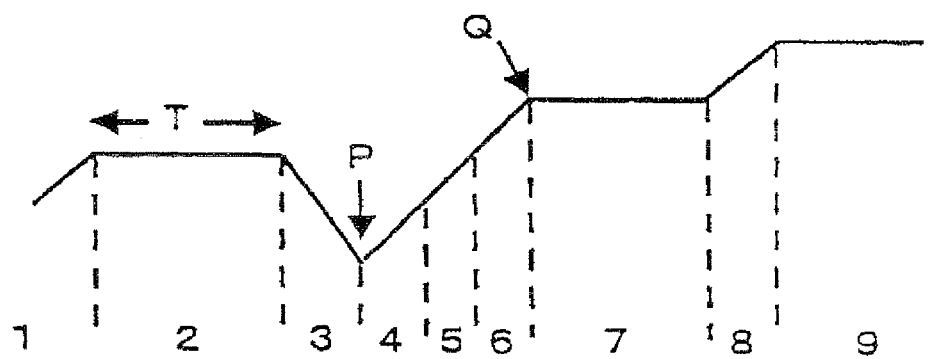
(c) 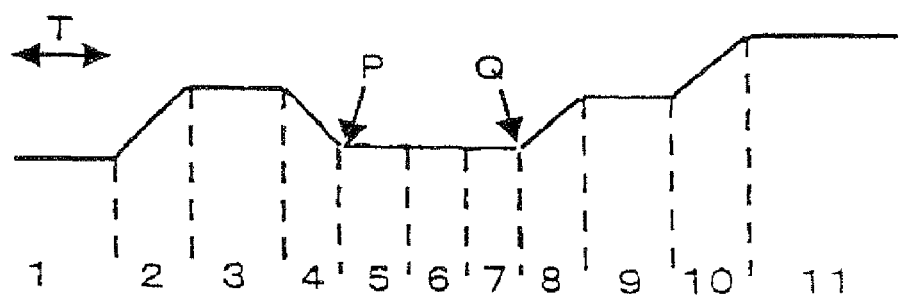

FIG. 52
(a) 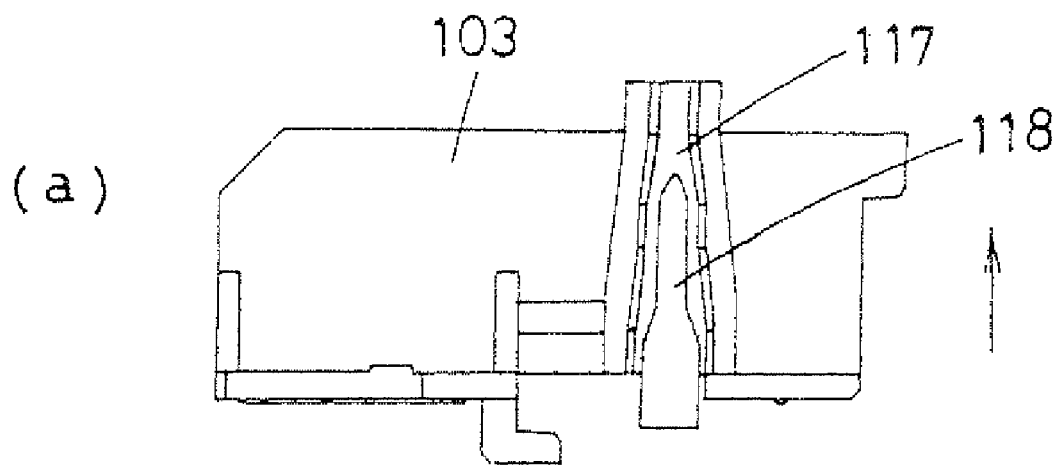
(b) 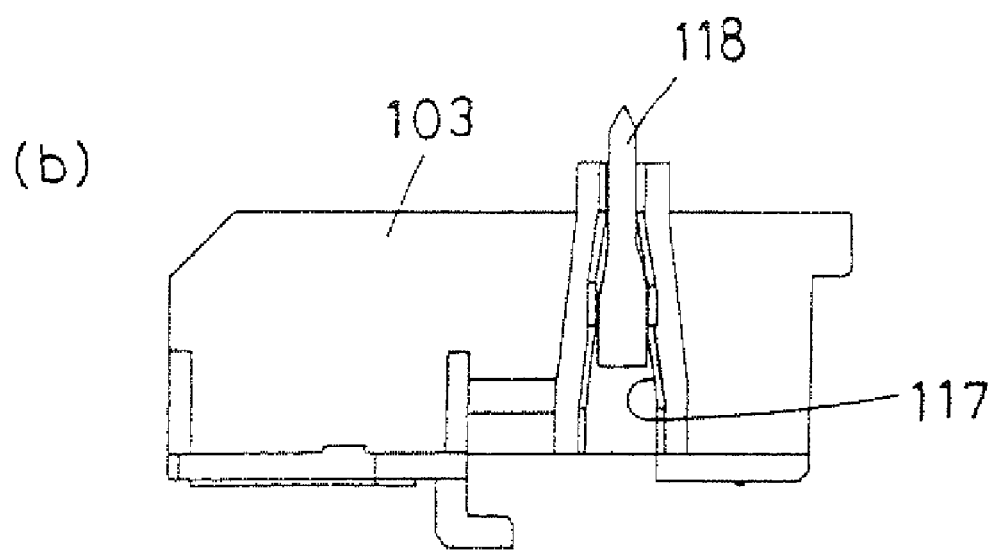

FIG. 57
(a)
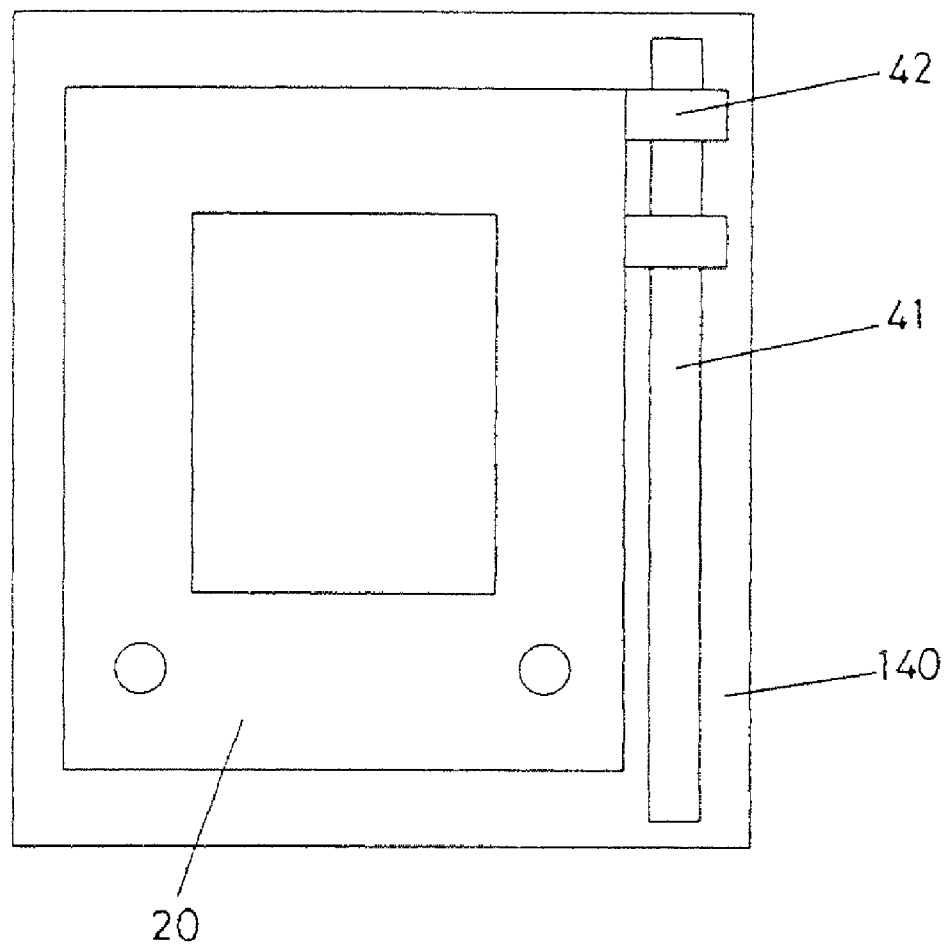
(b)
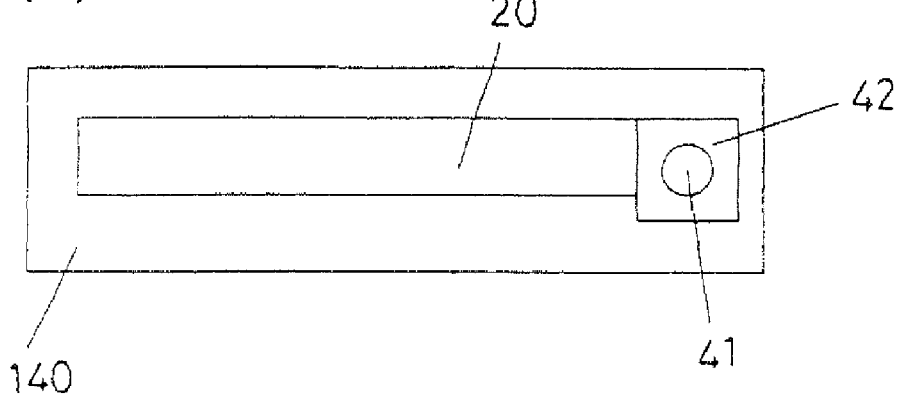

FIG. 58
(a)
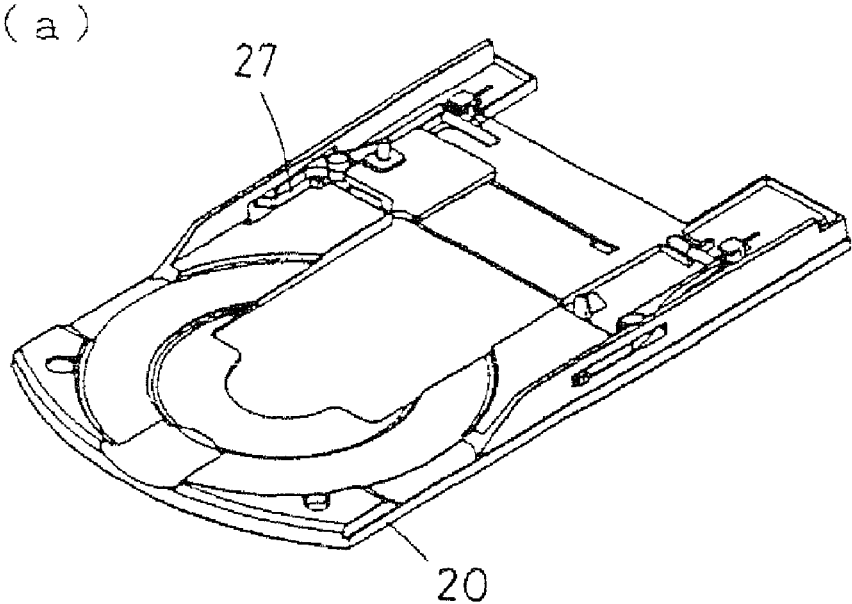
(b)
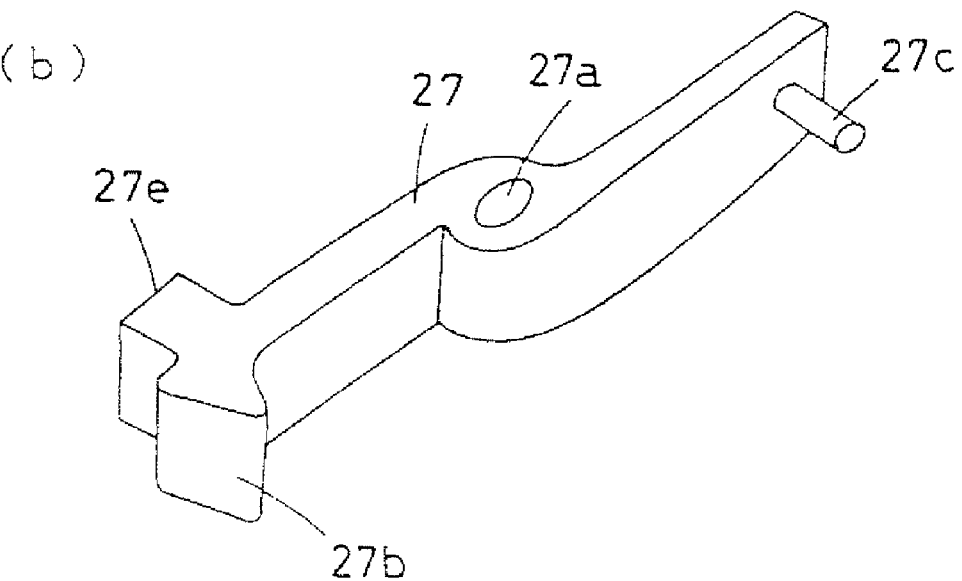

FIG. 59
(a)
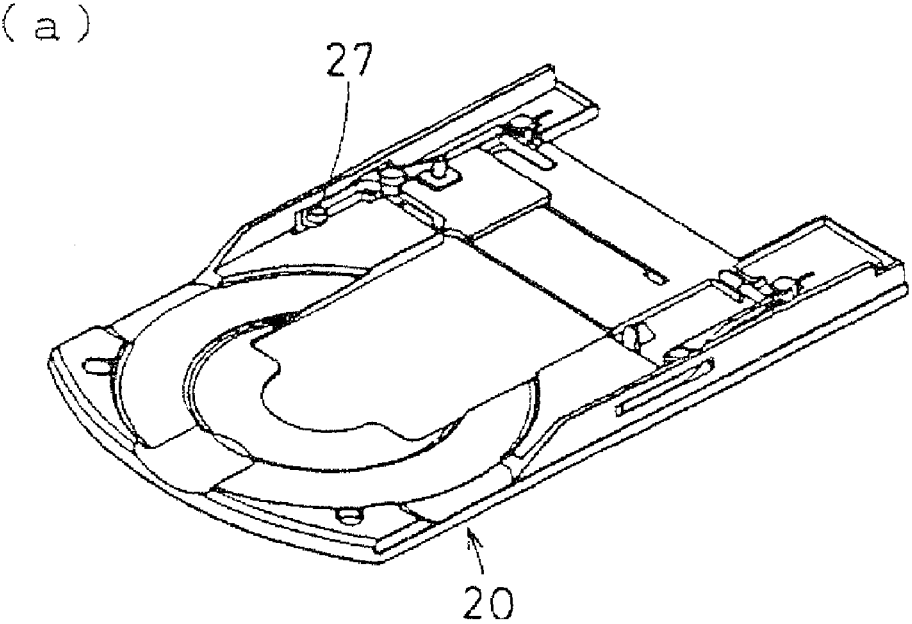
(b)
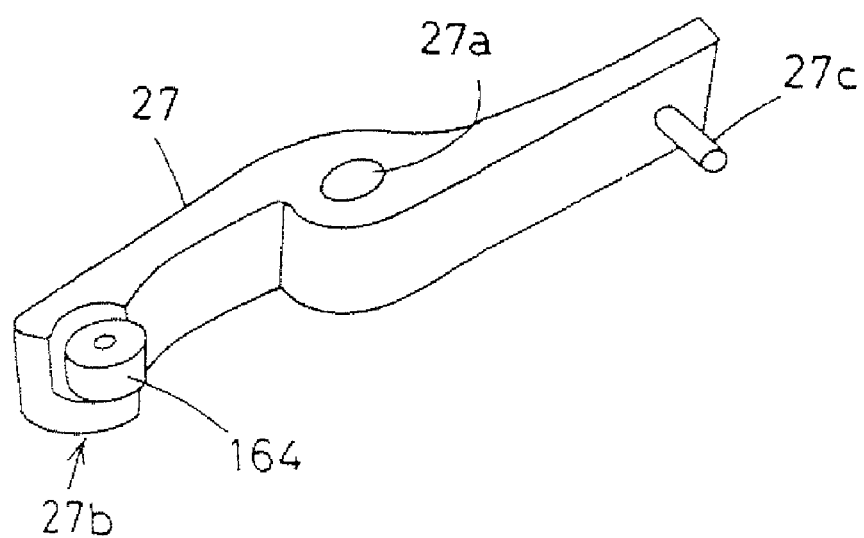

FIG. 60
(a)
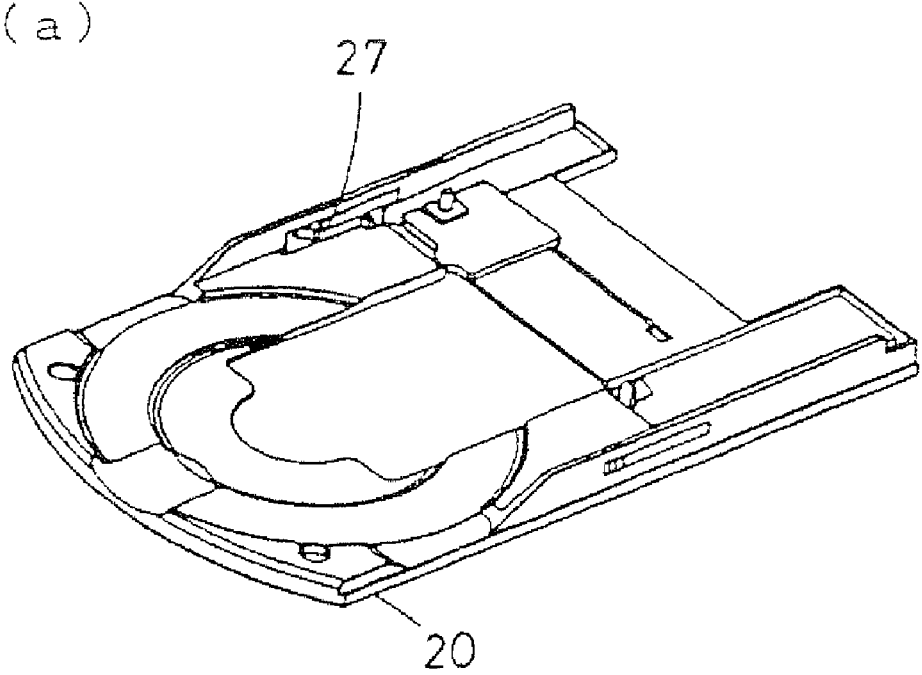
(b)
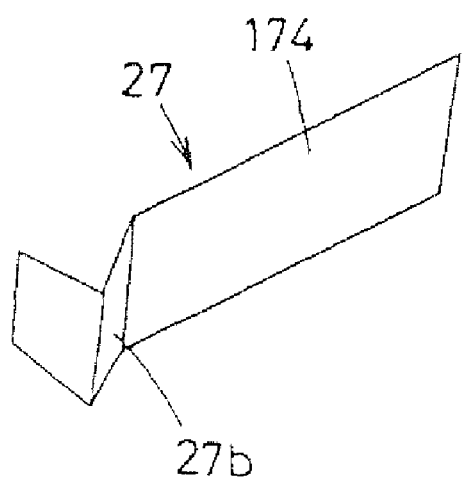

FIG. 61
(a)
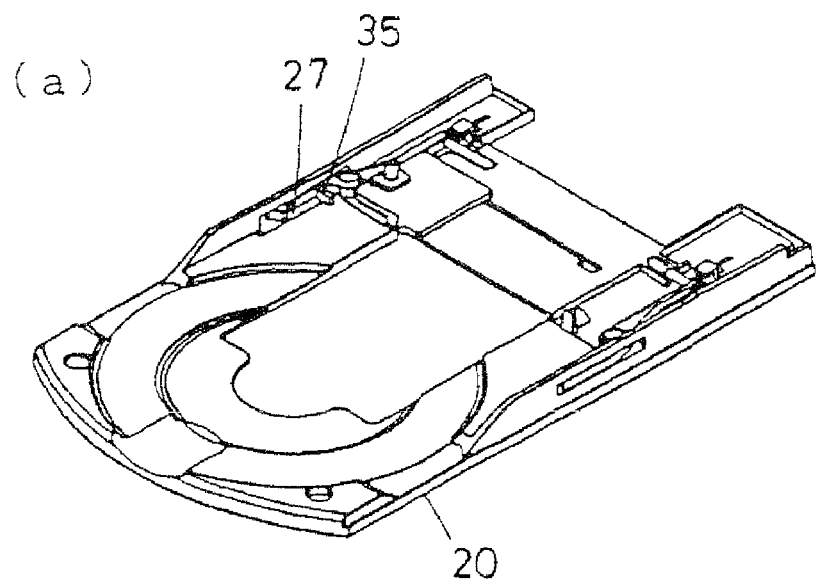
(b)
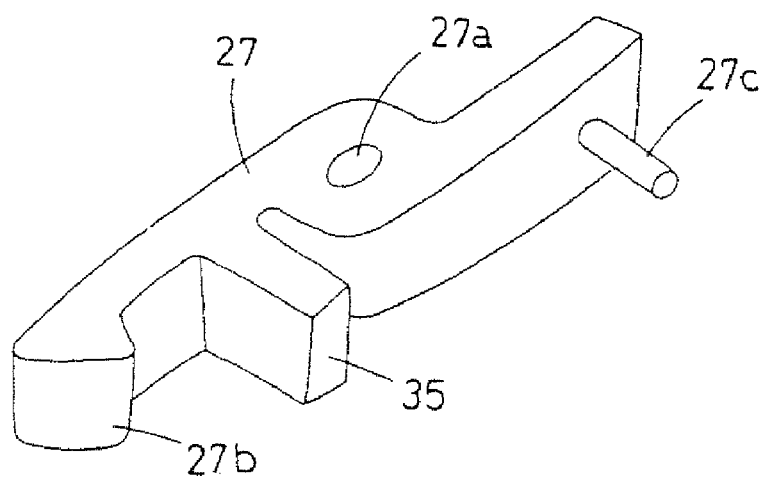

FIG. 68
(a)
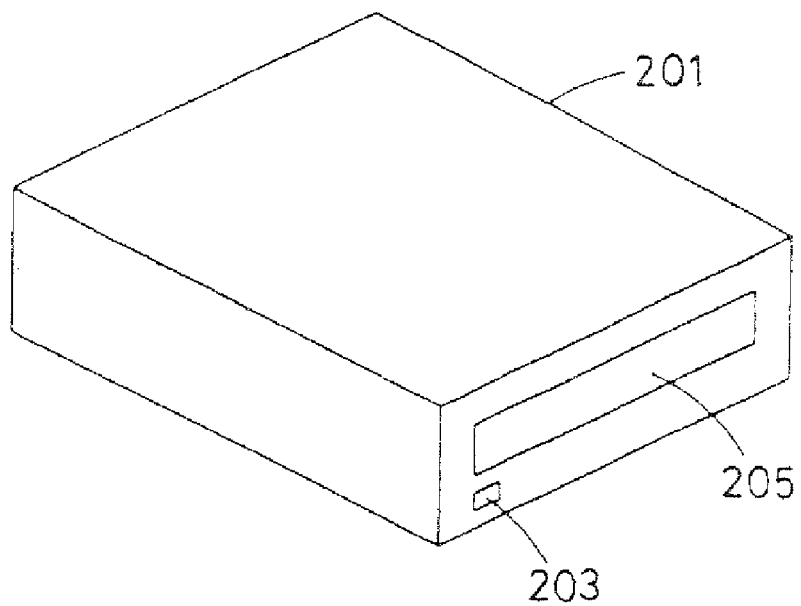
(b)
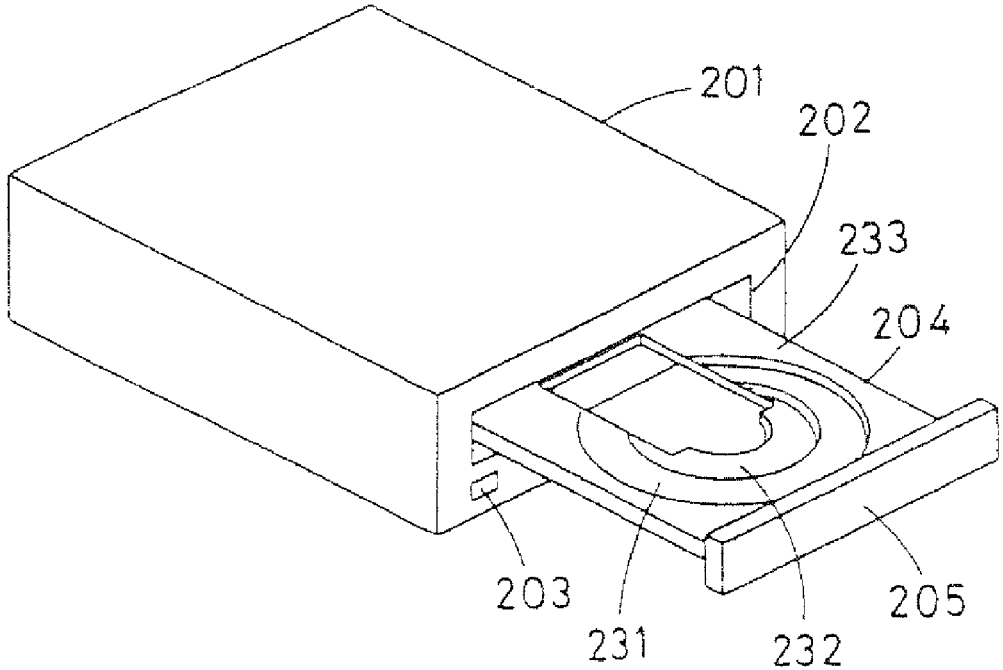

DISK DRIVE WITH ESTABLISHED RESONANCE FREQUENCIES FOR DAMPER MEMBER

This is a divisional application of application Ser. No. 10/501,022 filed Jul. 9, 2004, now U.S. Pat. No. 7,581,233 which is a national stage under 35 USC 371 of PCT/JP2003/000048 filed Jan. 7, 2003, which is based on Japanese Application No. 2002-003630 filed Jan. 10, 2002, Japanese Application No. 2002-005677 filed Jan. 15, 2002, Japanese Application No. 2002-011554 filed Jan. 21, 2002, Japanese Application No. 2002-014081 filed Jan. 23, 2002, Japanese Application No. 2002-035141 filed Feb. 13, 2002, Japanese Application No. 2002-043497 filed Feb. 20, 2002, Japanese Application No. 2002-054099 filed Feb. 28, 2002, and Japanese Application No. 2002-061802 filed Mar. 7, 2002, the entire contents of each of which are incorporated by reference herein.

FIELD OF THE INVENTION

The present invention relates to a disk drive and a disk loading method for an optical disk drive applied to a player, a recorder or the like which records in, reproduces from, or records in and reproduces from a disk such as an optical disk.

More particularly, the present invention relates to holding of a cartridge by means of a tray which mounts a disk stored in a cartridge and a naked disk, loads a disk into inside a disk drive (loading) or ejects a disk out of the disk drive (ejection), and to a cartridge holding mechanism which holds a disk which is stored in a cartridge.

The present invention also relates to a loading method, a loading mechanism and a loading drive for loading a tray into inside a disk drive (loading) or ejects a disk out of the disk drive (ejection).

The present invention further relates to a lock mechanism of a door for blocking an opening which appears after loading of a tray which mounts a cartridge containing a disk or a naked disk, loads into inside a disk drive (loading) or ejects out of the disk drive (ejection), and for blocking an opening which appears after loading of a disk, a cartridge, etc. by a slot-in method which does not require to use a tray.

The present invention further relates to an automatic loading mechanism of a tray which loads an optical disk stored in a cartridge into inside an optical disk drive (loading) or ejects a disk out of the optical disk drive (ejection).

The present invention further relates to a positioning mechanism for cartridge which is used at the time of loading a tray into inside a disk drive (loading).

More particularly, the present invention relates to a cartridge holding mechanism which is built on a tray which places an optical disk stored in a cartridge and a naked disk, loads an optical disk for the purpose of positioning the optical disk to a spindle motor inside disk drive (loading) or ejects an optical disk to outside for the purpose of removing the optical disk.

BACKGROUND ART

A mechanism inside a conventional optical disk drive which drives only a naked optical disk is for flexibly supporting, by means of a damper, only a traverse base which holds a spindle motor for rotationally driving a disk and an optical head for recording in and reproducing from a disk.

Meanwhile, in an optical disk drive which drives an optical disk stored in a cartridge, a traverse base and a loading mechanism for cartridge are formed as one integrated structure and a damper flexibly supports this structure as a whole.

A structure and operations of an optical disk drive which records in and reproduces from an optical disk stored in a cartridge will now be described.

While referring to a conventional optical disk record/reproduce drive shown in FIGS. 62 through 64, placing of a cartridge on a tray, a cartridge holding mechanism, loading of a tray and ejection of a tray will now be described.

In FIGS. 62 and 63, denoted at 1 is a cartridge in which an optical disk 10 is held, denoted at 144 is an eject switch, denoted at 201 is a main unit of the optical disk record/reproduce drive comprising a mechanical chassis 201a and a base frame 201b, denoted at 204 is a tray for seating a cartridge holding an optical disk (not shown) and a naked optical disk 10.

(Structure of Tray)

There are two concave portions, one large and the other small, formed in a concentric arrangement at the center of a cartridge seating surface 233 of the tray 204. The concave portion having a large diameter is a large diameter disk seater 231 while the concave portion having a small diameter is a small diameter disk seater 232, and either one is used in accordance with the outer diameter of a disk which is to be mounted to the optical disk record/reproduce drive 201.

The tray 204 comprises a front wall surface 234, a left wall surface 235 and a right wall surface 236 which are disposed vertically to the cartridge seating surface 233. A cartridge pre-loading member 237 is disposed via a compression coil spring 237a to the innermost side of the tray 204 so as to be freely movable in a forward/backward direction, creating a structure that the cartridge pre-loading member 237 is held by a holding part 250 as it is pre-loaded toward the front of the tray 204 by the spring 237a.

(Structure of Rack Gear)

A rack gear 288, which engages with a last-stage drive gear 219 of a loading gear system 281 which is driven by a loading motor 280 disposed to the mechanical chassis 201a, is disposed to the back surface of the tray 204, and as the rotating direction of the loading motor 280 is switched, the tray 204 is loaded and ejected.

A structure of the tray 204 realizes loading and ejection, as the rotating direction of the loading motor 280 which is disposed to the front of the mechanical chassis 201a is switched.

(Structure of Traverse Base)

Held by the mechanical chassis 201a are a spindle motor 282 which rotates a disk 10 while holding the disk 10, an optical pickup 283 which reads information out from the disk 10 and writes information in the disk 10, a traverse motor 284 which moves the optical pickup 283 in the radius direction of the disk 10, and a traverse base 266 which holds a reed screw 297.

(Structure for Holding Traverse Base)

The traverse base 266 holds the spindle motor 282 which rotates a disk while holding the disk, the optical pickup 283 which reads information out from the disk and writes information in the disk, the traverse motor 284 which moves the optical pickup 283 in the radius direction of the disk, and the reed screw 297.

The rear end of the traverse base 266 is held to the mechanical chassis 201a by means of a torsion spring 266a for free rotations, while the front end of the traverse base 266 is pre-loaded toward below with a low load.

There are two slit holes 291 are formed one on the right-hand side and the other on the left-hand side to the front end 266b of the traverse base 266, and receive a cam lever 285 which is inserted around a rotation shaft 292 which is disposed to a bottom surface of the mechanical chassis 201*a*. The traverse base 266 is driven upward and downward as the cam lever 285 rotates. The cam lever 285 engages with the tray 204 which is located in the vicinity of a loading position, and rotates in accordance with actions made by the tray 204.

(Structure of Alignment Pins)

Also disposed to the traverse base 266 in addition to the spindle motor 282, the optical pickup 283 and the traverse motor 284 are two alignment pins 214 which engage with positioning holes 3 of the cartridge 1 at the front end 266*b* of the traverse base 266, and the alignment pins 214 maintains a clearance between the disk 10 which is held and the cartridge in the spindle motor 282 and positions the cartridge 1 at such a position which does not touch the disk 10.

(Structure of Cartridge State Detecting Switch)

Disk state detecting switches 215 are disposed in the vicinity of the alignment pins 214. The disk state detecting switches 215 are mounted to a printed board, so as to judge an engaging state with a detection hole (not shown) of the cartridge 1 and thereby detect whether it is possible to write in the disk 10 which is stored in the cartridge 1, the back and the front surfaces of the disk 10 and a recording capacity of the disk 10. The plurality of disk state detecting switches 215 and the traverse base 266 are formed as integrated elements.

(Structure of Upper Base)

An upper base 228 is disposed as a top lid to the mechanical chassis 201*a*. Disposed to the upper base 228 are a clamper 210 which fixes the disk 10 to the spindle motor 282, a clamp arm 212 which holds the clamper 210 to the spindle motor 282 in such a manner that the clamper 210 can be freely attached and detached in a vertical direction and cartridge pressing springs 229 which restrict vibrations of the cartridge 1 at the time of loading, and there may be cartridge pressing rollers disposed to four cartridge pressing parts 230 which are disposed around the cartridge pressing springs 229. The urging force of the cartridge pressing springs 229 toward below, via the cartridge pressing parts 230, urges right-hand side and left-hand side ribs on the both sides of the cartridge 1 and accordingly fixes the cartridge 1 to the tray 204.

The urging force of the cartridge pressing springs 229 has a function of urging the cartridge 1 against the tray 204 and the tray 204 against the mechanical chassis 209 immediately after the start of loading until the loading has finished, a function of eliminating rattling which occurs between the cartridge 1, the tray 204 and the mechanical chassis 201*a*, and a function of reducing vibrations and noises which occur at the time of loading and as the disk 10 rotates.

(Structure of Shutter Opener)

Also disposed to the upper base 228 is a shutter opener (not shown) which opens and closes a shutter 2 of the cartridge 1, and loading is performed while opening the shutter opener toward the right-hand side in accordance with the loading of the cartridge 1 with the shutter opener hooked to a projection which is at a front edge of the shutter 2.

As the shutter 2 becomes released, the disk 10 stored in the cartridge 1 is ready to be rotated by the spindle motor 282 and recorded or reproduced by the optical pickup 283.

(Structure of Clamper)

A structure used for mounting the disk 10 to the spindle motor 282 is a structure in which the clamper 210 fixes the disk 10 to a turn table (not shown) on the spindle motor 282.

The clamper 210 comprises members which can be split into two, one above and the other below, and houses a magnet (not shown) inside. In addition, for the purpose of centering of the disk 10 with respect to the turn table, a magnetic element (not shown) is buried in an apex portion of a center cone which is formed at the center. Owing to magnetic suction force of the magnet housed inside the clamper 210 and the magnetic element, the clamper 210 fixes the disk 10 to the turn table.

(Structure of Traverse Driving)

Two metallic shafts named "main shaft" and "sub shaft" disposed to the traverse base 266 holds the optical pickup 283 in such a manner that the optical pickup 283 can freely move in the radius direction of the disk 10.

In the vicinity of the main shaft, there is the reed screw 297 which is directly linked to the traverse motor 284. The optical pickup 283 comprises a nut piece which engages with the reed screw 297, and as the traverse motor 284 rotates, drive force which is in the radius direction of the disk 10 develops in the optical pickup 283 through the nut piece which is in engagement with the reed screw 297 and the optical pickup 283 accordingly moves to a desired radius position on the disk 10 at a high speed.

(Structure of Optical Pickup)

The optical pickup 283 contains highly dense integration of a semiconductor laser, a lens, a light receiving element (not shown), etc. In the opening of the optical pickup 283 in the top surface, an objective lens is supported by a wire spring (not shown) in such a manner that the objective lens can freely move forward, backward, toward above and toward below.

For recording/reproduction of data recorded on the back surface of the disk 10, laser light is focused at the back surface of the disk 10 and a very small spot is accordingly created.

In order to keep the laser light in focus against vibrations in the radius direction of the disk 10 and swaying of the disk 10 along the direction of the rotation shaft, an electro-magnetic actuator (not shown) which develops drive force in the direction of the rotation shaft is attached to the objective lens.

(Support by Rubber Dampers)

The tray 204, the mechanical chassis 201*a*, the traverse base 266, the upper base 228, and mechanical portions of the main unit 201 of the optical disk record/reproduce drive which are held by or fixed to these elements constitute one rigid body, as loading of the tray 204 completes.

The mechanical portions of the main unit 201 of the optical disk record/reproduce drive described above are supported by rubber dampers 290 on the four corners against the base frame 201*b*. Flexible supporting by the rubber dampers 290 ensures an effect that an influence over recording and reproduction of the disk 10 is reduced when the base frame 201*b* is vibrated or impacted from outside.

Operations of the optical disk record/reproduce drive having such a structure described above will now be described in relation to an example of reproducing from the disk 10 stored in the cartridge 1.

(Placing of Cartridge)

For placing of the cartridge 1 on the tray 204 which is surrounded by the front wall surface 234, the left wall surface 235 and the right wall surface 236, the cartridge 1 is slid obliquely toward below from the forward upper side to the tray 204 while pushing the cartridge pre-loading member 237 to the innermost side of the tray 204 at the rear edge of the cartridge 1, and the cartridge 1 is placed on the cartridge seating surface 233 in such a manner that the front edge of the cartridge 1 contacts an inner wall of the front wall surface 234, whereby placing of the cartridge 1 on the tray 204 is completed.

At this stage, the cartridge preloading member 237 presses the front edge of the cartridge 1 against the inside of the front wall surface 234, and the cartridge 1 is positioned with respect to the tray 204 without any rattling in the forward/backward direction or the right/left direction.

(Loading)

The tray 204 now seating the cartridge 1 is automatically loaded into inside the main unit 201 of the optical disk record/reproduce drive because of the drive force of the loading motor 280, while the shutter of the cartridge 1 is opened by the opener. Following this, the alignment pins 214, which are integrated with the traverse base 266 to which the spindle motor 282, the optical pickup and the like are fixed, are inserted in the positioning holes 3 of the cartridge 1, and the cartridge 1 is accordingly optimally positioned relative to the tray 204 and the spindle motor. At about the same time, the disk state detecting switch 215 detect the state of the cartridge 1. In addition, the clamper 210 fixedly holds the disk on the turn table of the spindle motor 282 of the main unit 201, and as the spindle motor 282 rotates, the disk rotates in such a state which permits recording or reproduction.

The tray 204 and the mechanical chassis 201a are molded from a resin, and the slide surface for loading of the mechanical chassis 201a is formed even and smooth. The bottom slide surface of the tray 204 has a convex cross section shaped in the form of a rail and a few guide members are disposed in the vicinity of the slide surface of the mechanical chassis 209, which structure preventing winding of the tray 204 during loading.

At the time of loading of the tray 204, the cartridge pressing springs 229 disposed on the right-hand side and the left-hand side to the upper base 228 and the four cartridge pressing parts 230 in total disposed at the front and the rear ends of the cartridge pressing springs 229 urge the ribs, which are at the right-hand side and the left-hand side ends of the cartridge 1, toward below. Through the cartridge 1 urged toward below by the cartridge pressing parts 230, the tray 204 is urged by the mechanical chassis 209, which allows loading without creating vibrations or noises attributed to rattling in the vertical direction.

Until loading of the tray 204 has completed, the spindle motor 282, the traverse motor 284 and the optical pickup 283 held on the traverse base 266 retract to below the loading path of the tray 204 for the purpose of avoiding interference with the tray 204, the cartridge 1 and the disk 10, and then move close to the disk at the time the completion of the loading.

(Descending of Clamp)

Immediately before loading of the tray 204 completes, a clamp arm driving projection 241 disposed on the tray 204 pushes up one side of the clamp arm 212 disposed with a hinge to the upper base 228 for free rotation while lowering the other side which holds the clamper 210. As a result, the clamper 210 is lowered to such a position which permits clamping of the disk 10.

(Ascending of Traverse Base)

After lowering of the clamper 210, as loading of the cartridge 1 placed on the tray 204 completes, the engagement of the tray 204 and the rack gear 288 gets released, the drive force developed by the drive gear 219 gets separated, and the rack gear 288 alone gets driven toward the rear side to the tray 204. The drive force toward the rear side to the rack gear 117 is transmitted to the cam lever 285 as rotation force upon the cam lever 285, so that the traverse base 266 fit to the cam lever 285 with the slit holes 291 ascends along the slanted surface of the cam lever 285.

(Insertion of Alignment Pin)

As the traverse base 266 ascends, the two alignment pins 214 integrated with the traverse base 266 get inserted into the two positioning holes 3 which are formed in the front of the cartridge 1.

During loading, rattling of the tray 204 with respect to the mechanical chassis 201a, rattling of the cartridge with respect to the tray 204 and the like create a misregistration of the cartridge 1 relative to the spindle motor 282. When the disk 10 rotates with the cartridge 1 misregistered relative to the spindle motor 282, the outer circumference of the disk 10 contacts the inner wall of the cartridge 1 and a noise is accordingly created. In the event that the misregistration is large, it is possible that the contact will serve as a resistance, the clamping of the disk 10 will be dissolved and the disk 10 will be damaged inside the cartridge 1.

As the alignment pins 214 are inserted into the positioning holes 3 of the cartridge 1, the cartridge is finally positioned relative to the tray 204 and the spindle motor, the misregistration of the cartridge 1 relative to the spindle motor 205 improves, and a sufficient clearance is ensured between the cartridge 1 and the disk 10.

(Insertion of Detecting Switch)

At around the same time with insertion of the alignment pins 214 into the positioning holes 3, the state detecting switches 215 as well get inserted to state detecting holes (not shown) of the cartridge 1.

Since there is a large clearance ensured between the state detecting holes and the state detecting switches 215 unlike for the alignment pins 214, even when there is a misregistration of the cartridge 1, the inserting action is sufficiently guaranteed for detection of the state of the cartridge 1.

(Clamping of Disk)

In parallel to insertion of the alignment pins 214 and the state detecting switches 215 to the cartridge 1, during the ascending of the traverse base 266, the center cone is inserted into a center hole of the disk 10 stored in the cartridge 1 and the disk 10 accordingly floats up inside the cartridge 1.

As the disk 10 floats up, the clamper 210 waiting at a clamping position engages with the center cone 222 and the clamping of the disk 10 completes.

(Rotation of Disk)

As the clamping of the disk 10 completes, the spindle motor 282 rotates and the spot created by the laser light emitted from the optical pickup 283 irradiates the back surface of the disk 10.

After this, in accordance with an instruction from a host PC, data already recorded in the disk 10 are reproduced.

(Release of Disk)

After a predetermined recording/reproduction operation for the disk 1 has finished, in accordance with an instruction from the PC or an input signal from the eject switch 144 of the main unit 201 of the optical disk record/reproduce drive, an ejection operation for the cartridge 1 and the disk 10 stored in the cartridge 1 is started.

Being approximately opposite to the loading operation, an ejection operation for the tray 204, will not be described in redundancy.

The conventional optical disk record/reproduce drive described above has a structure that the mechanical chassis 201a holds the traverse base 266, to which the spindle motor 282 which rotates the disk, the optical pickup 283 and the like are held, the tray 204, on which the cartridge 1 is placed and held, the loading motor 280 which loads the tray 204, and the like, and the base frame 201b supports the mechanical chassis 201a through the damper.

However, the conventional optical disk record/reproduce drive has a problem that the drive is complex and large and there is a large load upon the clamper which blocks external vibrations.

Further, the drive load is large since it is necessary to release the shutter of the cartridge, vertically drive the traverse base and position the cartridge all at the same time to thereby realize the structure which holds the cartridge and the optical disk as one integrated unit, and a special drive structure is necessary for the loading mechanism as the cartridge and the optical disk need be held as one integrated unit, which not only hinder an endeavor for size reduction of the drive but also leads to a following further problem which prohibits size reduction.

That is, it is necessary to suppress a misregistration of the cartridge and the housed disk relative to each other, since the clearance between the cartridge and the disk which is housed inside the cartridge is small and the flexible holding is by means of self-excited vibrations, the damper, etc.

FIG. 67 is a timing chart of the sequence of cartridge loading in the main unit 201 of the conventional optical disk record/reproduce drive.

Denoted at 250 is a cartridge placing job of placing the cartridge 1 on the tray 204.

A job occurring at 251 is a cartridge forward-urging job of urging the cartridge against the front wall surface 234 of the tray 204 with the cartridge pre-loading member 237 which is disposed to the rear side of the tray 204 after placing of the cartridge 1 on the tray 204.

As subsequent jobs, denoted at 252 is a tray pushing job of pushing the tray 204 into inside the optical disk record/reproduce drive 201 and denoted at 253 is a load eject switch job of pressing a load eject switch 246, both of which serving as a trigger to start loading of the tray 204.

After either one between the tray pushing job 252 and the load eject switch job 253 is selected, a loading job 254 of loading the tray 204 is started.

Approximately parallel to the loading job 254, a shutter opening job 255, which is of opening the shutter 2 of the cartridge 1, and a cartridge downward-urging job 256, which is of urging the cartridge 1 toward below the tray 204, are carried out.

At 257, a clamp preparing job completes during which the clamp arm and the clamper engaged with projections of the tray 204 are positioned with respect to the cartridge 1 immediately before and by the end of the loading job 254.

The shutter opening job 255 for the cartridge 1 has finished at the end of the loading job 254, and preparation to clamp the disk 10 stored in the cartridge 1 to the spindle motor accordingly completes.

Denoted at 258 is a cartridge positioning job of inserting the alignment pins 214 into the positioning holes 3 which are formed in the cartridge 1 and finishing the positioning of the cartridge 1 relative to the tray 204.

As the traverse base 208 moves upward, the two alignment pins 214 integrated with the traverse base 208 get inserted into the two positioning holes 3 which are formed in the front of the cartridge 1.

During loading, rattling of the tray 204 with respect to the mechanical chassis 209, rattling of the cartridge with respect to the tray 204 and the like create a misregistration of the cartridge 1 relative to the spindle motor 205. When the disk 10 rotates with the cartridge 1 misregistered relative to the spindle motor 205, the outer circumference of the disk 10 contacts the inner wall of the cartridge 1 and a noise is accordingly created. In the event that the misregistration is large, it is possible that the contact will serve as a resistance, the clamping of the disk 10 will be dissolved and the disk 10 will be damaged inside the cartridge 1.

As the alignment pins 214 are inserted into the positioning holes 3 of the cartridge 1, the misregistration of the cartridge 1 relative to the spindle motor 205 improves and a sufficient clearance is created between the cartridge 1 and the disk 10.

Denoted at 259 is a state detecting job, which is performed parallel to the cartridge positioning job 258, of inserting the state detecting switches 215 to the state detecting holes 4 of the cartridge 1 and thereby detecting the state of the disk inside the cartridge 1.

At about the same time of the insertion of the alignment pins 214 into the positioning holes 3 of the cartridge, the state detecting switches 215 as well are inserted into the state detecting holes 4 of the cartridge 1.

Unlike the alignment pins 214, since there is a large clearance between the state detecting holes 4 and the state detecting switches 215, even when there is a misregistration of the cartridge 1, the insertion action is sufficiently guaranteed for detection of the state of the cartridge 1.

Further, denoted at 260 is a disk clamping job during which the spindle motor 205 clamps with the clamper 210 the disk inserted to the center hole 5 of the disk 10.

In parallel to the insertion of the alignment pins 214 and the state detecting switches 215 into the cartridge 1, during the ascending of the traverse base 208, the center cone 122 is inserted into the center hole 53 of the disk 10 stored in the cartridge 1 and the disk 10 accordingly floats up inside the cartridge 1.

As the disk 11 floats up, the clamper 210 waiting at the clamping position engages with the center cone 222 and the clamping of the disk 10 completes.

Denoted at 261 is a record/reproduce job during which the spindle motor 205 rotates the disk and recording in the disk or reading of a record is realized because of the function of the optical pickup 207.

As the clamping of the disk 10 completes, the spindle motor 205 rotates and the spot created by the laser light emitted from the optical pickup 207 irradiates the back surface of the disk 10.

After this, in accordance with an instruction from the host PC, data already recorded in the disk 10 are reproduced.

After a predetermined recording reproduction operation for the disk 1 has finished, in accordance with another instruction from the PC or an input signal from the eject switch 144 of the main unit 201 of the optical disk record/reproduce drive, the ejection operation for the cartridge 1 and the disk 10 stored in the cartridge 1 is started.

Being approximately opposite to the loading operation, an ejection operation of the tray 204 of the conventional optical disk record/reproduce drive, will not be described in redundancy.

The conventional optical disk record/reproduce drive described above has the following problems.

(1) During loading into the optical disk record/reproduce drive with the cartridge placed on the tray, because of the cartridge pressing springs, the load urging the cartridge is added to the loading load acting only upon the tray, and thus, a load upon the loading motor and the loading gear system is large.

(2) Although the cartridge pressing springs urges the cartridge against the tray through the cartridge pressing members (rollers) during loading, if a foreign matter gets nipped between the cartridge pressing members and the cartridge, the surface of the cartridge may get damaged.

(3) Since friction force acting on the tray is superimposed upon the weight of the cartridge because of the urging force in the forward/backward direction exerted by the cartridge pre-loading member and the urging force exerted by the cartridge pressing springs during positioning of the cartridge, the insertion force of inserting the alignment pins increases, and therefore, a large load acts upon the support structure supporting the alignment pins, the loading motor which drives the alignment pins in the vertical direction, and the loading gear system.

(4) When there is a large misregistration of the cartridge, the forward/backward direction urging force exerted by the cartridge pre-loading member and the function force upon the tray exerted by the cartridge pressing springs may make it difficult to insert the alignment pins and may prohibit accurate positioning of the cartridge.

With reference to a CD=ROM drive structure of the conventional optical disk record/reproduce drive, a structure that the tray blocks an opening for loading and ejection and operations of the drive will now be described.

In FIG. 68, denoted at 201 is the main unit of the optical disk record/reproduce drive, denoted at 202 is an opening of the main unit for loading and ejection of the tray, denoted at 203 is an operation button of the load eject switch, and denote at 204 is the tray on which the optical disk is placed.

There are two concave portions 231 and 232, one large and the other small, formed in a concentric arrangement at the center of the cartridge seating surface 233 of the tray 204. The concave portion 231 having a large diameter is a large diameter disk seater while the concave portion 232 having a small diameter is a small diameter disk seater, and either one is used in accordance with the outer diameter of a disk which is to be mounted to the main unit 201 of the optical disk record/reproduce drive.

In addition, a tray decoration 205 is formed in the front surface of the tray 204. The structure is that upon completed loading of the tray 204, the tray decoration 205 blocks the opening 202 of the main unit 201 of the optical disk record/reproduce drive.

The back surface of the tray 204 seats a rack gear (not shown) engaged with the last-stage drive gear of the loading gear system which is linked to the loading motor (not shown) which is disposed to the front side of the mechanical chassis of the main unit 201. This realizes a structure that as the rotating direction of the loading motor is switched, the tray 204 is loaded and ejected.

As described above, the CD-ROM drive has a structure that the CD-ROM drive comprises the tray 204 which accepts only a naked disk and the tray decoration (lid) 205 which is integrated with the tray 204 blocks the opening 202. The tray 204 is mechanically locked after inserted and the tray decoration 205 blocks the opening 202 at about the same time, and hence, it is impossible to pull out the tray 204 by hand or insert a finger, a foreign matter or the like from outside.

The conventional optical disk record/reproduce drive described above has the following mechanical problems.

Because of the structure described above with the conventional tray 204, it is not possible to place both a naked disk and a disk stored in the cartridge on the tray 204. Even if the structure of the disk seating surface of the tray 204 is modified so as to make it possible to place the cartridge, with the tray decoration 205 still remaining in the front of the tray 204, placing of the cartridge onto the tray 204 or ejection of the cartridge from the tray is inconvenient since only the side surfaces of the cartridge are where the cartridge is held. There is a problem that a child with small hands or an aged person whose force for grasping at the cartridge with fingertips, in particular, can not easily place the cartridge or take out the cartridge.

If the tray decoration 205 is removed or the tray decoration 205 is locally notched to thereby hold the cartridge at the front and eventually accept the cartridge, an opening to outside the drive will be created in the front of the optical disk record/reproduce drive, which may invite dirt, a foreign matter or the like into the drive during operations of the drive or may encourage a child to touch a rotating disk and hurt the child. There is also a possibility that diffracted light of the strong laser light reflected by the recording surface of the disk will leak out at the front opening, and depending on installation of the drive, will impinge upon an eye and damage a retina.

As for an optical disk record/reproduce drive of the so-called slot-in type which does not use a tray but requires a roller in the front of the optical disk record/reproduce drive for loading of a disk into inside the drive by means of rotations of the roller, when the drive is compatible only with a naked disk, a lid for blocking the opening is not necessary as long as there is a path for a thin disk to pass. However, use of the slot-in type compatible with a cartridge does require a path for a thick disk to pass, and hence, a lid structure for blocking the opening.

The conventional optical disk record/reproduce drive shown in FIGS. 62, 69 and 70 will now be described. In these drawings, denoted at 201 is the main unit of the optical disk record/reproduce drive, denoted at 204 is the tray for seating the cartridge 1 storing the optical disk (not shown) and a naked optical disk (not shown), denoted at 205 is the state detecting switch which is disposed to the tray 204 and detects completed placing of the cartridge 1, denoted at 206 is a flexible lead which connects the state detecting switch 205 with a control circuit.

There are two concave portions, one large and the other small, formed in a concentric arrangement at the center of a cartridge seating surface 233 of the tray 204. The concave portion having a large diameter is a large diameter disk seater 231 while the concave portion having a small diameter is a small diameter disk seater 232, and either one is used in accordance with the outer diameter of a disk which is to be mounted to the main unit 201 of the optical disk record/reproduce drive.

The tray 204 comprises the front wall surface 234, the left wall surface 235 and the right wall surface 236 which are slightly larger than the outer size of the cartridge 1 and disposed vertically to the cartridge seating surface 233. The cartridge pre-loading member 237 is disposed via a compression coil spring 237a to the innermost side of the tray 204 so as to be freely movable in the forward/backward direction, creating a structure that the cartridge pre-loading member 237 is held by the holding part 250 as it is pre-loaded toward the front of the tray 204 by the spring 237a.

The rack gear (not shown), which engages with the last-stage drive gear of the loading gear system which is driven by the loading motor disposed to the front of the mechanical chassis, is disposed to the back surface of the tray 204, and as the rotating direction of the loading motor is switched, the tray 204 is loaded and ejected.

Operations of the optical disk record/reproduce drive having such a structure described above will now be described in relation to an example of reproducing from the disk stored in the cartridge 1. For placing of the cartridge 1 on the tray 204 which is surrounded by the front wall surface 234, the left wall surface 235 and the right wall surface 236, the cartridge 1 is slid obliquely toward below from the forward upper side to the tray 204 while pushing the cartridge pre-loading member 237 toward the innermost side to the tray 204 at the rear edge of the cartridge 1, and the cartridge 1 is placed on the cartridge seating surface 233 in such a manner that the front edge of the cartridge 1 contacts the inner wall of the front wall surface 234, whereby placing of the cartridge 1 on the tray 204 is completed.

At this stage, the cartridge pre-loading member 237 presses the front edge of the cartridge 1 against the inside of the front wall surface 234, and the cartridge 1 is roughly positioned with respect to the tray 204 without any rattling in the forward/backward direction or the right/left direction.

Further, the state detecting switch 205 is pressed on the insertion-end side surface of the cartridge. This starts the loading motor 212 and the tray 204 now seating the cartridge 1 is automatically loaded into inside the main unit 201 of the optical disk record/reproduce drive because of the drive force of the loading motor 212, after which the cartridge is finally positioned relative to the tray 204 and the spindle motor by means of insertion of the alignment pins not shown, which are integrated as one with the traverse base to which the spindle motor not shown, the optical pickup and the like are fixed, into the cartridge.

The conventional example above has the following problems.

(1) As for insertion over the cartridge into the optical disk record/reproduce drive, it is necessary to insert the cartridge into the optical disk record/reproduce drive obliquely from above while avoiding the front wall surface at the front end of the tray.

In the event that the position in the height direction at which the optical disk record/reproduce drive is installed is about the same as or higher than the height of eyes of an operator who performs the insertion, the insertion over the cartridge becomes unnatural and the drive is therefore inconvenient to use.

(2) For insertion over the cartridge into the optical disk record/reproduce drive, it is necessary to execute a plurality of operations, i.e., to push in the cartridge against the forward pre-loading force of the cartridge pre-loading member, to thereafter confirm complete placing of the cartridge on the cartridge seating surface which is surrounded by the front wall surface, the left wall surface and the right wall surface of the tray and the cartridge pre-loading member, to thereafter push in the tray into inside the drive or actuate the loading switch which is disposed to a different portion for complete insertion over the cartridge into the optical disk record/reproduce drive.

(3) Therefore, when the cartridge is placed on the tray in a wrong state and the tray is loaded with the cartridge struck against the front wall surface, the left wall surface or the right wall surface because of a misoperation made by an operator, the tray opening in the optical disk record/reproduce drive and the cartridge interfere with each other in the middle of the loading of the tray and the loading is consequently interrupted.

Meanwhile, the structure in which the cartridge itself avoids a misoperation during loading may lead to a scratch on the surface of the cartridge, or in the worse case, destruction of the cartridge.

(4) In the event that the detecting switch is disposed on the tray which moves during loading or ejection, cartridge insertion into the optical disk record/reproduce drive for instance can automatically finish without pushing in the tray or actuating an operation switch which is disposed to a different portion.

However, since the detecting switch as well moves together with the tray, a complex arrangement of wiring members for signal transmission is needed, which in turn results in lack of reliability.

Nowadays, as a recording medium for information equipment such as a computer, a reproduction-only disk such as a CD-ROM, a rewritable disk of the magneto-optic system or the phase change system, and the like are used.

In the conventional optical disk record/reproduce drive shown in FIGS. 62 through 64, a drive system design, such as a gear ratio, for a loading drive which accepts both a cartridge and a naked disk is centered on a cartridge in general because of a large load at the time of opening or closing of the shutter of the cartridge or a large load at the time of loading of the cartridge into the drive against the load of the cartridge.

Therefore, a large drive torque is necessary, which creates a loading noise when the gear ratio is selected right at an appropriate speed for cartridge loading since the speed of loading means which loads in a tray or the like becomes too fast in the absence of a media or against use of a naked disk.

Further, because of an individual difference which the disk loading drive has, a change with time, etc., it is necessary to change the profile of the drive system while judging the state of the loading drive and accordingly reduces a noise.

The conventional optical disk record/reproduce drive shown in FIGS. 62 through 67 has the following problems.

(1) The external shape of the traverse base is large since the alignment pins and the state detecting switches are integrated with the traverse base which holds the spindle motor and the like, and as it is necessary to vertically drive the heavy traverse base for loading or ejection, the vertical drive force for the traverse base increases, and a noise due to collision of the traverse base and the chassis particularly during ejection becomes noisier.

(2) Because of the large external shape of the traverse base, there is a restriction upon the arrangement of the loading motor for loading drive and ejection drive and the gear system relative to each other, which prevents to ensure a sufficient reduction ratio and increases a noise which is created during loading and ejection.

(3) Since the cartridge after the completion of the loading is held as one integrated unit together with the traverse base, the upper base, the tray and the mechanical chassis, the damper members which absorb disturbing vibrations support the heavy mechanical chassis, and therefore, rubber whose hardness is high needs be used considering deformation due to a change with time in the damper members, which however makes it impossible to sufficiently absorb large disturbing vibrations.

(4) During placing of the cartridge on the tray, the cartridge is urged by the cartridge pre-loading member against the inside the front wall surface of the tray and accordingly positioned.

Hence, when the position of the cartridge is to be adjusted during loading of the cartridge, the drive force which inserts the alignment pins into the positioning holes of the cartridge must move the cartridge in the forward/backward direction or the right/left direction against the urging force exerted by the cartridge pre-loading member, which in turn leads to a problem that the load upon the loading motor and the loading gear system, electric power consumption and a noise increase.

(5) During loading of the cartridge, the cartridge pressing springs and the cartridge pressing rollers urge the cartridge against the cartridge seating surface of the tray.

Hence, when the position of the cartridge is to be adjusted during loading of the cartridge, the drive force which inserts the alignment pins into the positioning holes of the cartridge must move the cartridge in the forward/backward direction or the right/left direction against the urging force exerted by the cartridge pressing springs and the cartridge pressing rollers, which in turn leads to a problem that the load upon the loading motor and the loading gear system, electric power consumption and a noise increase.

The conventional optical disk record/reproduce drive shown in FIGS. 62 and 63 has the following problems.

(1) As described earlier, the tray 204 and the mechanical chassis (201) are molded resin elements, and the slide surface for loading of the mechanical chassis 201a is formed even and smooth. The bottom slide surface of the tray which slides against this slide surface has a convex cross section shaped in the form of a rail. Further, a few guide members are disposed in the vicinity of the slide surface of the mechanical chassis, which structure preventing winding of the tray 204 during loading.

However, considering dimensional shrinkage attributed to a temperature change, the structure permits a gap in the width direction, thereby allowing the tray 204 to rattle in the right/left direction.

(2) For placing of the cartridge 1 on the tray 204, a torque acts upon the tray 204 due to load created at the time of opening or closing of the shutter of the cartridge 1, and therefore, the tray 204 is transported as it is slanted to one side in a slanted direction which turns around between loading and ejection.

(3) As the cartridge placed on the tray 204 is loaded and the alignment pins of the traverse base accordingly engage with the alignment pin engagement holes of the cartridge, rattling in the right/left direction, if large, between the mechanical chassis (201) and the tray 204 leads to a positioning error of the cartridge 1 and makes it difficult to accurately position the traverse base.

(4) While restriction upon the tray 204 in the vertical direction is realized by the mechanical chassis (201) and the upper base 228, it is not possible to reduce the vertical rattling to zero, which serves as a factor which makes the tray instable while the cartridge is being manipulated.

The conventional optical disk record/reproduce drive shown in FIGS. 62 and 63 further has the following problems.

(1) For placing of the cartridge on the tray of the optical disk record/reproduce drive, it is necessary to insert the cartridge into inside the tray obliquely from above while avoiding the front wall surface at the front end of the tray.

In the event that the position in the height direction at which the disk record/reproduce drive is installed is about the same or higher than the height of eyes of an operator who performs the insertion, the insertion over the cartridge becomes unnatural and the drive is therefore inconvenient to use.

This problem similarly occurs during placing of the disk which is not housed in the cartridge.

(2) For placing of the cartridge on the tray, it is necessary to execute a plurality of operations, i.e., to push in the cartridge against the forward pre-loading force of the cartridge pre-loading member, to thereafter confirm complete placing of the cartridge on the cartridge seating surface which is surrounded by the front wall surface, the left wall surface and the right wall surface of the tray and the cartridge pre-loading member, to thereafter push in the tray into inside the drive or actuate the loading switch for complete insertion over the cartridge into the disk record/reproduce drive.

(3) When the cartridge is placed on the tray in a wrong state and the tray is loaded with the cartridge struck against the front wall surface, the left wall surface or the right wall surface because of a misoperation committed by an operator, the tray opening in the disk record/reproduce drive and the cartridge interfere with each other in the middle of the loading of the tray and the loading is consequently interrupted.

Meanwhile, the structure in which the cartridge itself avoids a misoperation during loading may lead to a scratch on the surface of the cartridge, or in the worse case, destruction of the cartridge.

(4) A structure generally in a major use is that there is a notch in the vicinity of the center of the front wall surface, since it is necessary to locally notch the front wall surface, the left wall surface and the right wall surface which surround the cartridge seating surface for the purpose of placing of the cartridge on the tray and ejection of the cartridge from the tray.

However, since an operator can not recognize the cartridge only at the position where there is the notch in the wall surface, the operator is forced into unnatural posture that the operator holds the cartridge with his or her fingers at the top and the bottom surfaces of the cartridge, while such is greatly burdensome to an aged person or a child who can not hold strong at fingertips.

(5) Further, there are a number of restrictions upon the structure of the tray which comprises the front wall surface, the left wall surface, the right wall surface and the notch in wall surface, and the freedom of design is accordingly low.

SUMMARY OF THE INVENTION

The present invention aims at providing a small disk drive which reduces a load upon a damper, and particularly, a cartridge holding mechanism for such a disk drive.

A different object of the present invention is to provide a disk drive which reduces a load upon a loading motor, decreases insertion force for positioning of a cartridge by means of alignment pins and allows easy and accurate positioning of the cartridge, and more particularly, a loading method and a loading mechanism for such a disk drive.

A different object of the present invention is to provide a disk drive which allows to block an opening almost completely in a loading state, eliminates a tray decoration of a tray, and permits an application even to a cartridge of the slot-in type, and more particularly, a door lock mechanism for such a disk drive.

A different object of the present invention is to provide a disk drive which allows easy loading of a cartridge, realizes an easy arrangement of wiring members for a detecting switch and maintains the reliability, and more particularly, an automatic loading mechanism for such a disk drive.

A different object of the present invention is to provide a disk drive which solves a problem of a wrong feeling due to a different loading speed caused by the type of a medium or whether there is a medium or not, an individual difference which a disk loading drive has, an uneven loading time owing to a change with time and a driving-induced noise.

A different object of the present invention is to provide a disk drive which solves a problem of a wrong feeling due to a different loading speed occurring immediately after replacement of a medium and a driving-induced noise. That is, unless the profile of a drive system is changed in accordance with a medium immediately after medium replacement in a loading drive which accepts both a naked disk and a cartridge which is compatible with a plurality types of media, a user feels a wrong feeling.

A different object of the present invention is to provide a disk drive which solves a problem of an uneven loading time owing to a temperature change or the like within a disk loading drive and a driving-induced noise. More particularly, since a loading time and an ejection time of a drive system both change as a temperature within a disk loading drive changes, it is necessary to change the profile of the drive system while judging the temperature within a loading mechanism.

A different object of the present invention is to provide a disk drive which allows to calculate an optimal drive profile through a simple algorithm. That is, it is necessary to detect the state of a disk loading drive using a simple algorithm, for the purpose of measuring a loading time and an ejection time and calculating an optimal drive profile while considering the type and size of a mounted medium, an individual difference which a disk loading drive has, a change with time and variations including a temperature change.

A different object of the present invention is to provide a disk drive which solves a problem of a driving-induced noise which is created as a clamp mechanism holds a medium during loading. That is, a loading drive for handling disks generally comprises a clamp mechanism, as means of holding a disk, which utilizes suction force of a magnet and a magnetic element. This mechanism, too, which has a simple structure creates an impact-induced loud noise as the clamp mechanism holds a disk or as the clamp mechanism is released, since the suction force of the magnet and the magnetic element is in inverse proportion to the square of a distance.

A different object of the present invention is to provide a disk drive which solves a problem of a driving-induced noise which is created as a clamp mechanism releases a medium during ejection.

A different object of the present invention is to provide a disk drive which chooses an algorithm which is fast and quickly converges as calculating means. In short, for control of learning by a drive mechanism, it is necessary to select a fast and quickly converging algorithm as calculating means based on a result of measurement on a loading time and an ejection time and a drive profile which is prepared in advance.

A different object of the present invention is to provide a cartridge positioning mechanism for a disk drive which permits to reduce the size and the weight of a traverse base and decreases drive force, a noise and the like for the purpose of solving the problems described above.

A different object of the present invention is to provide a disk drive which allows to stably load in a tray and eject the tray without rattling and ensures the accuracy of a position upon the completion of loading, and more particularly, a loading mechanism for such a disk drive.

A different object of the present invention is to provide a disk drive which allows easy attachment and detachment of a naked optical disk and a cartridge, and more particularly, a cartridge holding mechanism for such a disk drive.

A disk drive according to the present invention comprises: disk rotating means which mounts and rotates a disk; a traverse base which holds the disk rotating means; a damper member which flexibly holds the traverse base; a main unit which holds the traverse base through the damper member; a tray which mounts a cartridge which houses a disk; and driving means which loads or ejects the tray and accordingly moves the disk in the cartridge close to or away from the disk rotating means, wherein the cartridge is supported by the main unit through the tray.

In this structure, the cartridge and the disk housed in the same are held by the main unit, such as a chassis, as separate articles through the damper member inside the disk drive, the cartridge for instance is fixed as one unit with the main unit through the tray, and the traverse base is supported by the damper member, and hence, it is possible to realize a simple drive structure and reduce the size and the weight of the drive as a load upon the damper member is reduced and a conventional base frame is not necessary, and it is possible to reduce a drive load during loading of the cartridge into the drive. In addition, when the damper member is made of a rubber material, with a simple structure, it is possible to realize the function of blocking vibrations from outside while flexibly holding the traverse base.

In the structure above, there is a traverse base holding member which is moved vertically by the drive relative to the main unit at the time of tray loading or tray ejection, and the traverse base is flexibly held by the traverse base holding member through the damper member.

This simplifies the mechanism for loading the cartridge into the drive, and reduces the size of the drive.

In the structure above, the damper member applies a preload in a direction which is parallel to a surface of the traverse base.

This makes it possible to improve the accuracy of repeated positioning of the traverse base during vertical driving of the traverse base holding member.

In the structure above, the resonance frequencies of the damper member in the radius direction of the disk as it is being loaded and in the direction of a rotation shaft are set higher than the maximum rotational frequency of the disk.

Hence, as vibrations of the traverse base are minimized which are attributed to swaying-induced vibrations during high-speed rotations of an optical disk having a mass eccentricity, it is possible to avoid contact of the cartridge and the optical disk.

The structure above comprises: a positioning member which inserts the tray, as it is loaded into inside the main unit by the driving means, now seating the cartridge into a positioning hole formed in the cartridge, and which accordingly positions the cartridge; a traverse base to which disk rotating means is fixed which rotates as one unit with the disk while holding the disk at a center hole of the disk; and a cartridge urging member which urges the cartridge against the tray in a direction perpendicular to a disk recording surface of the disk in a condition that the cartridge is positioned by the positioning member.

In this structure, as required in a loading method described later, loading of the cartridge housing the disk placed on the tray into the disk drive is followed by a cartridge positioning job of inserting the positioning member into the cartridge positioning hole and a detecting job of detecting various detecting holes which are formed in the cartridge, and after this, the disk is held by the disk rotating means and the disk clamp member and a cartridge urging job is performed during which the cartridge urging member urges the cartridge, and therefore, there is no sliding load attributed to urging against the cartridge during tray loading, the cartridge urging member does not damage the surface of the cartridge, and the positioning job becomes easy. Further, since a load because of the urging force is reduced, smooth transportation is realized, which permits to use a low torque motor and realize a low-power consumption drive. In addition, since the loads are reduced, the life of the driving means is extended.

The structure above comprises: a positioning member which inserts the tray, as it is loaded into inside the main unit by the driving means, now seating the cartridge into a positioning hole formed in the cartridge, and which accordingly positions the cartridge; state detecting means which detects a state detecting hole of the cartridge which expresses the states of the cartridge loaded into the main unit and the disk which is inside the cartridge; a disk clamp member which clamps the disk together with the disk rotating means; and a cartridge urging member which urges the cartridge against the tray in a direction perpendicular to a disk recording surface of the disk in a condition that the cartridge is positioned by the positioning member.

In the structures above, the disk drive comprises the raisin lowering means which moves the disk rotating means, which mounts and rotates the disk, close to the disk and away from the disk, the cartridge urging member is driven by the raising/lowering means.

Since in the structures above, the cartridge urging member is driven by the raising/lowering means of the traverse base which supports the disk rotating means, the structures above do not require dedicated driving means for the cartridge urging member.

In the structures above, the cartridge urging member urges the tray in a direction perpendicular to a tray transporting direction, after a naked disk has been loaded into the main unit and when the cartridge is not within the tray.

This structure permits to suppress vibrations of the tray, since the cartridge urging member urges the tray from above when a naked disk is loaded into the optical disk drive.

In the structures above, there are at least one pair of cartridge urging members in a symmetrical arrangement with respect to a cartridge transporting direction, and the cartridge urging members urge at about a central position in a cartridge depth direction.

Since this is a structure that there is at least one pair of cartridge urging members in a symmetrical arrangement with respect to the cartridge and that the cartridge is urged at about a central portion as viewed in the depth direction, and therefore, it is possible to urge the cartridge without fail.

The structures above comprises a main unit comprising an opening portion for loading or ejecting a disk or a cartridge housing a disk, a door which is disposed to open and close the opening portion and the is closed with the disk or the cartridge loaded, and lock means which prevents opening of the door which is closed.

Since use of this structure allows to close and lock up the opening portion with the door, it is possible to prevent entry of dirt, a foreign matter or the like into the drive from outside after the disk or the cartridge has been loaded into the drive. This also prevents a child from forcing the door to open from outside the drive which is in operation, touching the naked disk and getting injured, while preventing leakage of diffracted light of strong laser light to outside the drive. Hence, it is possible to block the opening portion almost completely in the loaded state, eliminate a tray decoration of a tray, and permits an application to a disk drive which uses the slot-in method for cartridges.

In the structure above, the main unit comprises a tray which mounts a disk or cartridge and permits loading or ejection through the opening portion, the lock means engages with the tray, and opening of the door is prevented by means of the loading operation of the tray.

This structure realizes lock means for door, by adding a few parts, without separately disposing a complicated mechanism or electric circuit, in the process of forming the lock means.

In the structure above, the main unit comprises a motor and a slide member which moves in accordance with the motor, the lock means engages with the slide member, and opening of the door is prevented by means of operations of the slide member.

This structure realizes lock means for door by adding a few parts as claim 2 defines, when the motor is a drive motor for disks.

In the structure above, the lock means is integrated with the slide member.

This structure allows to further reduce the number of parts, which virtually prevents an increase in cost regarding parts to realize the lock means.

The structure above comprises mount detecting means which detects setting of the cartridge to the tray at a right position with the tray ejected and outputs a detection signal, and controlling means which receives the detection signal and outputs an operation instruction to the driving means.

Hence, only when the mount detecting means disposed to the main unit senses loading of the cartridge to a right position on the tray, insertion of the cartridge into the optical disk record/reproduce drive for instance is automatically completed without pushing in the tray or activating an operation switch which is disposed to a separate portion. Further, since the mount detecting means is disposed to the fixed side of the mechanical main unit for instance instead of disposing on the tray which is to move, wiring for the mount detecting means is easy and the reliability is guaranteed, and placing of the cartridge on the tray is sensed easily only as the cartridge is placed on the tray and insertion of the cartridge is automatically completed.

The structure above comprises a detecting member which detects setting of the cartridge to the tray at the right position, wherein the mount detecting means responds to a detecting operation of the detecting member.

Hence, even when the state detecting means is away from the cartridge at the right placing position because of the detecting member, it is easy to dispose the mount detecting means to the fixed side of the mechanical main unit for instance instead of disposing on the tray which is to move, and wiring for a detecting switch is easy.

The structure above comprises cartridge holding means which engages with an engagement receiving part of the cartridge in such a manner that the cartridge holding means can be freely detached, positions and fixes the cartridge to the tray, wherein the cartridge holding means also serves as a detecting member.

This eliminates the necessity of separately disposing detecting means which detects the completion of the cartridge to the right placing position.

The structure above comprises controlling means which controls the driving means based on a predetermined drive profile in which a speed is set differently in accordance with an elapsed time until the completion of traveling of the tray from the start of the traveling of the tray, detecting means which detects the completion of loading and ejection by the driving means, and calculating means which measures a loading time and an ejection time of the disk by the driving means based on a result of the detection performed by the detecting means, wherein the controlling means changes at least one of the speed and the elapsed time contained in the drive profile in accordance with a measured time measured by the calculating means.

This structure makes it possible to reduce a wrong feeling owing to a difference in speed of loading depending on the type of the medium and whether there is a medium or not, variations in loading time due to an individual difference which a disk loading drive has, a change with time and the like, a driving-induced noise, etc.

The structure above comprises medium judging means which judges the shape, the size and the like of the disk, wherein the controlling means changes the drive profile by media in accordance with a result of the judgment obtained by the medium judging means.

This structure makes it possible to eliminate a wrong feeling due to a difference in speed immediately after the medium is replaced in the loading mechanism which is compatible to a plurality types of media, and to reduce a noise during driving.

The structure above comprises measuring means which measures an inside temperature inside the drive, wherein the controlling means changes the drive profile by predetermined temperature in accordance with a result of the measurement regarding the inside temperature.

This structure makes it possible to reduce variations in loading time and ejection time of the drive system of the disk loading drive because of a temperature change.

In the structure above, an operation time of the driving means is changed by the controlling means based on drive processing numbers which are assigned to the drive profile for every infection point and calculation using a result of the measurement of a loading time and an ejection time calculated by the calculating means.

This structure allows to calculate a drive profile in accordance with a result of the measurement on a loading time and an ejection time, the type, the size and the like of the mounted medium, an individual difference which a disk loading drive has, a change with time, and a temperature change.

In the structure above, selected as an inflection point is a point at which the disk engages with the holding means in the drive profile regarding loading of the disk into the drive.

This makes it possible to reduce a noise which is created while the clamp mechanism holds the medium during loading.

In the structure above, selected as an inflection point is a point at which the disk engages with and get disengaged from the holding means in the drive profile regarding ejection of the disk from the drive.

This structure allows to reduce a noise which is created while the clamp mechanism holds the medium during ejection.

In the structure above, the calculating means sets up a variable as a major drive time in the drive profile, assigns drive processing numbers to the drive profile for every certain period of time, extends an operation time of the driving means when the drive processing number upon detection of an end by the detecting means is larger than an optimal number calculated in advance, but shortens the operation time of the driving means when the drive processing number upon detection of all end by the detecting means is smaller than the optimal number calculated in advance.

This structure allows to converge learning control for the drive mechanism at a high speed, based on a result of measurement regarding a loading time and an ejection time and the drive profile prepared in advance, using this algorithm.

In the structure above, the calculating means assigns unique values to the drive processing numbers other than the optimal number, and when driving processing ends at the drive processing number, the calculating means adds the unique value unique to the drive processing number to the operation time of the driving means.

This structure allows to converge learning control for the drive mechanism at a high speed, based on a result of measurement regarding a loading time and an ejection time and the drive profile prepared in advance, using this algorithm.

In the structure above, the calculating means multiplies a difference between the drive processing number and the optimal number by a coefficient, and adds to the operation time of the driving means.

This structure allows to converge learning control for the drive mechanism at a high speed, based on a result of measurement regarding a loading time and an ejection time and the drive profile prepared in advance, using this algorithm.

The structure above comprises controlling means which controls the driving means based on a predetermined drive profile in which a speed is set differently in accordance with an elapsed time until the completion of traveling of the tray from the start of the traveling of the tray; and medium judging means which judges the shape, the size and the like of the disk, wherein the controlling means changes at least one of the speed and the elapsed time contained in the drive profile in accordance with a result of the judgment obtained by the medium judging means.

The structure above comprises controlling means which controls the driving means based on a predetermined drive profile in which a speed is set differently in accordance with an elapsed time until the completion of traveling of the tray from the start of the traveling of the tray, and measuring means which measures an inside temperature inside the drive, wherein the controlling means changes at least one of the speed and the elapsed time contained in the drive profile in accordance with a result of the measurement regarding the inside temperature.

The structure above comprises positioning means engages with a positioning hole of the cartridge in such a manner that the positioning means can be freely detached, wherein the positioning means engages with the positioning hole of the cartridge in a condition that the tray has been loaded.

In these structures, the positioning means is separately disposed from the traverse base, it is possible to form the traverse base in a small outer shape and light weight, and it is possible to reduce a drive torque, a gear load and a noise during loading and ejection.

The structure above comprises: positioning means which is held by the main unit in such a manner that the positioning means freely engages with and gets detached from a positioning hole of the cartridge, wherein the positioning means engages with a positioning hole of the cartridge in a condition that the tray has been loaded, and the main unit holds the damper member and the driving means, and holds the tray in such a manner that the tray is freely loaded and ejected.

In the structure above, the damper member is disposed to the traverse holder, and the traverse holder is held by the main unit.

In the structure above, the positioning means can engage with and get detached from two positioning holes, one on the left-hand side and the other on the right-hand side, of the cartridge in at lease one position.

These structures make it possible to increase a tolerance regarding the positioning means for cartridges.

In the structure above, the positioning means is held in such a manner that the position of the positioning means can be adjusted in the forward/backward direction relative to the main unit.

This structure improves the accuracy of positioning the cartridge through forward/backward adjustment of the positioning means.

The structure above comprises a cam member which vertically drives the traverse base and the positioning means, wherein the traverse base and the positioning means share the same cam mechanism which is disposed to the cam member.

Since the traverse base and the positioning means share the same cam mechanism in this structure, it is possible to avoid shifting of the sequence for vertically driving the traverse base and the positioning means which is attributed to a variation in profile regarding the cam mechanism owing to initial friction and friction with time.

The structure above comprises a guide member which guides vertical driving of the positioning means, the guide member has a tapering shape which tapers over multiple steps, and a gap between the positioning means and the guide member becomes the smallest during insertion of the positioning means into the positioning hole of the cartridge.

Since the gap between the positioning means and the guide member becomes the smallest during insertion of the cartridge in this structure, it is possible to reduce a drive load before insertion and improve the positioning accuracy at the time of insertion.

In the structure above, the cartridge comprises a state detecting hole which expresses the state of the disk housed in the cartridge, state detecting means is disposed which is held by the main unit in such a manner that the state detecting means can engage with and get detached from the state detecting hole, and the positioning means and the state detecting means ascend in synchronization.

Since the state detecting means is disposed separately from the traverse base in this structure, it is possible to realize the traverse base in a small outer shape and light weight, and it is possible to further reduce a drive torque during loading and ejection, a gear load, and a noise.

The structure above comprises second driving means which vertically drives the positioning means.

Since this structure uses the second driving means which vertically drives the positioning means, even when a cam mechanism for example which vertically drives the positioning means is far from the position at which the positioning means is inserted into the positioning hole, it is possible to strengthen the insertion force over the positioning means against bending stress which develops during insertion of the positioning means.

In the structure above, the second driving means stops drive force immediately before engagement of the positioning means and the positioning hole of the cartridge completes.

In this structure, since the drive force of the second driving means is stopped immediately after the completion of insertion of the positioning means into the positioning hole, it is possible to avoid creep deformation which occurs in the second driving means when the loaded state continues for a long time.

The structure above comprises traveling restricting means which restricts traveling of the state detecting means after detachment of the state detecting means from the state detecting hole of the cartridge.

Since ascending of the state detecting means is restricted after detachment of the state detecting means in this structure, it is possible to avoid interference between the tray or the cartridge and the state detecting means during ejection.

In this structure, the second driving means and the traveling restricting means are integrated as one.

Since the second driving means of the positioning means is integrated with the restricting means of the state detecting means, the number of parts is reduced.

The structure above comprises shutter opening/closing means which opens a shutter of the cartridge at the time of loading, wherein the tray has a position reference for the cartridge in a direction in which the shutter opening/closing means opens the shutter of the cartridge, and the positioning means is disposed at one position at least.

Since the positioning means is disposed on the opening side of the shutter of the cartridge at least in this structure, it is not necessary to adjust the position of the cartridge in the right/left direction and it is possible to adjust the position of the positioning means in the forward/backward direction.

The structure above comprises holding means which holds the tray between a loading position and an ejection position in such a manner that the tray can be transported linearly, and driving means which drive the tray for loading and ejection.

Hence, using the holding means, it is possible to ensure the stability of mounting the cartridge to the tray and ensure the positional accuracy of the cartridge relative to the main unit of the traverse base upon loading.

The structure above comprises opening/closing means which opens a shutter of the cartridge, wherein the tray comprises cartridge holding means which holds the cartridge.

Since the tray will not be transported as it is inclined to one side during loading and ejection because of the load for opening and closing the shutter of the cartridge which is held by the cartridge holding means, it is possible to improve the tray, e.g., the quality of tray-related operations.

In this structure, the opening/closing means is disposed to the tray.

Hence, even in a loading mechanism of the method which requires to open the shutter of the cartridge at the time of mounting and in the loading mechanism which opens and closes the shutter in synchronization to loading of the tray, it is possible to reliably operate without rattling of the tray in the vertical and the right/left directions.

In the structure above, the holding means comprises a shaft disposed in the forward/backward direction to the tray and a shaft bearing disposed to the main unit.

Hence, with a simple structure, it is possible to enhance the operation stability of mounting of the cartridge to the tray, and improve the quality by preventing rattling of the tray during loading and ejection of the cartridge, and as the simple structure also restricts the width-direction position of the cartridge during loading, it is possible to increase the reliability of the loading mechanism. Further, disposing the shaft inside the tray creates an advantage that the thickness and the size of the drive are reduced.

In the structure above, the holding means comprises a shaft disposed in the forward/backward direction to the main unit and a shaft bearing disposed to the tray.

Hence, it is possible to enhance the operation stability of mounting of the cartridge to the tray, and improve the quality by preventing rattling of the tray during loading and ejection of the cartridge, and as the simple structure also restricts the width-direction position of the cartridge during loading, it is possible to increase the reliability of the loading mechanism. Further, with the guide shaft disposed to the mechanical main unit, there is no restriction upon the thickness of the tray.

The structure above comprises cartridge holding means which restricts movements of the cartridge relative to the tray in the loading or ejection direction and which engages with an engagement receiving part disposed to the cartridge in such a mainer that the cartridge holding means can be detached from the engagement receiving part.

By means of the cartridge holding means, it is possible to prevent failing of the cartridge from the tray and roughly match the center of the disk with the center of the spindle motor which rotates the disk housed in the cartridge. Hence, a wall surface for holding a conventional cartridge holding is not necessary, which makes it easy to attach and detach a naked disk, a cartridge, etc.

In the structure above, no wall surface which is perpendicular to a cartridge seating surface is disposed at the front edge of the tray in the loading/ejection direction.

This allows to attach and detach a cartridge from the front of the tray, and to realize placing of a cartridge and a naked disk onto a tray with a high level of freedom.

In the structure above, the driving means has a structure that as the tray as it is in the ejected state is pushed manually into inside the main unit, driving for loading is started, and force which engages the cartridge with the cartridge holding means is smaller than force with which the tray is pushed manually into inside the main unit.

This makes it possible to avoid a mistake that manual insertion of the tray into the disk drive is executed before mounting of the cartridge to the cartridge holding means.

In the structure above, the cartridge holding means has such a structure which flexibly engages with the engagement receiving part of the cartridge, a stopper is disposed at the rear edge of the tray in the loading direction of the cartridge, and during placing of the cartridge on the tray, a placing limit position for cartridge restricted by the stopper roughly matches with a position at which the cartridge completes engaging with the cartridge holding means.

Hence, the entire processing of cartridge placing, holding and positioning is realized only by means pushing in of the cartridge from the front. Further, pushing in of the cartridge from the front also realizes driving for loading of the tray at once.

In the structure above, the cartridge holding means is disposed to the tray in such a manner that the cartridge holding means can sink in the engagement receiving part of the cartridge which has a concave shape.

Hence, based on a change in operation force for holding of the cartridge with the cartridge holding means, it is possible to confirm the completion of holding of the cartridge.

In the structure above, there are engagement receiving parts on the left-hand side and the right-hand side to an axial line of the loading or ejection direction passing through the center of gravity of the cartridge.

Since the cartridge is held on the both sides, it is possible to hold the cartridge without fail.

In the structure above, the engagement receiving part is located on one of the left-hand side and the right-hand side to an axial line of the loading or ejection direction passing through the center of gravity of the tray, or is located on the axial line.

Hence, it is possible to hold the cartridge with the cartridge holding means with small insertion force.

In the structure above, the tray comprises a guide member which restricts movements of the cartridge in a direction perpendicular to the loading or ejection direction of the tray.

As the guide member restricts the cartridge, it is possible to perform the operation of holding with the cartridge holding means without fail.

In the structure above, in a condition that an engaging part of the cartridge holding means is about to engage with the cartridge but is not in engagement, in order to prevent loading of the tray into the main unit, an opening portion disposed in a front surface of the main unit for loading and ejection of the tray interferes with the cartridge holding means.

This makes it possible to avoid a wrong operation regarding placing of the tray on the cartridge.

In the structure above, the cartridge holding means comprises, on the tray, a revolution shaft which revolves in a direction perpendicular to the loading and ejection direction of the tray and a holding member which has an engaging part which is axially supported by the revolution shaft and engages with the engagement receiving part, and the engaging part of the cartridge holding means is pre-loaded in a direction of engagement with the engagement receiving part of the cartridge.

This makes it possible to realize the cartridge holding means with a small number of parts.

In the structure above, the cartridge holding means comprises an elastic member which is flexibly deformed in a direction perpendicular to the loading and ejection direction of the tray, and the front edge of the elastic member is deformed through plastic deformation into a projecting shape which sinks into the engagement receiving part of the cartridge which has a concave shape, or an engaging member having the projecting shape is integrated with the elastic member at the front edge of the elastic member.

It is possible to realize the cartridge holding means with even more simple structure than defined in claim 10.

In the structure above, in the engaging part of the cartridge holding means which sinks into the engagement receiving part of the cartridge which has a concave shape, a roller having a cylindrical or approximately spherical shape is disposed which rotates along a surface of the cartridge and which comprises a rotation shaft in a direction perpendicular to the loading and ejection direction of the tray.

The friction force during engagement of the engaging part of the cartridge holding means with the engagement receiving part of the cartridge is small, and therefore, with small insertion force over the cartridge, the cartridge is placed smoothly.

A loading method for a disk drive according to a present invention is a loading method for a disk drive which comprises a main unit and a tray which mounts a cartridge housing a disk and which is disposed to the main unit in such a manner that the tray can be loaded into the main unit and ejected from the main unit freely, the loading method comprising: a first step during which the tray seating the cartridge is loaded into the main unit by the driving means; a second step during which a positioning member positions the cartridge as it is loaded into the main unit; a third step during which state detecting means detects the state of the cartridge; a fourth step during which the disk is held by means of cooperation of disk rotating means and a disk clamp member; and a fifth step during which a cartridge urging member urges the cartridge against the tray, wherein after the second step and the third step are executed following the first step, the fourth step and the fifth step are executed.

In this structure, loading of the cartridge housing the disk placed on the tray into the disk drive is followed by a cartridge positioning job of inserting the positioning member into the cartridge positioning hole and a detecting job of detecting various detecting holes which are formed in the cartridge, and after this, the disk is held by the disk rotating means and the disk clamp member and a cartridge urging job is performed during which the cartridge urging member urges the cartridge, and therefore, there is no sliding load attributed to urging against the cartridge during tray loading, the cartridge urging member does not damage the surface of the cartridge, and the positioning job becomes easy. Further, since a load because of the urging force is reduced, smooth transportation is realized, which permits to use a low torque motor and realize a low-power consumption drive. In addition, since the loads are reduced, the life of the driving means is extended.

In the structure above, the disk drive comprises: mount detecting means which detects that the cartridge is arranged at a right position on the cartridge with the tray ejected, and which outputs a detection signal; and controlling means which receives the detection signal and outputs and operation instruction to the driving means.

In the structure above, the disk drive comprises a detecting member which detects that the cartridge is arranged at a right position on the cartridge, wherein the mount detecting means responds to the detecting operation performed by the detecting member.

In the structure above, the disk drive comprises cartridge holding means which engages with the engagement receiving part of the cartridge in such a manner that the cartridge holding means can be freely detached, and which fixes and positions the cartridge to the tray, wherein the cartridge holding means also serves as a detecting member.

In the structure above, the disk drive comprises: controlling means which controls the driving means based on a predetermined drive profile in which a speed is set differently in accordance with an elapsed time until the completion of traveling of the tray from the start of the traveling of the tray; detecting means which detects the completion of loading and ejection by the driving means; and calculating means which measures a loading time and an ejection time of the disk by the driving means based on a result of the detection performed by the detecting means, wherein the controlling means changes at least one of the speed and the elapsed time contained in the drive profile in accordance with a measured time obtained by the calculating means.

BRIEF DESCRIPTION OF THE DRAWINGS

FIG. 2(a) is a perspective view of a tray;

FIG. 2(b) is a perspective view of a cartridge holder;

FIG. 5(a) is a perspective view of a tray and a clamper;

FIG. 5(b) is a perspective view which shows a state that loading of the tray has completed;

FIG. 8(a) is a cross sectional view of a rubber damper according to a second preferred embodiment of the present invention;

FIG. 8(b) is a cross sectional view of the rubber damper as it is mounted;

FIG. 27 shows a sixth preferred embodiment of the present invention, in which the section (a) is a perspective view showing the external shape of an optical disk record/reproduce drive while the section (b) is a perspective view which shows a state that a tray has been ejected;

FIG. 30 shows a seventh preferred embodiment, in which the section (a) is a perspective view showing the external shape of an optical disk record/reproduce drive while the section (b) is a perspective view which shows a state that a tray has been ejected;

FIG. 31(a) is a schematic horizontal cross sectional view showing a loading state;

FIG. 31(b) is a schematic vertical cross sectional view of the same;

FIG. 33 shows an eighth preferred embodiment, in which the section (a) is a perspective view showing the external shape of an optical disk record/reproduce drive while the section (b) is a perspective view which shows a state that a tray has been ejected;

FIG. 34(a) is a schematic horizontal cross sectional view showing a loading state;

FIG. 34(b) is a schematic vertical cross sectional view of the same;

FIG. 35(a) is a schematic horizontal cross sectional view showing an ejection state;

FIG. 35(b) is a schematic vertical cross sectional view of the same;

FIG. 48(a) is a waveform diagram of a PWM drive voltage;

FIG. 48(b) shows a PWM drive current;

FIG. 49 shows a profile of a loading operation, with an operation time measured along a horizontal axis and a duty (%) of PWM drive measured along a vertical axis in which the section (a) shows a loading operation within a guaranteed range of temperature while the section (b) shows a loading operation outside the guaranteed range of temperature;

FIG. 50 shows a profile of an ejection operation, with an operation time measured along a horizontal axis and a duty (%) of PWM drive measured along a vertical axis, in which the section (a) shows an ejection operation within a guaranteed range of temperature while the section (b) shows an ejection operation outside the guaranteed range of temperature;

FIG. 51(a) is a block diagram of a control system which changes a profile of driving means;

FIG. 51(b) shows a drive profile during loading, with drive process numbers assigned;

FIG. 51(c) shows a drive profile during ejection, with drive process numbers assigned;

FIG. 52 is an explanatory view a relationship between a guide member and a guide groove according to the fourth preferred embodiment;

FIG. 57 shows a fourteenth preferred embodiment, in which the section (a) is a schematic plan view while the section (b) is a front view;

FIG. 58 is a perspective view of a tray and a cartridge holder in the third preferred embodiment;

FIG. 59 is a perspective view of a tray and a cartridge holder in the fourth preferred embodiment;

FIG. 60 is a perspective view of a tray and a cartridge holder in the fifth preferred embodiment;

FIG. 61 is a perspective view of a tray and a cartridge holder in the sixth preferred embodiment;

FIG. 68 shows an optical disk record/reproduce drive according to a different conventional example, in which the section (a) is a perspective view showing the external shape while the section (b) is a perspective view showing an ejection state;

BEST MODE FOR IMPLEMENTING THE INVENTION

Preferred embodiments of the present invention will now be described with reference to the associated drawings.

First Preferred Embodiment

Figure 1:
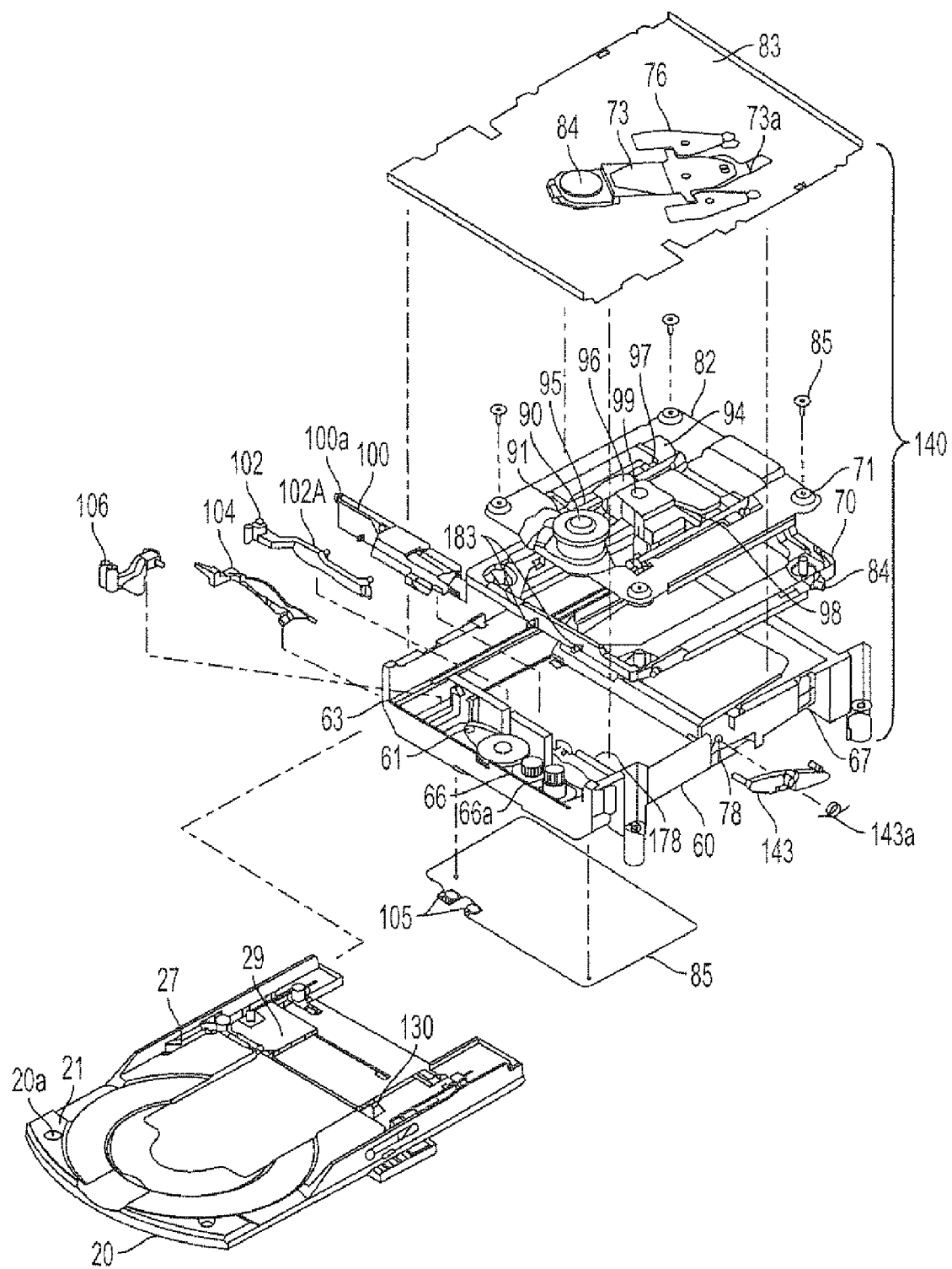
FIG. 1 is an exploded perspective view of an optical disk drive which comprises a cartridge holding mechanism according to a first preferred embodiment of the present invention.

A cartridge holding mechanism of an optical disk record/reproduce drive according to a first preferred embodiment of the present invention will be described with reference to FIGS. 1 through 7. FIG. 1 shows the first preferred embodiment of the optical disk record/reproduce drive according to the present invention. In FIG. 1, denoted at 140 is a main unit of the optical disk record/reproduce drive, denoted at 20 is a tray which mounts a cartridge and a naked optical disk, denoted at 1 is a cartridge, and denoted at 10 is a disk which is stored in a cartridge.

(Structure of Tray)

There are two concave portions, one large and the other small, formed in a concentric arrangement at the center of a cartridge seating surface 21 of the tray 20. The concave portion having a large diameter is a large diameter disk seater 22 while the concave portion having a small diameter is a small diameter disk seater 23, and either one is used in accordance with the outer diameter of a disk which is to be mounted to the main unit 140 of the optical disk record/reproduce drive.

A left wall surface 25 and a right wall surface 26, which are slightly larger than the outer size of the cartridge 1 and are vertical to the cartridge seating surface 21, are formed at the left-hand side and the right-hand side edges of the tray 20 and serve as guides which are used to place the cartridge 1 on the tray 20.

(Stricture of Cartridge Holder)

Openings 30 are formed in a part of the left wall surface 25 and the right wall surface 26, and cartridge holders 27 which have a concave shape and engage with engagement receiving parts 6 are disposed to the left-hand side and the right-hand side innermost edges of the cartridge 1.

The cartridge holders 27 are held for free revolutions about pins 28 which are disposed to the cartridge seating surface 21, with holes 27a formed in the middle fit with the pins 28, one sides comprising engaging parts 27b which have a convex shape for instance and engage with the engagement receiving parts 6 of the cartridge 1, and the other sides being urged by coil springs 49 between the coil springs 49 and the tray 20 in a direction in which the engagement receiving parts 6 of the cartridge 1 are held. The cartridge is thus restricted and supported on the left-hand side and the right-hand side by the left-hand side and the right-hand side wall surfaces 25 and 26, while restricted and supported on the front side and the rear side by the cartridge holders 27.

(Structure of Shutter Opener)

An opener 29 for opening and closing the shutter 2 of the cartridge 1 is disposed on the innermost side to the tray 20 in such a manner that the opener 29 can freely move in the right/left direction. Loading is realized through an opening action toward the left-hand side with a shutter opener 24 hooked at a projection disposed to a front edge of the shutter 2. As the shutter opener 24 guided along a cam for instance which is disposed to the bottom surface of an upper base 83, the opener 29 moves in accordance with a loading action of the cartridge 1.

As the shutter 2 is opened, the disk 10 stored in the cartridge 1 is ready for rotations by a spindle motor 90, which serves as disk rotating means, and ready for recording and reproduction by means of an optical pickup 99.

(Structure of Rack Gear)

On one side of the back surface of the tray 20, there is a rack gear 40 which engages with a drive gear 66a of a reduction loading gear system 66 of a loading motor 61 serving as driving means and which extends along the loading direction of the tray 20.

As the rotating direction of the loading motor 61 is switched, the tray 20 is loaded and ejected. In this structure, in the vicinity of the rack gear 40 disposed to the back surface of the tray, a metallic guide shaft 41 is held at the front edge and the rear edge of the tray 20 and further held by a mechanical chassis 60 via a shaft holder 42. The other side of the tray 20 is supported for free sliding by a guide stripe 63 of the mechanical chassis 60, and resilient floating preventing parts 209 disposed to side walls of the mechanical chassis 60 restrict floating of the tray 20 from the guide stripe 63. The loading motor 60 and the loading gear system 66 are disposed to the front edge of the mechanical chassis 60.

(Structure of Traverse Base/Support by Rubber Dampers)

Rubber dampers 71, whose four corners are of a damper material such as a rubber material for example, flexibly hold the spindle motor 90, which rotates the disk 10 while holding the disk 10, the optical pickup 99, which reads out information from the disk 10 or writes information in the disk 10, a traverse base 82 holding a traverse motor 94 which moves the optical pickup 99 in the radius direction of the disk 10 and a reed screw 95, to a traverse holder 70 which is a traverse holding member. Denoted at 85 are fixing members, such as screws, which fix the rubber dampers 71. Flexible supporting by means of the rubber dampers 71 realizes an effect of reducing an influence over recording in and reproduction from the disk 10 upon application of vibrations or impact from outside on the main unit 140 of the optical disk record/reproduce drive.

(Structure for Supporting Traverse Holder)

The rear side of the traverse holder 82 is axially supported by shafts 84' so that the traverse holder 82 can freely revolve with respect to a bearing 67 of the mechanical chassis 60, while the front side of the traverse holder 82 comprises projections 183, for instance, which are cam followers engaging with a slide cam 100 which will be described later, and as the projections 183 engage with cam grooves 109 which are formed at an angle in the slide cam 100 and the slide cam 100 moves in the right/left direction, the traverse holder 82 is driven in the vertical direction.

(Alignment Pin/Structure of Cartridge State Detecting Switch)

Alignment pins 102, which engage with positioning holes 3 through hole 20a of the tray 20 after the completion of loading of the cartridge 1 on the tray 20, and state detecting levers 106 which engage with cartridge state detecting holes 4 are disposed in the vicinity of the loading motor 61 disposed to the front side of the mechanical chassis 60.

A body 102A of the alignment pins 102 comprises projections such as cam followers, and the alignment pins 102 comprise centrically members 102a which fit with support columns (not shown) disposed for free sliding to the mechanical chassis 60 and which are supported for free vertical movements. Similarly to the traverse holder 70, at positions far away from the projections 183, cam followers engage with the cam grooves 109 of the slide cam 100, the alignment pins 102 are driven in the vertical direction as the slide cam 100 moves in the right/left direction, the detecting levers 106 are driven in the vertical direction by assist arms 104 which are axially supported by the mechanical chassis 60 and revolve as the slide cam 100 moves in the right/left direction.

The alignment pins 102 engage with the positioning holes 3 of the cartridge 1 after the completion of loading, thereby realizing a function of maintaining the clearance between the disk 10 which is held and the cartridge 1 in the spindle motor 90 and positioning the cartridge 1 at such a position which does not contact the disk 10.

Detecting switches 105 are disposed to a circuit board 85' of a control circuit attached to the bottom surface of the mechanical chassis 60, and have a function of judging, through the detecting levers 106, a condition of engagement with the detecting holes 4 of the cartridge 1 and detecting whether it is possible to write in the disk 10 which is stored in the cartridge 1, the back and the front surfaces of the disk 10 and a recording capacity of the disk 10.

(Structure of Upper Base)

The upper base 83 is disposed as a top lid to the mechanical chassis 60. A clamper 84, which fixes the disk 10 to the spindle motor 90, and a clamp arm 73, which holds the clamper 84 in such a manner that the clamper 84 is freely attachable to and detachable from the spindle motor 90, and a cam groove, which restricts movements of the opener 29 which opens and closes the shutter 2 of the cartridge 1, are disposed to the upper base 83. The clamper 84 is disposed to a front edge of the clamp arm 73, spring resilient force urges the clamper 84 in a direction away from the spindle motor 90 while a middle part 76 is attached to the upper base 83, and a receiving part 73a is formed at the rear edge. A pressurizing part such as a projection 130 disposed to the rear edge of the tray 20 pushes the receiving part 73a upon the completion of loading of the tray 20, whereby the clamper 84 moves close to the spindle motor 90.

(Structure of Side Arm)

Side arms 143, which restrict vibrations of the cartridge 1 which has been loaded, and side arm springs 143a, which urge the side arms 143 toward the cartridge 1, are disposed to the left-hand side and the right-hand side surfaces of the mechanical chassis 60. Middle portions of the side arms 143 are axially supported by a shaft 78, the side arm springs 143a make the rear edges of the side arms 143 engaged with the bottom surface side of the traverse holder 70, and the front edges of the side arms 143 are positioned above the cartridge 1 which is loaded. By means of the side arm springs 143a, the side arms 143 urge the cartridge 1 toward the tray 20 as the traverse holder 70 rises as loading of the tray 20 proceeds, thereby realizing a function of urging the tray 20 against the mechanical chassis 60, eliminating rattling between the cartridge 1, the tray 20 and the mechanical chassis 60, and reducing vibrations and noises which are created as the disk 10 rotates. In addition, as the side arms 143 fix the tray 20 to the mechanical chassis 60 after the completion of loading of the tray 20, a load upon the loading motor 61 during loading of the tray 20 is reduced.

(Structure of Clamper)

The clamper 74 fixes the disk 10 to a turn table 91 at the time of mounting of the disk 10 to the spindle motor 90.

The clamper 84 comprises members which can be split into two, one above and the other below, and houses a magnet (not shown) inside. In addition, for the purpose of centering of the disk 10 with respect to the turn table 91, a magnetic element (not shown) is buried in an apex portion of a center cone which is formed at the center. Owing to magnetic suction force of the magnet housed inside the clamper 84 and the magnetic element, the clamper 84 fixes the disk 10 to the turn table 91.

(Structure of Traverse Driving)

Two metallic shafts named "main shaft 97" and "sub shaft 98" disposed to the traverse base 80 hold the optical pickup 99 in such a manner that the optical pickup 99 can freely move in the radius direction of the disk 10.

In the vicinity of the main shaft 97, there is the reed screw 95 which is directly linked to the traverse motor 94. The optical pickup 99 comprises a nut piece 96 which engages with the reed screw 95, and as the traverse motor 94 rotates, drive force which is in the radius direction of the disk 10 develops in the optical pickup 99 through the nut piece 96 which is in engagement with the reed screw 95 and the optical pickup 99 accordingly moves to a desired radius position on the disk 10 at a high speed.

(Structure of Slide Cam)

A partition wall 178, which separates the front side the traverse holder 82 from the loading motor 61 and the like, is disposed to the mechanical chassis 60, and the slide cam 100 is disposed to the partition wall 178 in such a manner that the slide cam 100 can freely move in the right/left direction.

There is a rack gear 101 disposed to the front side of the slide cam 100, and the slide cam 100 is driven to the left-hand side and the right-hand side by a middle gear 65 of the loading gear system 66. A cam follower, which is a projection 100a for example, disposed to an edge of the slide cam 100 is guided by a load cam 249 which is disposed to the back surface of the tray 20. The load cam 249 extends in the forward backward direction as viewed from the tray 20, that is, parallel to the rack gear 40, with a slanted portion 249a which is slanted at about 45 degrees extending at the front edge of the tray 20 and an extension portion 249b extending vertically to the forward/backward direction as viewed from the tray 20. Hence, the drive gear 66a drives the rack 40 because of operations of the loading motor 61 and the loading gear system 66 and the tray 20 is accordingly loaded, and as the projection 10a moves to the slanted portion 249a at about the same time as the completion of the loading, the slide cam 100 starts moving and the middle gear 65 of the loading gear system 66 mesh with the rack gear 101, and following this, the rack 40 and the drive gear 66a get disengaged from each other, thereby switching the gears. When the projection 100a of the slide cam 100 moves to the extension portion 249b, the loading of the tray 20 stops and the slide cam 100 alone is moved by the middle gear 65. An ejection operation of the tray 20 is opposite to this.

As the slide cam 100 moves to the left-hand side and the right-hand side, the traverse holder 82, the alignment pins 102 and the detecting levers 106 are driven in the vertical direction as described earlier.

Operations of the main unit 140 of the optical disk record/reproduce drive having such a structure as above will now be described in relation to an example of reproducing from the disk 10 which is stored in the cartridge 1.

(Placing of Cartridge)

For placing of the cartridge 1 on the tray 20, the cartridge 1 is slid on the cartridge seating surface 21 from the front of the tray 20 in a direction of pushing into the optical disk record/reproduce drive.

In the process that the left-hand side and the right-hand side edge surfaces of the cartridge 1 are being pushed in the tray 20 with the left-hand side and the right-hand side wall surfaces 25 and 26 serving as guides, since there are slanted surfaces at the front edges of the engaging parts 27b of the cartridge holders 27, the cartridge 1 is easily released because of the insertion force of inserting the cartridge 1. As the cartridge is further inserted, the urging force of the coil springs 49 make the engaging parts 27b of the cartridge holders 27 engaged with the engagement receiving parts 6 of the cartridge 1.

From a change in the insertion force and a sound which is emitted at the time of engagement with the cartridge holders 27, an operator can confirm the completion of the engagement.

A stopper 28a for restriction insertion over the cartridge to an insertion limit is disposed on the innermost side of the cartridge seating surface 21, and the insertion limit provided by the stopper 28a approximately matches with the engaging positions at which the cartridge 1 engages with the cartridge holders 47.

Placing of the cartridge 1 on the tray 20 completes in this manner.

At this stage, the cartridge holders 27 restrict movements of the cartridge 1 in the forward/backward direction, while the left-hand side and the right-hand side wall surfaces 25 and 26 restrict movements of the cartridge 1 in the right/left direction.

(Manual Loading Operations)

As application of the insertion force upon the cartridge 1 continues, the insertion force gets transmitted to the tray 20 via the stopper 28a and manual loading of the tray 20 into the optical disk record/reproduce drive 140 is started.

During manual loading of the tray 20, an eject end switch (not shown) of the tray detects a signal indicative of passing of the tray, a drive voltage is applied to the loading motor 61, and as the drive gear 66 which follows rotations of the loading motor 61 rotates, automatic loading of the tray 20 starts.

At this stage, the spring constant and the pre-loading force of the coil springs 49 which urge the cartridge holders 27 are set such that the following relationship holds between the insertion force over the cartridge 1 into the cartridge holders 27 and the manual loading force upon the tray 20, whereby manual loading of the tray 20 is performed after placing of the cartridge 1 on the tray 20 has completed:

(the insertion force over the cartridge)<(the manual loading force)

If the force relationship above is opposite, loading of the tray 20 starts before insertion over the cartridge 1 into the cartridge holders 27 completes, and clamping of the disk 10 stored in the cartridge 1 accordingly fails.

(Automatic Loading)

With a loading switch (not shown) of the main unit 140 of the optical disk record/reproduce drive turned on at the time of the completion of placing of the cartridge 1 on the tray 20, a drive voltage is applied to the loading motor 61, and as the drive gear 66 which follows rotations of the loading motor 61 rotates, automatic loading of the tray 20 starts.

During loading of the tray 20, actions of the shutter opener 29 open the shutter 2 of the cartridge 1, and the optical disk 10 stored in the cartridge 1 becomes ready for recording and reproduction on the recording surface.

(Driving of Traverse Holder)

The load cam 249 disposed to the back surface of the tray drives the slide cam 100 in the left-hand side direction, immediately before loading of the tray 20 completes. As the slide cam 100 moves, the traverse holder 70 which engages with the cam grooves 109 of the slide can 100 gradually move from the bottom position to the top position.

At the same time, the traverse holder 82 too, which is flexibly supported by the rubber dampers 71 to the traverse holder 70, together with the clamper 84 moves the optical disk as it has been loaded up to the top position for clamping.

Clamping of the optical disk has completed by the time the slide cam 100 has moved, and the spindle motor 90 starts rotating the optical disk.

(Incorrect Placing of Cartridge)

Figure 3:
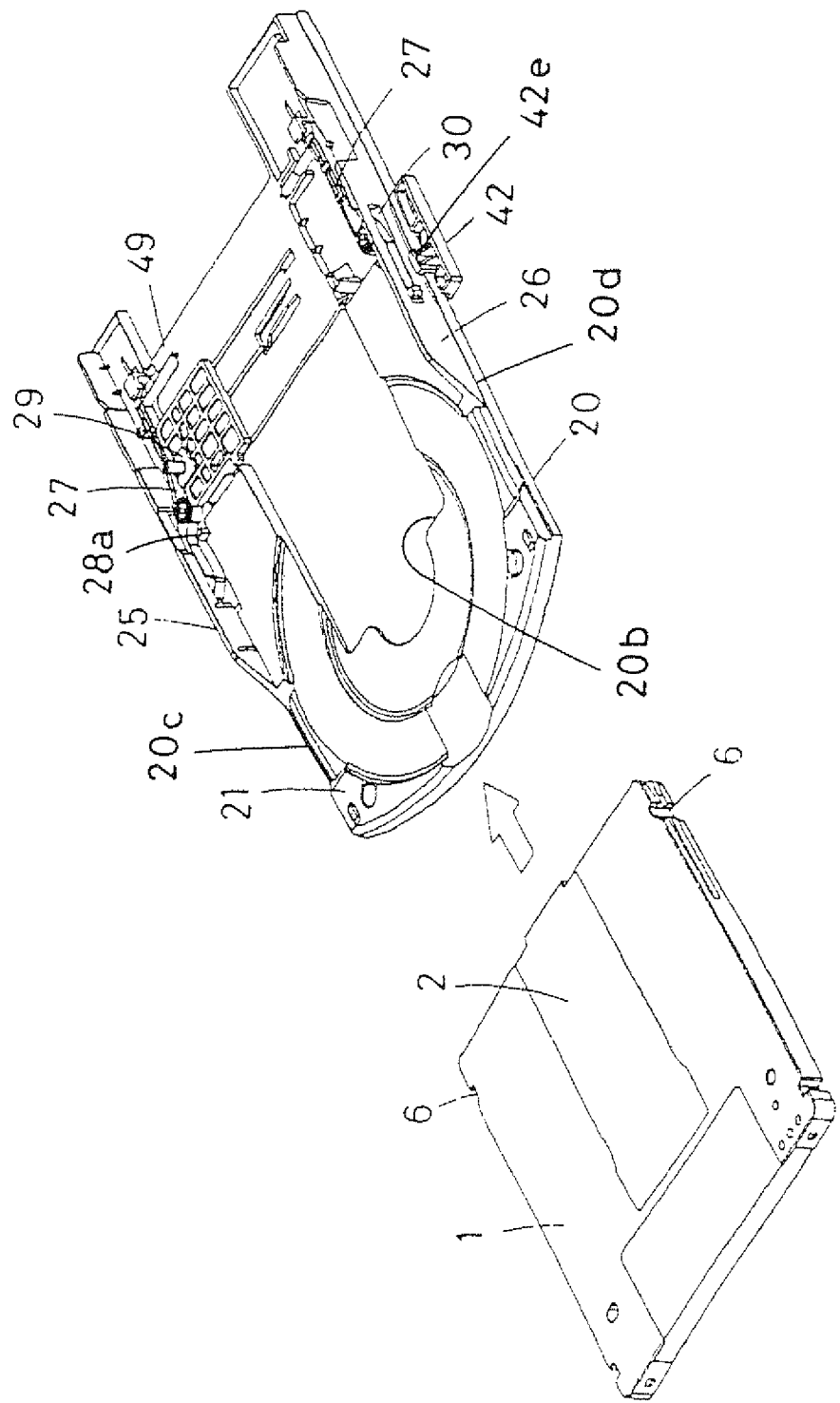
FIG. 3 is a perspective view which shows a state that a cartridge is yet to be placed on a tray.

With reference to FIG. 3, a description will now be given on operations of the cartridge holders 27 upon incorrect placing of the cartridge 1 on the tray 20 in the opposite forward/backward direction.

In a similar fashion to normal operations, the cartridge 1 is slid on the cartridge seating surface 21 from the front of the tray 20 in a direction of pushing into the optical disk record/reproduce drive 140.

In the process that the left-hand side and the right-hand side edge surfaces of the cartridge 1 are being pushed in the tray 20 with the left-hand side and the right-hand side wall surfaces 25 and 26 serving as guides, since there are slanted surfaces at the front edges of the engaging parts 27*b* of the cartridge holders 27, the cartridge 1 is easily released because of the insertion force of inserting the cartridge 1. As the cartridge is further inserted, because of the absence of the engagement receiving parts 6 of the cartridge 1, the engaging parts 27*b* of the cartridge holders 27 slide in the released condition along the left-hand side and the right-hand side edge surfaces of the cartridge 1. The cartridge holders 47 remain released, even when the cartridge 1 has arrived at the position of the stopper 28*a* which restricts to the insertion limit.

As the loading switch is turned on with the cartridge 1 incorrectly placed on the tray 20, loading of the tray 20 into the optical disk record/reproduce drive 140 progresses. However, since the cartridge holders 27 are in the released condition and open toward outside on the left-hand side and the right-hand side edge surfaces of the cartridge 1 during the loading of the tray 20, the cartridge holders 47 of the optical disk record/reproduce drive 140 are open wider in the width direction than the width of an opening 60*a* of the mechanical chassis 60 which is for passing the tray 20, and therefore, the engaging parts 27*b* of the cartridge holders 27 and the opening 60*a* interfere with each other, and the loading of the tray 20 is stopped in the middle.

The loading motor 61 senses an abrupt increase in drive load attributed to the interference between the cartridge holders 27 and the opening 60*a* and the loading of the tray 20 is stopped, following which the loading motor 61 rotates in the reverse direction and the ejection operation of the tray 20 takes over.

In this manner, as the cartridge 1 which an operator thought has placed on the tray 20 and loaded gets ejected unexpectedly, the operator learns about the incorrect placing of the cartridge 1.

According to this embodiment, upon application of vibrations and impact from outside the optical disk record/reproduce drive while the optical disk rotates, while the drive itself and the cartridge temporarily are held as one integrated unit to the drive vibrate, there are only suppressed vibrations and impact upon the traverse holder 82 which is supported by the rubber dampers 71, the optical pickup 99 formed on the traverse holder 82 and the optical disk which is fixed to the turn table 91 of the spindle motor 90, and hence, an influence over recording and reproduction decreases largely.

Further, since a mechanism supported by the rubber dampers 71 inside the optical disk record/reproduce drive is limited only to the traverse holder 82, it is possible to make the structure of the drive simple and reduce the size and the weight of the drive.

In addition, as the side arms 143 press and fix the cartridge 1 to the tray 20 after the cartridge 1 has been inserted into the drive, the drive load for loading the cartridge 1 into the drive is reduced. Still further, it is possible to reduce the drive load also by means of reduction in size and hence weight of the traverse base 82, or by disposing the alignment pin, the detecting switch, the detecting arm and the like separate from the traverse base as described above.

Second Preferred Embodiment

A second preferred embodiment of the present invention will be described with reference to FIG. 8. This embodiment is directed to attachment of the rubber dampers in the first preferred embodiment. There are holes 300 which are approximately circle are formed on the four corners of the traverse base 82, and the rubber dampers 71, which are cylindrical yet concaved in the middle to be shaped like a lug, are fit in the same at the concaved portions 71*a*.

There are through holes 71*b* along the vertical direction of the rubber dampers 71, bosses 70*a* which have a cylindrical shape for instance disposed upright to the traverse holder 70 are inserted through the through holes 71*b*, and fixing screws 85 are put in the screw holes 70*b* which are formed at the top ends of the bosses, thereby preventing dropping of the rubber dampers 71.

In the rubber dampers 71, predetermined misregistrations H are created between the inter-hole distances between the holes 300 of the traverse base 82 and the inter-boss distance of the bosses 70*a* of the traverse holder 70, so that the pre-load will be given in a parallel direction to the surface of the traverse base 82.

Owing to the misregistrations H, in addition to the vertical-direction load created by the weight of the traverse base 82, a load in the horizontal direction is applied to the rubber dampers 71, and as the postures of the traverse base 82 and the traverse holder 70 as driven vertically change in accordance with loading or ejection of the cartridge 1, a variation in reproducibility of positioning of the traverse base 82 is reduced.

Even if the inter-hole distances between the holes 300 of the traverse base 82 are the same as the inter-boss distance of the bosses 70*a* of the traverse holder 70, as the outer diameter of the concaved portions 71*a* of the rubber dampers 71 is made larger than the diameter of the rubber damper attaching holes 300 of the traverse base 82 and the outer diameter of the bosses 70*a* of the traverse holder 70 is made larger that the diameter of the through holes 21*b* of the rubber dampers 71, a load in the horizontal direction is applied to the rubber dampers 71, and it is therefore possible to reduce a variation in reproducibility of positioning of the traverse base 82.

In this manner, the pre-load in the radial direction of the disk is applied on the damper members and the traverse base 82 is flexibly held to the mechanical chassis 60.

Third Preferred Embodiment

A third preferred embodiment of the present invention will be described with reference to FIG. 9. This embodiment is directed to setup of the resonance frequency of the rubber dampers in the first preferred embodiment. The rubber dampers are of a material which exhibits both a spring characteristic and a vibration absorption characteristic and therefore inevitably has a primary resonance frequency. The primary resonance frequency becomes lower as a soft rubber material whose vibration absorption characteristic is higher is used, which realizes setup to a frequency close the rotational frequency of the optical disk.

However, since an optical disk requires a step of molding a resin into a thin disk and a step of bonding, the thickness of the disk always becomes uneven and a centering error always occurs during the bonding, which makes the center of rotation of the optical disk and the center of gravity fail to match with each other. This deviation is called a mass eccentricity. While a mass eccentricity is defined by standards as an optical disk needs to rotate at a high speed, it is impossible to control a mass eccentricity to zero, and hence, when an optical disk having a mass eccentricity is rotated, the optical disk sways and vibrates and the traverse base 82 as well vibrates as a reaction to this.

While the rotational frequency of the optical disk increases during spin-up of the optical disk record/reproduce drive and the swaying-induced vibrations accordingly increase, the primary resonance frequency of the rubber dampers 71 which support the traverse base 82 maximizes the vibrations.

In an optical disk record/reproduce drive which does not accommodate a cartridge, when a naked optical disk having a large mass eccentricity is rotated, the primary resonance frequency of the rubber dampers is set to a value which is lower than the rotational frequency of the optical disk in general, for the purpose of avoiding deterioration in recording and reproduction due to the swaying-induced vibrations which will otherwise occur at a target number of revolutions.

Meanwhile, in an optical disk record/reproduce drive for recording in and reproduction from an optical disk which is housed in a conventional cartridge, even if the mass eccentricity of an optical disk is large and swaying-induced vibrations occur, since the optical disk and a cartridge vibrate as one integrated unit, the optical disk and the cartridge will not contact.

Figure 9:
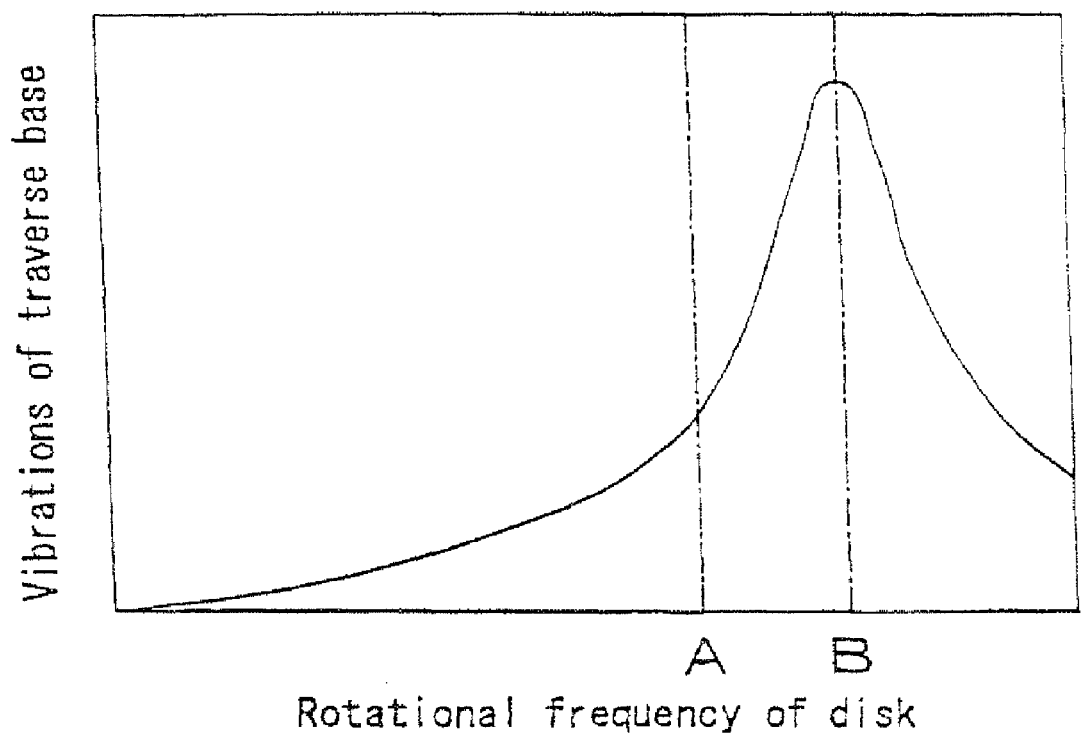
FIG. 9 is a characteristic diagram showing vibrations of a traverse base in response to the rotational frequency of a disk and the primary resonance frequency of a damper according to a third preferred embodiment.

However, in the optical disk record/reproduce drive according to the present invention, since there is a possibility of contact between the optical disk and the cartridge 1 when the amplitude of the swaying-induced vibrations becomes maximum during spin-up in the event that the mass eccentricity of the optical disk housed in the cartridge is large, the primary resonance frequency B of the rubber dampers 1 is set to be higher than at least the maximum rotational frequency A of the optical disk as shown in FIG. 9 to thereby avoid contact between the optical disk and the cartridge during spin-up.

In the present invention, the damper members may be formed so as to allow revolutions of the traverse base 82, and the rear edge of the traverse base 82 may be attached directly to the mechanical chassis 60 through the damper members so as to vertically drive the front edge of the traverse base 82.

Fourth Preferred Embodiment

FIGS. 1 through 6, 10 through 25 and 52 through 55 show a fourth preferred embodiment of the present invention. FIG. 1 is an exploded perspective view of an optical disk record/reproduce drive according to the first preferred embodiment of the present invention, while FIG. 25 shows the flow of the sequence from loading of the cartridge into the optical disk record/reproduce drive up to rotation of the disk.

The optical disk record/reproduce drive according to the present invention will now be described with reference to FIG. 1. Denoted at 140 is the main unit of the optical disk record/reproduce drive which is generally divided into a loading mechanism 190, a traverse mechanism 191, the mechanical chassis 60, the tray 20 and a disk clamp mechanism 192.

Figure 25:
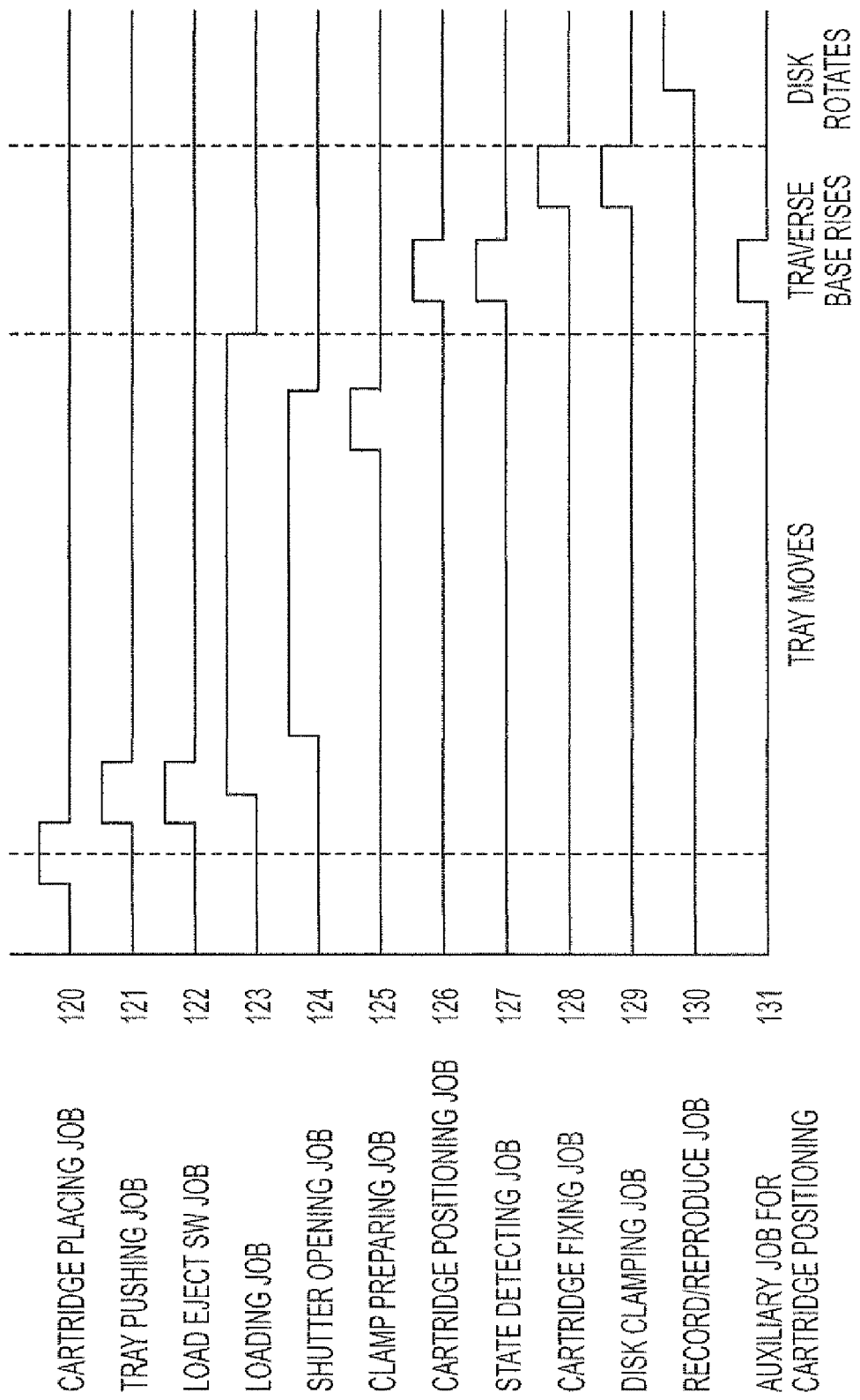
FIG. 25 is a timing chart which shows the sequence of loading a cartridge according to a fourth preferred embodiment.

FIG. 25 is a timing chart of the sequence of loading of the cartridge into the optical disk record/reproduce drive according to the present invention.

Denoted at 120 is a cartridge placing job of placing the cartridge 1 on the tray 20. Denoted at 121 as a next job is a tray pushing job of pushing the tray 20 into inside the main unit 140 of the optical disk record/reproduce drive, while denoted at 122 is a load eject switch job of pressing a load eject switch (not shown), and these serve as a trigger which starts loading of the tray 20.

After either one of the tray pushing job 121 or the load eject switch job 122 is selected, a loading job 123 of loading the tray 20 is started.

A shutter opening job 124 of opening the shutter 2 of the cartridge 1 is executed approximately in parallel to the loading job 123, and the shutter opening job 124 for the cartridge 1 ends at the time of the completion of the loading job 123, thereby completing preparation for clamping of the disk stored in the cartridge with the spindle motor 90. In short, immediately before and by the end of the loading job 123, a clamp preparing job 125 completes during which the clamper 84 disposed to the clamp arm 73 which engages with the projection 130 disposed to the tray 20 is positioned relative to the cartridge 1.

Denoted at 126 is a cartridge positioning job of inserting the alignment pins 102 into the positioning holes 3 which is formed in the cartridge 1 and finishing the positioning of the cartridge 1 relative to the tray 20. At this stage, an auxiliary job for cartridge positioning 131 is carried out.

Denoted at 127 is a state detecting job during which the detecting levers 106, which engage with the state detecting switches or the detecting switches 105 disposed to the circuit board 85', are received by the state detecting holes 4 of the cartridge 1 and the state of the disk inside the cartridge 1 is detected.

Following this, a cartridge fixing job 128 is executed during which the side arms 143 urge, press and fix the cartridge 1 to the tray 20, whereby rattling of the cartridge 1 is eliminated.

Denoted at 129 is a disk clamping job during which the spindle motor 90 passes through the center hold of the disk and clamps, together with the clamper 84, the disk 10.

Denoted at 130 is a record/reproduce job during which the spindle motor 90 rotates the disk and the optical pickup 99 records in or reads out a record from the disk.

Being approximately opposite to the sequence of the cartridge loading, the sequence of ejection of the cartridge from the optical disk record/reproduce drive according to the present invention will not be described in redundancy.

Mechanical portions for executing the respective jobs referred to in FIG. 25 will now be described.

First, as shown in FIG. 2, during the cartridge placing job 120, the shafts 28 disposed on the both sides of the tray 20 are received by the holes 27a which are formed in the middle of the cartridge holders 27 which serve as cartridge holding means, the springs 49 which use coil springs for instance inwardly urge the engaging parts 27b which are at the front edges, the engaging parts 27b are made engaged with the engagement receiving parts 6 of the cartridge 1 (See FIG. 6, etc.), and the pair of cartridge holders 27 accordingly hold the cartridge 1. Denoted at 21 is the cartridge seating surface, denoted at 22 and 23 are the concave portions for seating a naked disk, denoted at 25 and 26 are the both side walls, denoted at 29 is the shutter opener, and denoted at 30 are slits which accept partial insertion over the cartridge holders 27.

Figure 4:
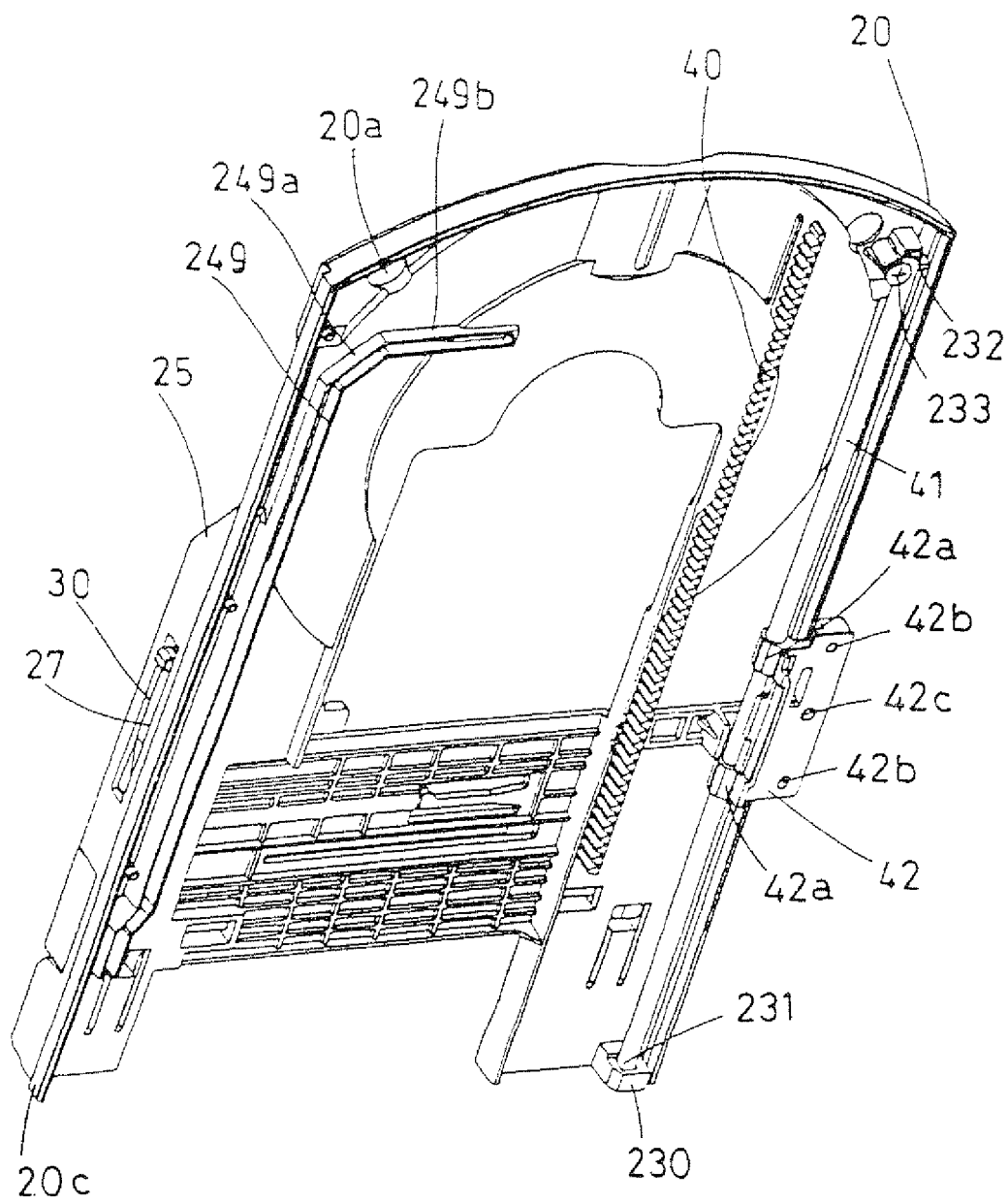
FIG. 4 is a perspective view of a tray as it is viewed from the back.

Next, the loading job 123 based on the jobs 121 and 122 performed on the tray 20 is carried out owing to a rack-and-pinion action exercised by the loading mechanism 190, and the loading mechanism 190 is disposed inside the opening 60a of the mechanical chassis 60 for loading and ejection of the tray 20 and comprises the loading motor 61 and the loading gear system 66. Meanwhile, there is the rack 40, which engaged with the drive gear (output pinion) 66a of the loading gear system 66, disposed to one side of the back surface of the tray 20 along the loading/ejection direction as shown in FIG. 4. Denoted at 41 is a metallic shaft which is parallel to the rack 40, and denoted at 42 is a bearing holder which receives the shaft 41 and is fixed to the mechanical chassis 60. The one side of the tray 20 is therefore capable of moving freely relative to the mechanical chassis 60 in the loading/ejection direction while the other side is supported for free sliding by the guide stripe 63 of the mechanical chassis 60, and the resilient floating preventing parts 209 projecting from the mechanical chassis 60 prevents the other side of the tray 20 from floating upward. The ejecting position of the tray 20 relative to the mechanical chassis 60 is restricted to a position which allows attachment of the cartridge 1 to the tray 20 and detachment the cartridge 1 from the tray 20, whereas the loading position of the tray 20 is restricted to a position which allows driving of the disk of the cartridge 1 by the spindle motor 90.

The shutter opening job 124 is for opening the shutter 2 which is disposed to the cartridge 1, and is realized with the opener 29, which is disposed so as to be freely movable in a direction perpendicular to the loading/ejection direction of the tray 20, and a cam guide (not shown) which is shaped as a groove for instance to move the opener 29 in association with loading of the tray 20 and which is disposed to the back surface of the upper base 83. In a condition with the tray 20 already ejected, the opener 29 has moved to the position which is for opening the shutter 2 using the cam guide, and therefore, as the cartridge 1 is placed on the tray 20 and the tray 20 starts to be loaded from the fixed state that the tray 20 is held by the cartridge holders 27, the opener 29 moves in a direction perpendicular to the loading direction along the cam guide, the projection of the opener 29 engages with the projection at the front edge of the shutter 2, and the shutter 2 starts to be opened against the spring force of a closing spring which is urged in the closing direction of the closing spring and is then opened completely before the loading completes. As the shutter 2 is opened, the disk housed in the cartridge 1 can be engaged with the spindle motor 90 and the optical pickup 99 can be moved close. On the other hand, in accordance with ejection of the tray 20, the opener 29 moves in the opposite direction to the direction described above, and the shutter 2 moves in the closing direction because of the closing spring.

The clamp preparing job 125 is realized with the disk clamp mechanism 192 which operates as the tray 20 moves in the vicinity of the loading position. As shown in FIG. 1, the disk clamp mechanism 192 is attached on the upper base 83 and comprises the clamp arm 73, the clamp pressing spring 76 which supports the middle part of the clamp arm 73, and the clamper 84 which is disposed to one end of the clamp arm 73 and positioned at a through hole 83a which is formed in the upper base 83. In this structure, the clamper 84 fixes the disk 2 to the turn table 91 during mounting of the disk 10 to the spindle motor 90. The clamper 84 comprises members which can be split into two, one above and the other below, and houses the magnet inside. In addition, for the purpose of centering of the disk 10 with respect to the turn table 91, the magnetic element is buried in an apex portion of a center cone which is formed at the center. Owing to magnetic suction force of the magnet housed inside the clamper 84 and the magnetic element, the clamper 84 fixes the disk 10 to the turn table 91.

The clamp pressing spring 76 urges the clamper 84 so that the clamper 84 floats beyond the top surface of the upper base 83, and the clamper 84 is fit to a stopper 83b which is formed in the through hole 83a. Meanwhile, there is a through hole 83c to face the other edge of the clamp arm 73, and the other edge of the clamp arm 73 is bent so as to protrude to the back surface side of the upper base 83, thereby forming the receiving part 73a.

FIG. 5(a) shows a relationship between the disk clamp mechanism 192 and the tray 20 yet omits the upper base 83, while FIG. 5(b) shows the mechanical chassis 60. There is the projection 130 disposed upright to the right-hand innermost side of the tray 20. As the tray 20 slides into inside the drive, that is, in the direction denoted at the arrow A and the loading of the tray 20 comes to the completion, the projection 130 contacts the receiving part 73a of the clamp arm 73. The clamp pressing spring 76 always urges the clamp arm 73 in such a manner that the receiving part 73a of the clamp arm 73 moves downward about a fulcrum which is in the middle of the clamp arm 73. However, contacting the projection 130 disposed on the tray 20, the receiving part 73a of the clamp arm 73 rises and revolves about the fulcrum in the direction denoted at the arrow B, so that the clamper 84 attached for free rotation to the hole at the front edge of the clamp arm 73 moves down to the central portion of the disk which is housed in the cartridge 1 whose shutter 2 is open. However, since the traverse holder 70 which will be described later has not moved up yet in this condition, chucking of the disk does not occur and the clamp 84 accordingly remains standby.

The cartridge positioning job of inserting the alignment pins 102 into the positioning holes 3 which is formed in the cartridge 1 will now be described with reference to FIGS. 6 and 10 through 12.

The alignment piece 102A comprising the alignment pins 102 directed vertically to the cartridge 1 can move in the direction C, as paired projections (earn follower) 108 which are formed in the side surface of the alignment piece 102A engage for free sliding with the cam grooves 109 which are formed approximately in the shape of the letter Z in the slide cam 100 which serves as a cam member and as paired cylindrical penetrations 102, whose cross sectional shape is pentagonal and which are formed in the same direction as the projecting direction of the alignment pins 102, engage for free sliding with cylindrical projections (not shown) whose cross sectional shape is cruciform for instance and which are disposed upright to the mechanical chassis 60.

The slide cam 100 is in engagement for free sliding along the partition wall 178, which extends in a direction perpendicular to the loading ejection direction of the tray 20 and which separates the traverse holder 70 and the like from the loading motor 61, the loading gear system 66 and the like which are mounted to the mechanical chassis 60 (FIG. 1). The projection 100a protrudes from one edge of the slide cam 100, and engages for free sliding with the groove-shaped load cam 249 which is disposed in the vicinity of the side portion which is parallel to the rack 40 disposed to the back surface of the tray 20 and is opposite to the opposite side to the rack 40. The load cam 249 comprises the slanted portion 249a, which is slanted at about 45 degrees for instance so as to slightly move the slide cam in the vicinity of the loading position at which loading of the tray 20 ends, and the extension portion 249b which is contiguous to the slanted portion 249a and guides the earn sliding part 100a in a direction perpendicular to the travel direction of the tray 20. A rack 110 is disposed to the slide cam 100 at such a position which is opposed to the loading gear system 66, and as the cam sliding part 10a moves on the slanted portion 249a, the rack part 110 engages with the middle gear 65 which is one gear toward the motor 61 than the drive gear 66a of the reduction loading gear system 66. The rack 40 and the drive gear 66a get disengaged from each other after this engagement with the middle gear 65, whereby the gears are switched. Although the tray 20 loses driving by the drive gear 66a as a result of this, the cam sliding part 100a is stopped by the slide cam 100 after slightly moved while traveling on the slanted portion 249a, the slide cam 100 moves in the direction perpendicular to the travel direction of the tray 20 as the motor 61 rotates even after the loading of the tray 20, and the cam sliding part 100a moves to the extension portion 249b. As the slide cam 100 moves, the projections 108 rise along the cam grooves 109, and the alignment pins 102 rise. When the movement is in the opposite direction, operations opposite to this are performed.

Figure 10:
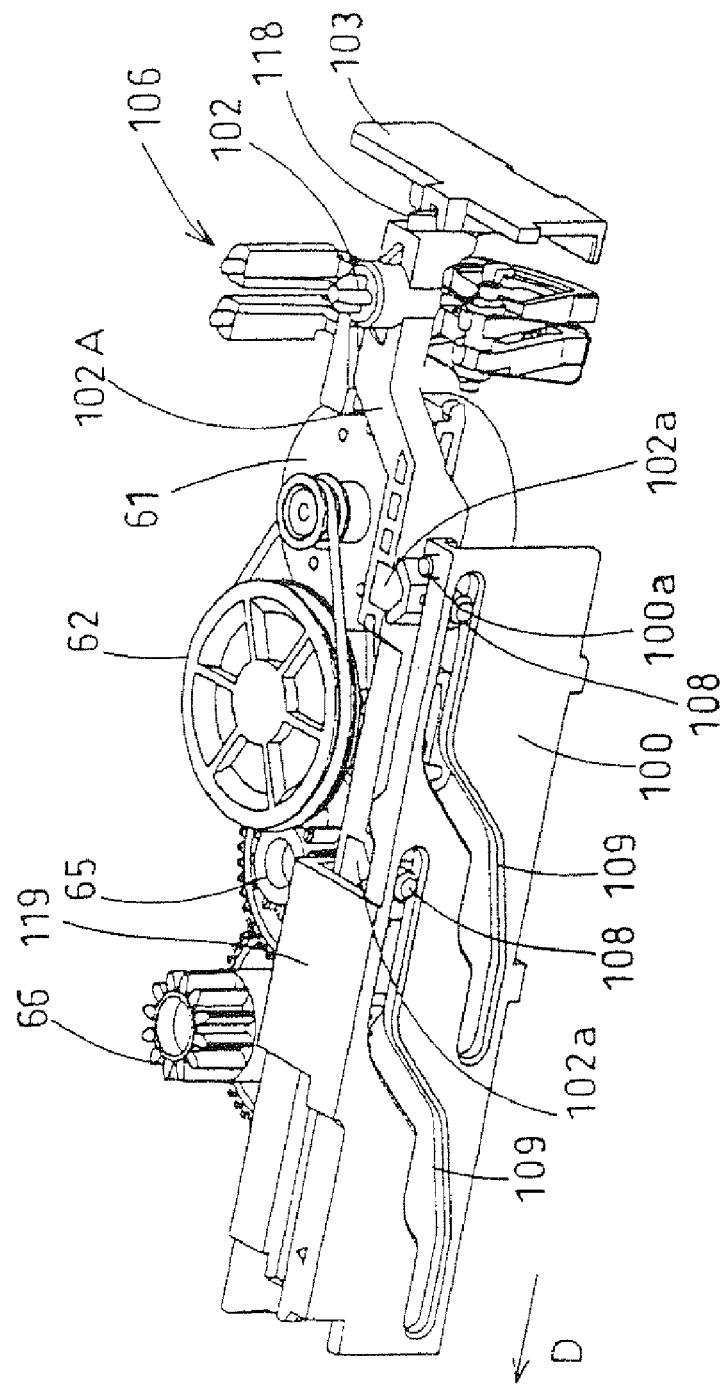
FIG. 10 is a perspective view which shows a relationship between a slide cam plate, an alignment pin, a switch lever and a loading mechanism, as it is viewed toward an ejecting direction of a tray.
Figure 11:
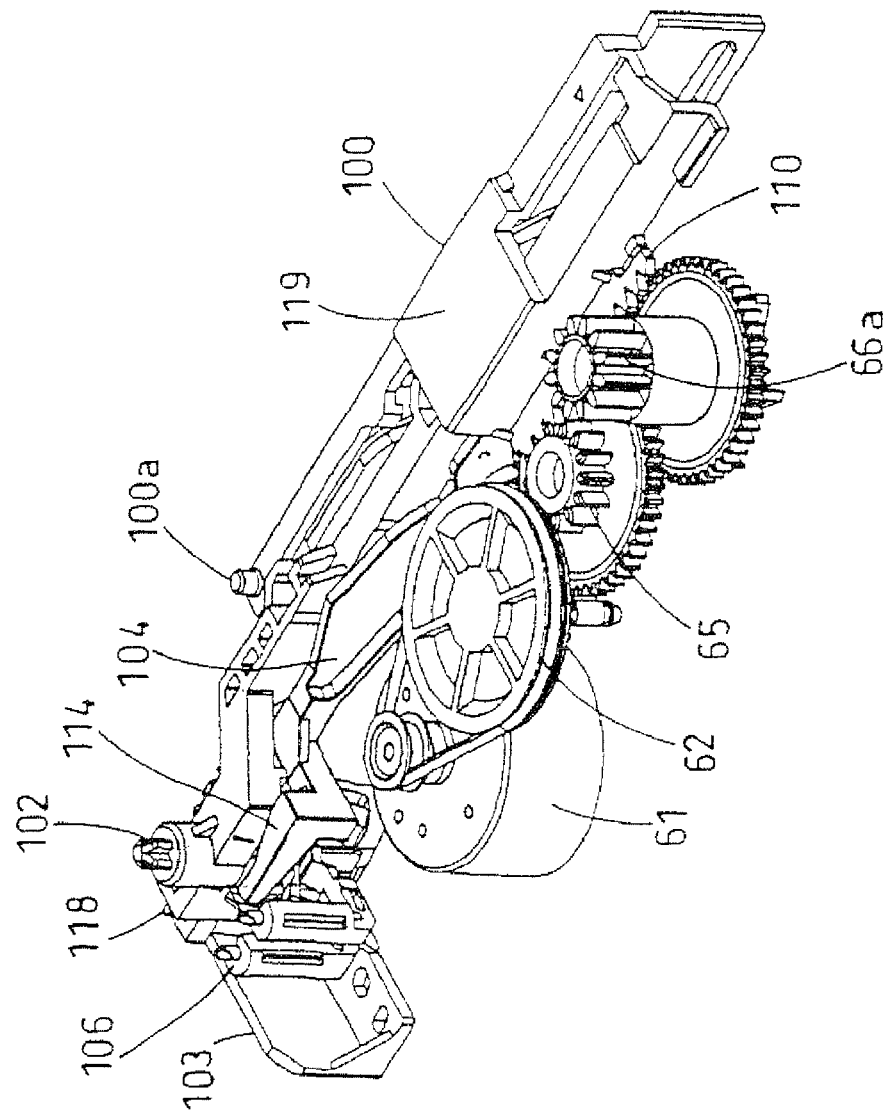
FIG. 11 is a perspective view of FIG. 10, as it is viewed toward a loading direction of a tray.

As shown in FIGS. 10 and 11, the loading motor 61 keeps rotating even after the tray 20 has been drawn, the middle gear 65, which is within the loading gear system 66 and drives the rack 110 of the slide cam 100, moves the slide cam 100 in the direction D. After the tray 20 has been drawn, therefore, the alignment pins 102 rise toward the positioning holes 3 of the cartridge 1 which is on the tray 20. The alignment pins 102 then engages with the positioning holes 3 of the cartridge 1 after passing through the through holes 20a of the tray 20, thereby completing positioning in the direction which is parallel to the surface of the disk which is inside the cartridge 1. The slide cam 100 and the alignment piece 102A will be described in detail later. The last-stage drive gear 66 drives the rack 40 of the tray 20 not shown after transmission of the rotations of the loading motor 61 to a pulley 62, the middle gear 65 and the like of the loading gear system 66, and the tray 20 therefore moves.

The alignment pins 102 engage with the positioning holes 3 of the cartridge 1 as it is after loaded as shown in FIG. 5(b), thereby realizing a function of maintaining the clearance between the disk 10 which is held by the spindle motor 90 and the cartridge 1 in the spindle motor 90 and positioning the cartridge 1 at such a position which does not contact the disk 10.

The assist arms 104 which assist rising of the alignment pins 102 are disposed to the mechanical chassis 60 in such a manner that the assist arms 104 can freely revolve. The assist arms 104 is driven through cam plates 119 which are disposed to upper portions of the alignment pins 102, as the slide cam 100 moves in the right/left direction. The assist arms 104 supply force which helps the alignment pins 102 to rise, from below the alignment pins 102 during loading. In the event that the position of the cartridge 1 does not match with the position of the tray 20, the misregistration of the cartridge 1 is corrected with the alignment pins 102 forced into the positioning holes 3 of the cartridge 1, whereas if the misregistration is large, even when the alignment pins 102 get deformed because of shortage of the insertion force, the assist arms 104 provide insertion force as an assist only during insertion of the alignment pins 102 into the positioning holes 3 so that sufficient force for correction of the misregistration will be provided. Further, it has a function of releasing the assist immediately before the completion of the rising. In addition to these functions, the assist arms 104 have a function of restricting movements of the detecting levers 106 in the direction toward the cartridge 1 after the detecting levers 106 have left the state detecting holes 4 of the cartridge.

Detection of the state detecting holes 4 of the cartridge 1, namely, the cartridge positioning job 126 shown in FIG. 25 will now be described with reference to FIGS. 12 through 18.

Figure 12:
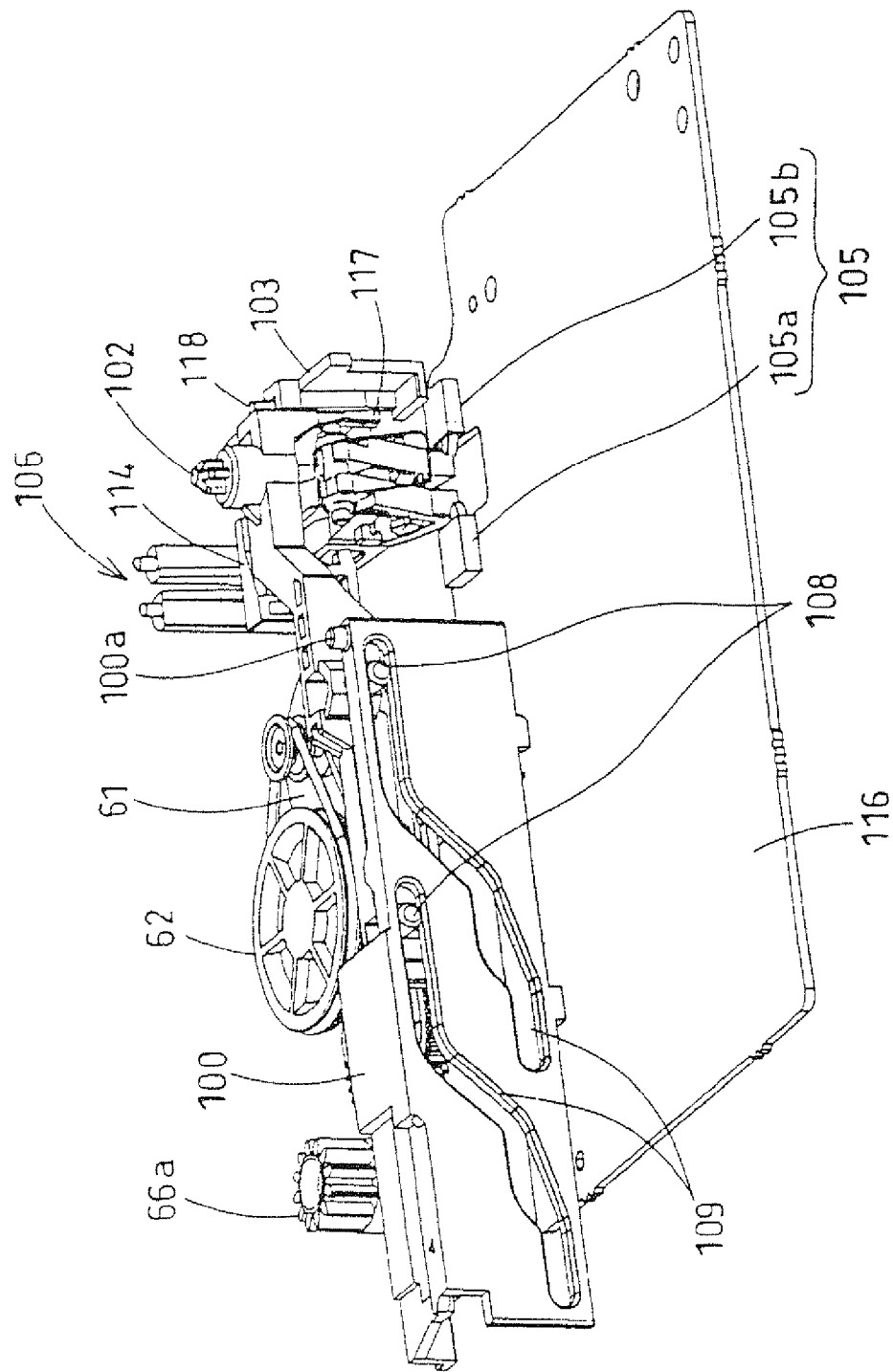
FIG. 12 is a perspective view which further shows a relationship between the switch lever and a state detecting switch on a circuit board in FIG. 10.
Figure 13:
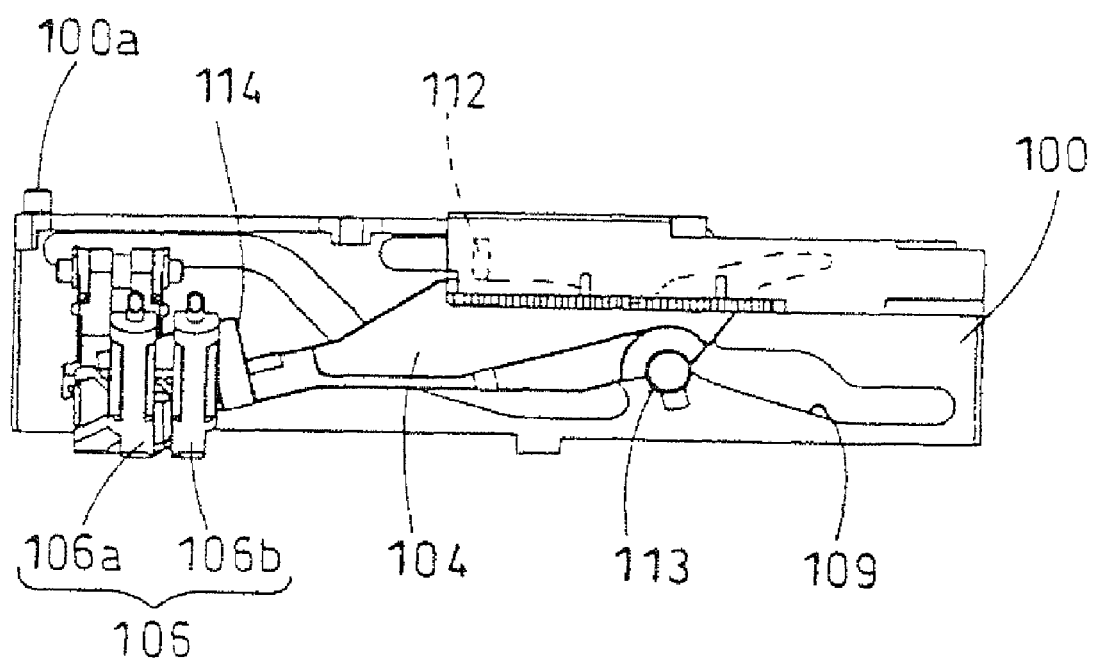
FIG. 13 is a front view which shows a relationship between a switch lever and an assist arm.
Figure 14:
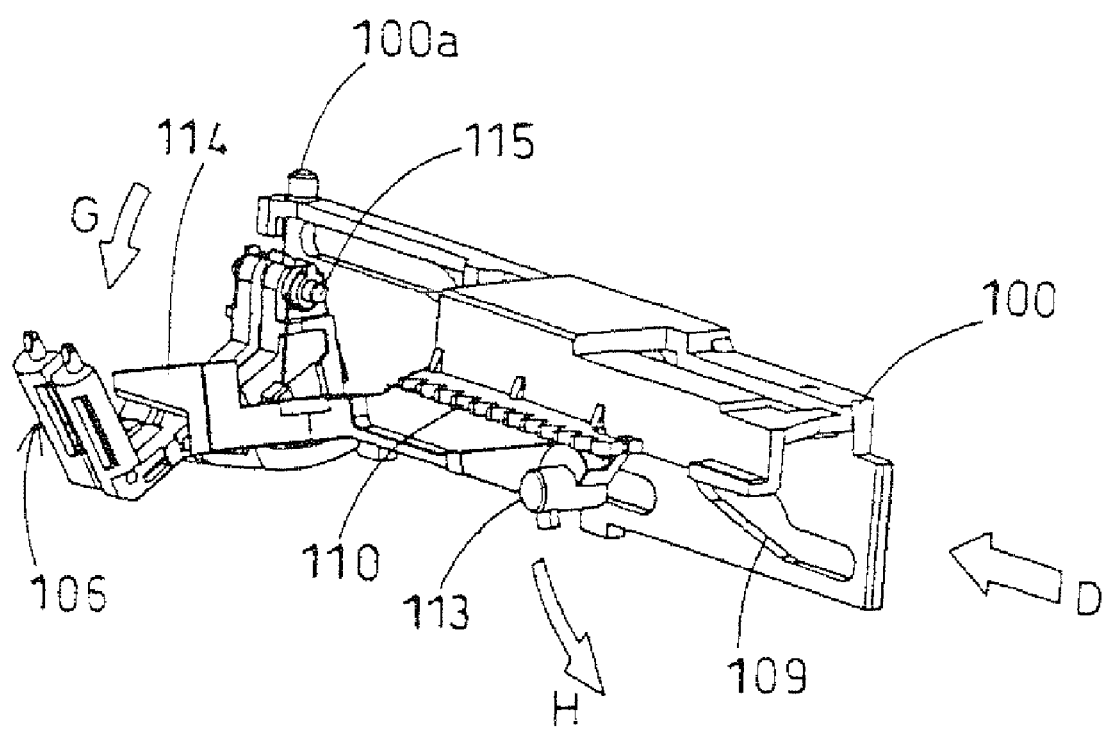
FIG. 14 is a perspective view of FIG. 13.
Figure 15:
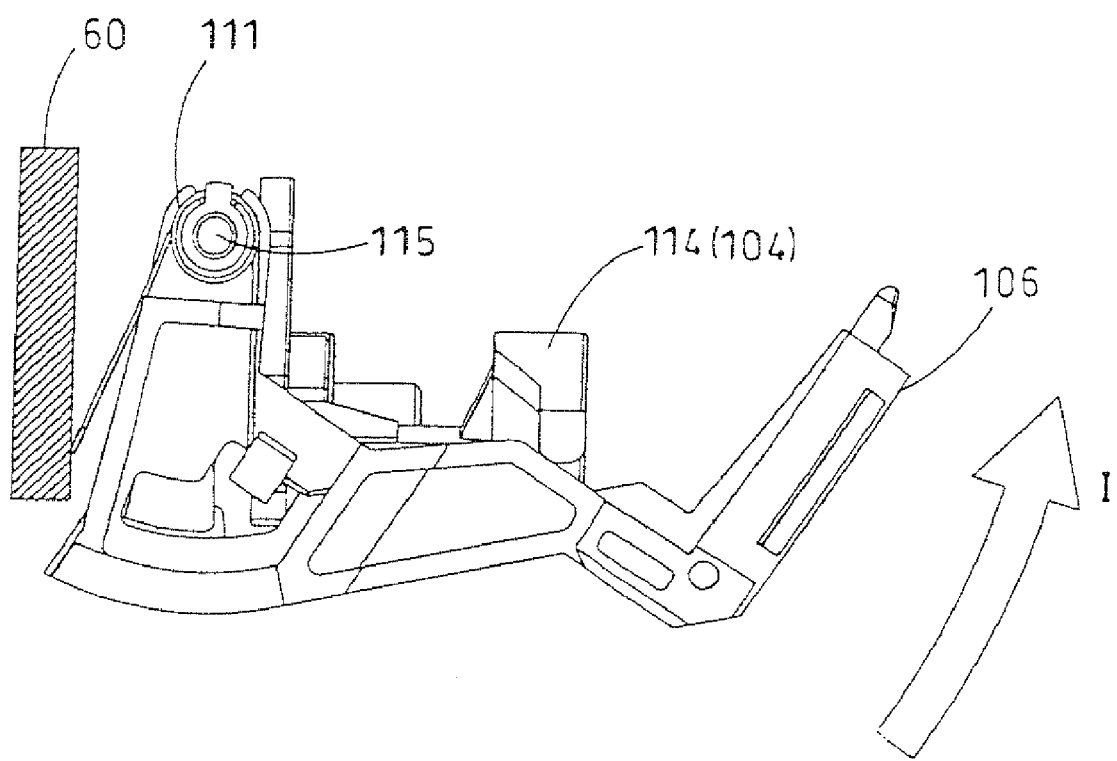
FIG. 15 is a side view which shows an assist arm and a torsion spring as they are with a switch lever lowered.
Figure 16:
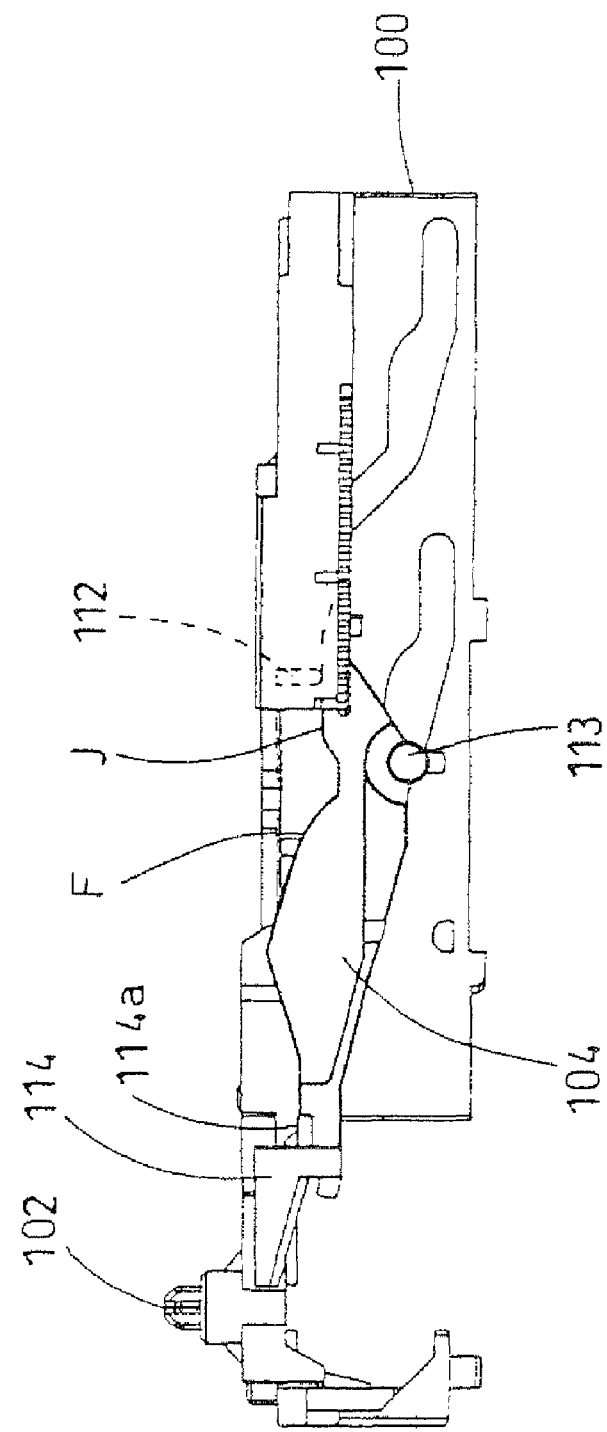
FIG. 16 is an explanatory view which shows that an assist arm has risen.

FIG. 12 is a drawing for describing movements of the paired detecting levers 106 inserted in the state detecting holes 4 of the cartridge 1, FIGS. 13 and 14 are drawing for describing a state that the detecting levers 106 are urged by torsion springs 111, and FIGS. 15 and 16 are drawing for describing a state that the detecting levers 106 are detecting whether there are the state detecting holes 4 of the cartridge 1.

In any one of the drawings, the mechanical chassis 60 is omitted for the simplicity of illustration. For the DVD-RAM cartridge 1, a detecting lever 106a corresponds to an active-side detecting hole while a detecting lever 106b corresponds to a write protect detecting hole.

In FIG. 13, although not shown, the alignment pins 102 are in a state yet to be inserted in the positioning holes 3 of the cartridge 1. At this stage, a projection 112 on the inner side of the slide cam 100 is in contact with an F-portion of the assist arms 104. The assist arms 104 have such a structure that the assist arms 104 can revolve about a revolution shaft 113, and the revolution shaft 113 is held for free revolutions by a revolution shaft holding part of the mechanical chassis 60 not shown. This posture is maintained in the state shown in FIG. 13, whereby rising of the detecting levers 106 is suppressed. At this stage, front edges 114 of the assist arms 104 are revolved in the direction H as shown in FIG. 14, so that rising of the paired state detecting levers 106 is prevented, and as a result, the state detecting levers 106 are pushed down in the direction G which is a direction away from the cartridge 1.

The state detecting levers 106 are always urged by the torsion springs 111 and are therefore always under a load which revolves in the I direction about a revolution shaft 115, as shown in FIG. 15. One ends of the torsion springs 111 are in contact with the state detecting levers 106, while the other ends of the torsion springs 111 are in contact with the wall surfaces of the mechanical chassis 60. However, as described earlier, the assist arms 104 prevent revolving movements of the state detecting levers 106. The revolution shaft 115 of the state detecting levers 106 is held for free revolutions by revolution shaft holding part of the mechanical chassis 60 not shown.

Figure 6:
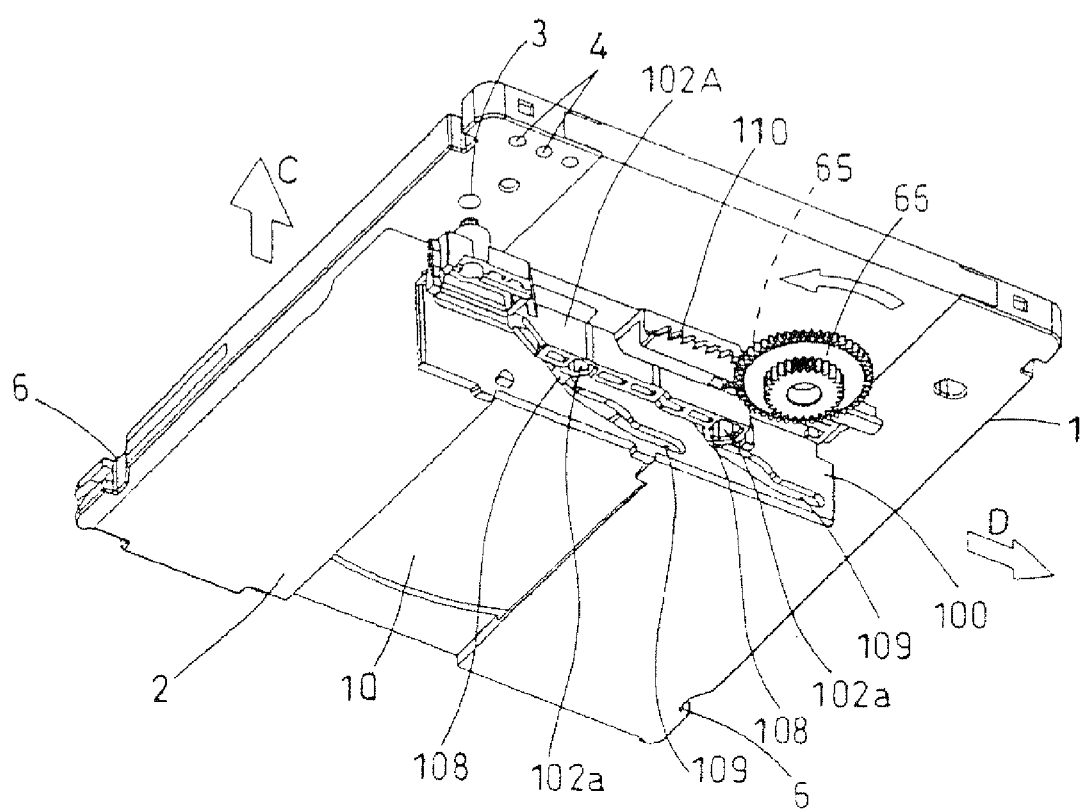
FIG. 6 is a perspective view a cartridge and a slide cam as they are as viewed from the back with a shutter opened.
Figure 7:
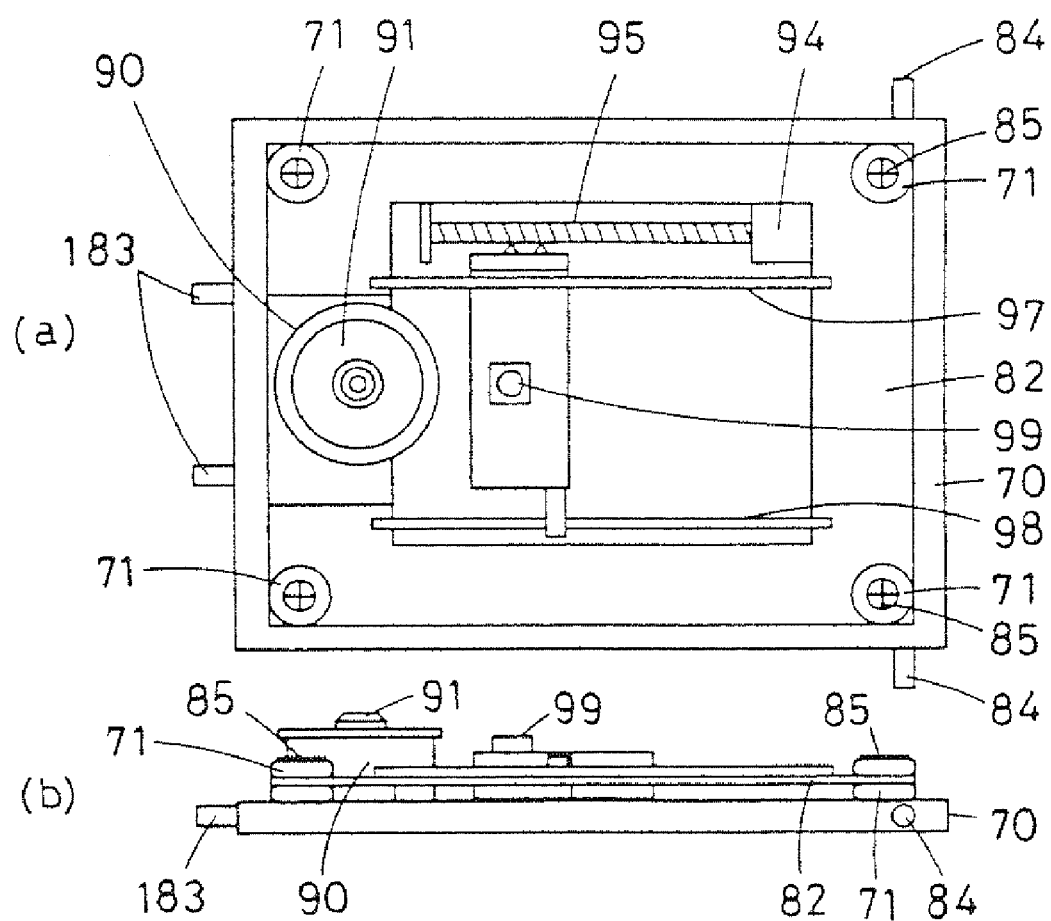
FIG. 7(a) is a plan view of a traverse base.
FIG. 7(b) is a side view of the traverse base.

After the slide cam 100 has moved in the direction D in FIG. 6 and the alignment pins 102 have been inserted in the positioning holes 3 of the cartridge 1, as shown in FIG. 16, since the projection 112 on the inner side of the slide cam 100 is in contact with J-portions of the assist arms 104, the assist arms 104 revolve about the revolution shaft 113, as shown in FIG. 12 from the state of pressing the state detecting levers 106 as shown in FIG. 13, in the opposite direction to the direction H which is shown in FIG. 14. Hence, even if the alignment pins 102 get deviated from the positioning holes 3 and a portion closer to the alignment pins 102 bend, pushing-up parts 114a close to the front edge 114 provide an assisting action of pushing up at about the alignment pins 102. The state detecting levers 106 are released from the suppressing force of the assist arms 104, and because of the effect of the torsion springs 111, revolve in the direction I shown in FIG. 15 about the revolution shaft 115 toward the cartridge 1.

Figure 17:
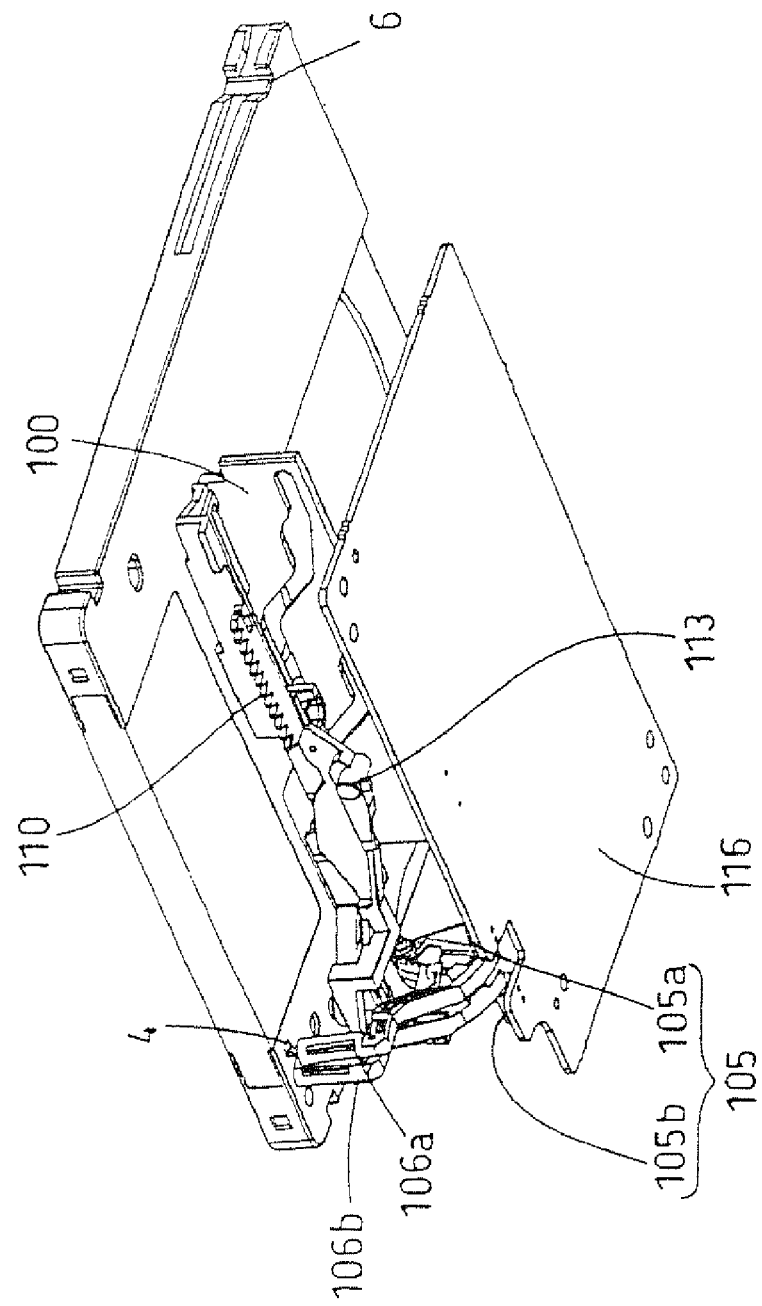
FIG. 17 is a perspective view which shows a cartridge as it is looked up from below in a condition that a switch lever has been inserted in a detecting hole of a cartridge.
Figure 18:
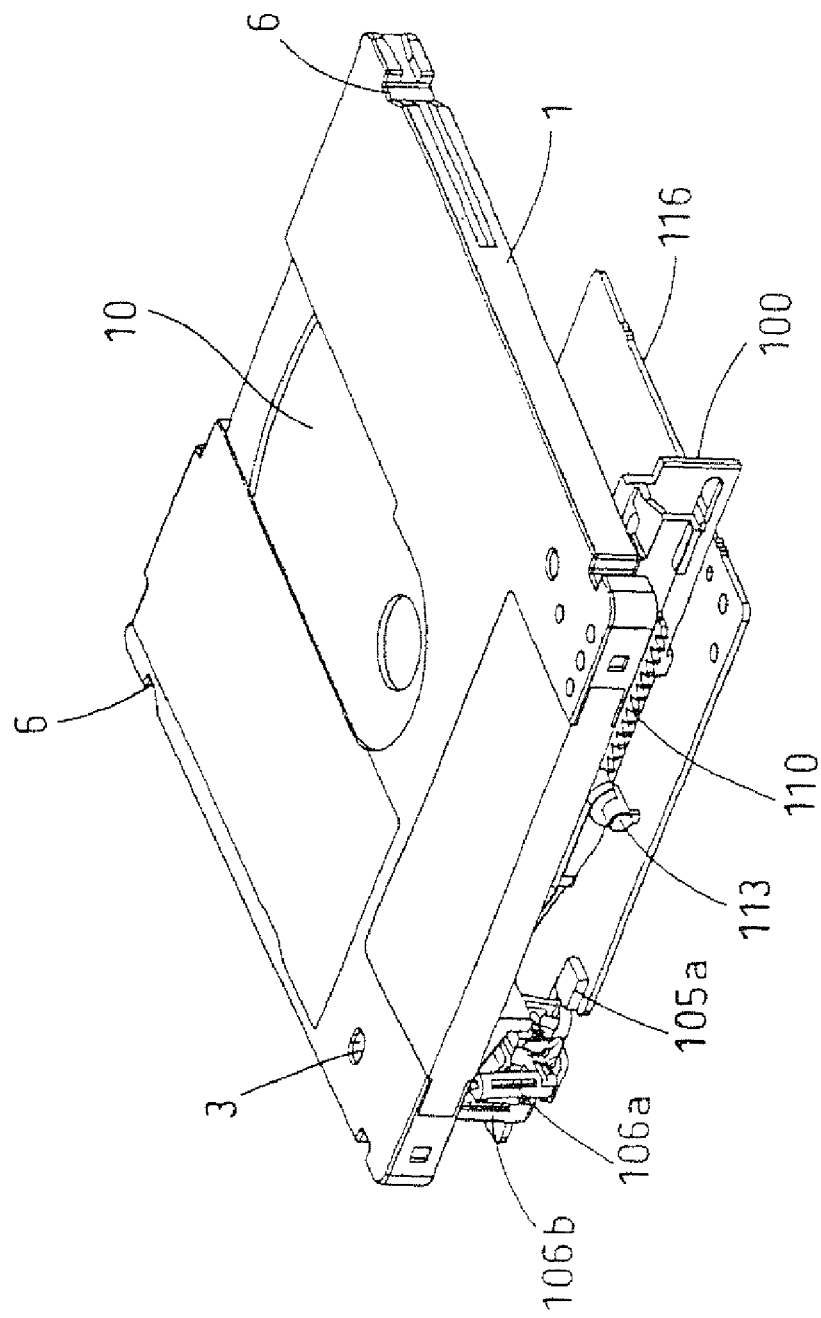
FIG. 18 is a perspective view of FIG. 17 as it is viewed from above.

Illustrate in FIG. 14 is the state that the state detecting levers 106 are in the state detecting holes 4 of the cartridge 1, in which the state detecting hole 4 corresponding to the detecting lever 106a among the detecting levers 106 is blocked. State detecting switches 105a and 105b, which are disposed on the circuit board 116 and positioned at corresponding positions to the state detecting levers 106a and 106b as shown in FIGS. 12 and 17, detect this state. The state detecting switches 105 have a function of judging, through the detecting levers 106, a condition of engagement with the detecting holes 52 of the cartridge 1 and detecting whether it is possible to write in the disk 10 which is stored in the cartridge 1, the back and the front surfaces of the disk 10 and a recording capacity of the disk 10.

According to the present invention, the detecting levers 106 are interposed between the state detecting switches 105 and the detecting holes 4 of the cartridge 1. However, the state detecting switches 105 may directly use means which detects the detecting holes 4 of the cartridge 1, and if the structure allows, the alignment piece 102A and the state detecting levers 106 or the alignment piece 102A and the state detecting switches 105 may be integrated as one so that the detecting holes 4 of the cartridge 1 will be detected at the same time as insertion of the alignment pins 102 in the positioning holes 3 of the cartridge 1.

The auxiliary job for cartridge positioning will now be described. As shown in FIGS. 10 through 12, fixing means fixes an adjust plate 103, which restricts the position of the alignment pins 102 in the forward/backward direction and which serves as a guide member with which the position in the forward/backward direction can be adjusted relative to the mechanical chassis 60, to the mechanical chassis 60. It has a function of minimizing a gap between a guide groove 117 approximately shaped like mutually diverging slopes for instance of the adjust plate 103 and the guide part 118 of the alignment pins 102 immediately before the alignment pins 102 engage with the positioning holes 3 of the cartridge 1, and holding the alignment pins 102 without rattling in the forward/backward direction. The guide groove 117 is approximately shaped like mutually diverging slopes for example, and to be more specific, has a shape with the both inclined surfaces tapered over multiple stages as shown in FIGS. 52(*a*) and 52(*b*). In FIG. 52(*a*), the guide part 118 is located below the guide groove 117 and there is a large gap between the guide part 118 and the guide groove 117, whereas in FIG. 52(*b*), the guide part 118 is located above the guide groove 117, the gap between the guide part 118 and the guide groove 117 is small, and the guide part 118 is positioned by the guide groove 117.

Next, the job during which the side arms 143 press the cartridge 1, namely, the job 128 shown in FIG. 25 will now be described with reference to FIGS. 19 through 24.

Figure 19:
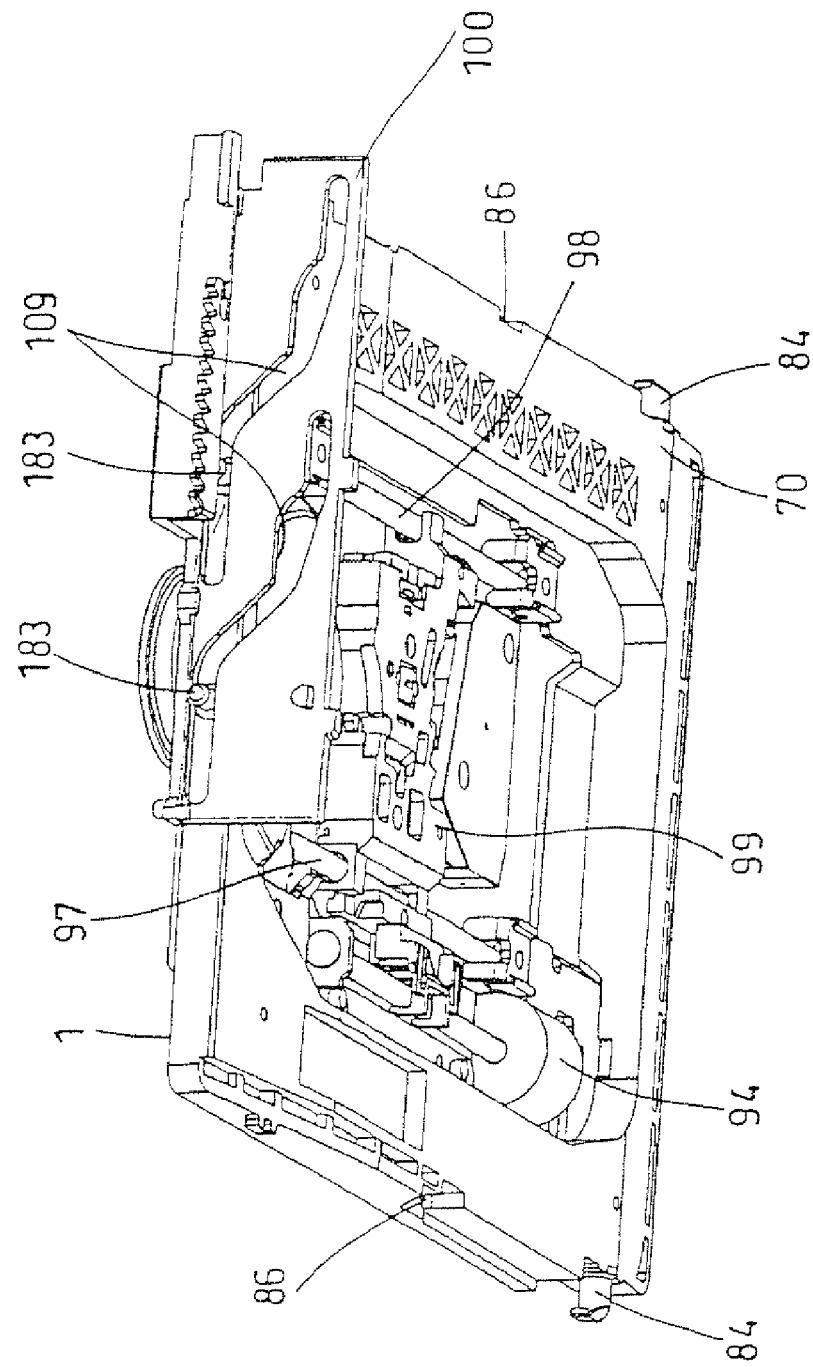
FIG. 19 is a perspective view of a traverse holder as it is viewed from below.
Figure 20:
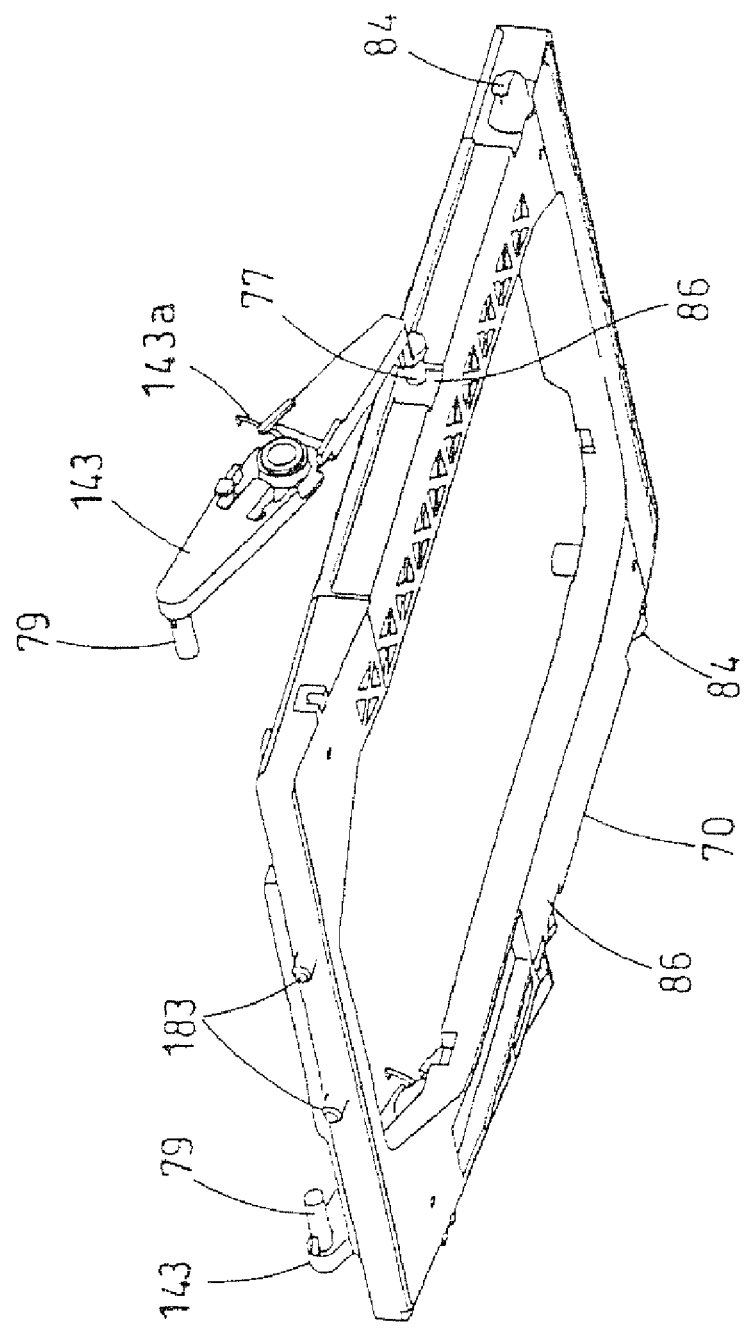
FIG. 20 is a perspective view which shows structures of a traverse holder and a side arm.
Figure 21:
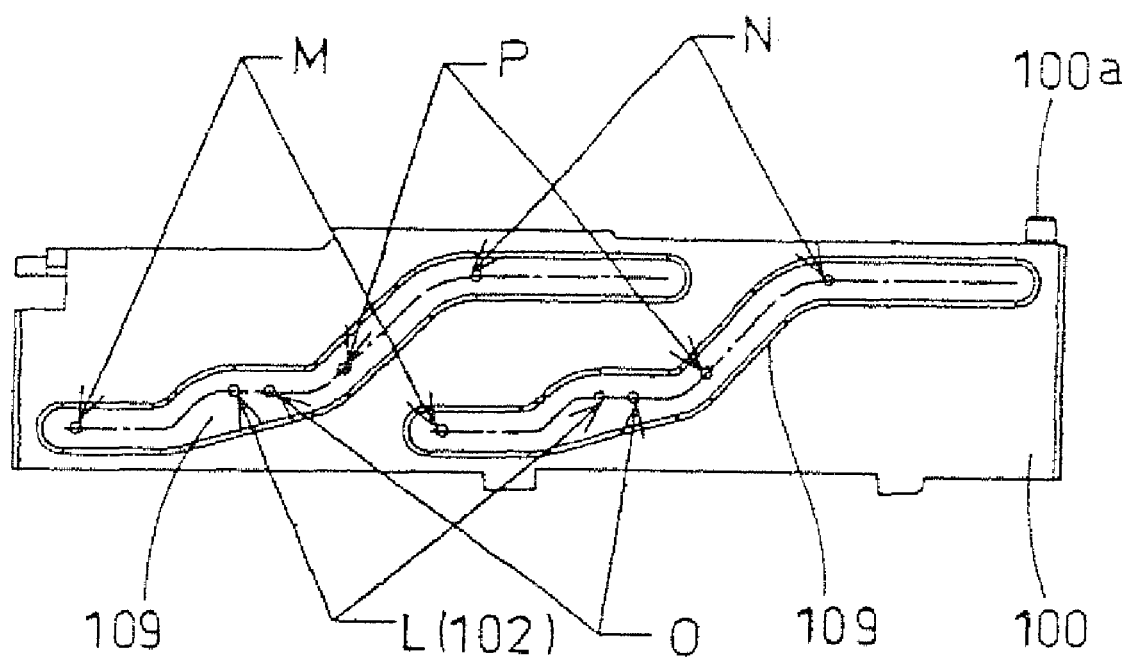
FIG. 21 is an explanatory view for describing the shape of a cam groove of a slide cam plate and the position of a cam follower.
Figure 22:
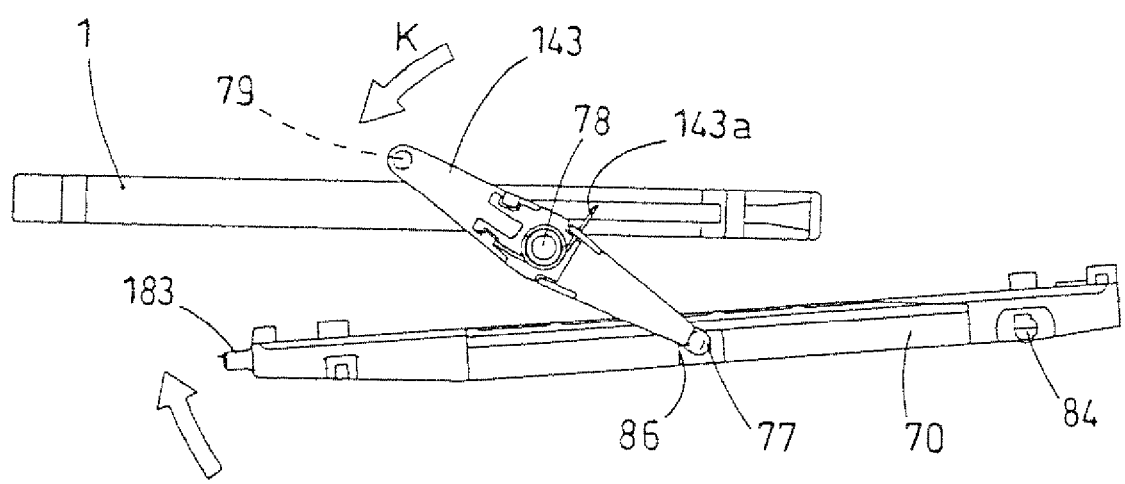
FIG. 22 is an explanatory view which shows a side arm as it is yet to contact a cartridge and as it is viewed from the side.
Figure 23:
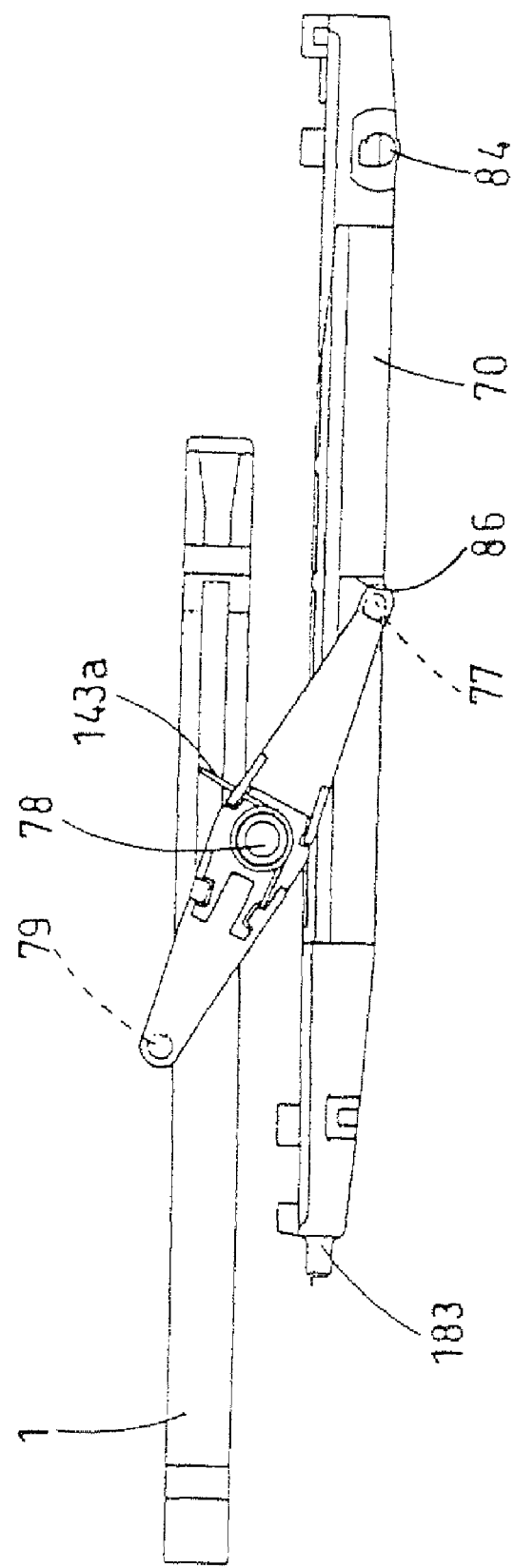
FIG. 23 is an explanatory view which shows a side arm as it is in contact with a cartridge.
Figure 24:
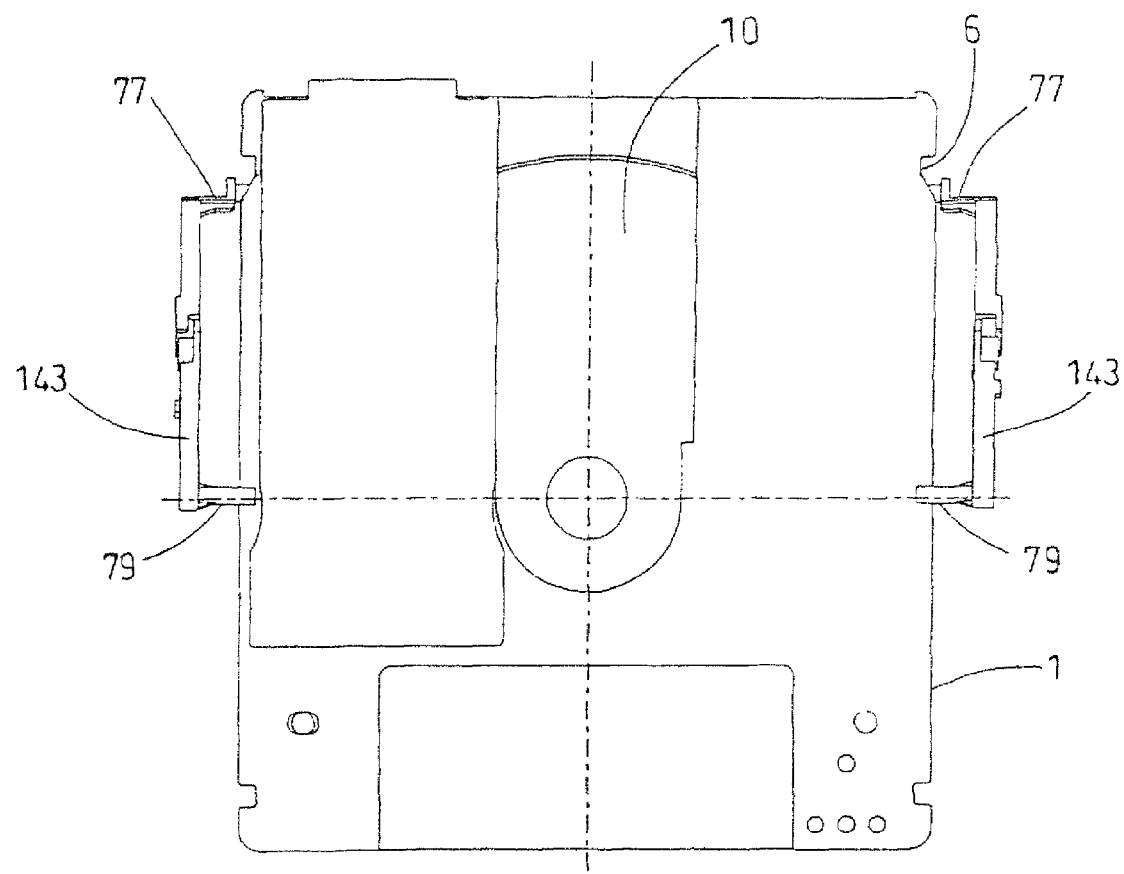
FIG. 24 is an explanatory view of a position at which a side arm clamps a cartridge, as viewed in plan.

FIG. 19 is a drawing for describing a relationship between the traverse holder 70 and the slide cam 100, and FIG. 20 is a drawing which shows structures of the traverse holder 70 and a side arm 71 which is a cartridge urging member. FIG. 21 shows the shape of the cam groove of the slide cam 100 which governs operations of an alignment pin 107 and the side arm 7. FIGS. 22 and 23 are drawings which show the respective states of the side arm 71. FIG. 24 is a drawing which shows a position at which the side arm 71 clamps the tray 20.

The side arm 71, which restricts movements and vibrations of the loaded cartridge 1 on the tray 20, and a side arm spring 72, which urges the side arm 71 against the cartridge, are disposed on the left-hand side and the right-hand side side surfaces of the mechanical chassis 60. The side arm 71 has a function of urging the cartridge 1 against the tray 20 and the tray 20 against the mechanical chassis 60, eliminating rattling between the cartridge 1, the tray 20 and the mechanical chassis 60, and reducing vibrations and noises which are created as the disk 10 rotates.

As shown in FIG. 19, paired pins, namely, cam followers 183, which are located on the opposite side to the alignment piece 102A and protrude at one edge of the traverse holder 70, engage for free sliding with the two cam grooves 109 which are formed approximately in the shape of the letter Z in the slide cam 100 and are parallel to each other. Paired revolution supporting shafts 84' protrude perpendicular to the cam followers 183 on the both sides at the other end of the traverse holder 82 and on a surface parallel to the disk surface, and the traverse holder 70 is in engagement on the bearing 67 of the mechanical chassis 60 about the revolution supporting shafts 84' for free revolutions. Hence, as the slide cam 100 slides in a direction vertical to the travel direction of the tray 20, the traverse holder 70 revolves about the revolution supporting shafts 84' in accordance with the shape of the cam grooves 109 of the slide cam 100. This slide cam 100 thus constitutes raising/lowering means which raises and lowers the traverse holder 70.

Further, as shown in FIG. 1, the traverse holder 82 is flexibly supported by the rubber dampers 71 for instance, which constitute the damper members, and the fixing screws 85, on the four corners of the traverse holder 70. Flexible supporting by means of the rubber dampers 71 realizes an effect of reducing an influence over recording in and reproduction from the disk 10 upon application of vibrations or impact from outside upon the main unit 140 of the optical disk record/reproduce drive.

Attached to the traverse holder 82 are the spindle motor 90 which holds rotates the disk 10, the main shaft 97, the sub guide shaft 98, the optical pickup 99 which is held for free sliding in the longitudinal direction of the guide shafts 97 and 98 and reads out information from the disk or writes information in the disk, and the traverse motor 94 which moves, using the reed screw, the optical pickup 99 in the radius direction of the disk along the guide shafts 97 and 98. Hence, as the traverse holder 70 rises owing to the function of the slide cam 100, the traverse base 80 moves closer to the disk 10 which is housed in the cartridge 1.

As shown in FIG. 20, there are paired notches 86 in a symmetrical arrangement, one on the left-hand side and the other on the right-hand side, formed in the both side surfaces of the traverse holder 70, and power points 77 of the paired side arms 143, penetrating the mechanical chassis 60, are in contact with edges of the notches 86. The paired side arms 143 are arranged in the both side surfaces of the mechanical chassis 60, with the middle parts axially supported by the revolution shaft 78 which is disposed to the both side surfaces of the mechanical chassis 60 as shown in FIG. 1, so that the side arms 143 can freely revolve about the revolution shaft 78. Further, the side arms 143 are located in a symmetrical arrangement, one on the left-hand side and the other on the right-hand side, with respect to the center line of the cartridge 1 which has been loaded into the mechanical chassis 60 as shown in FIG. 24. Torsion springs 143*a* are attached to the side arms 143 and the mechanical chassis 60, and the urging direction of the torsion springs 143*a* is always in a direction of moving the points of application 79 of the side arms 143, that is, the direction K. Hence, as the traverse holder 70 ascends, the points of application 79 of the side arms 143 descend.

With reference to FIG. 21, a description will now be given on the timing of operations performed by the respective portions, based on the shape of the cam grooves 109 which are formed approximately in the shape of the letter Z in the slide cam 100, the alignment pieces 102, and engagement of the traverse holder 70.

The starting point for the projections 108 of the alignment piece 102A is L-points on the cam grooves 109, and the starting point for the cam followers 183 of the traverse holder 70 is M-points on the cam grooves 109.

First, the projections 108 of the alignment piece 102A rise in the cam grooves 109 of the slide cam 100 before the traverse holder 70 does. When the alignment piece 102A reaches the top position and insertion of the alignment pins 102 into the positioning holes 3 of the cartridge 1 completes. That is, when arriving at N-points on the cam grooves 109, the cam followers 183 of the traverse holder 70 are at O-points, and at this stage, the side arms 143 are yet to urge the cartridge 1. In other words, this is the state shown in FIG. 22. As the loading gear system 66 of the loading motor 61 further moves the slide cam 100, while the alignment pins 102 only move on flat portions of the cam grooves 109 but does not change in the direction of the height of the alignment pins 102, the traverse holder 70 keeps rising, and as soon as the traverse holder 70 arrives at P-points, the points of application 79 of the side arms 143 abut on the cartridge 1 as shown in FIG. 23. After this, the side arms 143 are held only at the points of application 79 and the revolution shaft 78, the power points 77 float from the notches 86 and lose the contact with the traverse holder 70. In short, after the cartridge 1 is positioned and fixed by means of the alignment pins 102, the side arms 143 are at the timing for fixing the upper portion of the alignment pins 102. Hence, it is possible to insert the alignment pins 102 into the positioning holes 3 of the cartridge 1.

Further, as shown in FIG. 24, positions at which the points of application 79 of the left and right side arms 143 press the cartridge 1 are a portion close to the central portion of the disk in the depth direction of the cartridge 1 and the central portion of the disk.

At last, when the cam followers 183 of the traverse holder 70 arrive at the N-points on the slide cam 100, the disk 10 gets placed on the turn table 91 of the spindle motor 90 which is fixed to the traverse holder 82, at the same time with which the disk 10 floats inside the cartridge 1, the clamper 74 which used to be in the standby state clamps the disk 10 and the loading completes. Following this, the spindle motor 90 rotates the disk 10, and recording or reproduction is started.

Although the traverse holder 82 and the traverse holder 70 are separate units in this embodiment, an alternative structure may be used in which the traverse holder 70 is omitted, the slide cam 100 directly drives the traverse holder 82, and the traverse holder 82 drives the side arms 143.

This is the sequence of loading of the cartridge 1.

When the sequence described above is used, the cartridge 1 is not urged during loading of the cartridge 1, and therefore, the tray 20 can smoothly move. The reduction in load realizes effects that the loading motor 61 does not need a high torque, the drive requires only low electric power consumption and the lives of the driving members such as gears are longer.

Operations of the optical disk record/reproduce drive having such a structure above will now be described in relation to an example of reproduction from the cartridge 1. As insertion force is applied on the cartridge 1 with the cartridge 1 placed on the tray 20, the insertion force is transmitted to the tray 20 through the stopper which is disposed to the tray 20, and manual loading of the tray 20 into the disk record/reproduce drive 140 starts.

During the manual loading of the tray 20, the eject end switch (not shown) of the tray detects a signal indicative of passing of the tray 20, a drive voltage is applied to the loading motor 61, and as the drive gear 66 which follows rotations of the loading motor 61 rotates, automatic loading of the tray 20 starts.

At this stage, being under no excessive load, the tray 20 smoothly moves.

Immediately before the tray 20 reaches a position at which insertion completes, when the projection 100a of the slide cam 100, which engages with the load cam 249 which is disposed to the bottom surface of the tray 20, moves passed the slanted portion 249a of the load cam 249 disposed to the bottom surface of the tray owing to the drive force of the tray 20, horizontal-direction drive force develops in the slide cam 100 and the slide earn 100 moves toward the right-hand side.

The rack gear 101 engages with the middle gear 65 while the slide cam 100 moves toward the right-hand side, the middle gear 65 starts driving the slide cam 100. At about the same time, the drive gear 66 deviates from the rack 40 of the tray 20 and the driving of the tray 20 by the drive gear 66 stops. After this, the projection 112 of the slide earn 100 drives and loads the tray 20.

As the projection 100a of the slide cam 100 moves to the extension portion 249b of the load cam 249, the tray 20 finishes moving.

The projections 108 of the alignment pins 102 and the cam followers 183 of the traverse holder 82 engage with the cam grooves 109 of the slide cam 100, and rise along the cam grooves 109 of the slide cam 100.

As shown in the timing chart in FIG. 21, since the same cam grooves 109 of the slide cam 100 are used, a predetermined time difference occurs between vertical driving of the alignment pins 102 and vertical driving of the traverse base 80. The time difference is dependent upon a positional relationship of vertical groove portions which are formed in the mechanical chassis 60. As the middle gear 65 starts driving the slide cam 100, rising of the alignment pins 102 starts first.

The alignment pins 102 rise along the guide groove 117 of the adjust plate 103 which restricts movements of the alignment pins 102 in the forward/backward direction relative to the main unit 140 of the optical disk record/reproduce drive. Each one of the guide parts 118 of the alignment pins 102 and the guide groove 117 of the adjust plate 103 has a tapering shape which tapers over multiple stages, and since a predetermined gap is provided before insertion of the alignment pins 102 into the positioning holes 3 of the cartridge 1 for the purpose of reducing the load during rising and a guiding gap between the guide groove and the alignment pins 102 is minimized immediately before the alignment pins 102 engage with the positioning holes 3, ratting of the alignment pins 102 in the forward/backward direction is kept minimum.

While the alignment pins 102 are provided with rising force because of the cam profile of the same cam grooves 109 of the slide cam 100, the same cam grooves 109 are disposed in the vicinity of the center in the width direction of the disk record/reproduce drive 140 so as to drive the slide cam 100 in the right/left direction, and since the positioning holes 3 of the cartridge 1 and the alignment pins 102 are close to an edge of the disk record/reproduce drive 140, during driving of the alignment pins 102, because of a frictional resistance between the alignment pins 102 and the adjust plate 103 and an insertion load over the positioning holes 3 attributed by the misregistration of the cartridge 1, there is a possibility that bending stress will develop in the alignment pins 102 and the alignment pins 102 will not rise to the normal height.

To solve such a problem in advance, the assist arms 104 assist the force of raising the alignment pins 102 as second driving means in addition to the drive force of the alignment pins 102 over the cam grooves 109 of the slide cam 100, and therefore, the insertion of the alignment pins 102 into the positioning holes 3 is reinforced, whereby reliable positioning of the cartridge 1 is ensured.

As the slide cam 100 in the right/left direction, an assist arm pressurizing surface, which abuts on the cam portions on the top surfaces of the assist arms 104 and is disposed to the slide cam 100, revolves the assists arm 104 in accordance with the loading, and the assist arms 104 abut on the lower portions of the alignment pins 102, which assists the force of raising the alignment pins 102. Further, in order to prevent creep deformation of the alignment pins 102 which are formed by a resin and hence always under a load, the assisting drive force upon the assist arms 104 is stopped immediately before the rising of the alignment pins 102 completes and the assist arms 104 get detached from the alignment pins 102.

The state detecting levers 106 are attached for free revolutions to the mechanical chassis 60, and always urged by the torsion springs 111 against the bottom surfaces of the assist arms 104. As the slide cam 100 in the right/left direction, the state detecting levers 106 vertically moves about the revolution shaft under restriction by the assist arms 104. The height of the state detecting levers 106 during ascending and descending of the state detecting levers 106 is restricted by the assist arms 104. Immediately before the assist arms 104 completely ascend, the state detecting levers 106 abut on the cartridge 1. When there is not the cartridge 1, portions close to front edges of the detecting levers 106a and 106b abut on paired stoppers which are disposed to the mechanical chassis 60 and shaped like hooks, and are positioned at predetermined height.

The traverse holder 82 is attached for free revolutions to the mechanical chassis 60 and the cam followers 183 which are two pairs of projections in the front are engagement with the slide cam 100, and after rising of the alignment pins 102, the traverse holder 82 rise along the cam grooves 109 of the slide cam 100. Immediately after the traverse holder 82 has completed ascending, the detecting switches 105 detect the end of the loading, and the loading is finished.

The rubber dampers 71, which restricts a misregistration and vibrations of the cartridge 1 loaded into the mechanical chassis 60, is in engagement for free revolutions with the revolution supporting shafts 84' which are on the left-hand side and the right-hand side of the mechanical chassis 60, and the power points 77 of the side anus 71 are urged against the lower portion of the traverse holder 82. The points of application 79 of the side arms 71 are above the tray 20. In synchronization to the rising of the traverse holder 82, the side arms 71 revolve about the revolution supporting shafts 84' in the direction of descending of the points of application 79. The points of application 79 touch the cartridge 1 immediately before the traverse holder 82 has completed ascending, and as the traverse holder 82 further ascends, the power points 77 go off from the traverse holder 82, the cartridge 1 is urged by the force of the side arm spring 72 of the side arms 71 against the tray 20, and positioning of the cartridge in the forward/backward direction and the right/left direction accordingly completes.

Next, a description will now be given on a state in which a naked disk not housed in the cartridge 1 is loaded into the optical disk record/reproduce drive 140 having the above-mentioned mechanism.

The respective portions except for the side arms 143 operate exactly in the same manner as in loading of the cartridge 1, and therefore, will not be described in redundancy.

As described earlier already, the points of application 79 of the side arms 143 descend in accordance with revolutions in the direction of ascending of the traverse holder 70. However, the points of application 79 remain above the top surface of the disk, and the power points 77, being already in contact with the notches 86 of the traverse holder, will not descend from the current positions, and hence, maintain their current postures while maintaining a sufficient clearance with the points of application 79 of the side arms 143. Therefore, even when a naked disk is loaded, the points of application 79 of the side arms 143 will not interfere with the disk.

There are notches formed on the both sides of the upper base 83 for the points of application 79 of the side arms 143 to pass, and with respect to a relationship with the upper base 83 when the points of application 79 of the side arms 143 move to the bottom positions, as the points of application 79 of the side arms 143 descending most largely are positioned below the bottom surface of the upper base 83, there will not any interference between the side arms 143 and the upper base 83. This allows to attach the upper base 83 to the mechanical chassis 60 without detaching the side arms 143 and accordingly increase the freedom regarding a method of attaching the upper base 83, and hence, shorten an assembly time, a time required for replacement of parts, etc.

Fifth Preferred Embodiment

Figure 26:
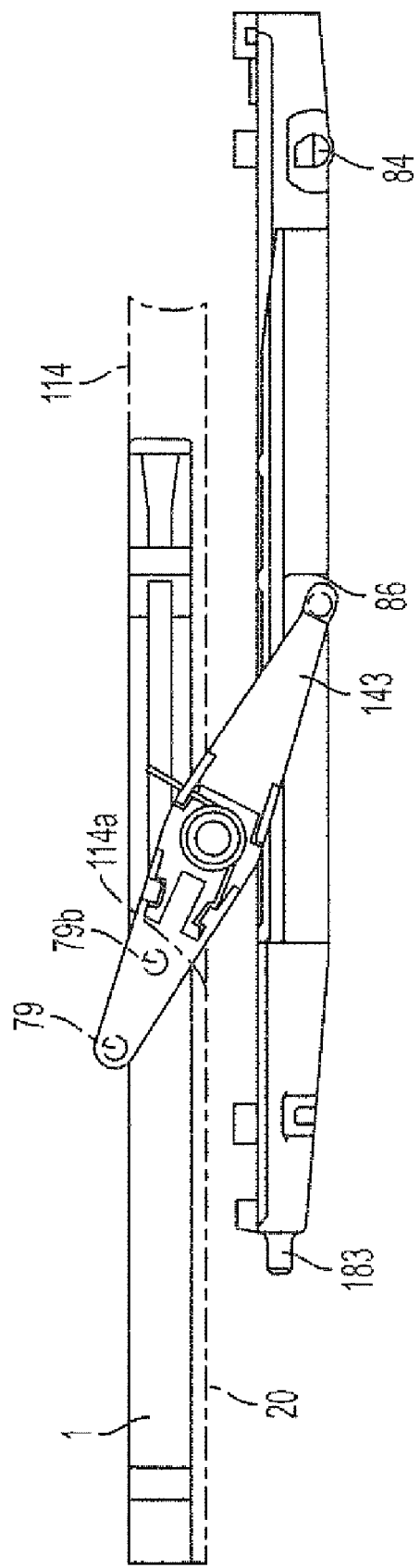
FIG. 26 is an explanatory view which shows a side arm as it clamps a tray according to a fifth preferred embodiment, as viewed from the side.

FIG. 26 shows a fifth preferred embodiment of the present invention. There are second points of application 79b in addition to the points of application 79 described above of the side arms 143, thereby realizing a structure that during loading of a naked disk 11 by means of the second points of application 79b, actions of the side arms 143 press tapering parts 114a on the front edge side of the side walls 25 and 26 which are formed on the innermost both sides of the tray 20. Hence, it is possible to suppress vibrations of the tray 20 which are attributed to a mass eccentricity of the disk 11.

In the event that the first points of application 79 of the side arms 143 fix the cartridge 1, the positional relationship is set so that the second points of application 79b are in a floating state from the tapering parts 114a without pressing the tray 20.

An alternative is to realize engagement with the tray 20 by forming the second points of application 79b at extended positions toward the front edge side than the first points of application 79 of the side arms 143 and slightly extending the side walls 25 and 26 toward the front side, or by inclining the tapering parts 114a on the front edge of the side walls 25 and 26 less steep and thereby forming steps in the middle of the inclination, and to form notches in the side walls 25 and 26 such that the second points of application 79b will not hit the tray 20 when the second points of application 79b press the tray 20. In this case as well, when the first points of application 79 of the side arms 143 fix the cartridge 1, the second points of application 79b do not press the tray 20 and there is a clearance between the second points of application 79b and the cartridge 1. Thus, the tray 20 is fixed to the side arms 71 through the cartridge 1, and the second points of application 79b fix the tray 20 in the case of a naked disk.

Although the second points of application 79b fix the front edge inclined surfaces of the side walls 25 and 26 of the tray 20 and can press in the sliding direction of the cartridge 1 and a direction perpendicular to the sliding direction in FIG. 26, the flat portions may be disposed immediately below the points of application 79 of the side arms 71 of the tray 20 and the first points of application and the second points of application may be accordingly the same points of application.

Sixth Preferred Embodiment

FIGS. 1 through 4 and 27 through 29 show a structure of a drive door lock mechanism of the optical disk record/reproduce drive according to a sixth preferred embodiment of the present invention. In FIG. 1, denoted at 140 is the main unit of the optical disk record/reproduce drive which comprises the opening 60a, which is formed by the mechanical chassis 60 and the upper base 83. Denoted at 20 is the tray which seats a cartridge and a naked optical disk, while denoted at 243 is a door which opens and closes the opening 60a.

There are two concave portions 22 and 23, one large and the other small, formed in a concentric arrangement at the center of a cartridge seating surface 21 of the tray 20. The concave portion 22 having a large diameter is a large diameter disk seater while the concave portion 23 having a small diameter is a small diameter disk seater, and either one is used in accordance with the outer diameter of a disk which is to be mounted to the main unit 140 of the optical disk record/reproduce drive.

The left wall surface 25 and the right wall surface 26, which are slightly larger than the outer size of the cartridge 1 and are vertical to the cartridge seating surface 21, are formed on the left-hand side and the right-hand side of the tray 20 and serve as guides which are used to place the cartridge 1 on the tray 20.

Openings 30 are formed in a part of the left wall surface 25 and the right wall surface 26 of the tray 20 (FIGS. 3 and 4), and there are cartridge holders 27 disposed which engage with the engagement receiving parts 6 which are formed in a concave shape in the left-hand and the right-hand innermost edge surfaces of the cartridge 1.

There are holes 27*a*, which are for the pins 28 disposed to the cartridge seating surface 21 to pass through, are formed at the center of the cartridge holders 27 and the cartridge holders 27 are held for free revolutions about the pins 28. One edges of the cartridge holders 27 comprise convex portions 27*b* which engage with the engagement receiving parts 6 of the cartridge 1, while the other edges of the cartridge holders 27 are urged by the coil springs 49 for instance with the tray 20 in the direction of holding the engagement receiving parts 6 of the cartridge 1.

The opener 29 which opens and closes the shutter 2 of the cartridge 1 is disposed on the innermost side of the tray 20, such that the opener 29 can freely move in the right/left direction. Loading is realized through an opening action toward the left-hand side with the opener 29 hooked at a projection disposed to the front edge of the shutter 2. To this end, the cam groove (not shown) for opening the opener 29 is formed in the back surface of the upper base 83, so as to open the shutter 2 in accordance with the loading of the tray 20 for example.

As the shutter 2 is opened, the disk (not shown) housed in the cartridge 1 becomes ready for rotations by the spindle motor 90 which will be described later and ready for recording and reproduction by means of the optical pickup 99.

The loading motor 61 and the reduction loading gear system 66 are disposed to the front of the mechanical chassis 60, the rack 40 which engages with the drive gear 66 is disposed to one side portion of the back surface of the tray 20 (FIG. 4). As the rotating direction of the loading motor 61 is switched, the tray 20 is loaded and ejected. In a similar manner, the metallic shaft 41 is held at the front edge and the rear edge of the tray 20 parallel to and in the vicinity of the rack 40 of the back surface of the tray, and further held by the mechanical chassis 60 through the shaft holder 42. The edge on the other side of the tray 20 is supported for free sliding at the step 63 which is on the inner side of the mechanical chassis 60. Thus, the tray 20 is supported by the main unit 140 in such a manner that the tray 20 can be loaded and ejected.

As shown in FIG. 1, the rubber dampers 71 on the four corners of the traverse holder 70 flexibly support the traverse holder 82 which holds the spindle motor 90, which rotates the disk while holding the disk, the optical pickup 99, which reads out information from the disk 10 or writes information in the disk 10, the traverse motor 94, which moves the optical pickup 99 in the radius direction of the disk along the guide shafts 97 and 98, and the reed screw 95. Denoted at 85 are screws fixing the rubber dampers. Flexible supporting by means of the rubber dampers 71 realizes an effect of reducing an influence over recording in and reproduction from the disk upon application of vibrations or impact from outside upon the main unit 140 of the optical disk record/reproduce drive.

On the rear side of the traverse holder 70, the shafts 84' are axially supported for free revolutions by the bearing 67 of the mechanical chassis 60, the projections 183 on the front side of the traverse holder 70 engage with slanted cam slits of the slide cam 100, and as the slide cam 100 moves in the right/left direction, the traverse holder 82 is driven vertically.

The clamper 84 disposed to the upper base 83 fixes the disk to the turn table 91, during mounting of the disk to the spindle motor 90. The clamper 84 comprises members which can be split into two, one above and the other below, and houses the magnet inside. In addition, for the purpose of centering of the disk with respect to the turn table 91, the magnetic element is buried in an apex portion of a center cone which is formed at the center. Owing to magnetic suction force of the magnet housed inside the clamper 84 and the magnetic element, the clamper 84 fixes the disk to the turn table 91.

On the front side of the traverse holder 70, the partition wall 178 which separates the loading motor 61 from the traverse holder 70 is disposed to the mechanical chassis 60, the slide cam 100 is disposed to the partition wall 178 for free movements in the right/left direction.

The rack gear 101 is disposed to on the front side of the slide cam 100 and driven in the right/left direction by the middle gear of the reduction loading gear system 66. Further, the projection 10*a* of the slide cam 100 is in engagement with the load cam 249, which is parallel to the travel direction and shaped as a groove for instance, on the back surface of the tray 20. The slanted portion 249*a* formed on the front edge side of the load cam 249 is inclined at about 45 degrees, and the extension portion 249*b* which extends vertically to the travel direction. When the projection 100*a* moves on the extension portion 249*b*, the rack gear 101 engages with or leaves the loading gear system 66. At the same time, the drive gear 66*a*, which is in engagement with the middle gear of the reduction loading gear system 66, and the rack gear 40 get disengaged from each other, and on the contrary, before the rack gear 101 goes off from the middle gear of the reduction loading gear system 66, the drive gear 66*a* meshes with the rack gear 40.

Engagement with the cam slits (not shown) is ensured so that the alignment pins 102, which positions the cartridge 1 at the loading position, is driven vertically together with the traverse holder 82 as the slide cam 100 moves in the right/left direction, and the detecting levers 106 are driven vertically through the assist arms 104.

The door 243 and the lock means will now be described. There are opening holes 68*a* and 68*b* formed on the front side of the right-hand side surface of the mechanical chassis 60 (FIG. 28), and a door lock pin 147 which is a rock member, by means of a returning spring such as a coil spring 148 for example disposed between the door lock pins 147 and the mechanical chassis 60, urges the door lock pin 147 toward the left-hand side which is the lock opening side of the door 243.

The door lock pin 147 form a shape like a box with one open side, and the both edges constitute chassis engagement pins 147*a* and 147*b* for engagement with the mechanical chassis 60. A tray engagement pin 147*c* is disposed in the middle of the chassis engagement pins 147*a* and 147*b* vertically to the chassis engagement pins 147*a* and 147*b*, and the tray engagement pin 147*c* engages with a cam 50 which is formed by linear grooves for instance arranged side by side in the rack gear 40 which is disposed to the back surface of the tray 20. An edge 50*a* of the cam 50 is inclined at about 45 degrees, which permits the cam 50 to drive the tray engagement pin 147*c* in the right-hand side direction immediately before the tray 20 has been loaded, and hence allows the chassis engagement pins 147*a* and 147*b* to protrude from the right-hand side wall of the mechanical chassis 60.

The door 243 disposed to the front opening 60*a* of the main unit 140 of the optical disk record/reproduce drive comprises hinges (not shown) at the left-hand side and the right-hand side edges and engages with a supporting shaft which is disposed to the mechanical chassis 60, so that the door 243 is supported by the mechanical chassis 60 in the opening 60*a* about the hinges which serve as the center of rotation in such a manner that the door 243 can freely open and close.

The door 243 is urged by a spring (not shown) toward the side on which the opening 60*a* is blocked, and pushed open by the front edge of the tray 20 in accordance with ejection of the tray 20.

Meanwhile, there are engaging parts 145 and 146, which restrict the amount of opening of the door 243, disposed on the both sides of the door 243, and the right-hand side engaging part 146 also engages with the door lock pin 147. The engaging part 146 engages with the engagement pin 147*a*, which jumps out from the opening hole 68*a* on the right-hand side of the mechanical chassis 60 upon loading of the tray 20, whereby restricting locking of opening of the door 143 from outside the drive.

Denoted at 143 are the side arms whose middle parts are axially supported by the revolution shaft 78 of the mechanical chassis 60 and which press the loaded cartridge 1 by means of the springs 143*a*, base edges of the side arms 143 engage with the traverse holder 70 which moves in the vertical direction, and front edges of the side arms 143 press and fix the cartridge as the traverse holder 70 moves toward above. Denoted at 185 is the circuit board of the control circuit, which comprises a switch which operates in response to the detecting levers for detecting the state in which the cartridge 1 is placed, etc.

Operations of the optical disk record/reproduce drive 140 having such a structure above will now be described in relation to an example of loading of the tray 20.

As the load eject switch 142 of the optical disk record/reproduce drive 140 is pressed, a drive voltage is applied to the loading motor 61, and in accordance with rotations of the middle gear which follows rotations of the loading motor 61, the rack gear 101 is driven, the slide cam 100 moves in the left-hand direction, and the traverse holder 70 engaged with the cam grooves 109 retracts toward below. At this stage, the traverse holder 82, too, which is supported by the traverse holder 70 retracts toward below, in synchronization to this. At the same time, the detecting levers 106, too, retract from the cartridge 1 through the alignment pins 102 and the assist arms 104.

Next, as the projection 100*a* disposed to the top surface of the slide cam 100 drives the groove of the slanted portion 249*a* of the load cam 249 formed in the back surface of the tray, ejection of the tray 20 is started. While the ejection of the tray 20 is driven initially by the projection 100*a* of the slide cam 100, driving of the rack gear 40 disposed to the back surface of the tray 20 by the drive gear 66*a* which follows rotations of the loading motor 61 takes over the drive force from the middle, and the driving continues until the tray 20 reaches the end point of ejection of the main unit 140 of the optical disk record/reproduce drive.

Figure 29:
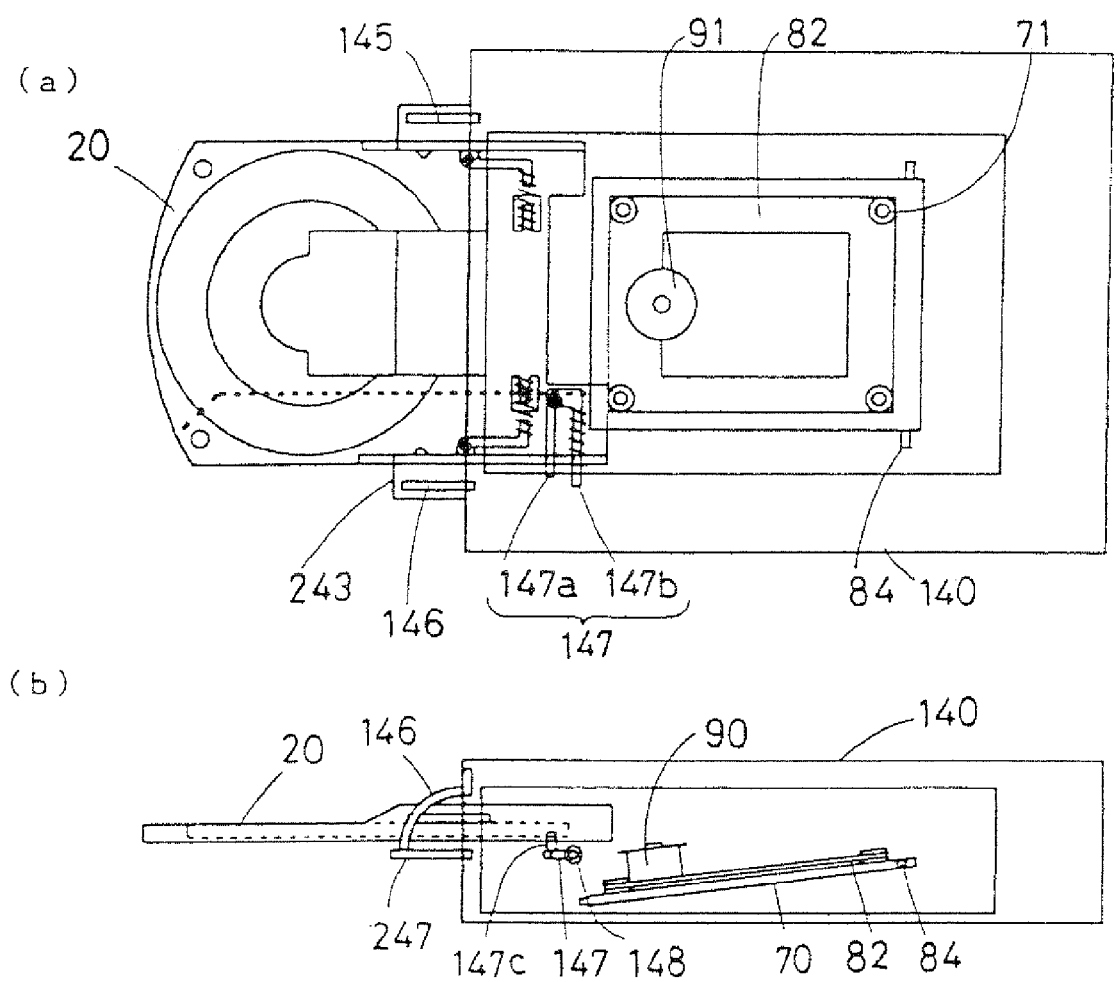
FIG. 29(a) is a schematic horizontal cross sectional view showing an ejection state.
FIG. 29(b) is a schematic vertical cross sectional view of the same.

In accordance with the start of the ejection of the tray 20, first, the door 243 is push-revolved toward below about a hinge against the returning spring 148, and at the same time that the door 243 fully opens, the tray 20 gets ejected from the optical disk record/reproduce drive 140 (FIG. 29).

Next, the naked cartridge 1 is placed on the ejected tray 20, and as the front edge of the tray 20 is pushed in or the load eject switch 142 of the main unit 140 of the optical disk record/reproduce drive is pressed again, a drive voltage is applied to the loading motor 61, the loading motor 61 rotates in the reverse direction, and the drive gear 66 which follows rotations of the loading motor 61 rotates, thereby starting automatic loading of the tray 20.

Figure 28:
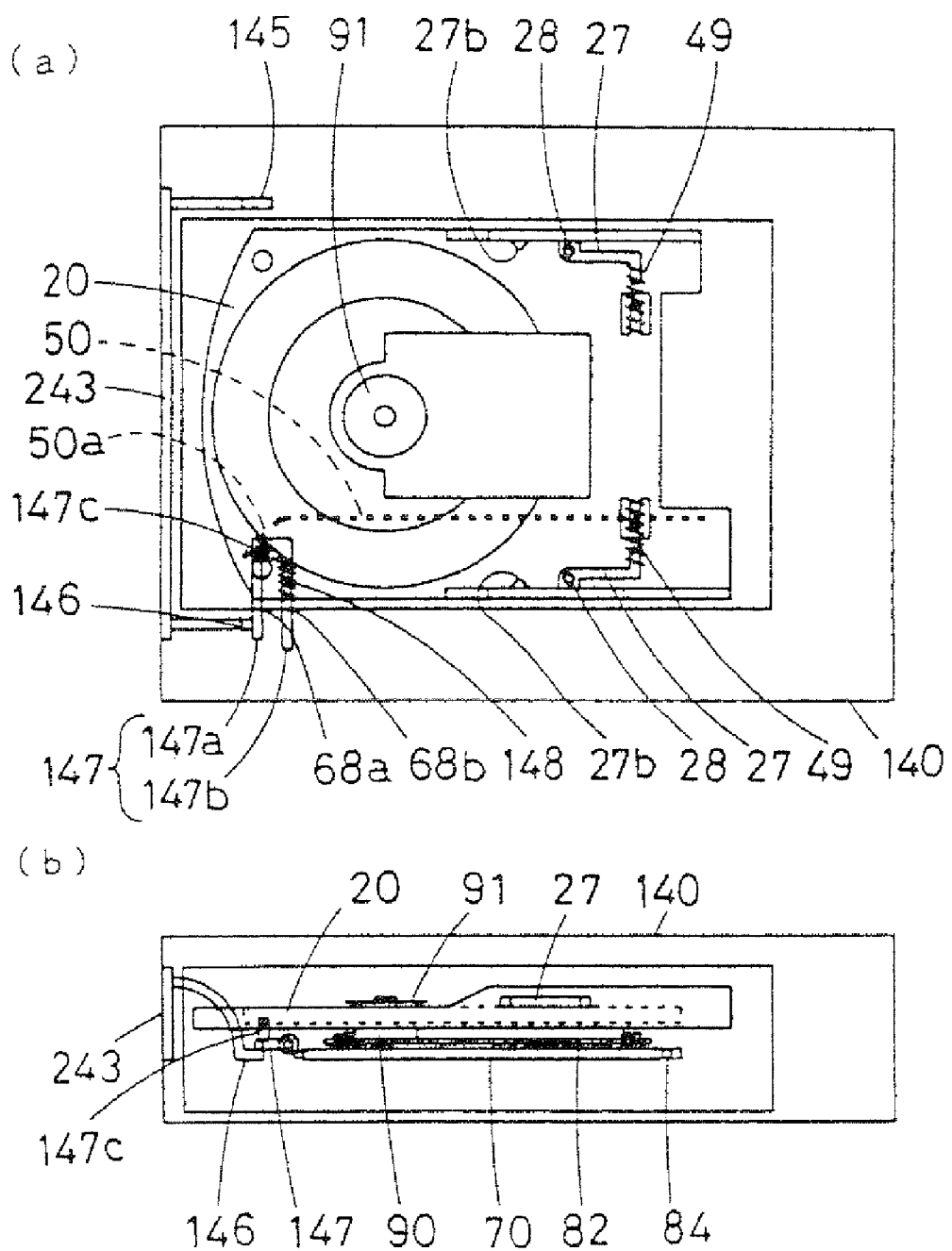
FIG. 28(a) is a schematic horizontal cross sectional view showing a loading state.
FIG. 28(b) is a schematic vertical cross sectional view of the same.

Upon loading of the tray 20 into inside the optical disk record/reproduce drive 140, the returning spring 148 blocks the door 243. At this stage, because of actions of the lock pin driving cam 50 disposed to the back surface of the tray 20, the door lock pin 147 projects from the right-hand side surface of the mechanical chassis 60 and engages with the engaging part 146 of the door 243, which completes locking of the door 243 (FIG. 28).

Seventh Preferred Embodiment

Figure 32:
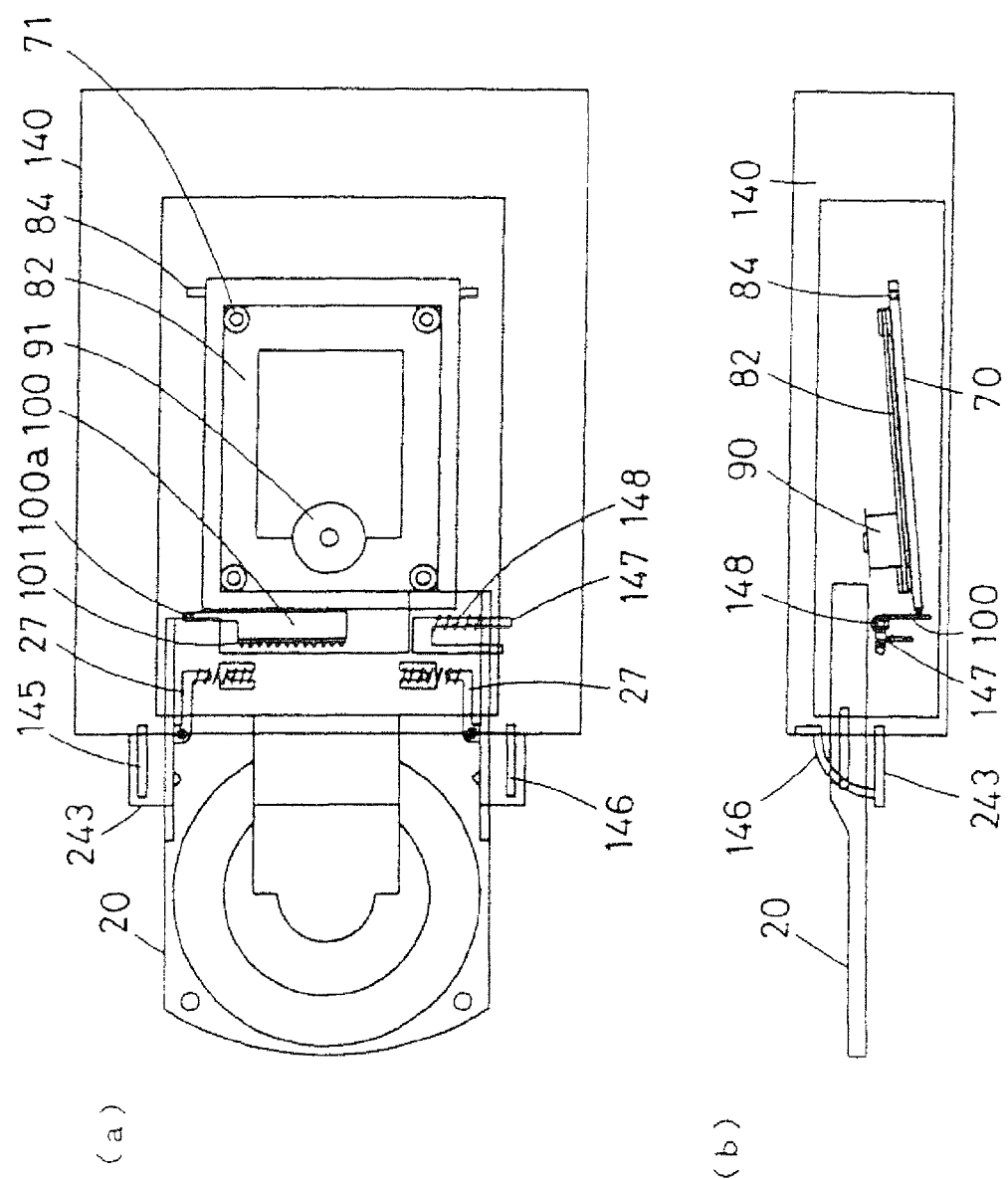
FIG. 32(a) is a schematic horizontal cross sectional view showing an ejection state.
FIG. 32(b) is a schematic vertical cross sectional view of the same.

FIGS. 30 through 32 show a seventh preferred embodiment of the present invention. A difference from the sixth preferred embodiment is to have the slide cam 100 drive the door lock pin 147 which locks the door 243. That is, at the time of the completion of loading of the tray 20, the slide cam 100 starts moving toward the right-hand side to the tray 20 because of the slanted portion 249*a* of the load cam, even after the drive gear 66*a* and the rack 40 get disengaged from each other and the tray 20 is stopped, the slide cam 100, driven by the loading gear system 66, slides along the extension portion 249*b* until pushing the traverse holder 82 and the like toward above. The sliding action pushes out the door lock pin 147 against the spring 148 (FIG. 31 (*a*)). As a result, after the loading of the tray 20 completes and the door 243 is closed, the lock pin 147 engages with the lock pin engaging part 146.

FIG. 32 shows the ejected state of the tray 20, in which the slide cam 100 has moved toward the left-hand side and the returning spring 148 has returned the lock pin 147 to the retracted position.

This eliminates the lock pin driving cam 50 disposed to the back of the tray 20 and the tray engagement pin 147*c* of the lock pin 147 which are used in the first preferred embodiment. The other structures are similar to those used in the first preferred embodiment.

The slide cam 100 may be integrated with the lock pin 147, which makes it possible to further reduce the number of parts.

Eighth Preferred Embodiment

FIGS. 33 through 35 show an eighth preferred embodiment of the present invention. This optical disk record/reproduce drive is of the slot loading method, and instead of the lack of the tray 20, the main unit 140 comprises a guide part (not shown) which guides the cartridge 1 for free movements, a roller such as a rubber roller 197 which automatically loads the cartridge 1, and an urging plate 198.

A door 193 is held to the main unit 140 of the optical disk record/reproduce drive in such a manner that the door 193 can move in the vertical direction, a rack gear 194 extends along the travel direction behind the door 193, and a lock engaging part 199 protrudes toward the innermost side of the main unit 140. A door opening/closing motor (not shown) is disposed in the vicinity of the door 193 of the main unit 140 of the optical disk record/reproduce drive, and drives a drive gear 196 which engages with the rack gear 194.

The rubber roller 197 and the urging plate 198 are disposed to oppose each other on the inner side of the opening 60*a* which is at the front surface of the main unit 140 of the optical disk record/reproduce drive, and the urging plate 198 is disposed for free revolutions so as to move close to and away from the rubber roller 197, and the urging plate is urged against the rubber roller 197 by an urging spring (not shown). The other structures are similar to those used in the first preferred embodiment.

As the load eject switch 142 is pressed, the drive gear 196 rotates as driven by the door opening/closing motor, the door 193 moves vertically toward below in parallel to the front surface of the main unit 140, and the opening 60a in the front surface of the main unit 140 of the optical disk record/reproduce drive appears (FIG. 35).

As the cartridge 1 is inserted between the rubber roller 197 and the urging plate 198, the rubber roller 197 is made rotating by frictional force with the cartridge, the control circuit which has sensed rotations of the rubber roller 197 rotates the rubber roller 197, and the cartridge 1 gets loaded automatically into inside the main unit 140 of the optical disk record/reproduce drive while opening the shutter 2 of the cartridge 1.

At this stage, movements of the slide cam 100 moves up the traverse base 82 supported by the traverse holder 82 which used to retract toward below from the path of the cartridge 1, and the disk inside the cartridge 1 is held by the turn table 91 of the spindle motor 90 and the clamper 84.

As the loading of the cartridge 1 completes, the drive gear 196 driven by the door opening/closing motor (not shown) rotates in the reverse direction, the rack gear 194 moves, the door 193 vertically moves toward above, the opening in the front surface of the main unit 140 of the optical disk record/reproduce drive is blocked.

At this stage, the door lock pin 147 is driven as the slide cam 100 moves and engages with the engaging part 199 of the door 193, which prohibits manual opening of the door 193 from outside (FIG. 34).

While the slide cam 100 drives the lock pin 147 and the door 193 is driven by the motor to open and close since no tray is used for the purpose of realizing the slot loading mechanism, it is not necessary to vertically open and close the door 193, and the door may be driven by the door opening/closing motor and revolve-opened and closed.

In addition, while the slide cam 100 is used as a slide member, a separate slide member may be disposed separately from the slide cam 100, and a different motor may be used as the motor separately from the loading motor.

Ninth Preferred Embodiment

FIGS. 1 through 4 and 36 through 44 show a structure of an automatic loading mechanism of the optical disk record/reproduce drive according to a ninth preferred embodiment of the present invention. In other words, FIG. 1 shows the optical disk record/reproduce drive to which the first preferred embodiment of the present invention is applied. In FIG. 1, denoted at 20 is the tray which is a tray for seating a cartridge which houses an optical disk for instance or a naked optical disk (not shown), and denoted at 140 is the main unit of the optical disk record/reproduce drive.

In the main unit 140, denoted at 60 is the chassis with legs which comprises both side walls and is shaped as a box of a synthetic resin, denoted at 70 is the traverse holder whose one edge is supported by the chassis 60 for free vertical movements, denoted at 82 is the traverse base which is held by the traverse holder 70 via the vibration absorbing dampers 71 and comprises a record/reproduce mechanism, denoted at 83 is the top lid which is attached to the traverse holder 70 and covers the traverse base 82, and denoted at 85' is the board of the control circuit which is attached to the bottom side of the chassis 60.

In the chassis 60, the loading motor 61 and the loading gear system 66 which are driving means for the tray 20 are disposed on the inner side of the opening 60a which is for loading and ejection of the tray 20.

The traverse base 82 holds the spindle motor 90, which rotates the disk while holding the disk, the optical pickup 99, which reads out information from the disk 10 or writes information in the disk 10, the traverse motor 94, which moves the optical pickup 99 in the radius direction of the disk, and the reed screw 95 which moves the optical pickup 99.

The top lid 83 supports the middle part of the clamper 84 which clamps the optical disk to the spindle motor 90, and urges by spring force the clamper 84 such that the front edge side of the clamper 84 will move away from the spindle motor 90, and moves the clamper 84 closer to the spindle motor 90 against the spring and fixes the disk to the turn table during mounting of the optical disk to the spindle motor 90.

On the front side of the traverse holder 82, the slide cam 100 which engages with the mechanical chassis 60 is disposed so that the slide cam 100 can move in the right/left direction. The slide cam 100 is guided by the guide cam groove 249 (FIG. 4) formed in the back surface of the tray 20, and reciprocally moves within a certain range in accordance with loading and ejection of the tray 20. There is the rack gear on the front side of the slide cam 100, and the slide cam 100 is driven by the middle gear of the loading gear system 66 in the right/left direction within a predetermined range as it is after the tray 20 has been loaded. As the slide cam 100 moves in the right/left direction at this stage, the traverse holder 82, the alignment pins 102 and the detecting levers 104 are driven in the vertical direction, the state detecting pins 106 move in the vertical direction in accordance with the operations of the detecting levers 104.

FIG. 2 shows the tray 20 and the cartridge holders 27. In the middle of the cartridge seating surface 21 of the tray 20, there are two concave portions one large and the other small, formed in a concentric arrangement. The concave portion having a large diameter is a large diameter disk seater 22 while the concave portion having a small diameter is a small diameter disk seater 23, and either one is used in accordance with the outer diameter of a disk which is to be mounted to the main unit 140 of the optical disk record/reproduce drive.

Further, on the left-hand side and the right-hand side as viewed from the loading/ejection direction of the tray 20, the left wall surface 25 and the right wall surface 26, which are slightly larger than the outer size of the cartridge 1 (FIG. 37) and are vertical to the cartridge seating surface 21, are disposed over approximately half the entire length on the innermost side within a cartridge placing range in the loading/ejection direction of the tray 20, thereby realizing a function as guide members which are used during placing of the cartridge 1 on the tray 20. Meanwhile, openings 30 are formed in a part of the left wall surface 25 and the right wall surface 26, and at left-hand side and right-hand side positions to an axial line along the direction of loading or ejection passing through the center of gravity of the cartridge 1, e.g., on the left-hand and the right-hand innermost sides in the loading direction, there are the cartridge holders 27, which are holding members of cartridge holding means engaged with the engagement receiving parts 6 (FIG. 42), disposed on the inner side to the left wall surface 25 and the right wall surface 26.

On the front side of the tray 20 and the front side of the both side walls 25 and 26, there is no wall surface which is disposed perpendicular to the cartridge seating surface. Hence, there is no obstacle against placing of the cartridge 1 on the tray 20. Further, since the front edge of the tray 20 is shaped as a curved convex surface and the cartridge 1 is a flat rectangle, the both sides of the rear edge of the cartridge placed on the tray 20 project beyond the tray 20.

FIG. 2(b) shows the cartridge holders 27, which sink into and engage with the concaved engagement receiving parts 6 which are located on the left-hand side and the right-hand side to the axial line along the direction of loading or ejection passing through the center of gravity of the cartridge 1. The cartridge holders 27 are of a synthetic resin which is shaped as long thin members, and the middle parts of the cartridge holders 27 are bent approximately in the shape of the letter Z. There are axial holes 27a formed in the middle parts in a direction perpendicular to the step bending direction. The axial holes 27a engage with the pins 28 which are disposed outside the cartridge placing range and on the inner side of the cartridge seating surface 21 relative to the left wall surface 25 and the right wall surface 26, and the cartridge holders 27 are held for free revolutions about the pins 28. Further, the cartridge holders 27 comprise, at front edges of the downwardly stepped parts, convex-shaped engaging parts 27b which engage with the engagement receiving parts 6 of the cartridge 1 and are shaped approximately as triangles which extend within the cartridge placing range. At front edges of the opposite upwardly stepped parts, spring receiving projections 27c are disposed in the same direction as the engaging parts 27b. The projections 37 (FIG. 36) are disposed on the tray 20 side to face these, and the coil springs 49 are interposed so as to engage with these at the both edges, whereby the engaging parts 27b are urged and loaded in the direction in which the engagement receiving parts 6 of the cartridge 1 are held. A stopper 31 of the cartridge holders 25 against the spring force of the coil springs 49 is disposed at a position which is approximately on the opposite side to the spring receiving projections 27c of the tray 20. Further, with the cartridge holders 25 supported by the stopper 31, the downwardly stepped parts on the engaging parts 27b side enter into the openings 30 from the holes 27a of the cartridge holders 27, inner surfaces 27d are approximately flush with the inner surfaces of the wall surfaces 25 and 26, and the engaging parts 27b alone project into the cartridge placing range. This prevents the tray 20 from becoming wide.

In addition, on the innermost side of the tray 20, the opener 29 which opens and closes the shutter 2 of the cartridge 1 is disposed for free movements in the right/left direction. The opener 29 operates in accordance with loading of the tray 20, and permits loading through an opening action toward the left-hand side with a projection of the opener 29 hooked at the projection disposed to the front edge of the shutter 2. For the opener 29 to operate in accordance with loading and ejection of the tray 20, the guide cam groove of the opener 29 is disposed to the main unit 140 or the top lid. Alternatively, there may be such means which makes it possible to drive the opener 29 and open the shutter when the cartridge 1 is mounted on the tray 20. As the shutter 2 is opened, the optical disk housed in the cartridge 1 becomes ready for rotations by the spindle motor 90 and ready for recording and reproduction by means of the optical pickup 99.

FIG. 4 shows the back surface of the tray 20, in which there is the rack gear 40 disposed on one side which engages with the drive gear 66a of the loading gear system 66. As the rotating direction of the loading motor 61 is switched, the tray 20 is loaded and ejected. In a similar manner, the metallic guide shaft 41 is held at the front edge and the rear edge of the tray 20, parallel to and in the vicinity of the rack 40 of the back surface of the tray, and is farther held by the mechanical chassis 60 through the shaft holder 42. The other side of the tray 20 is placed for free sliding on the guide stripe 63 (FIG. 1) which is formed on the inner side of the box-like shaped mechanical chassis 60, and the pressing members 183, which are disposed to the side walls of the mechanical chassis 60 so as to be able to flexibly project while retracting, prevent an action of leaving from the guide stripe 63.

Figure 36:
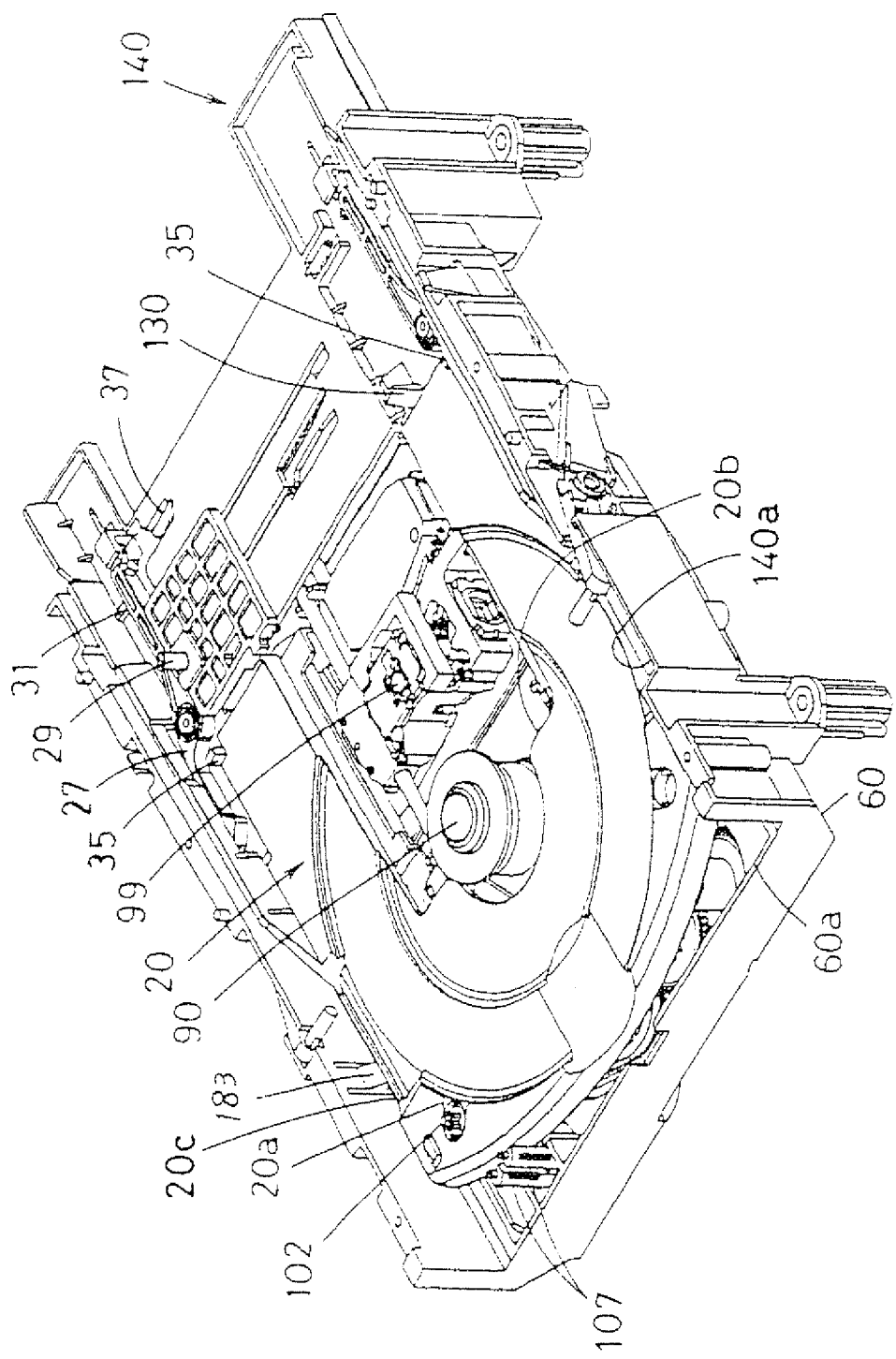
FIG. 36 is a perspective view which shows a state that a tray has been loaded and a top lid of a main unit has been removed in a ninth preferred embodiment.
Figure 41:
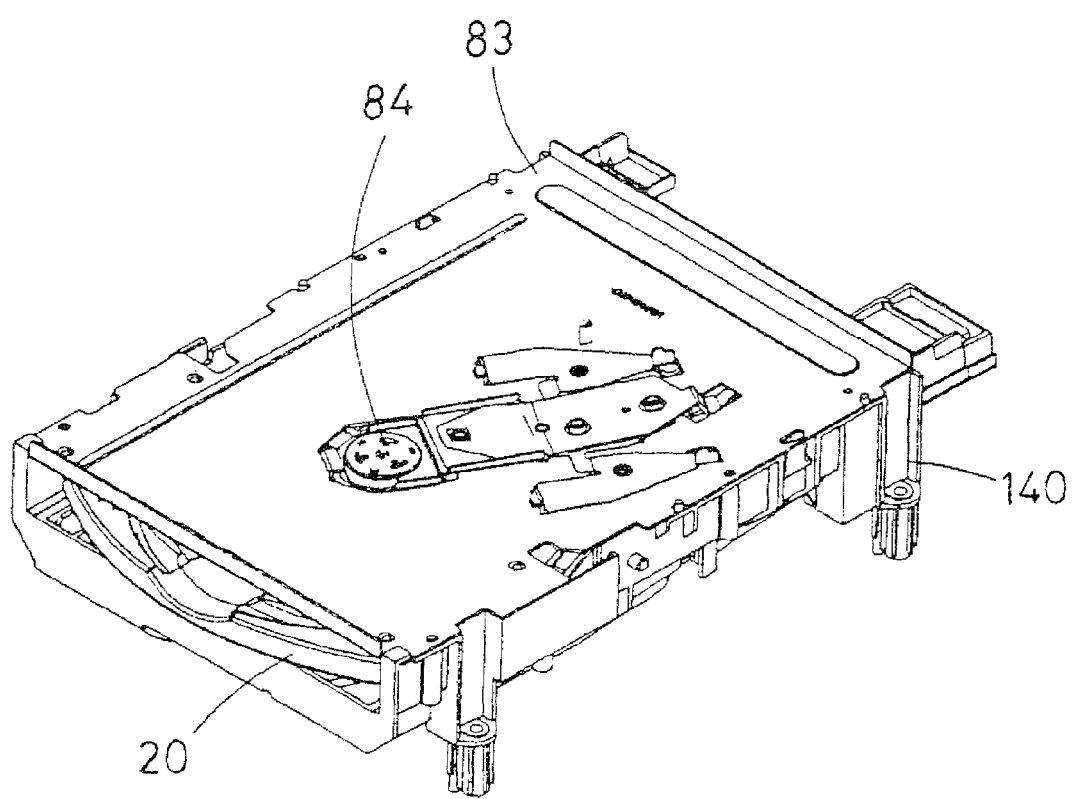
FIG. 41 is a perspective view which shows a state that a tray has been loaded.

FIGS. 36 and 41 show the tray 20 as it has been loaded. Until loading of the tray 20 completes, the spindle motor 90 held on the traverse base 82, the traverse motor 94 and the optical pickup 99 remain retracted to below the loading path of the tray 20 for the purpose of avoiding interference with the tray 20 and the cartridge 1.

With loading of the tray 20 completed, the tray 20 is positioned such that the spindle motor 90 will be located at the center of the optical disk. As the loading gear system 66 drives the slide cam 100 a little before this, the alignment pins 102 protrude through the holes 20a formed in the tray 20 and engage with the positioning holes formed in the cartridge 1. The cartridge 1, which is roughly restricted in the forward/backward direction and the right/left direction to the tray 20, is finally positioned relative to the tray 20 and the spindle motor 90 as a result of this engaging action. Meanwhile, the traverse base 82 ascends, the spindle motor 90 and the optical pickup 99 move close to the optical disk housed in the cartridge 1 which is placed on the tray 20 from a center opening 20b of the tray 20, and at the same time, the pressing levers 143 press the both central sides of the cartridge 1 against the tray 20 because of the force of the springs 143a of the pressing levers 143 as the traverse base 82 ascends, while the clamper pressing part 130 projecting from the tray 20 press the rear edge of the clamper 84 and the front edge of the clamper 84 moves close to the optical disk, whereby the optical disk is clamped to the turn table of the spindle motor 90. The front edge of the tray 20 is positioned on the inner side of the opening 60a of the chassis 60 at the loading position of the tray 20, and at about the same time as the completion of the loading, the state detecting pins 106, which are for detection of the back and the front surfaces of the cartridge 1 and whether it is possible to write, project toward the cartridge on the front edge side of the tray 20 in accordance with the operations of the detecting levers 104, and for this structure, there are a back surface detecting hole and a writing detecting hole (not shown) formed in the cartridge 1.

Figure 37:
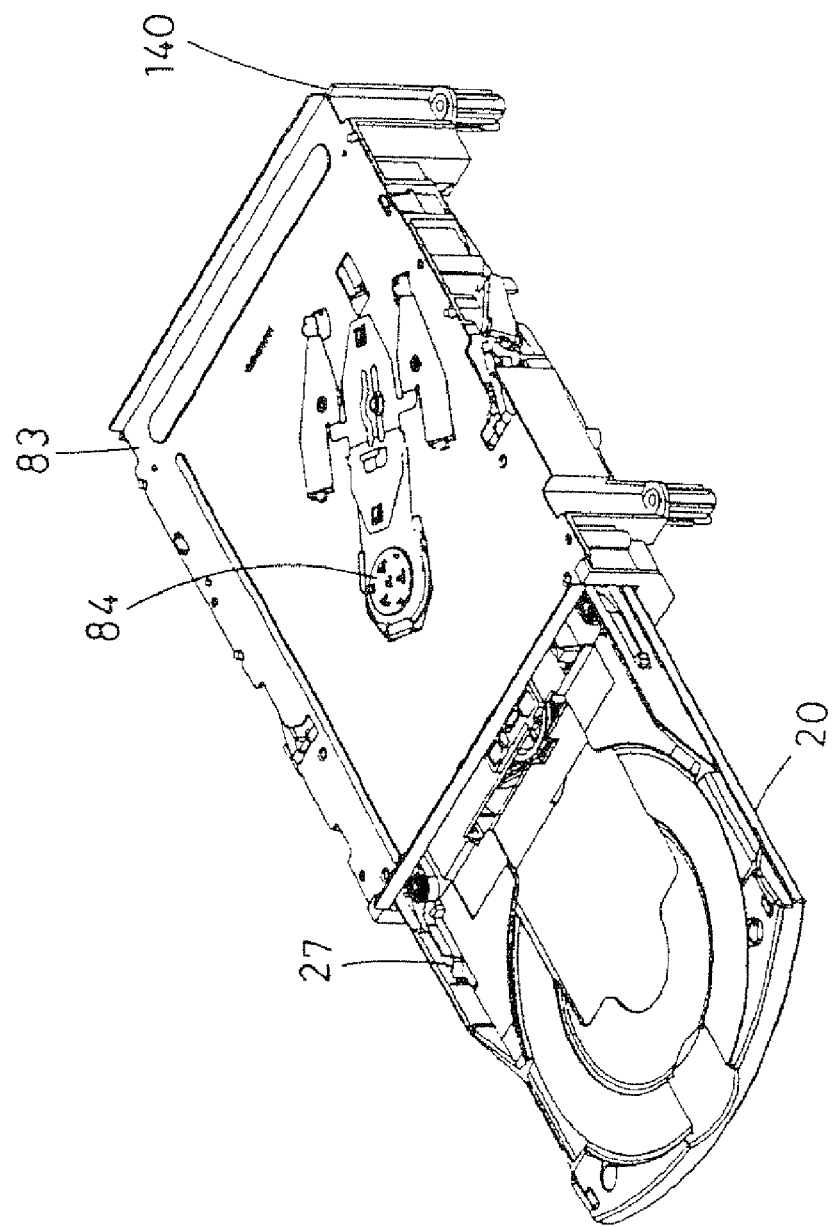
FIG. 37 is a perspective view which shows a state that a tray has been ejected.
Figure 38:
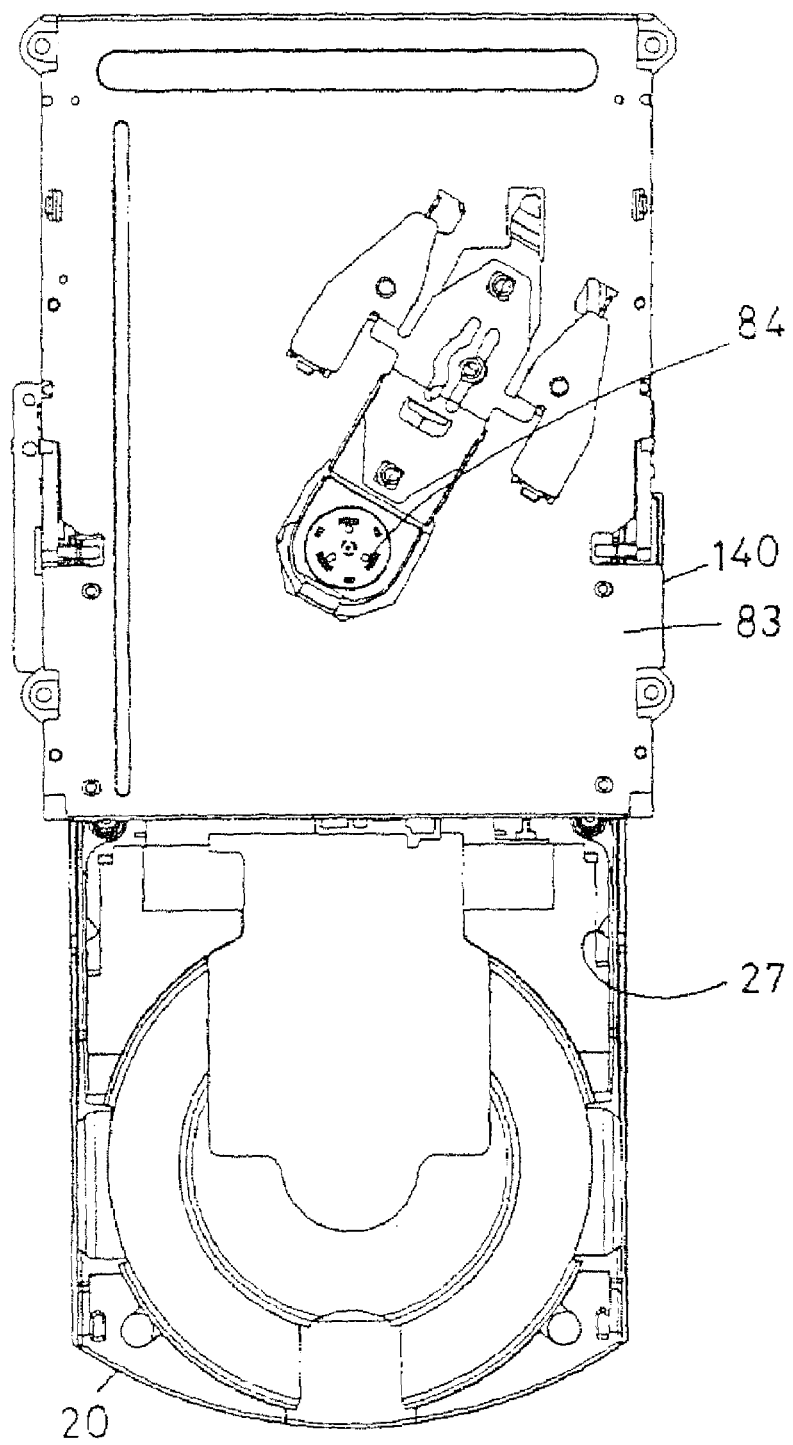
FIG. 38 is a plan of the same.

FIGS. 37 and 38 show the tray 20 as it is ejected, in which as the loading motor 61 is driven in the opposite direction to the direction during loading, the tray 20 is ejected. At this stage, the slide cam 100 engages with the loading gear system 66 operates, the detecting levers 106, the alignment pins 102 and the traverse base 82 descend, the detecting levers 106 push down the state detecting pins 106, and the pressing levers 143 ascend, so that the tray 20 moves and the clamper 84 moves away as the tray 20 starts moving.

Figure 39:
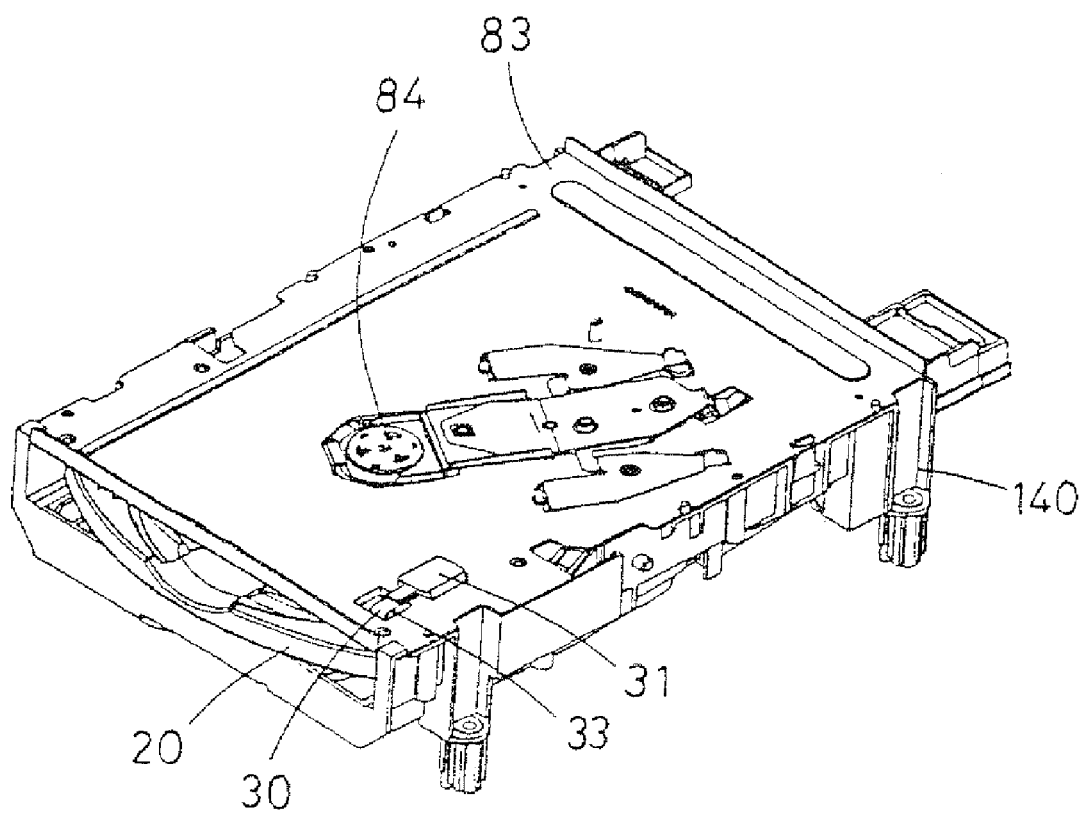
FIG. 39 is a perspective view for describing detecting means which detects placing of a cartridge.
Figure 40:
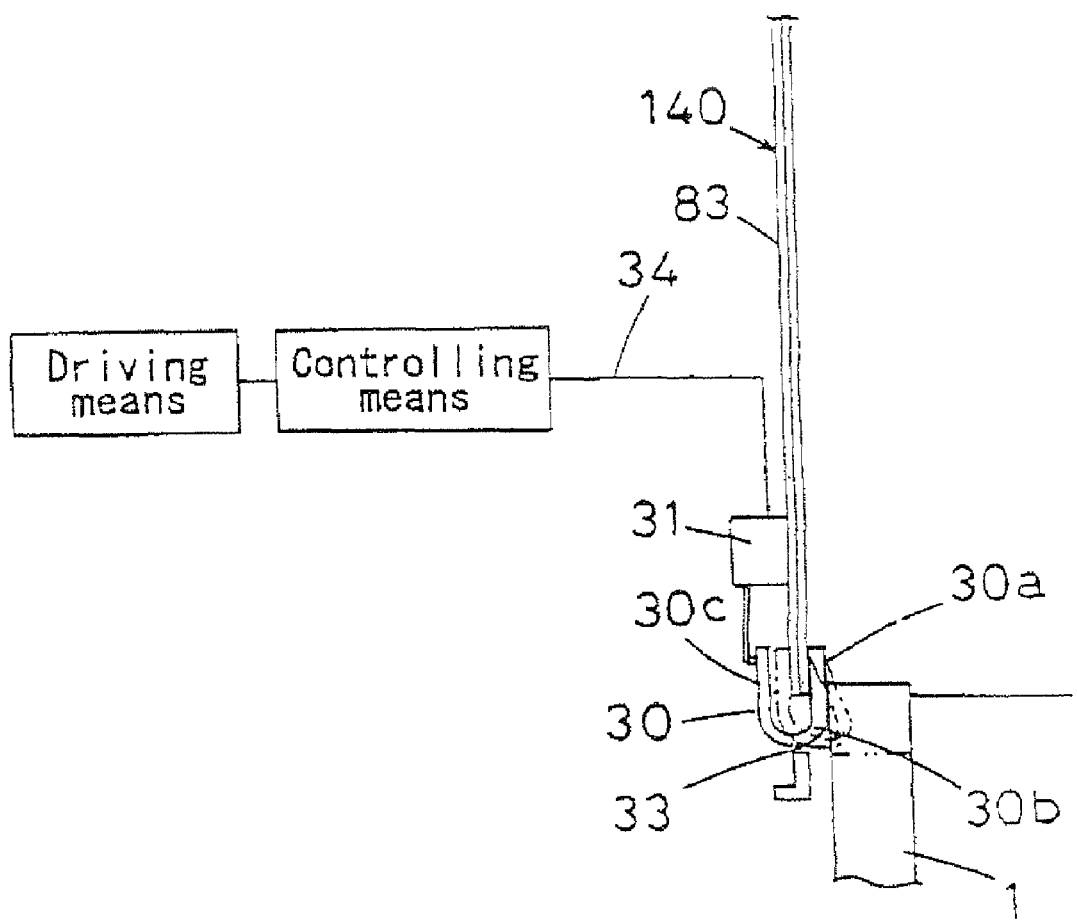
FIG. 40 is a partially expanded view of FIG. 39.

FIGS. 39 and 40 show a detecting member 30 and a detecting switch 31 which serve as mount detecting means. The detecting members 30 are disposed to the lower portion of the top lid 83, and detect that the cartridge 1 is placed at the right position on the tray 20. In this embodiment, the detecting members 30 are formed by a spring member, such as a blade spring, which is approximately formed in the shape of the letter U, one ends 30a are attached to the bottom surface in the vicinity of holes 33 formed on the front edge side of the top lid 83, bend parts 30b pass through the holes 33, the other ends 30c are located on the top surface side of the top lid 83, and the bend parts 30b are located at a position to receive the top surface of the cartridge 1. The detecting switches 31 are disposed to the top lid 83 so that operating parts of the detecting switches 31 overlap the other ends 30c of the detecting members 30 on the top surface of the top lid 83, and sense movements of the other ends 30c attributed to arrangement of the cartridge 1 at the right position based on the state of ejection of the tray 20. When the cartridge 1 is not placed on the tray 20 correctly, the bend parts 30b of the detecting members 30 become as denoted at the imaginary line and move away from the detecting switches 31, and as the cartridge 1 is placed, the switches 31 are manipulated at the other ends 30c. Output lines 34 for the detecting switches 31 are installed in the control circuit for the board disposed to the back surface of the mechanical chassis 60, and the control circuit, when accepted a detection signal from the detecting switches 31, outputs an operation instruction to the loading motor 61 which is driving means.

Operations of the optical disk record/reproduce drive 140 having such a structure above will now be described in relation to an example of reproduction from the optical disk which is housed in the cartridge 1.

Figure 42:
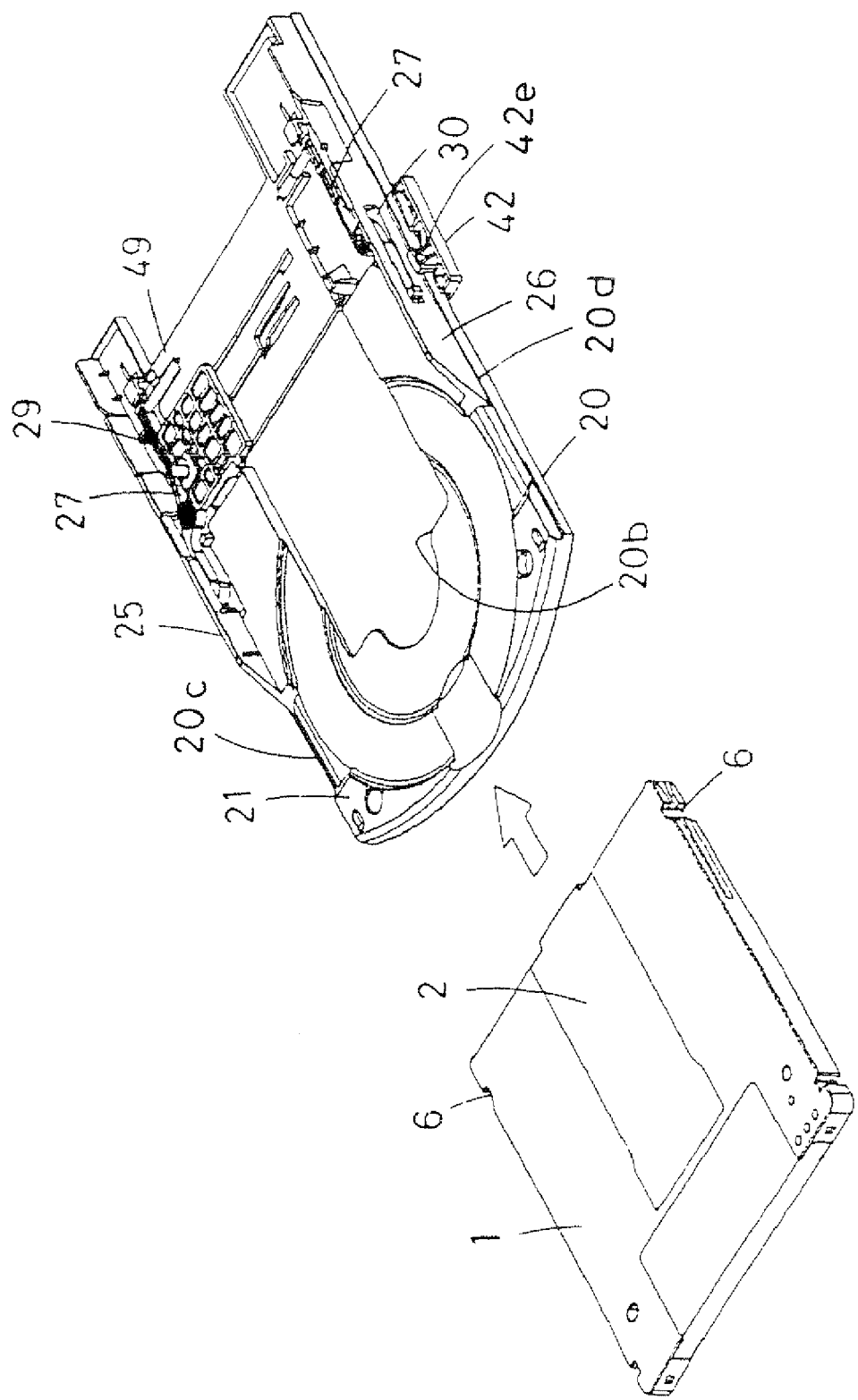
FIG. 42 is a perspective view which shows a state that a cartridge is yet to be placed on a tray.
Figure 43:
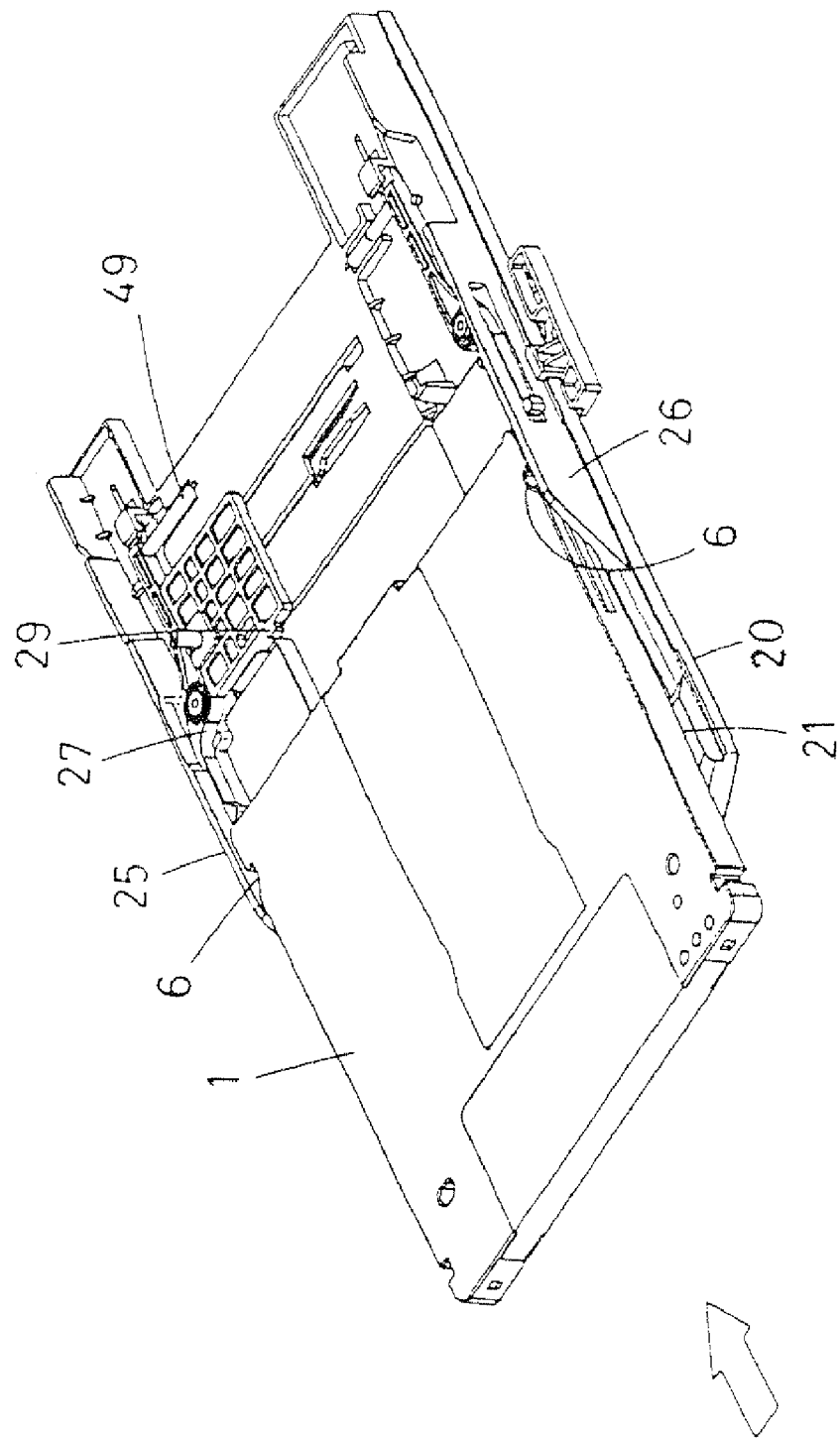
FIG. 43 is a perspective view which shows a state that a cartridge is partially placed on a tray but yet to be held by a cartridge holder.

FIGS. 42 and 43 show placing of the cartridge 1 on the tray 20, in which the cartridge 1 is slid on the cartridge seating surface 21 from the front of the tray 20 in a direction of pushing into the main unit 140 of the optical disk record/reproduce drive.

In the process that the left-hand and the right-hand edge surfaces of the cartridge 1 are pushed to the tray 20 with the left wall surface 25 and the right wall surface 26 serving as guides, since there are slanted surfaces at the front edges of the engaging parts 27b which serve as the projections of the cartridge holders 27, the insertion force of the cartridge 1 makes it possible to easily open to the width between the left wall surface 25 and the right wall surface 26.

Figure 44:
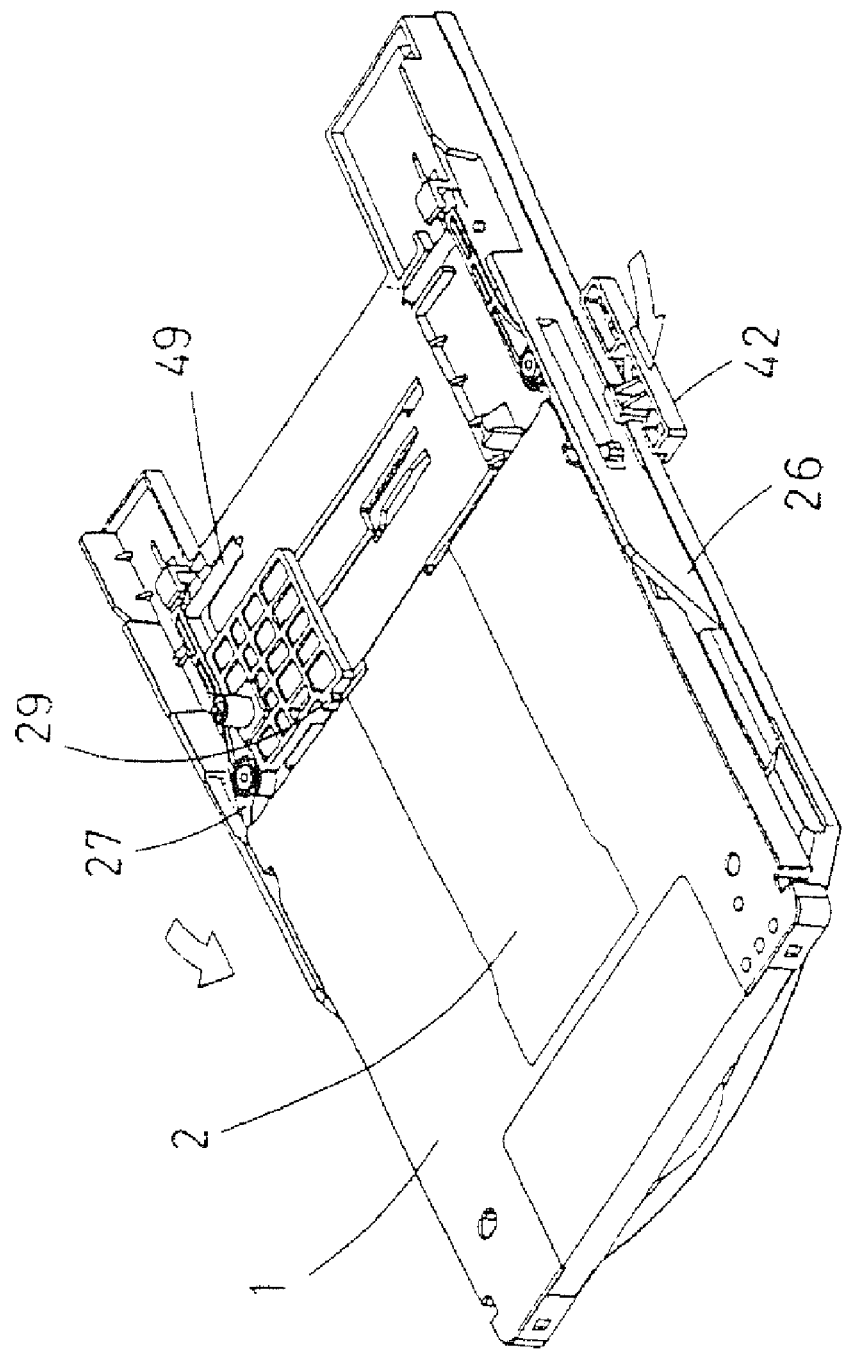
FIG. 44 is a perspective view which shows a state that a cartridge is held by a cartridge holder.

FIG. 44 shows a state that the cartridge 1 is further inserted, and the engaging parts 27b of the cartridge holders 27, owing to the urging force of the coil springs 49, sink into and engage with the concaved engagement receiving parts 6 of the cartridge 1. At this stage, from a change in the insertion force and a sound which is emitted at the time of engagement with the cartridge holders 47, an operator can confirm the completion of the engagement.

On the innermost side of the cartridge seating surface 21, there are stoppers 35 which restricts the cartridge 1 to the insertion limit, which ensures that the engaging positions at which the cartridge 1 engages with the cartridge holders 27 approximately match with the insertion limit provided by the stoppers 35. This completes the placing of the cartridge 1 on the tray 20. At this stage, the cartridge holders 27 restrict movements of the cartridge 1 in the forward/backward direction, while the left-hand side and the right-hand side wall surfaces 25 and 26 restrict movements of the cartridge 1 in the right/left direction.

At the same time, the detecting members 30 are pressed at the insertion edge of the cartridge 1, and the detecting members 30 press the operating parts 31a of the detecting switches 31 and a detection signal is outputted. The detection signal is outputted to the control circuit, which operates the loading motor 61.

In this embodiment, the control circuit may switch such that the driving means will not operate in accordance with the operations of the detecting switches 31 to thereby make it possible to perform the following loading operation.

That is, during manual loading, the insertion force to insert onto the tray 20 is continuously applied to the cartridge 1, the insertion force is transmitted to the tray 20 through the stoppers 35, and manual loading of the tray 20 into the main unit 140 of the optical disk record/reproduce drive is started.

While the tray 20 is being loaded manually, the eject end switch (not shown) of the tray detects a signal indicative of passing of the tray, a drive voltage is applied to the loading motor 61, and as the drive gear 66 which follows rotations of the loading motor 61 rotates, automatic loading of the tray 20 starts.

At this stage, the spring constant and the pre-loading force of the coil springs 49 which urge the cartridge holders 27 are set such that the following relationship holds between the insertion force over the cartridge 1 into the cartridge holders 47 and the manual loading force upon the tray 20, whereby manual loading of the tray 20 is performed after placing of the cartridge 1 on the tray 20 has completed:

Insertion force over the cartridge<Manual loading force

If the force relationship above is opposite, loading of the tray 20 starts before insertion over the cartridge 1 into the cartridge holders 47 completes, and clamping of the disk 10 stored in the cartridge 1 accordingly fails.

On the other hand, during automatic loading, with the loading switch (not shown) of the main unit 140 of the optical disk record/reproduce drive turned on at the time of the completion of placing of the cartridge 1 on the tray 20, a drive voltage is applied to the loading motor 61, and as the drive gear 66 which follows rotations of the loading motor 61 rotates, automatic loading of the tray 20 starts.

In the structure according to this embodiment, after the cartridge 1 is placed on the tray 20, for loading of the tray 20 and the cartridge 1 into the main unit 140 of the optical disk record/reproduce drive, the cartridge 1 is inserted as if to slide the cartridge 1 on the cartridge seating surface 21 and application of the insertion force is continued, whereby the loading operation is completed. In other words, the operation of inserting the cartridge 1 alone serves the purpose, whereas a plurality of operations realize placing of the cartridge 1 and loading of the tray 20 in the conventional disk record/reproduce drive.

Further, since the conventional disk record/reproduce drive is shaped like a box which comprises a front wall surface for the purpose of positioning the cartridge relative to the tray, the operation of placing the disk on the tray while avoiding the front wall surface during placing of the naked optical disk on the tray makes people feel a wrong feeling. However, since a tray whose shape is approximately the same as that of a tray which generally seats only a naked optical disk may be used as the tray 20 which has such a structure according to this embodiment, the operability for placing the naked disk on the tray will not give people a wrong feeling. In addition, since the freedom of design of the tray improves because of the absence of the front wall surface, it is possible to use a high-grade design which targets at a better design effect for instance instead of using a function-oriented design.

Still further, in the structure according to this embodiment, after the cartridge 1 is placed on the tray 20, for loading of the tray 20 and the cartridge 1 into the optical disk record/reproduce drive, the cartridge 1 is inserted as if to slide the cartridge 1 on the cartridge seating surface 21 and only if one moves his or her hand off from the cartridge 1 as it remains inserted, loading is automatically started and the cartridge 1 is mounted inside the optical disk drive. In other words, the operation of placing the cartridge on the tray alone serves the purpose, whereas the conventional disk record/reproduce drive requires three operations, i.e., pushing in of the cartridge 1 on the tray 20, placing at the right position, pushing in of the tray or other switching.

Moreover, it is possible to realize the means which detects placing at the right position after placing of the cartridge 1 and loading of the tray 20, the loading driving means and the like in simple structures instead of making these complex. Such simple structures lead to an improvement in reliability.

Tenth Preferred Embodiment

A tenth preferred embodiment of the present invention will now be described with reference to FIGS. 45 and 46. The cartridge holders 27 serve also as the detecting members 30 which drive the detecting switches 31 which functions as state detecting means of detecting the completion of placing of the cartridge 1 at the right position in the first preferred embodiment, and the detecting members 30 are omitted. In this embodiment, switch pressing parts 27e protrude at the edges which are on the opposite side to the engaging parts 27b of the cartridge holders 27 in the opposite direction to the spring receiving projections 27c, the operating parts 31a of the detecting switches 31 fixed to the chassis 60 is faced with the switch pressing parts 27e.

Figure 45:
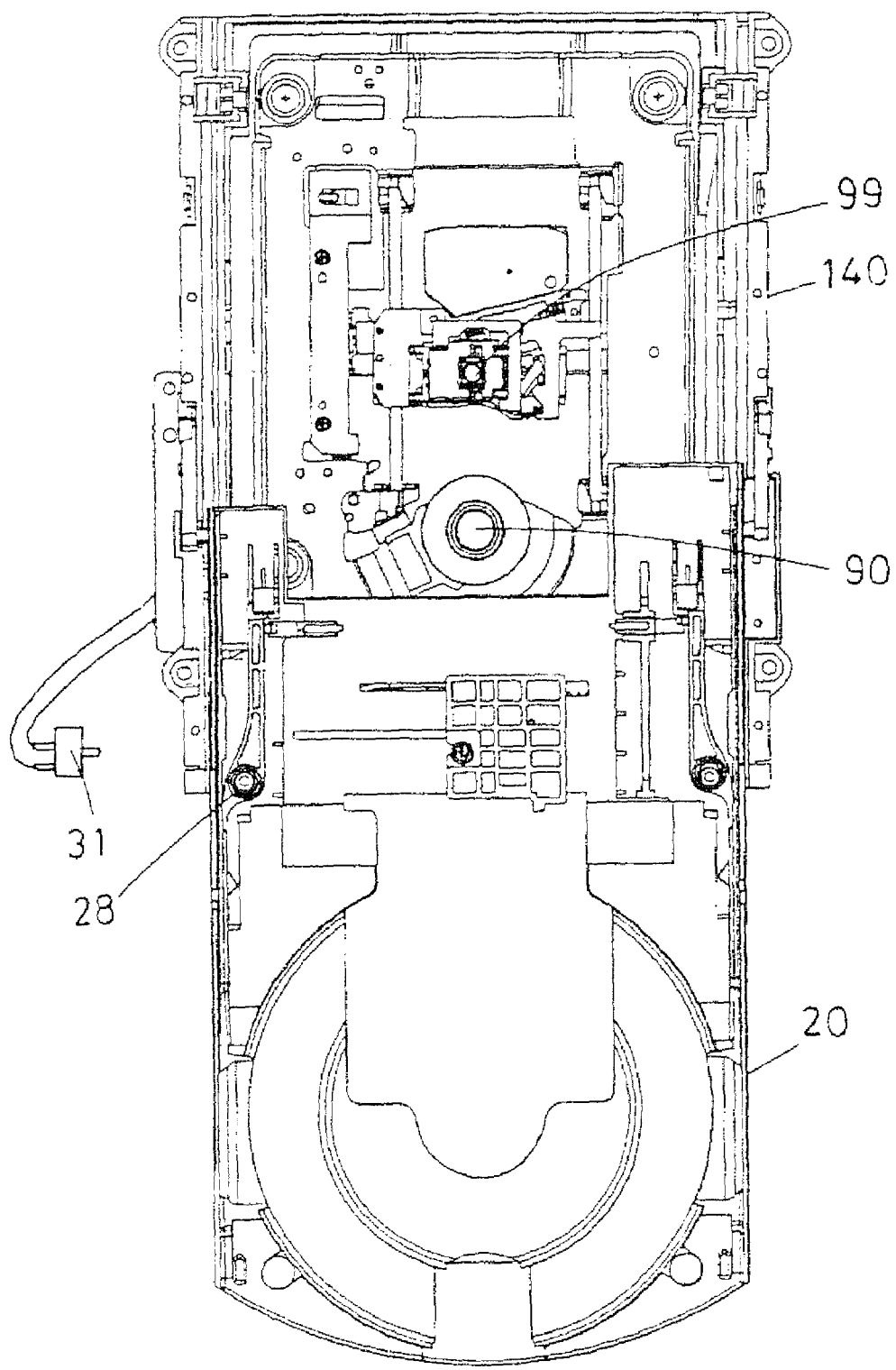
FIG. 45 is a plan view which shows a state that a tray has been ejected in a tenth preferred embodiment.
Figure 46:
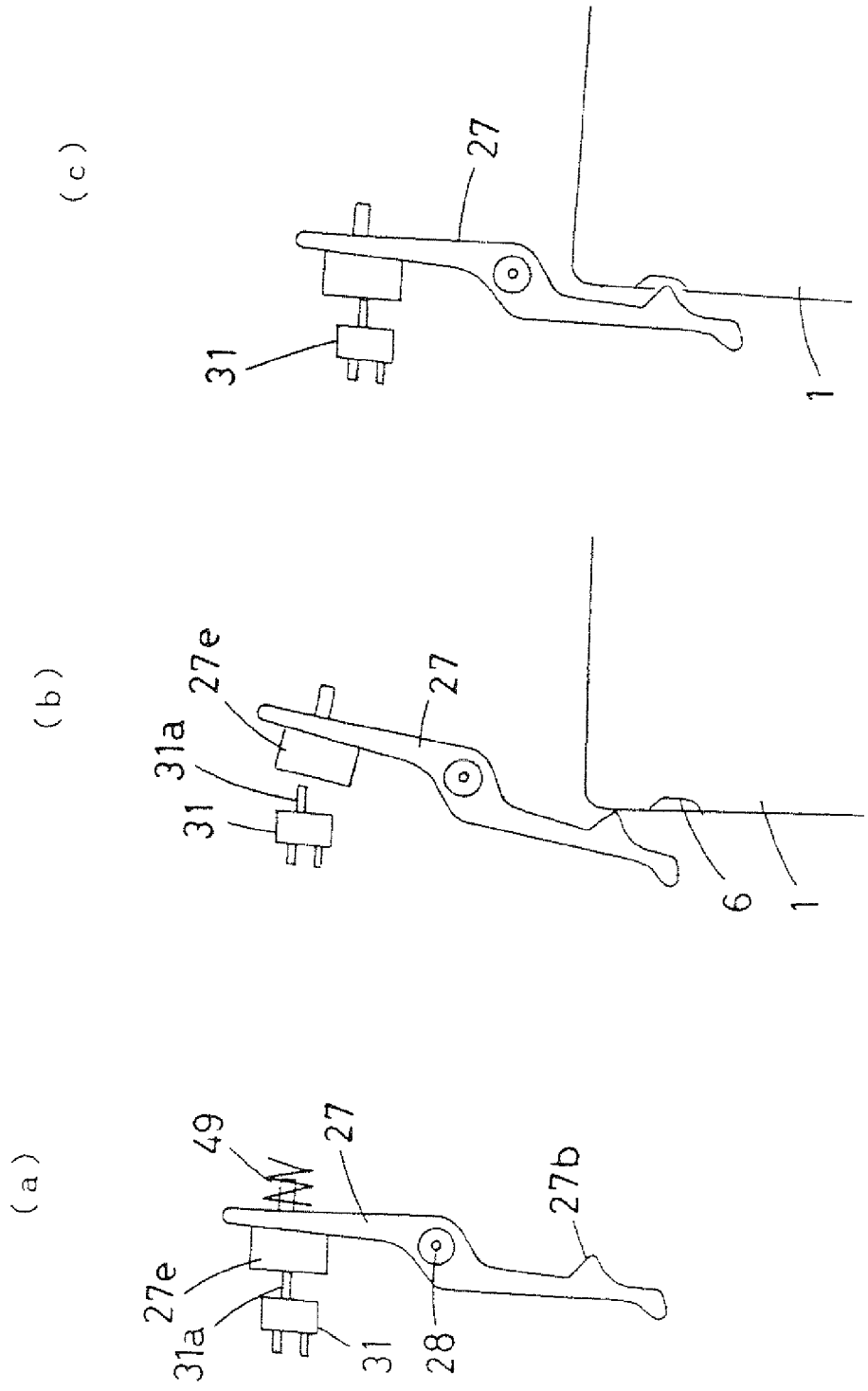
FIG. 46 is an explanatory view for describing operations of a cartridge holder and a detecting switch.

FIG. 45 shows the detecting switch 31 as it is before attached.

FIG. 46(a) shows the same state as that in FIG. 13 in which the cartridge 1 is not mounted to the tray 20 which is in the ejected state. At this stage, the springs 49 press the operating parts 31a of the detecting switches 31 in the switch pressing parts 27e. FIG. 46(b) shows a state that the cartridge 1 is being mounted to the tray 20, with the front edge on the both sides of the cartridge pressing the engaging parts 27b and hence the switch pressing parts 27e away from the detecting switches 31. FIG. 46(c) shows the engaging parts 27b as sink in and engage with the concaved engagement receiving parts 6 of the cartridge 1, with the switch pressing parts 27c of the cartridge holders 27 pressing the operating parts 31a of the detecting switches 31 again. Hence, the detecting switches 31 output to the controlling means a signal which corresponds to the series of operations that the detecting switches 31 are pressed at the operating parts 31a, left not pressed, pressed again, the controlling means senses mounting of the cartridge 1 in the right manner and outputs a drive signal to the loading motor 61 which serves the driving means, so that loading of the tray 20 is started and the switch pressing parts 27e move away from the operating parts 31a of the detecting switches 31.

In the structure according to this embodiment, since the members holding the cartridge 1 also detect placing of the cartridge 1 and loading of the tray 20 at the right position, it is not necessary to separately dispose driving means for the detecting switch, the number of parts does not have to be increased, and costs of the optical disk record/reproduce drive is reduced.

An eleventh preferred embodiment of the present invention will now be described with reference to the associated drawings. While it is possible to the disk loading drive according to the present invention as it is horizontally and vertically installed and as it is vertically installed with the opening positioned at the top, this embodiment will be described in relation to a state that the disk loading drive is installed horizontally.

According to the present invention, a reproducible disk, such as a music CD and a DVD-ROM, and a recording disk, such as a DVD-RAM, whose diameter is 8 cm, 12 cm and the like are handled. These disks as a whole are simply called naked disks. It is the form of a medium that a loading mechanism considers, and a recording/reproduction method, a recording density and the like are not limited to the examples described above.

Next, a description will now be given on a loading mechanism which handles both naked disks having different sizes such as 12 cm and 8 cm and a cartridge in which a naked disk is housed. First, an overall structure of a disk loading drive will be described, and structures of the respective portions will then be described in detail.

A mechanical structure according to the eleventh preferred embodiment of the present invention, being similar to as described earlier in relation to the first preferred embodiment and the like with reference to FIGS. 1 through 7, will not be described in redundancy, and an electric structure and operations of the disk loading drive will be described with reference to FIGS. 47 through 51.

Figure 47:
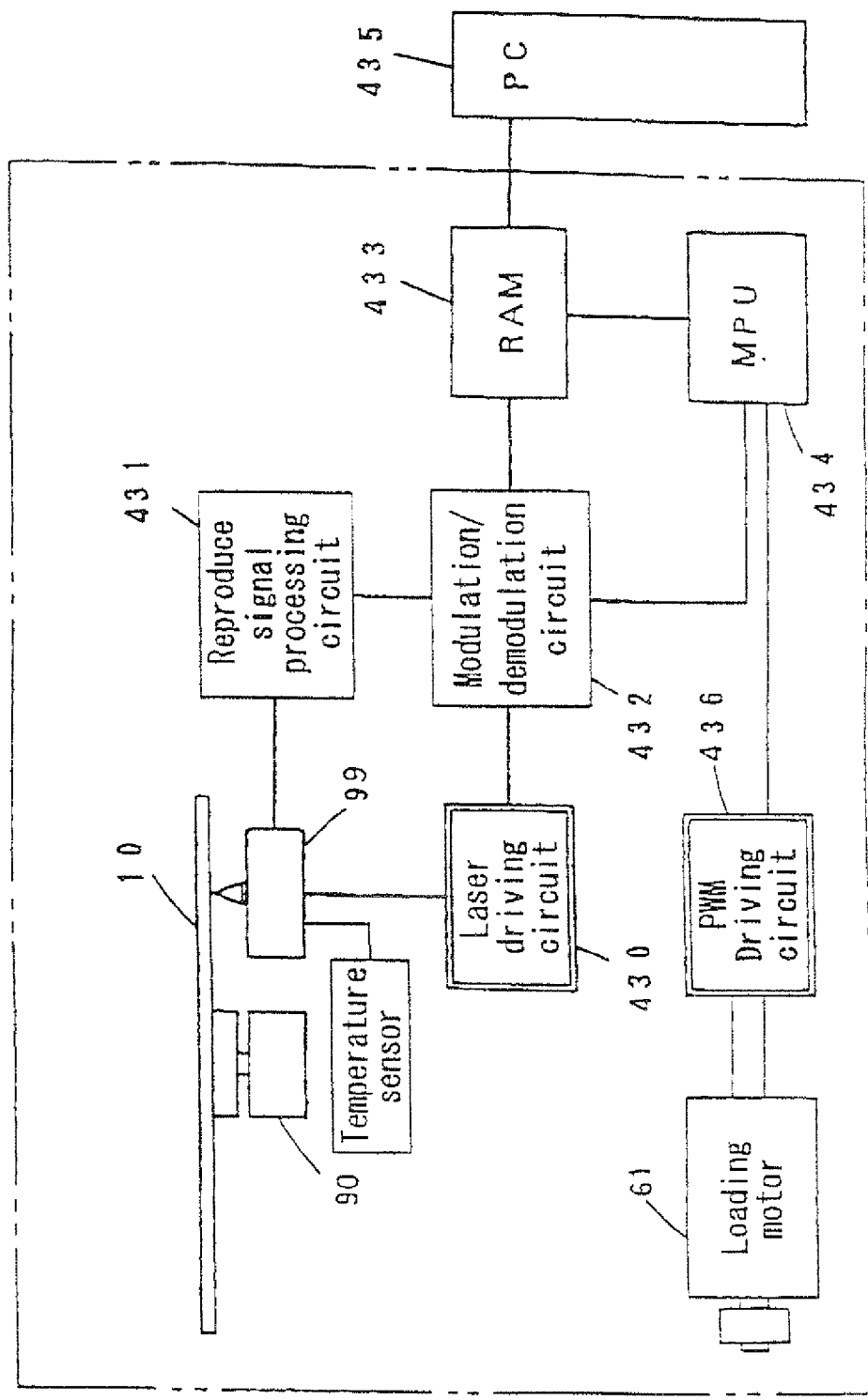
FIG. 47 is a block diagram of an electric control system according to an eleventh preferred embodiment.

FIG. 47 is a block structure diagram of the disk loading drive according to the eleventh preferred embodiment, and these illustrated are formed on the circuit board 120 described above. That is, a laser driving circuit 430 operates, the optical pickup (optical head) 99 irradiates the disk 10 with laser, a light receiving element of the optical head receives a signal from the disk 10, and a reproduce signal processing circuit 431 processes the signal. Denoted at 432 is a modulation/demodulation circuit, denoted at 433 is a RAM of a memory, denoted at 434 is a central processing unit (MPU), and denoted at 435 is a personal computer (PC). A temperature sensor is built within the optical head, which measures a temperature in the vicinity of a recording film of the disk 10.

Denoted at 436 is a PWM driving circuit of a motor system. PWM is the abbreviation of Pulse Wave Modulation, and this circuit is a driving circuit which requires to supply a constant voltage as a pulse as shown in FIG. 48(a) and change the width of supplying pulses so as to supply a current corresponding to supplied pulses to the loading motor 61 in accordance with the supplying width as shown in FIG. 48(b).

Since a PWM driving circuit allows to more finely set a drive current for the loading motor 61, setup of a profile of current supply with firmware not only eliminates the necessity to change a circuit constant or a drive mechanism but also contributes to reduction in operation noise and improvement in reliability of the mechanism.

In general, since it is preferable that a loading operation noise during actual use is low, there is an inconvenience that a shortage of torque attributed to an abnormal disk and a low temperature makes it impossible to transport a disk although the gear ratio, firm specifications and the like for the loading mechanism are set assuming a standard disk.

According to the present invention, in accordance with the loading/ejection operations at a guaranteed temperature and a temperature environment, the specifications of the firmware are changed outside a guaranteed range of low temperatures (5 degrees or lower) which increase a load upon the loading mechanism, the problem above is solved. For measurement of a temperature for switching, the temperature sensor of the optical head is used.

FIGS. 49 and 50 show profiles during loading and ejection of the PWM driving circuit of the disk loading drive according to the present invention. Measured along the vertical axes is a pulse supplying amount in percentage from the PWM driving circuit in response to a reference voltage, while measured along the horizontal axes is an operation time. Hence, the profiles represent a relationship of a speed relative to an elapsed time. For instance, in the event that the pulse supplying amount is 50% at the reference voltage of 12 V, a current corresponding to driving at a constant voltage of 6 V is supplied to the motor. The PWM driving duty (%) satisfies the relationship of X<A<B<C<D<E.

FIG. 49(a) shows a profile during loading of the PWM driving circuit within the guaranteed range of temperature (normal use temperature). Denoted at (a1) is the normal loading operation, in which the pulse supplying amount is increased from A % to B % during disk loading which takes time and then fixed at B % in an attempt to reduce a loading sound, and particularly for the purpose of eliminating a colliding sound of the clamper and the disk during clamping, the pulse supplying amount is set to a minimum value of X % at Tc which is the timing of clamping of the disk. Following this, during traveling of the traverse base moves (TB raising/lowering) which requires large force and ends in a moment, the pulse supplying amount is linearly increased little by little from X % to C %. Te is the timing of the completion of the loading. The following period corresponds to high-load loading which will be described next, in which the pulse supplying amount is increased continuously even after Te up to C % which is the amount at the time T, and the pulse supplying amount is then increased further from C % to E %, and the time out occurs at the time 2T.

Denoted at (a2) is the high-load loading operation. The pulse supplying amount starts at A % and goes up to C % during the disk loading operation, but is at E % during the TB raising/lowering operation. Since the operation of opening and closing the shutter of the cartridge changes depending on a temperature environment because of bending, temperature-induced shrinkage and the like in the event that the cartridge 1, the shutter and the like are molded elements, a large load occurs during transportation of the disk. Further, since the sliding loads of the cartridge 1, the shutter and the like increase and slippage occurs between a belt and a pulley of the loading mechanism because of a change with time, the transmission torque decreases, which imposes a large load during transportation of the disk.

During the disk loading operation under a high load which is attributed to transportation of a cartridge, etc., even the disk which couldn't be loaded initially at B % is loaded without creating a wrong feeling as the amount changes to C % time elapses, and the TB raising/lowering operation, too, is performed at E %, which makes it possible to realize a structure which will not cause a trouble during an actual use.

At this stage, time out is set twice or more the normal loading time, and the pulse supplying amount at time out is raised to C % and then maximized to E %.

FIG. 49(b) shows a profile during loading of the PWM driving circuit outside the guaranteed temperatures. Although the pattern of changes occurring in the profile with time is almost similar to that shown in FIG. 49(a), the duty ratio and the operation times at different duty ratios are different.

Denoted at (b1) is the normal loading operation. Assuming loading and ejection of a disk early morning in the middle of winter, the pulse supplying amount for PWM at a guaranteed temperature starts at B % and is then raised to C % which is higher than B % during (a1). At the time Tc which is the timing of clamping of the disk, the amount is set to A % which is higher than X % during (a1). The amount then gradually increases to D %, during which the time Te is the loading the completion time.

In general, since a load upon the loading mechanism at a low temperature increases to be 1.5 times as large as a normal temperature load or larger, a certain time point corresponding to D % is set as the time 2T and time out is set as the time 4T, thus ensuring that time out is 4 times as long as a normal loading time within the guaranteed temperatures.

Denoted at (b2) is the high-load loading operation, which corresponds to (a2) although the disk loading operation is performed with the pulse supplying amount increasing to D % beyond C % from B % after the time Te.

Thus, time out is set to be twice as long as a normal loading time or longer outside the guaranteed temperatures, and the pulse supplying amount is set to become the largest E % after becoming D % at the time out.

FIG. 50(a) shows a profile during ejection of the PWM driving circuit within the guaranteed temperatures.

Denoted at (a3) is the normal ejection operation. The pulse supplying amount is set to the minimum A % up until the time Te, at which the clamper and the disk get disengaged from each other, to thereby suppress a clamper releasing sound low, and traveling of the traverse base which requires large force and ends in a moment takes place until the pulse supplying amount is raised to C % from A % in order to reduce a loading sound. The disk ejection operation completes at the time Te. The following period corresponds to high-load loading, in which the pulse supplying amount is increased from B % up to C % and further up to E %. Time out is set to 2T with respect to a certain time point T corresponding to C % pulse supplying amount.

Denoted at (a4) is the high-load loading operation. During the high-load loading operation, since the TB raising/lowering operation is performed at A %, B % and C % and the disk ejection operation is performed at C %, D % and E %, it is possible to discharge the disk without causing a wrong feeling, and hence, realize a structure which will not cause a trouble during an actual use.

Thus, time out is set to be twice as long as a normal loading time or longer, and the pulse supplying amount is set to become the largest upon time out.

FIG. 50(b) shows a profile during ejection of the PWM driving circuit outside the guaranteed temperatures.

Denoted at (b3) is the normal ejection operation. The pulse supplying amount is set to be larger than the pulse supplying amount for PWM at a guaranteed temperature, assuming loading and ejection of a disk early morning in the middle of winter. First, the pulse supplying amount is set to B % until the time Tc, at which the clamper and the disk get disengaged from each other, to thereby suppress a clamper releasing sound low and ensure the reliability as the first priority. The TB raising/lowering operation, too, is performed at E %, the disk ejection operation is performed at D %. The time Te is the completion of the disk ejection operation. The following period corresponds to high-load loading, in which the pulse supplying amount is increased continuously to D % up to a certain time point after the time 2T, the pulse supplying amount is then increased up to E %, and time out occurs at the time 4T.

In general, since a load upon the loading mechanism at a low temperature increases to be 1.5 times as large as a normal temperature load or larger time out is set to be 4 times as long as a normal ejection time within the guaranteed temperatures.

Denoted at (b4) is the high-load ejection operation. The TB raising/lowering operation is performed at B % and D %, and the disk is ejected at D % and E %, starting at about the time 2T.

FIG. 12 shows a control system. While the above shows the profiles by temperature and by media, this represents a profile learning control apparatus which changes a profile in accordance with an individual difference, a change with time and the like and comprises a driving circuit 436 which drives the loading motor 61, timer means which measures a driving time, a detecting SW (switch) which detects the completion of loading or ejection of the tray, the cartridge or the disk, i.e., loading the completion, controlling means which controls the drive voltage in accordance with a predetermined profile, and calculating means which executes predetermined calculation in accordance with a drive processing number corresponding to detected loading the completion and a measured time. The controlling means adjusts a drive time in accordance with a result of the calculation performed by the calculating means, and converges to "an end position of a profile with a low clamper noise" calculated in advance.

The timer means for instance may be contained in the calculating means, which are formed by the MPU 434 and the PC 435. The calculating means assigns drive processing numbers to a drive profile which is along the drive profile shown in FIG. 49(a) for every predetermined unit or every certain period of time such as an inflection point as shown in FIG.

51(b), increases the value of a major drive time T if a drive processing number upon detection of the end by the detecting switch is larger than an optimal drive processing number which is calculated in advance, but decreases the value T if this drive processing number is smaller than the optimal number. When an inflection point is selected as a point of engagement and disengagement of the disk upon holding of the disk by means of the clamper on the turn table which constitutes the holding means in particular, it is possible to reduce a noise which is created when the clamp mechanism releases the medium.

Describing one example in detail with reference to FIG. 51(b), the drive profile during loading is divided into flat portions and inclined portions at infection points, the inclined portion between the inflection points P and Q is further divided for every predetermined period, and drive processing numbers are given to the divided portions, starting with the smallest one. The range in which the profile is to be modified is then set as the drive time T bearing the drive processing number 2. The drive time T is thereafter adjusted such that the loading the completion time Te detected by the detecting switch shown in FIG. 49 will be located during the period bearing the drive processing number 5.

In this case, the calculating means may assign unique values xt to drive processing numbers x other than the optimal number N and add T to xt when the drive processing number x is at the end. The value may be a negative value when x is the same as or smaller than the optimal number. The drive processing number upon detection of the completion and an add time to T are controlled with reference to Table 1. In this case, the drive processing number 5 is calculated in advance as the end position of the profile with a low clamper noise. That is, N=5, xt=t1 through t4, t6 through t9, t1<t2<t3<t4, and t6<t7<t8<t9. Table 2 shows specific numerical values of an add time.

TABLE 1

| | Drive processing number | | | | | | | | |
|---|---|---|---|---|---|---|---|---|---|
| | 1 | 2 | 3 | 4 | 5 | 6 | 7 | 8 | 9 |
| Add time to t | t1 | t2 | t3 | t4 | 0 | t6 | t7 | t8 | t9 | t1 < t2 < t3 < t4 < 0 < t6 < t7 < t8 < t9

TABLE 2

| Drive processing number and Add time to t | | | | | | | | | |
|---|---|---|---|---|---|---|---|---|---|
| | Drive processing number | | | | | | | | |
| | 1 | 2 | 3 | 4 | 5 | 6 | 7 | 8 | 9 |
| Add time to t | −300 | −200 | −100 | −50 | 0 | +50 | +100 | +200 | +300 |

Alternatively, the calculating means may be realized by multiplying a difference (x−N) between the end number x and an optimal number N by a coefficient A time and adding to T.

An initial value of the major drive time T can be switched depending on an input from the cartridge detecting switch, a measured temperature, etc., thereby realizing a profile which handles even a difference in medium, a temperature change and the like.

Describing an embodiment of the operations, the controlling means drives the motor 61 through the driving circuit, in accordance with a predetermined profile. Assuming that an input is received from the loading the completion detecting switch during driving at the drive processing number 7, the calculating means adds t7 to an execution time T corresponding to the drive processing number 2. Next, at the time of execution of driving for loading, since the execution time corresponding to the drive processing number 2 is longer, the detecting switch detects the completion at 7 or a smaller number. Next, when the completion is detected at the drive processing number 6, t6 is added to T. In a similar fashion, the completion is detected at 6 or a smaller number at the time of execution of the next driving processing. In this manner, the time T corresponding to the drive processing number 2 is controlled so as to detect the completion at the drive processing number associated with "the smallest clamping sound" such as the number 5, thereby realizing mechanism control with excellent quietness.

FIG. 51(c) shows a change in profile during ejection, in which the profile is divided into flat portions and inclined portions at inflection points, the portion between the inflection points P and Q is further divided in predetermined unit time, and drive processing numbers are given to the divided portions in a sequential order, as in FIG. 51(b). The range in which the profile is to be modified is then set as the drive time T bearing the drive processing number 1. As in loading, the drive time T is thereafter adjusted such that the disk discharging the completion time Te will be located during the period bearing the drive processing number 6. Thus, the time T corresponding to the drive processing number 1 is controlled during the ejection operation, which realizes quietness in a similar manner to that during loading.

Since it is possible to change a profile in accordance with an actually measured time during loading and ejection as described above, quietness is ensured in the following manner. That is, a profile which will not cause a clamper suction noise during loading of a medium is calculated in advance, a loading time is measured, and learning control is performed as for the timing for the clamper 84 to hold the disk which is in engagement with the spindle motor 90, thereby reducing an impact noise attributed to suction force which is created by disk clamping between the magnet and the magnetic element. Further, it is possible to mute sounds regardless of a difference in clamping timing owing to an individual difference of the loading mechanism, a change with time and the like.

Further, cartridge detecting means is disposed to the tray 20, so as to distinguish a cartridge from a medium other than a cartridge upon the completion of mounting of the medium to the tray Standard profiles which minimize a clamper suction noise at the time of loading for the respective situations are calculated in advance. A loading time is measured and learning control is performed as for the timing for the clamper to hold the disk which is in engagement with the spindle motor, thereby preventing a delay in loading learning during mounting of different media to the tray and reducing an impact noise attributed to suction force which is created by disk clamping between the magnet and the magnetic element without creating a wrong feeling.

A profile which will not create a clamper detaching noise during ejection of a medium may be calculated in advance in a similar manner to the above, an ejection time may be measured, and learning control may be performed as for the timing for the clamper 84 to hold the disk 10 which is in engagement with the spindle motor, so as to reduce an impact noise attributed to elimination of suction force which is created by disk clamping between the magnet and the magnetic element. Further, it is possible to mute sounds regardless of a difference in clamping timing owing to an individual difference of the loading mechanism, a change with time and the like.

In this case as well as in loading, cartridge detecting means is disposed to the tray, a cartridge is distinguished from a medium other than a cartridge upon the completion of mounting of the medium to the tray, standard profiles which minimize a clamper detaching noise at the time of ejection for the respective situations are calculated in advance, an ejection time is measured, and learning control is performed as for the timing for the clamper to hold the disk which is in engagement with the spindle motor, thereby making it possible to prevent a delay in loading learning during mounting of different media to the tray, and to reduce an impact noise attributed to suction Force which is created by disk clamping between the magnet and the magnetic element without creating a wrong feeling.

The cartridge detecting means may be disposed to either the cartridge or the mechanical chassis.

According to this embodiment, time out for the disk transporting time is twice as long as a standard time for the above-mentioned PWM profile or longer, and the PWM driving duty is increased at the end of loading and the end of ejection, which in turn makes it possible to enhance the reliability of the loading operation against a change with time occurring in the rubber, the belt and the like, increased loads upon mechanical portions, etc.

Further, the temperature sensor is disposed to the drive, and loading is performed based on a power-up PWM profile, which is different from the PWM profile aiming at quietness described above, at or below an operation guaranteeing temperature, thereby increasing the number of revolutions of the motor and ensuring a torque against an increase in load upon loading which is started in early cold winter morning, and enhancing the reliability of the loading operation against a change with time occurring in the rubber, the belt and the like, increased loads upon mechanical portions, etc.

In the present invention, the detecting means which detects the completion of loading and ejection of a disk is not limited to a mechanical detection but may be an electric detection such as a change in motor current, a physical detection such as a magnetic detection, etc.

The medium judging means is not limited to a mechanical detection, either, but may a physical detection such as electricity.

Further, a change in profile is not limited to a change in duration of the operation time but may be a change in current supplied to the motor, etc.

Twelfth Preferred Embodiment

A cartridge positioning mechanism according to the twelfth preferred embodiment of the present invention is similar to that described in relation to the fourth preferred embodiment, and will not be described in redundancy. The twelfth preferred embodiment promises the following effect. That is, the alignment pins 102 described in relation to the fourth preferred embodiment do not exist on the left-hand side and the right-hand side of the cartridge 1, and there is the alignment pin 102 only on the left-hand side alone as cartridge positioning means.

As the cartridge 1 is placed on the tray 20 and the loading operation is initiated, the shutter 2 is opened toward the left-hand side with the opener 29 fit with the front edge of the shutter 2 of the cartridge 1, thereby performing loading.

At this stage, the reaction force of the spring of the shutter 2 develops urging force upon the cartridge 1, and the cartridge 1 is urged against the left wall surface 25 of the tray 20.

While the tray 20 comprises the left wall surface 25 and the right wall surface 26 which serve as a left-hand side and a right-hand side guides for the cartridge 1, since the different cartridges 1 have different widths, the positional relationship between the left wall surface 25 and the right wall surface 26 of the tray 20 is defined such that the cartridge seating surface 21 is as wide as or wider than the maximum width of the cartridges 1.

After the loading of the tray 20 completes, the alignment pin 102 rises as the slide cam 100 moves and the alignment pin 102 engages with the positioning hole 3 of the cartridge 1. With two positions, i.e., the left wall surface 25 of the tray 20 and the alignment pin 102 on the left-hand side are fixed, the cartridge 1 is positioned.

The guide shaft 41 is disposed to the bottom surface of the tray 20 and held in an engagement hole of the shaft holder 42 which is disposed to the mechanical chassis 60. This structure using the guide shaft 41 and the shaft holder 42 not only allows to drive so as to load or eject the tray 20 without any rattling toward the left-hand side and the right-hand side relative to the mechanical chassis 60, but is also effective as a reference for positioning of the cartridge 1 relative to the tray 20. The reference for positioning of the cartridge 1 relative to the tray 20 is the left-hand side which is the side toward the shutter 2 is opened, while a tolerance is ensured regarding the width so that a gap will always be created on the right-hand side. Setting up of the reference for positioning relative to the tray 20 in this manner virtually eliminates the necessity of adjustment of the position of the cartridge 1 relative to the tray 20 in the right/left direction, thus ensuring that positioning is necessary only in the forward/backward direction with the alignment pin 102 inserted in the positioning hole 3 of the cartridge 1.

The structure above realizes the same effect as that according to the structure in which the alignment pins 102 are fit in the two positioning holes 3, one on the left-hand side and the other on the right-hand side, of the cartridge 1.

Figure 53:
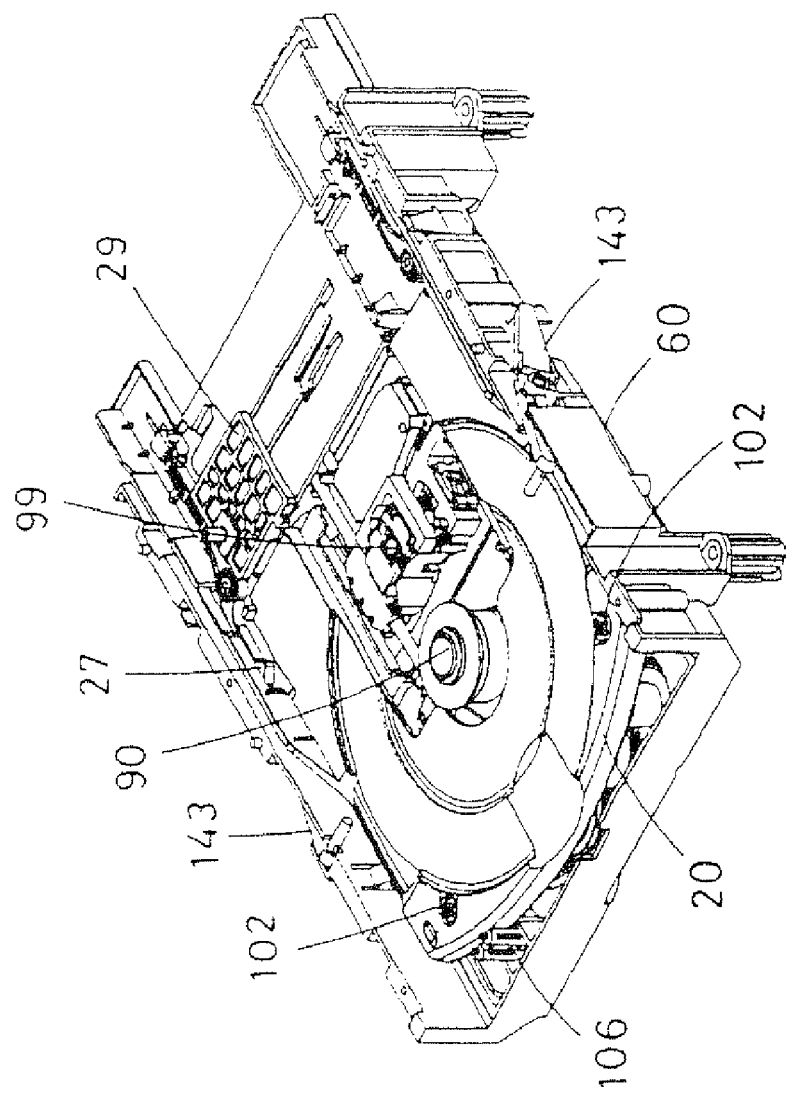
FIG. 53 is a perspective view which shows a state that loading of a tray has completed in the fourth preferred embodiment.
Figure 54:
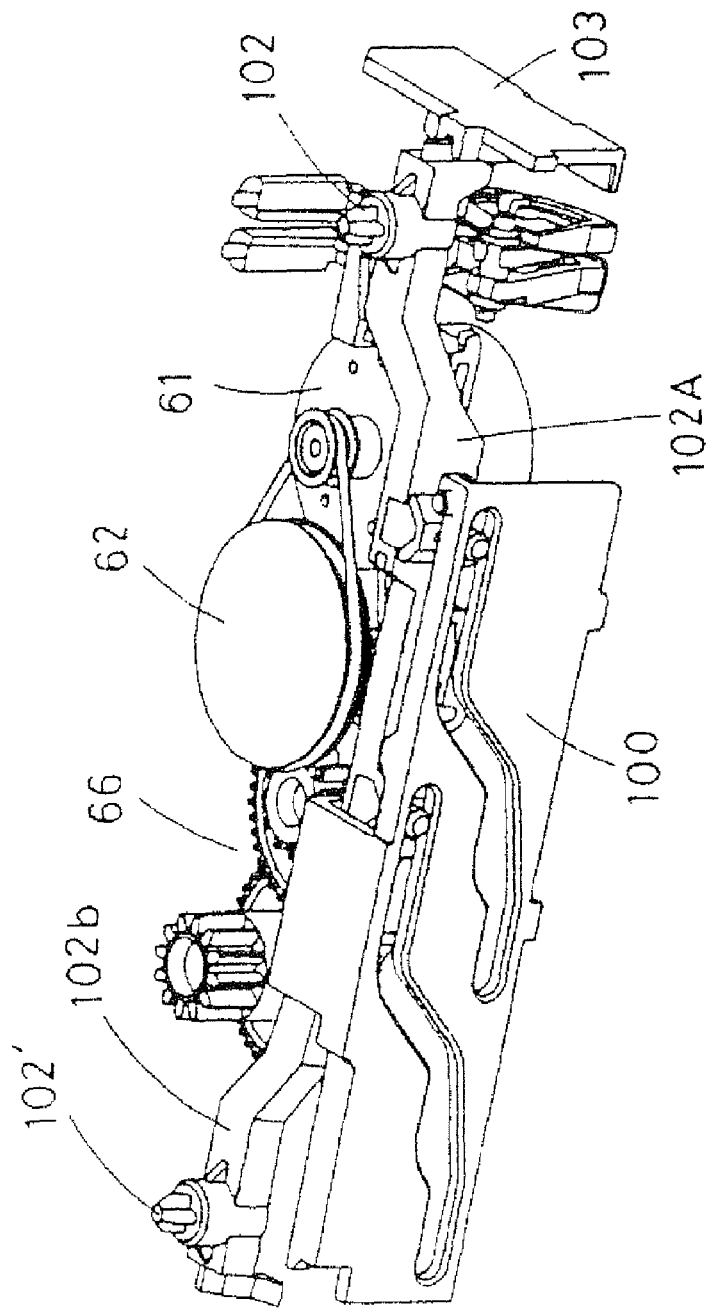
FIG. 54 is a perspective view which shows a relationship between a slide cam plate, an alignment pin piece, a switch lever and a loading mechanism, as it is viewed toward an ejecting direction of a tray.
Figure 55:
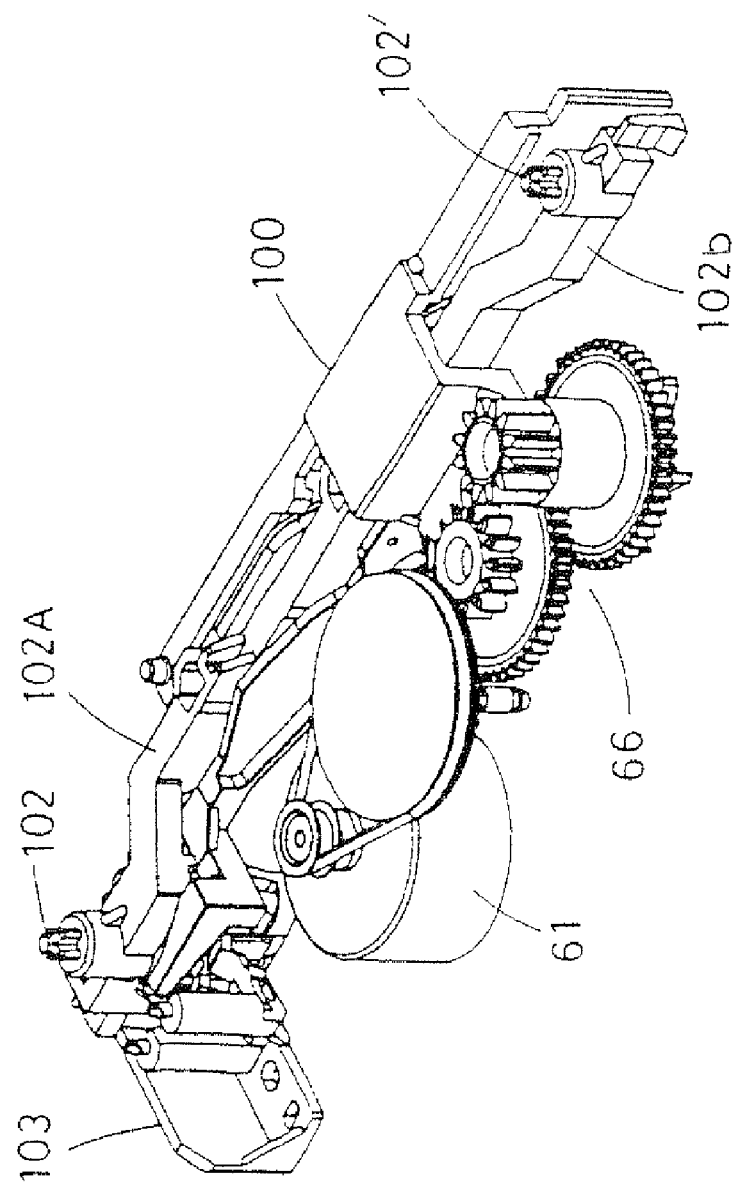
FIG. 55 is a perspective view of FIG. 54, as it is viewed toward a loading direction of a tray.
Figure 56:
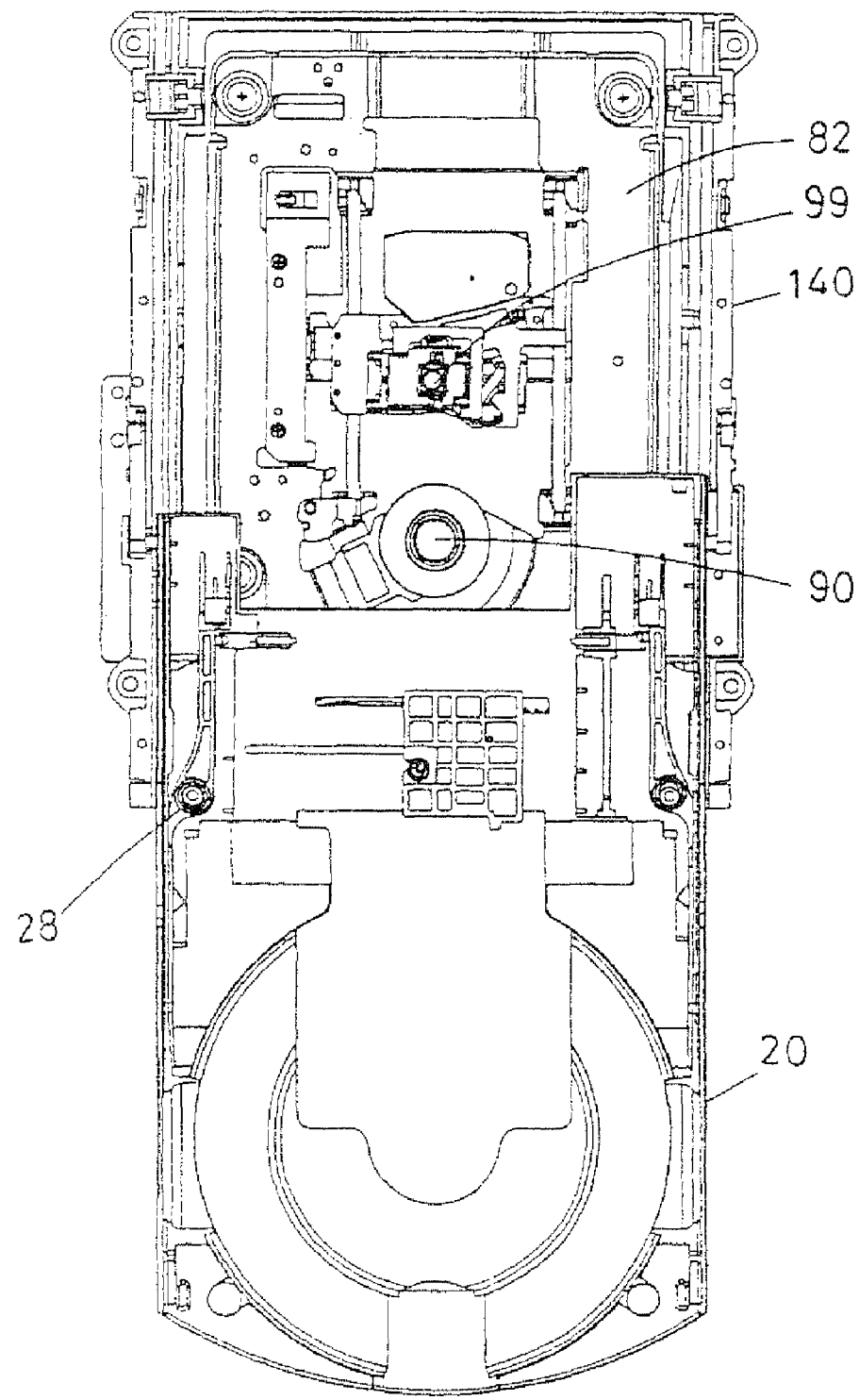
FIG. 56 is a plan view showing an ejection state according to a thirteenth preferred embodiment.
Figure 62:
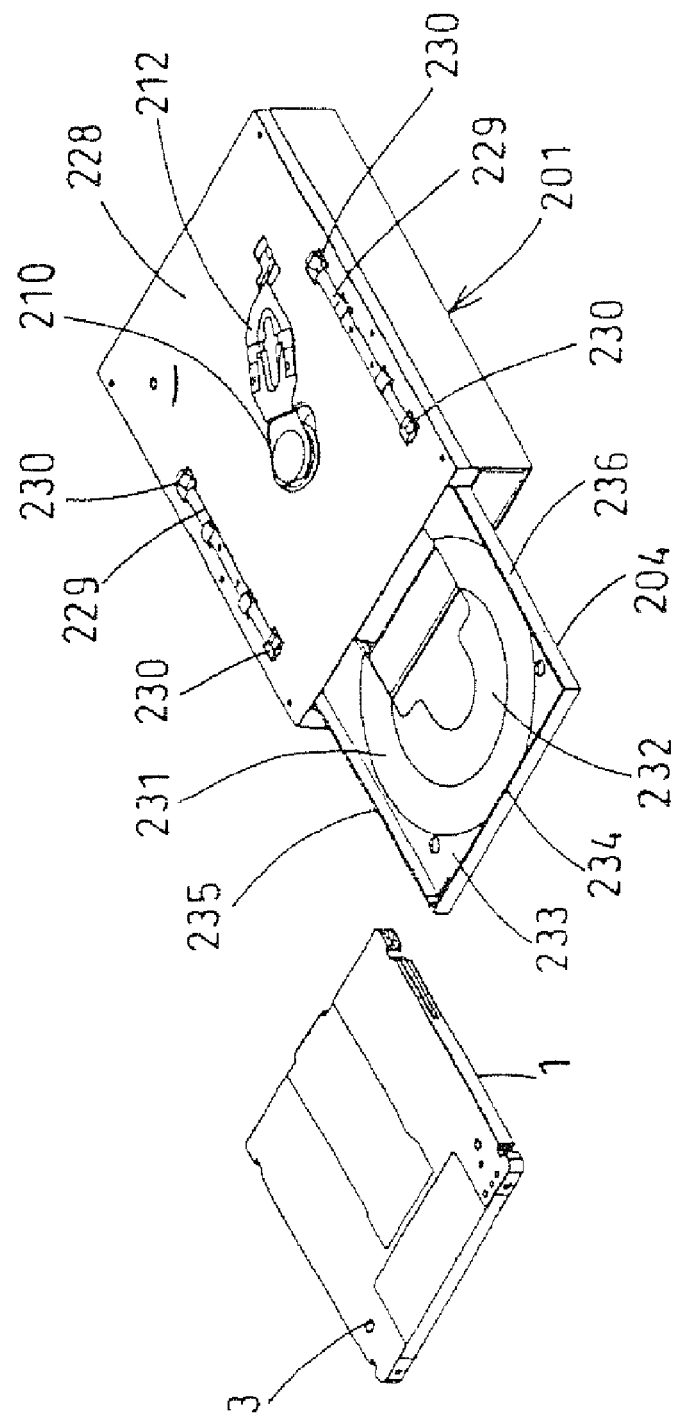
FIG. 62 is a perspective view which shows a state that a tray according to a conventional example has been ejected.
Figure 63:
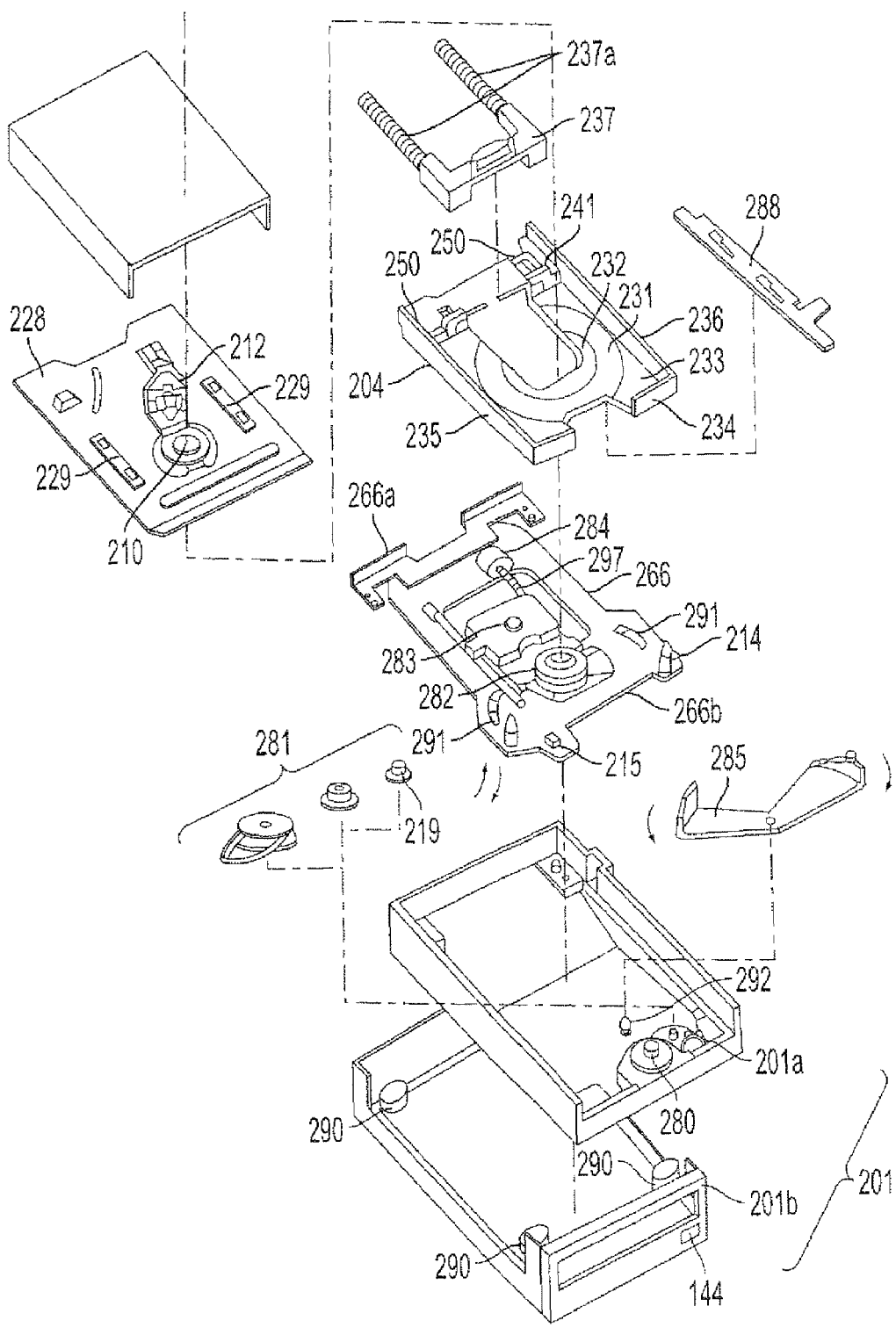
FIG. 63 is an exploded perspective view of the same.
Figure 64:
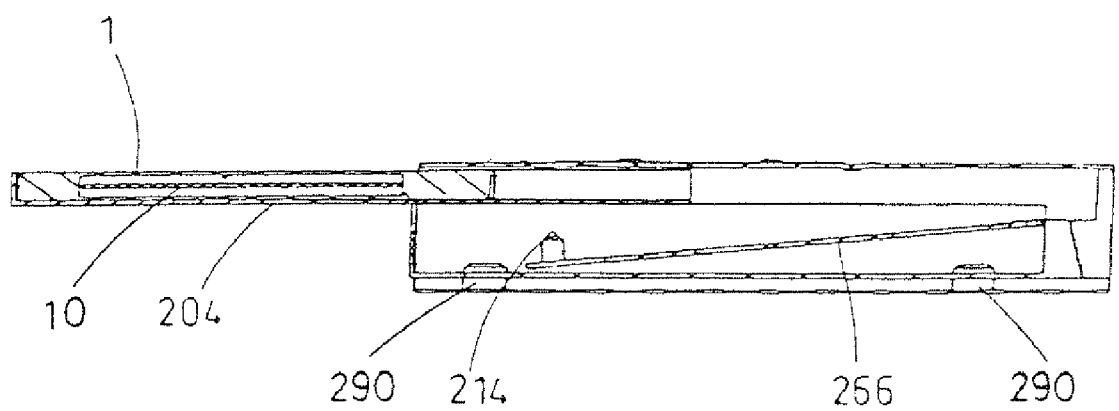
FIG. 64 is a schematic cross sectional view.
Figure 65:
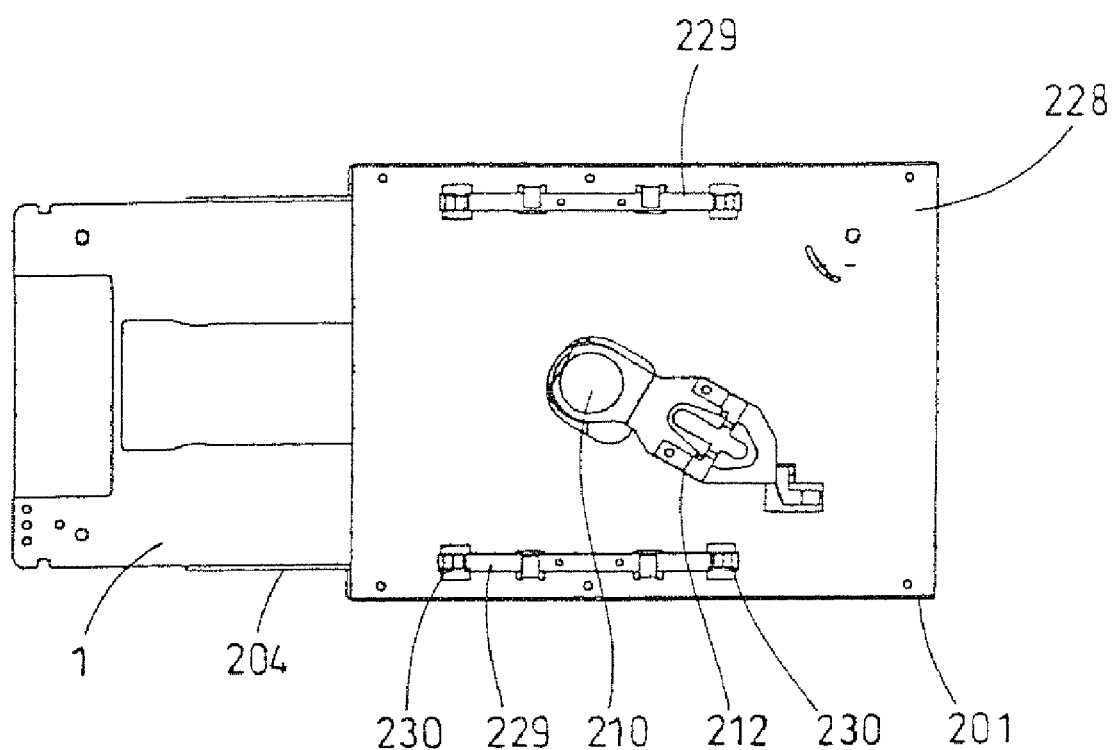
FIG. 65 is a plan view showing an ejection state.
Figure 66:
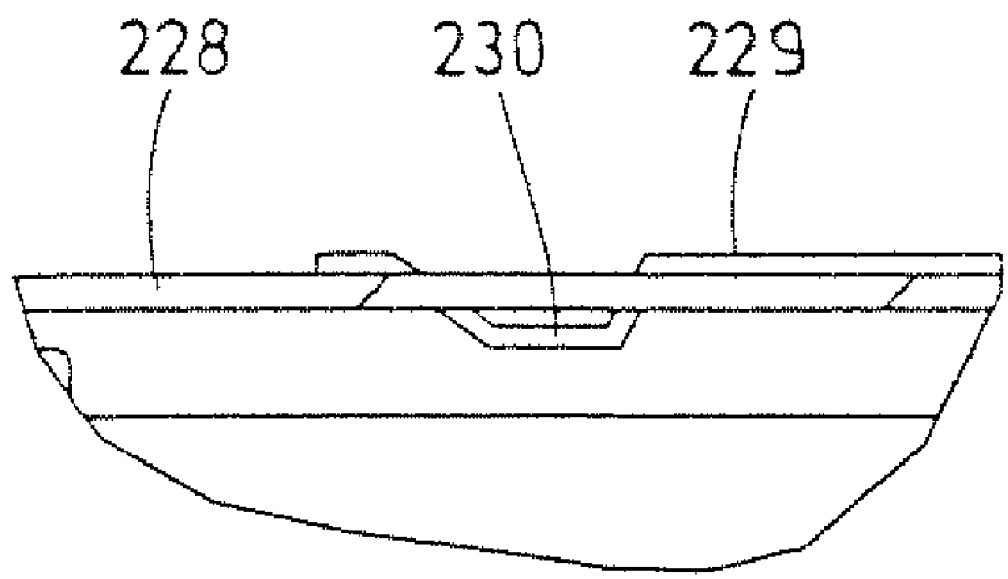
FIG. 66 is a partially expanded cross sectional view of the same.
Figure 67:
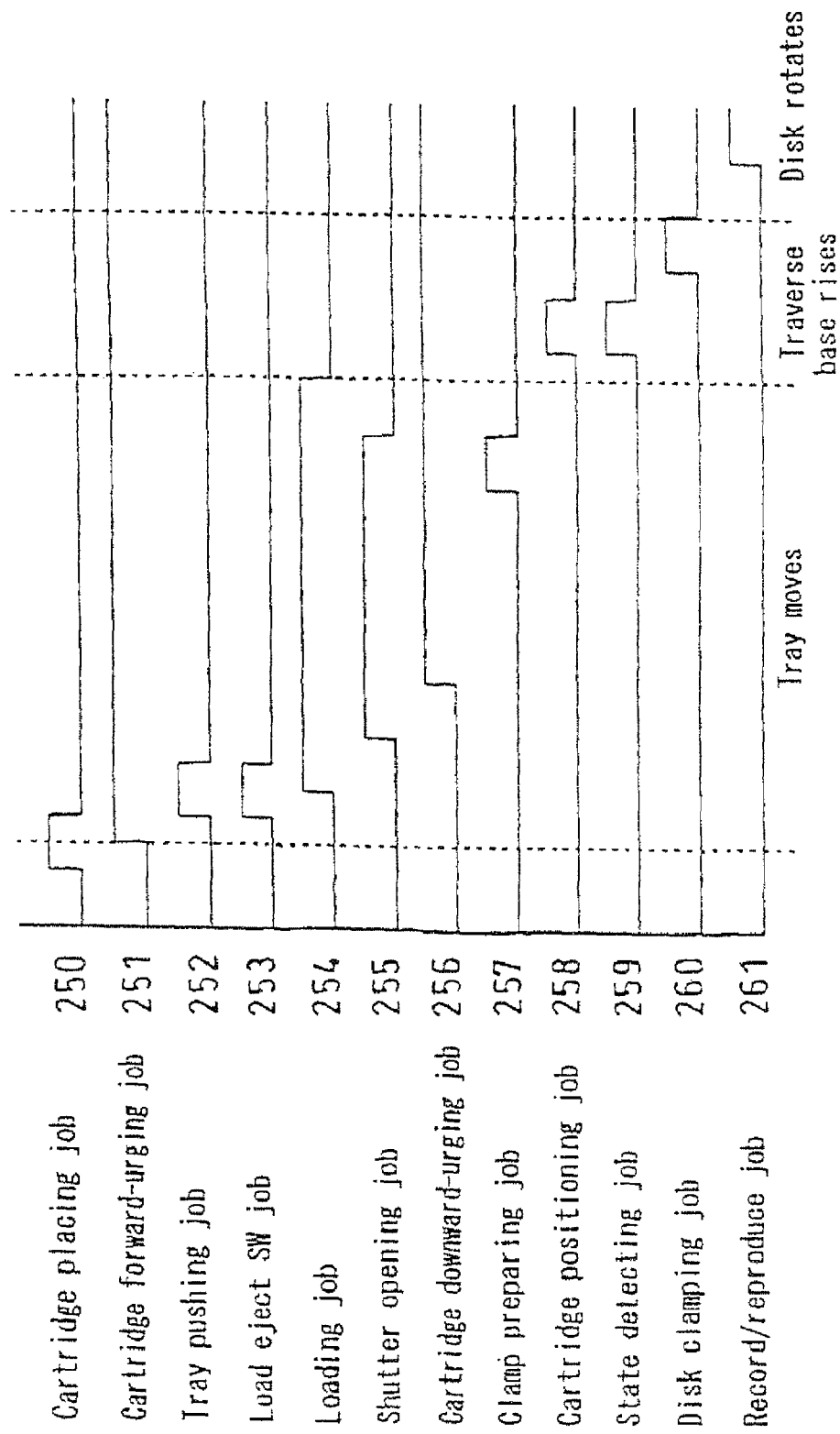
FIG. 67 is a timing chart which shows a sequence according to the conventional example.
Figure 69:
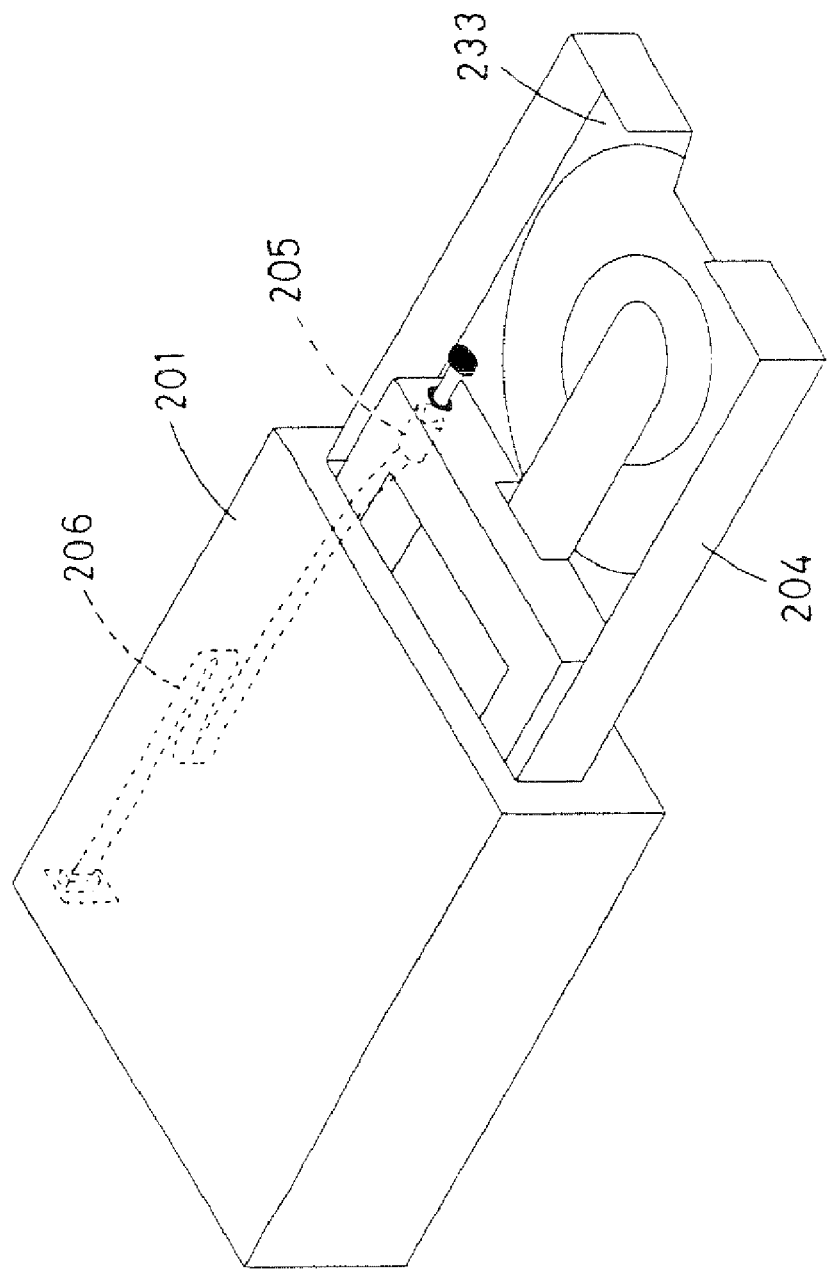
FIG. 69 is a perspective view which shows a state that a tray according to still other conventional example has been ejected.
Figure 70:
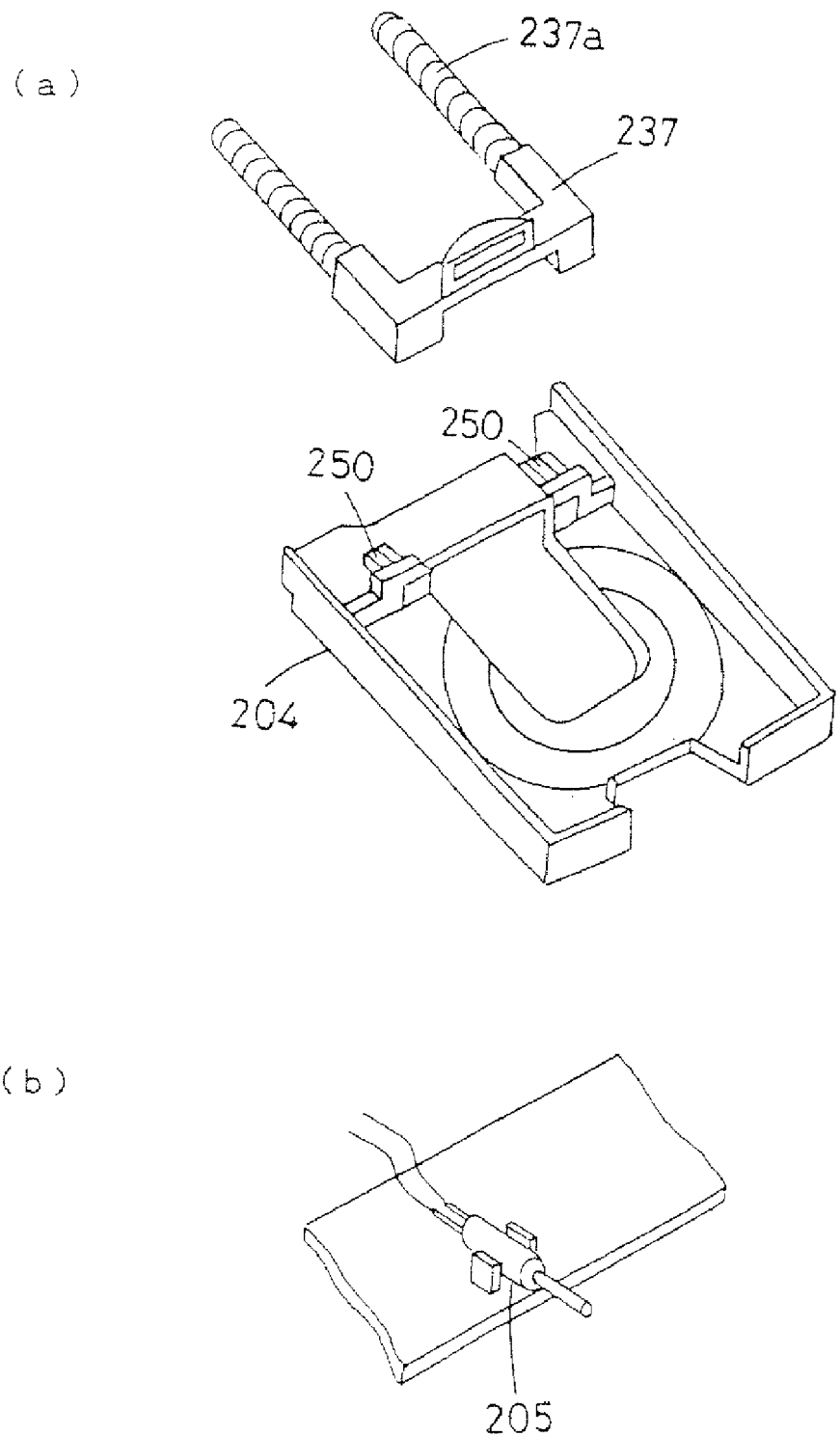
FIG. 70 is a partial perspective view.

A cartridge positioning mechanism of an optical disk drive according to a modification of this embodiment will be described with reference to FIGS. 53 through 55. As in the twelfth preferred embodiment, the alignment pins 102, 102' are disposed not only on the one side but on the left-hand side and the right-hand side, and the alignment pins engage with the two positioning holes 3, one on the left-hand side and the other on the right-hand side, of the cartridge 1. In the alignment piece 102A, the alignment pin 102' is formed at the front edge of an arm 102b which extends in the opposite direction to the alignment pin 102.

In the respective embodiments described above, the positioning means may be structured so as to permit positional adjustments not only in the forward/backward direction but also in the forward/backward direction relative to the chassis, for the purpose of further improving the positional accuracy. Further, a positional adjustment mechanism may be disposed which adjusts the position of the traverse base in the forward/backward direction and the forward/backward direction relative to the chassis. When the traverse base is adjusted in the forward/backward direction and the forward/backward direction, the accuracy of positioning the cartridge can improve.

A loading mechanism according to a thirteenth preferred embodiment of the present invention will be described with reference to FIGS. 1 through 4, 36 through 38, 41 through 44, and 56. That is, FIG. 1 shows the optical disk record/reproduce drive to which the thirteenth preferred embodiment of the present invention is applied. In FIG. 1, denoted at 20 is the tray which is a tray for seating a cartridge which houses an optical disk for instance or a naked optical disk (not shown), and denoted at 140 is the main unit of the optical disk record/reproduce drive.

In the main unit 140, denoted at 60 is the chassis with legs which comprises both side walls and is shaped as a box of a synthetic resin, denoted at 70 is the traverse holder whose one edge is supported by the chassis 60 for free vertical movements, denoted at 82 is the traverse base which is held by the traverse holder 70 via the vibration absorbing dampers 71 and comprises a record/reproduce mechanism, denoted at 83 is the top lid which is attached to the traverse holder 70 and covers the traverse base 82, and denoted at 85' is the board of the control circuit which is attached to the bottom side of the chassis 60.

In the chassis 60, the loading motor 61 and the loading gear system 66 which are driving means for the tray 20 are disposed on the inner side of the opening 60a which is for loading and ejection of the tray 20.

The traverse base 82 holds the spindle motor 90, which rotates the optical disk while holding the disk, the optical pickup 99, which reads out information from the disk 10 or writes information in the disk 10, the traverse motor 94, which moves the optical pickup 99 in the radius direction of the disk, and the reed screw 95 which moves the optical pickup 99.

The top lid 83 supports the middle part of the clamper 84 which clamps the optical disk to the spindle motor 90, and urges by spring force the clamper 84 such that the front edge side of the clamper 84 will move away from the spindle motor 90, and the clamper 84 fixes the disk to the turn table of the spindle motor 90.

On the front side of the traverse holder 82, the slide cam 100 which engages with the mechanical chassis 60 is disposed so that the slide cam 100 can move in the right/left direction. The slide cam 100 is guided by the guide cam groove 249 (FIG. 4) formed in the back surface of the tray 20, and reciprocally moves within a certain range in accordance with loading and ejection of the tray 20. There is the rack gear on the front side of the slide cam 100, and the slide cam 100 is driven by the middle gear of the loading gear system 66 in the right/left direction within a predetermined range as it is after the tray 20 has been loaded. As the slide cam 100 moves in the right/left direction at this stage, the traverse holder 82, the alignment pins 102 and the detecting levers 106 are driven in the vertical direction, the state detecting pins 107 move in the vertical direction in accordance with the operations of the detecting levers 106.

FIG. 2 shows the tray 20 and the cartridge holders 27. In the middle of the cartridge seating surface 21 of the tray 20, there are two concave portions one large and the other small, formed in a concentric arrangement. The concave portion having a large diameter is a large diameter disk seater 22 while the concave portion having a small diameter is a small diameter disk seater 23, and either one is used in accordance with the outer diameter of a naked disk which is to be mounted to the main unit 140 of the optical disk record/reproduce drive.

Further, on the left-hand side and the right-hand side as viewed from the loading/ejection direction of the tray 20, the left wall surface 25 and the right wall surface 26, which are slightly larger than the outer size of the cartridge 1 (FIG. 41) and are vertical to the cartridge seating surface 21, are disposed over approximately half the entire length on the innermost side of the tray 20 within a cartridge placing range in the loading/ejection direction of the tray 20, thereby realizing a function as guide members which are used during placing of the cartridge 1 on the tray 20. Meanwhile, openings 30 are formed in a part of the left wall surface 25 and the right wall surface 26, and at a left-hand side and a right-hand side positions to an axial line along the direction of loading or ejection passing through the center of gravity of the cartridge 1, e.g., on the left-hand and the right-hand innermost sides in the loading direction, there are the cartridge holders 27, which are holding members of cartridge holding means engaged with the engagement receiving parts 6 (FIG. 42), disposed on the inner side to the left wall surface 25 and the right wall surface 26.

On the front side of the tray 20 and the front side of the both side walls 25 and 26, there is no wall surface which is disposed perpendicular to the cartridge seating surface. Hence, there is no obstacle against placing of the cartridge 1 on the tray 20. Further, since the front edge of the tray 20 is shaped as a curved convex surface and the cartridge 1 is a flat rectangle, the both sides of the rear edge of the cartridge placed on the tray 20 project beyond the tray 20.

FIG. 2(b) shows the cartridge holders 27, which sink into and engage with the concaved engagement receiving parts 6 which are located on the left-band side and the right-hand side to the axial line along the direction of loading or ejection passing through the center of gravity of the cartridge 1. The cartridge holders 27 are of a synthetic resin which is shaped as long thin members, and the middle parts of the cartridge holders 27 are bent approximately in the shape of the letter Z. There are axial holes 27a formed in the middle parts in a direction perpendicular to the step bending direction. The axial holes 27a engage with the pins 28 which are disposed outside the cartridge placing range and on the inner side of the cartridge seating surface 21 relative to the left wall surface 25 and the right wall surface 26, and the cartridge holders 27 are held for free revolutions about the pins 28. Further, the cartridge holders 27 comprise, at front edges of the downwardly stepped parts, convex-shaped engaging parts 27b which engage with the engagement receiving parts 6 of the cartridge 1 and are shaped approximately as triangles which extend within the cartridge placing range. At front edges of the opposite upwardly stepped parts, spring receiving projections 27c are disposed in the same direction as the engaging parts 27b. The projections 37 (FIG. 36) are disposed on the tray 20 side to face these, and the coil springs 49 are interposed so as to engage with these at the both edges, whereby the engaging parts 27b are urged and loaded in the direction in which the engagement receiving parts 6 of the cartridge 1 are held. The stopper 31 of the cartridge holders 25 against the spring force of the coil springs 49 is disposed at a position which is approximately on the opposite side to the spring receiving projections 27c of the tray 20. Further, with the cartridge holders 25 supported by the stopper 31, the downwardly stepped parts on the engaging parts 27b side enter into the openings 30 from the holes 27a of the cartridge holders 27, inner surfaces 27d are approximately flush with the inner surfaces of the wall surfaces 25 and 26, and the engaging parts 27b alone project into the cartridge placing range. This prevents the tray 20 from becoming wide.

In addition, on the innermost side of the tray 20, the opener 29 which opens and closes the shutter 2 of the cartridge 1 is disposed for free movements in the right/left direction. The opener 29 operates in accordance with loading of the tray 20, and permits loading through an opening action toward the left-hand side with a projection of the opener 29 hooked at the projection disposed to the front edge of the shutter 2. For the opener 29 to operate in accordance with loading and ejection of the tray 20, the guide cam groove of the opener 29 is disposed to the main unit 140 or the top lid. Alternatively, there may be such means which makes it possible to drive the opener 29 and open the shutter when the cartridge 1 is mounted on the tray 20. As the shutter 2 is opened, the optical disk housed in the cartridge 1 becomes ready for rotations by the spindle motor 90 and ready for recording and reproduction by means of the optical pickup 99.

FIG. 4 shows the back surface of the tray 20, in which there is the rack gear 40 disposed on one side which engages with the drive gear 66*a* of the loading gear system 66. As the rotating direction of the loading motor 61 is switched, the tray 20 is loaded and ejected. In a similar manner, the metallic guide shaft 41 is held at the front edge and the rear edge of the tray 20, parallel to and in the vicinity of the rack 40 of the back surface of the tray, and is further held by the mechanical chassis 60 through the shaft holder (bearing) 42 which receives the guide shaft 41. One end of the guide shaft 41 is fit with a hole with bottom 231 of a supporting part 230 which projects on the back surface of the tray 20, the other end of the guide shaft 41 is fit with a concave portion 232 which projects on the back surface of the tray 20, and a screw with head 233 is fit in a screw hole which is formed in the side portion of the concave portion 232 with the head of the screw pressing the guide shaft 41, whereby the guide shaft 41 is prevented from falling. The tray 20 comprises guide steps 20*c* and 20*d* on the both sides of the cartridge seating surface 21, at about half the height of the cartridge seating surface 21. Paired cylindrical receiving portions 42*a*, which engage for free sliding with the guide shaft 41, are formed with a distance in the shaft holder 42, positioning holes 42*b* are formed at the both edges in the length direction of the portions of the guide shaft which stick out beyond the sides of the tray 20, an attaching hole 42*c* is formed between the positioning holes 42*b*, and a hook-shaped catching part 42*a* is disposed which projects and is hooked at the guide step 20*d* as shown in FIG. 8 in order to prevent the shaft holder 42 from shaking while the tray 20 is set inside the main unit 140. Meanwhile, in the main unit 140, as shown in FIG. 36, a housing part 140*a* to house the shaft holder 42 is disposed at a position which is on one side and close to the front, positioning projections (not shown) fit with the positioning holes 42*b* and a screw hole (not shown) fit with the attaching hole 42*c* are formed in the bottom surface inside the housing part 140*a*, and the shaft holder 42 is attached with a screw (not shown). The other edge of the tray 20 is placed for free sliding on the guide stripe 63 (FIG. 1) which is formed on the inner side of the box-like shaped mechanical chassis 60, and the tray 20 is prevented from getting detached from the guide stripe 63 as the tray is engaged for free sliding with the guide step 20*c* by a claw-shaped pressing part 104 which is formed between paired parallel slits on the side walls of the mechanical chassis 60 for instance, which exhibits elasticity of resin, and which projects from the inner surface of the side wall as shown in FIG. 4. Hence, the tray 20 becomes attached, as the tray 20 is inserted into the main unit 140, the shaft holder 42 is positioned and attached, and the pressing part 104 is pressed and the tray 20 is supported by the guide stripe 63 on the other side.

FIGS. 36 and 41 show the tray 20 as it is loaded. The tray 20 is positioned so as to locate the spindle motor 90 at the center of the optical disk and the slide cam 100 is driven by the loading gear system 66 at a position a little in front of the tray, the alignment pins 102 project through the holes 20*a* formed in the tray 20 and engage with the positioning holes formed in the cartridge 1. The cartridge 1, which is roughly restricted in the forward/backward direction and the right/left direction to the tray 20, is finally positioned relative to the tray 20 and the spindle motor 90 as a result of this engaging action. Meanwhile, the traverse base 82 ascends, the spindle motor 90 and the optical pickup 99 move close to the optical disk housed in the cartridge 1 which is placed on the tray 20 from the center opening 20*b* of the tray 20, and at the same time, the pressing levers 143 press the both central sides of the cartridge 1 against the tray 20 because of the force of the springs 143*a* of the pressing levers 143 as the traverse base 82 ascends, while the clamper pressing part 130 projecting from the tray 20 presses the rear edge of the clamper 84 and the front edge of the clamper 84 moves close to the optical disk, whereby the optical disk is clamped on the turn table of the spindle motor 90. The front edge of the tray 20 is positioned on the inner side of the opening 60*a* of the chassis 60 at the loading position of the tray 20, and at about the same time as the completion of the loading, the state detecting pins 107, which are for detection of the back and the front surfaces of the cartridge 1 and whether it is possible to write, project toward the cartridge 1 on the front edge side of the tray 20 in accordance with the operations of the detecting levers 106, and for this structure, there are a back surface detecting hole and a writing detecting hole (not shown) formed in the cartridge 1.

FIGS. 37 and 38 show the tray 20 as it is ejected, in which as the loading motor 61 is driven in the opposite direction to the direction during loading, the tray 20 is ejected. At this stage, the slide cam 100 engages with the loading gear system 66 operates, the detecting levers 106, the alignment pins 102 and the traverse base 82 descend, the detecting levers 106 push down the state detecting pins 107, and the pressing levers 143 ascend, so that the tray 20 moves and the clamper 84 moves away as the tray 20 starts moving.

Operations of the optical disk record/reproduce drive 140 having such a structure above will now be described in relation to an example of reproduction from the optical disk which is housed in the cartridge 1.

FIGS. 42 through 43 show placing of the cartridge 1 on the tray 20, in which the cartridge 1 is slid on the cartridge seating surface 21 from the front of the tray 20 in a direction of pushing into the main unit 140 of the optical disk record/reproduce drive.

In the process that the left-hand and the right-hand edge surfaces of the cartridge 1 are pushed to the tray 20 with the left wall surface 25 and the right wall surface 26 serving as guides, since there are slanted surfaces at the front edges of the engaging parts 27*b* which serve as the projections of the cartridge holders 27, the insertion force of the cartridge 1 makes it possible to easily open.

FIG. 44 shows a state that the cartridge 1 is further inserted, and the engaging parts 27*b* of the cartridge holders 27, owing to the urging force of the coil springs 49, sink into and engage with the concaved engagement receiving parts 6 of the cartridge 1. At this stage, from a change in the insertion force and a sound which is emitted at the time of engagement with the cartridge holders 47, an operator can confirm the completion of the engagement.

On the innermost side of the cartridge seating surface 21, there are the stoppers 35 which restrict the cartridge 1 to the insertion limit, which ensures that the engaging positions at which the cartridge 1 engages with the cartridge holders 27 approximately match with the insertion limit provided by the stoppers 35. This completes the placing of the cartridge 1 on the tray 20. At this stage, the cartridge holders 27 restrict movements of the cartridge 1 in the forward/backward direction, while the left-hand side and the right-hand side wall surfaces 25 and 26 roughly restrict movements of the cartridge in the right/left direction.

During manual loading, the insertion force is continuously applied to the cartridge 1, the insertion force is transmitted to the tray 20 through the stoppers 35, and manual loading of the tray 20 into the main unit 140 of the optical disk record/reproduce drive is started.

While the tray 20 is being loaded manually, the eject end SW (not shown) of the tray detects a signal indicative of passing of the tray, a drive voltage is applied to the loading motor 61, and as the drive gear 66 which follows rotations of the loading motor 61 rotates, automatic loading of the tray 20 starts.

As described earlier, the spring constant and the pre-loading force of the coil springs 49 which urge the cartridge holders 27 are set such that the following relationship holds between the insertion force over the cartridge 1 into the cartridge holders 47 and the manual loading force upon the tray 20, whereby manual loading of the tray 20 is performed after placing of the cartridge 1 on the tray 20 has completed:

Insertion force over the cartridge<Manual loading force

If the force relationship above is opposite, loading of the tray 20 starts before insertion over the cartridge 1 into the cartridge holders 47 completes, and clamping of the disk 10 stored in the cartridge 1 accordingly fails.

On the other hand, during automatic loading, with the loading SW (not shown) of the main unit 140 of the disk record/reproduce drive turned on at the time of the completion of placing of the cartridge 1 on the tray 20, a drive voltage is applied to the loading motor 61, and as the drive gear 66 which follows rotations of the loading motor 61 rotates, automatic loading of the tray 20 starts.

In the structure according to this embodiment, after the cartridge 1 is placed on the tray 20, for loading of the tray 20 and the cartridge 1 into the main unit 140 of the optical disk record/reproduce drive, the cartridge 1 is inserted as if to slide the cartridge 1 on the cartridge seating surface 21 and application of the insertion force is continued, whereby the loading operation is completed. In other words, the operation of inserting the cartridge 1 alone serves the purpose, whereas a plurality of operations realize placing of the cartridge 1 and loading of the tray 20 in the conventional disk record/reproduce drive.

Further, since it is possible to use a tray whose shape is almost the same as that of a tray which generally seats only a naked optical disk, the operability for placing the naked disk on the tray will not give people a wrong feeling. In addition, since the freedom of design of the tray improves because of the absence of the front wall surface, it is possible to use a high-grade design which targets at a better design effect for instance instead of using a function-oriented design.

In addition, the shaft 41 and the shaft holder 42 provide the stability of mounting the cartridge 1 to the tray 20 and ensure the positional accuracy of the cartridge relative to the traverse base upon loading. At the same time, since the tray 20 will not be transported as it is inclined to one side during loading and ejection because of the load for opening and closing the shutter of the cartridge 1, the quality of tray related operations improves.

In this case, both the stability of the operation of mounting the cartridge to the tray 20 and the reliability of the operations during loading and ejection are improved in the loading mechanism of the method which requires to open the shutter of the cartridge 1 at the time of mounting and also in the loading mechanism which opens and closes the shutter in synchronization to loading of the tray 20.

As a result, it is possible with a simple structure to ensure stable mounting of the cartridge to the tray 20, prevent rattling of the tray during loading and ejection of the cartridge accordingly improve the quality, and since this also serves to restrict a position in the direction of the width of the cartridge during loading, it is possible to enhance the reliability of the loading mechanism.

Still further, disposing the shaft 41 inside the tray 20 creates an advantage that the thickness and the size of the drive are reduced.

While this embodiment uses the structure that the shaft and the shaft bearing which are paired are arranged on one side of the tray, two paired shafts and shaft bearings may be disposed on the both sides of the tray, to thereby ensure similar operations and effect.

Fourteenth Preferred Embodiment

A fourteenth preferred embodiment of the present invention will now be described with reference to FIG. 57. The structure of attaching the shaft 41 and the shaft holder 42 alone is different from the thirteenth preferred embodiment. More specifically, the shaft holder 42 is attached to the tray 20, while the shaft 41 is attached to a mechanical chassis which is the main unit 140.

Structures of the other parts and the loading operation are similar to those according to the first preferred embodiment, thereby realizing a similar effect, and as the guide shaft 41 is disposed to the mechanical chassis 60, there is no restriction upon the thickness of the tray 20.

While this embodiment uses the structure that the shaft and the shaft bearing which are paired are arranged on one side of the tray, two paired shafts and shaft bearings may be disposed on the both sides of the tray, to thereby ensure similar operations and effect.

Fifteenth Preferred Embodiment

A cartridge holding mechanism according to a fifteenth preferred embodiment of the present invention will be described with reference to FIGS. 1 through 4, 36, 42 through 44. In other words, this embodiment is similar to the thirteenth preferred embodiment and therefore will not be described in redundancy. Instead, a description will now be given, with reference to FIG. 43, on operations of the cartridge holders 27 in a case that the cartridge 1 is wrongly placed on the tray 20 with the front and the back of the cartridge 1 reversed.

As in normal placing, the cartridge 1 is slid on the cartridge seating surface 21 from the front of the tray 20 in a direction of pushing into the main unit 140 of the disk record/reproduce drive. In the process that the left-hand and the right-hand edge surfaces of the cartridge 1 are pushed to the tray 20 with the left wall surface 25 and the right wall surface 26 serving as guides, the front edges of the engaging parts 27b of the cartridge holders 27 are easily opened by the insertion force of the cartridge 1. As the cartridge 1 is further inserted, the engaging parts 27b of the cartridge holders 47 slide as they are open along the left-hand and the right-hand edge surfaces of the cartridge 1 since there is no engagement receiving parts 6 of the cartridge 1. The cartridge holders 27 remain open even when the cartridge 1 has arrived at the stoppers 35 which restrict to the insertion limit.

When the loading SW is turned on with the cartridge 1 wrongly placed on the tray 20, loading of the tray 20 into the disk record/reproduce drive progresses. However, since the cartridge holders 27 remain open toward outside on the left-hand and the right-hand edge surfaces of the tray 20 during the loading of the tray 20, the cartridge holders 27 of the disk record/reproduce drive 140 are open wider in the width direction than the width of the opening 60a which is for passing the tray 20, and therefore, the engaging parts 27b of the cartridge holders 47 and the opening 60a interfere with each other, and the loading of the tray 20 is stopped in the middle.

The loading motor 61 senses an abrupt increase drive load attributed to the interference between the cartridge holders 27 and the opening 60a and the loading of the tray 20 is stopped, following which the loading motor 61 rotates in the reverse direction and the ejection operation of the tray 20 takes over.

In this manner as the cartridge 1 which an operator thought has placed on the tray 20 and loaded gets ejected unexpectedly, the operator learns about the incorrect placing of the cartridge 1.

In the structure according to this embodiment, for loading of the tray 20 and the cartridge 1 into the main unit 140 of the optical disk record/reproduce drive after the cartridge 1 is placed on the tray 20, the cartridge 1 is inserted as if to slide the cartridge 1 on the cartridge seating surface 21 and application of the insertion force is continued, whereby the loading operation is completed. In other words, the operation of inserting the cartridge 1 alone serves the purpose, whereas a plurality of operations realize placing of the cartridge 1 and loading of the tray 20 in the conventional disk record/reproduce drive.

Further, since the conventional disk record reproduce drive is shaped like a box which comprises a front wall surface so as to position the cartridge relative to the tray, people feel a wrong feeling during the operation of placing the disk on the tray while avoiding the front wall surface to place the naked disk on the tray. However, since a tray whose shape is approximately the same as that of a tray which generally seats only a naked optical disk may be used as the tray 20 which has such a structure according to this embodiment, the operability for placing the naked disk on the tray will not give people a wrong feeling. In addition, since the freedom of design of the tray improves because of the absence of the front wall surface, it is possible to use a high-grade design which targets at a better design effect for instance instead of using a function-oriented design.

Sixteenth Preferred Embodiment

A cartridge holding mechanism of an optical disk record/reproduce drive according to a sixteenth preferred embodiment of the present invention will be described. Portions of the optical disk record/reproduce drive which are common to those according to the fifteenth preferred embodiment will be omitted, and different structures will be described. That is, on the cartridge seating surface 21 of the tray 20, the cartridge holders 27 do not exit on the left-hand and the right-hand sides of the tray 20, and there is the cartridge holder 27 only on the left-hand side.

During insertion into the cartridge holder 27 for placing of the cartridge 1 on the tray 20, the urging force of the cartridge holder 27 urges the cartridge 1 against the right-hand side wall surface 26.

The cartridge 1 is held on the tray 20 between the cartridge holder 20 and the right-hand side wall surface 26. In the innermost side of the tray 20, the stoppers 35 are disposed at a position which roughly matches with the engaging position of the cartridge holder 27 and the cartridge 1, thereby ensuring approximately similar operations and effect to those obtained in the structure wherein the cartridge holders 27 exist on the left-hand and the right-hand sides of the cartridge 1.

The structure according to this embodiment makes it possible to reduce the number of parts of the cartridge holder 27 and decrease a cost of the optical disk record/reproduce drive. In addition, since the cartridge holder 27 which is to be opened at the time of insertion over the cartridge 27 is disposed only on one side, the insertion over the cartridge 1 decreases more than where the cartridge holders 27 are disposed on the both sides. As the insertion over the cartridge 1 into the cartridge holder 21 decreases, it is possible to decrease the manual insertion force of the tray 20 and improve the operability of the optical disk record/reproduce drive. Further, this is applicable to such a cartridge 1 which comprises the engagement receiving part 6 only on one side.

Seventeenth Preferred Embodiment

A cartridge holding mechanism of a disk drive according to a seventeenth preferred embodiment of the present invention will be described with reference to FIG. 58. Portions of the optical disk record/reproduce drive which are common to those according to the first preferred embodiment will be omitted, and different structures will be described with reference to FIG. 58.

The shapes of the cartridge holders 20 are partially modified when there is interference with the opening 60a in the released state that the cartridge 1 is wrongly placed on the tray. As shown in FIG. 58, when the shapes are modified into the shapes of the cartridge holders 27 which serve as stoppers for the opening 60a, similar operations and effect are obtained. In other words, opening-engaging projections 27e protrude to the opposite side to the direction in which the engaging parts 27b of the cartridge holders 27 project. Hence, when the cartridge 1 is wrongly placed on the cartridge seating surface 21, as the cartridge holders 27 remain open as in the first preferred embodiment, since the projections 27e stick out largely beyond the opening 60a, the engagement with the opening 60a of the main unit 140 is solid.

Eighteenth Preferred Embodiment

A cartridge holding mechanism of a disk drive according to an eighteenth preferred embodiment of the present invention will be described with reference to FIG. 59. Portions of the optical disk record/reproduce drive which are common to those according to the fifteenth preferred embodiment will be omitted, and different structures will be described with reference to FIG. 59.

In FIG. 59, instead of integrating the engaging parts 27b of the cartridge holders 27 as convex-shaped projections, rollers 164 are axially supported by rotation axes. The rotation axes for the rollers 164 are positioned parallel to axial holes 27a or the rotation shaft for the disk, and when the cartridge 1 is inserted into the cartridge holders 27, the rollers 164 contact the cartridge 1 and the cartridge holders 27 first. Following this, the rollers 164 which are the engaging parts 27b of the cartridge holders 27 rotate which remaining in contact with the left-hand and the right-hand edge surfaces of the cartridge 1, until the engagement with the engagement receiving parts 6 of the cartridge 1 has completed.

When the cartridge 1 is inserted into the cartridge holders 27 in the structure according to the eighteenth preferred embodiment, since the frictional force with the left-hand and the right-hand edge surfaces of the cartridge 1 decreases as the rollers 164 rotate, the insertion over the cartridge 1 decreases. As the insertion which inserts the cartridge 1 into the cartridge holders 27 decreases, the manual insertion force over the tray also decreases, which in turn makes it possible to improve the operability of the disk record/reproduce drive.

While the rollers are shaped like cylindrical columns, the rollers may be shaped approximately like spheres.

Nineteenth Preferred Embodiment

A cartridge holding mechanism of an optical disk drive according to a nineteenth preferred embodiment of the present invention will be described with reference to 60. Portions of the optical disk record/reproduce drive which are common to those according to the first preferred embodiment will be omitted, and different structures will be described with reference to FIG. 60.

In FIG. 60, the cartridge holders 27 are formed by elastic members such as blade springs. The cartridge 1 and the engaging parts 27b of the cartridge holders 27 have an inflected shape which is obtained by bending the front edges of blade springs through plastic deformation into a cone-headed shape, and therefore, when the cartridge 1 is inserted into the cartridge holders 27, the engaging parts 12b are opened to the left-hand side and the right-hand side as the arms 174 are flexibly bent, and the engaging parts 27b contact the left-hand and the right-hand side surfaces of the cartridge 1.

After this, the arms 174 remain bent, and when the engaging parts 27b of the cartridge holder 172 finish engaging with the engagement receiving parts 6 of the cartridge 1, the urging of the arms 174 is released.

In the structure according to this embodiment, the coil springs 49 which urge the cartridge holders 27 and the cartridge 1 are necessary in the preceding embodiments, and hence, two or more parts are required for one set. However, since the cartridge holders 27 are formed by blade springs, one part realizes one set, thereby making it possible to reduce the number of parts and decrease a cost of the disk record/reproduce drive.

Instead of bending the front edges of the elastic members, the engaging members shaped as projections may be integrated with the elastic members.

Twentieth Preferred Embodiment

A cartridge holding mechanism of an optical disk drive according to a twentieth preferred embodiment of the present invention will be described with reference to 61. Portions of the optical disk record/reproduce drive which are common to those according to the first preferred embodiment will be omitted, and different structures will be described with reference to FIG. 61. That is, while the fifteenth preferred embodiment requires to form the stoppers 35, which restrict the innermost edges of the cartridge holders 27 where the cartridge 1 is placed, separately from the cartridge holders 27, similar operations and effect are obtained by a structure that the shapes of the cartridge holders 27 are partially modified as shown in FIG. 61 into such shapes of the cartridge holders 27 in which the stoppers 35 are integrated.

Further, while the engagement receiving parts 6 of the cartridge 1 are located on the left-hand side and the right-hand side of the cartridge 1, even where the engagement receiving parts 6 are located on one or both of axial lines on the left-hand side and the right-hand side to an axial line along the loading or ejection direction passing through the center of gravity of the tray, by forming an opening in the cartridge seating surface 21 or by other approach, it is possible to form the cartridge holders 27 on the tray 20 with the engaging parts 27b of the cartridge holder 27 engaged.

The invention claimed is:

1. A disk drive comprising:
a disk rotating unit which mounts and rotates a disk;
a traverse base which holds said disk rotating unit;
a damper member which flexibly holds said traverse base;
a main unit which holds said traverse base through said damper member;
a tray which mounts a cartridge which houses said disk;
a driving unit which loads or ejects said tray and accordingly moves said disk in said cartridge close to or away from said disk rotating unit, and
a traverse base holding member which is moved vertically by said driving unit relative to said main unit at the time of tray loading or tray ejection, wherein:
said cartridge is supported by said main unit through said tray,
said traverse base is flexibly held by said traverse base holding member through said damper member, and
the resonance frequencies of said damper member in the radius direction of said disk as it is being loaded and in the direction of a rotation shaft are set higher than the maximum rotational frequency of said disk.

2. The disk drive of claim 1, wherein said damper member applies a preload in a direction which is parallel to a surface of said traverse base.

* * * * *